(12) United States Patent
Davicioni et al.

(10) Patent No.: US 12,497,660 B2
(45) Date of Patent: Dec. 16, 2025

(54) USE OF IMMUNE CELL-SPECIFIC GENE EXPRESSION FOR PROGNOSIS OF PROSTATE CANCER AND PREDICTION OF RESPONSIVENESS TO RADIATION THERAPY

(71) Applicants: DECIPHER BIOSCIENCES, INC., San Diego, CA (US); The Regents of the University of Michigan, Ann Arbor, MI (US)

(72) Inventors: Elai Davicioni, La Jolla, CA (US); Nicholas George Erho, Vancouver (CA); Jonathan Lehrer, Vancouver (CA); Felix Y. Feng, Hillsborough, CA (US); Shuang G. Zhao, Ann Arbor, MI (US)

(73) Assignee: Veracyte SD, Inc., San Diego, CA (US)

( * ) Notice: Subject to any disclaimer, the term of this patent is extended or adjusted under 35 U.S.C. 154(b) by 629 days.

(21) Appl. No.: 16/636,320

(22) PCT Filed: Aug. 2, 2018

(86) PCT No.: PCT/US2018/045058
§ 371 (c)(1),
(2) Date: Feb. 3, 2020

(87) PCT Pub. No.: WO2019/028285
PCT Pub. Date: Feb. 7, 2019

(65) Prior Publication Data
US 2021/0317531 A1 Oct. 14, 2021

Related U.S. Application Data

(60) Provisional application No. 62/541,566, filed on Aug. 4, 2017.

(51) Int. Cl.
*C12Q 1/6886* (2018.01)
*G16H 20/40* (2018.01)
*G16H 50/20* (2018.01)

(52) U.S. Cl.
CPC ........... *C12Q 1/6886* (2013.01); *G16H 20/40* (2018.01); *G16H 50/20* (2018.01); *C12Q 2600/106* (2013.01); *C12Q 2600/118* (2013.01)

(58) Field of Classification Search
None
See application file for complete search history.

(56) References Cited

U.S. PATENT DOCUMENTS

| | | |
|---|---|---|
| 3,645,691 A | 2/1972 | Guenter et al. |
| 3,687,808 A | 8/1972 | Thomas, Jr. et al. |
| 4,323,546 A | 4/1982 | Crockfor et al. |
| 4,683,195 A | 7/1987 | Mullis et al. |
| 4,683,202 A | 7/1987 | Mullis et al. |
| 4,800,159 A | 1/1989 | Mullis et al. |
| 4,965,188 A | 10/1990 | Mullis et al. |
| 5,130,238 A | 7/1992 | Malek et al. |
| 5,143,854 A | 9/1992 | Pinung et al. |
| 5,225,326 A | 7/1993 | Bresser et al. |
| 5,270,184 A | 12/1993 | Walker et al. |
| 5,283,174 A | 2/1994 | Arnold et al. |
| 5,288,514 A | 2/1994 | Ellman |
| 5,384,261 A | 1/1995 | Winkle et al. |
| 5,399,491 A | 3/1995 | Kacian et al. |
| 5,455,166 A | 10/1995 | Walker |
| 5,480,784 A | 1/1996 | Kacian et al. |
| 5,494,810 A | 2/1996 | Barany et al. |
| 5,538,848 A | 7/1996 | Livak et al. |
| 5,545,524 A | 8/1996 | Trent et al. |
| 5,677,195 A | 10/1997 | Winkler et al. |
| 5,705,365 A | 1/1998 | Ryder et al. |
| 5,710,029 A | 1/1998 | Ryder et al. |
| 5,711,029 A | 1/1998 | Ryder et al. |
| 5,744,305 A | 4/1998 | Fodor et al. |
| 5,814,447 A | 9/1998 | Ishiguro et al. |
| 5,824,518 A | 10/1998 | Kacian et al. |
| 5,830,711 A | 11/1998 | Barany et al. |
| 5,846,717 A | 12/1998 | Brow et al. |
| 5,854,033 A | 12/1998 | Lizardi |
| 5,854,206 A | 12/1998 | Twardzik et al. |
| 5,888,779 A | 3/1999 | Kacian et al. |
| 5,925,517 A | 7/1999 | Tyagi et al. |
| 5,928,862 A | 7/1999 | Morrison |

(Continued)

FOREIGN PATENT DOCUMENTS

| | | |
|---|---|---|
| EP | 0 684 315 | 11/1995 |
| EP | 1 409 727 | 11/2005 |

(Continued)

OTHER PUBLICATIONS

US 5,962,233 A, 10/1999, Livak et al. (withdrawn)
Fridman (Nature Reviews Clinical Oncology 14, 717-734 pub online Jul. 25, 2017).*
Newman (Nature Methods vol. 12 No. 5 May 2015).*
McArdle (British Journal of Cancer 2004 91, 541-543).*
Litwin (JAMA Jun. 27, 2017 vol. 317 No. 24).*
Fridman (Nature Reviews Clinical Oncology vol. 14 Dec. 2017 pp. 717-734).*
Zhang (PLOS ONE Dec. 2012 vol. 7 Issue 12 e50946 pp. 1-14).*
Abdueva et al., "Quantitative Expression Profiting in Formalin-Fixed Paraffin-Embedded Samples by Affymetrix Microarrays," Journal of Molecular Diagnostics (Jul. 2010) vol. 12, No. 4, pp. 409-417.

(Continued)

Primary Examiner — Amanda Haney
(74) Attorney, Agent, or Firm — Knobbe, Martens, Olson & Bear, LLP

(57) ABSTRACT

Methods, systems, and kits for the diagnosis, prognosis and the determination of cancer progression of prostate cancer in a subject are disclosed. In particular, the disclosure relates to the use of immune cell-specific gene expression in determining prognosis and identifying individuals in need of treatment for prostate cancer who will be responsive to radiation therapy.

19 Claims, 58 Drawing Sheets

(56) References Cited

U.S. PATENT DOCUMENTS

| | | | |
|---|---|---|---|
| 5,965,360 A | 10/1999 | Zain et al. |
| 5,985,557 A | 11/1999 | Prudent et al. |
| 5,989,815 A | 11/1999 | Skolnick et al. |
| 5,994,069 A | 11/1999 | Hall et al. |
| 6,001,567 A | 12/1999 | Brow et al. |
| 6,022,692 A | 2/2000 | Coulie et al. |
| 6,027,887 A | 2/2000 | Zavada et al. |
| 6,034,218 A | 3/2000 | Reed et al. |
| 6,090,543 A | 7/2000 | Prudent et al. |
| 6,121,489 A | 9/2000 | Dorner et al. |
| 6,136,182 A | 10/2000 | Dolan et al. |
| 6,150,097 A | 11/2000 | Tyagi et al. |
| 6,198,107 B1 | 3/2001 | Seville |
| 6,218,523 B1 | 4/2001 | French |
| 6,225,051 B1 | 5/2001 | Sugiyama et al. |
| 6,251,639 B1 | 6/2001 | Kurn |
| 6,262,245 B1 | 7/2001 | Xu et al. |
| 6,268,142 B1 | 7/2001 | Duff et al. |
| 6,303,305 B1 | 10/2001 | Wittwer et al. |
| 6,410,278 B1 | 6/2002 | Notomi et al. |
| 6,436,642 B1 | 8/2002 | Gould-Rothberg et al. |
| 6,541,205 B1 | 4/2003 | Yokoyama et al. |
| 6,573,043 B1 | 6/2003 | Cohen et al. |
| 6,630,358 B1 | 10/2003 | Wagner et al. |
| 6,723,506 B2 | 4/2004 | Fletcher et al. |
| 6,828,429 B1 | 12/2004 | Srivastava et al. |
| 7,008,765 B1 | 3/2006 | Bussemakers et al. |
| 7,186,514 B2 | 3/2007 | Zavada et al. |
| 7,211,390 B2 | 5/2007 | Rothberg et al. |
| 7,244,559 B2 | 7/2007 | Rothberg et al. |
| 7,264,929 B2 | 9/2007 | Rothberg et al. |
| 7,280,922 B2 | 10/2007 | Mei et al. |
| 7,300,788 B2 | 11/2007 | Matsuzaki et al. |
| 7,319,011 B2 | 1/2008 | Riggins et al. |
| 7,323,305 B2 | 1/2008 | Leamon et al. |
| 7,335,762 B2 | 2/2008 | Rothberg et al. |
| 7,358,061 B2 | 4/2008 | Yamamoto et al. |
| 7,361,488 B2 | 4/2008 | Fan et al. |
| 7,378,233 B2 | 5/2008 | Sidransky et al. |
| 7,407,755 B2 | 8/2008 | Lubinski et al. |
| 7,541,169 B2 | 6/2009 | Freimuth et al. |
| 7,598,052 B2 | 10/2009 | Giordano et al. |
| 7,662,553 B2 | 2/2010 | Lenz et al. |
| 7,767,391 B2 | 8/2010 | Scott et al. |
| 7,901,881 B2 | 3/2011 | Libutti et al. |
| 7,901,888 B2 | 3/2011 | Kebebew |
| 7,914,988 B1 | 3/2011 | Chudin et al. |
| 7,927,826 B2 | 4/2011 | Riggins et al. |
| 8,008,009 B2 | 8/2011 | Choquet-Kastylevsky et al. |
| 8,202,692 B2 | 6/2012 | Giordano et al. |
| 8,273,539 B2 | 9/2012 | Klee et al. |
| 8,293,880 B2 | 10/2012 | Cote et al. |
| 8,299,233 B2 | 10/2012 | Andre et al. |
| 8,338,109 B2 | 12/2012 | Vasmatzis et al. |
| 8,354,228 B2 | 1/2013 | Ron |
| 8,465,914 B2 | 6/2013 | Brown et al. |
| 8,541,170 B2 | 9/2013 | Kennedy et al. |
| 8,568,971 B2 | 10/2013 | Brown et al. |
| 8,669,057 B2 | 3/2014 | Kennedy et al. |
| 8,802,599 B2 | 8/2014 | Aharonov et al. |
| 8,828,656 B2 | 9/2014 | Bullerdiek et al. |
| 8,877,445 B2 | 11/2014 | Shackney |
| 8,945,829 B2 | 2/2015 | Keutgen et al. |
| 9,040,286 B2 | 5/2015 | Zon et al. |
| 9,074,258 B2 | 7/2015 | Davicion et al. |
| 9,096,906 B2 | 8/2015 | Aharonov et al. |
| 9,157,123 B2 | 10/2015 | Xing |
| 9,175,352 B2 | 11/2015 | Keutgen et al. |
| 9,206,481 B2 | 12/2015 | Srivastava et al. |
| 9,206,482 B2 | 12/2015 | Davicioni et al. |
| 9,234,244 B2 | 1/2016 | Zeiger et al. |
| 9,435,812 B2 | 9/2016 | Pestano et al. |
| 9,495,515 B1 | 11/2016 | Giulia et al. |
| 9,534,249 B2 | 1/2017 | Vasmatzis et al. |
| 9,587,279 B2 | 3/2017 | Fahey, III et al. |
| 9,617,604 B2 | 4/2017 | Davicion et al. |
| 9,631,239 B2 | 4/2017 | Perou |
| 9,708,667 B2 | 7/2017 | Yanai et al. |
| 9,714,452 B2 | 7/2017 | Davicioni et al. |
| 9,856,537 B2 | 1/2018 | Kennedy et al. |
| 9,994,907 B2 | 6/2018 | Davicioni et al. |
| 10,114,924 B2 | 10/2018 | Kennedy et al. |
| 10,407,731 B2 | 9/2019 | Klee et al. |
| 10,407,735 B2 | 9/2019 | Chinnaiyan et al. |
| 10,422,009 B2 | 9/2019 | Davicioni et al. |
| 10,494,677 B2 | 12/2019 | Vasmatzis et al. |
| 10,513,737 B2 | 12/2019 | Davicioni et al. |
| 10,865,452 B2 | 12/2020 | Davicioni |
| 10,876,164 B2 | 12/2020 | Stone |
| 11,035,005 B2 | 6/2021 | Buerki et al. |
| 11,078,542 B2 | 8/2021 | Davicioni et al. |
| 11,208,697 B2 | 12/2021 | Davicioni et al. |
| 11,390,923 B2 | 7/2022 | Chinnaiyan et al. |
| 11,414,708 B2 | 8/2022 | Davicioni |
| 12,195,805 B2 | 1/2025 | Faruki |
| 2001/0051344 A1 | 12/2001 | Shalon et al. |
| 2002/0076735 A1 | 6/2002 | Williams et al. |
| 2002/0090633 A1 | 7/2002 | Becker et al. |
| 2002/0119463 A1 | 8/2002 | Fads |
| 2002/0168638 A1 | 11/2002 | Schlegel et al. |
| 2002/0169137 A1 | 11/2002 | Reiner et al. |
| 2002/0182586 A1 | 12/2002 | Morris et al. |
| 2003/0119168 A1 | 6/2003 | Madison et al. |
| 2003/0152980 A1 | 8/2003 | Golub et al. |
| 2003/0175736 A1 | 9/2003 | Chinnaiyan et al. |
| 2003/0185830 A1 | 10/2003 | Xu et al. |
| 2003/0186248 A1 | 10/2003 | Erlander et al. |
| 2003/0190602 A1 | 10/2003 | Pressman et al. |
| 2003/0194734 A1 | 10/2003 | Jatkoe |
| 2003/0224399 A1 | 12/2003 | Reed et al. |
| 2003/0235820 A1 | 12/2003 | Mack et al. |
| 2004/0009481 A1 | 1/2004 | Schlegel et al. |
| 2004/0018493 A1 | 1/2004 | Anastasio et al. |
| 2004/0019466 A1 | 1/2004 | Minor et al. |
| 2004/0029114 A1 | 2/2004 | Mack et al. |
| 2004/0058378 A1 | 3/2004 | Kong et al. |
| 2004/0259086 A1 | 12/2004 | Schlegel et al. |
| 2005/0042222 A1 | 2/2005 | Yamamoto et al. |
| 2005/0042638 A1 | 2/2005 | Arnold et al. |
| 2005/0048533 A1 | 3/2005 | Sidransky et al. |
| 2005/0064455 A1 | 3/2005 | Baker et al. |
| 2005/0118625 A1 | 6/2005 | Mounts |
| 2005/0137805 A1 | 6/2005 | Lewin et al. |
| 2005/0202442 A1 | 9/2005 | Morris et al. |
| 2005/0227917 A1 | 10/2005 | Williams et al. |
| 2005/0240357 A1 | 10/2005 | Minor |
| 2005/0250125 A1 | 11/2005 | Novakoff |
| 2005/0260646 A1 | 11/2005 | Baker et al. |
| 2005/0266443 A1 | 12/2005 | Croce et al. |
| 2005/0266459 A1 | 12/2005 | Poulsen |
| 2006/0019256 A1 | 1/2006 | Clarke et al. |
| 2006/0019615 A1 | 1/2006 | Ditmer |
| 2006/0035244 A1 | 2/2006 | Riggins et al. |
| 2006/0046253 A1 | 3/2006 | Nakao |
| 2006/0046265 A1 | 3/2006 | Becker et al. |
| 2006/0083744 A1 | 4/2006 | Chen et al. |
| 2006/0088851 A1 | 4/2006 | Erlander et al. |
| 2006/0094061 A1 | 5/2006 | Brys et al. |
| 2006/0105360 A1 | 5/2006 | Croce et al. |
| 2006/0127907 A1 | 6/2006 | Matsubara et al. |
| 2006/0134663 A1 | 6/2006 | Harkin et al. |
| 2006/0204989 A1 | 9/2006 | Kopreski |
| 2006/0211017 A1 | 9/2006 | Chinnaiyan et al. |
| 2007/0010469 A1 | 1/2007 | Chan |
| 2007/0020657 A1 | 1/2007 | Grebe et al. |
| 2007/0031873 A1 | 2/2007 | Wang et al. |
| 2007/0037165 A1 | 2/2007 | Venter et al. |
| 2007/0037186 A1 | 2/2007 | Jiang et al. |
| 2007/0048738 A1 | 3/2007 | Donkena et al. |
| 2007/0065827 A1 | 3/2007 | Pauloski et al. |
| 2007/0065833 A1 | 3/2007 | Gupta |
| 2007/0083334 A1 | 4/2007 | Mintz et al. |
| 2007/0099197 A1 | 5/2007 | Afar et al. |
| 2007/0099209 A1 | 5/2007 | Clarke et al. |

(56) References Cited

U.S. PATENT DOCUMENTS

| | | |
|---|---|---|
| 2007/0105133 A1 | 5/2007 | Clarke et al. |
| 2007/0148667 A1 | 6/2007 | Williams et al. |
| 2007/0148687 A1 | 6/2007 | Bedingham et al. |
| 2007/0161004 A1 | 7/2007 | Brown et al. |
| 2007/0172841 A1 | 7/2007 | Wang |
| 2007/0172844 A1 | 7/2007 | Lancaster et al. |
| 2007/0212702 A1 | 9/2007 | Tomlins et al. |
| 2007/0220621 A1 | 9/2007 | Clarke et al. |
| 2007/0238119 A1 | 10/2007 | Yu et al. |
| 2007/0259352 A1 | 11/2007 | Bentwich et al. |
| 2007/0275915 A1 | 11/2007 | Hallenbeck et al. |
| 2008/0009001 A1 | 1/2008 | Bettuzzi et al. |
| 2008/0028302 A1 | 1/2008 | Meschkat |
| 2008/0044824 A1 | 2/2008 | Giordano et al. |
| 2008/0076674 A1 | 3/2008 | Litman et al. |
| 2008/0124344 A1 | 5/2008 | Combs et al. |
| 2008/0131892 A1 | 6/2008 | Becker et al. |
| 2008/0145841 A1 | 6/2008 | Libutti et al. |
| 2008/0254470 A1 | 10/2008 | Berlkin |
| 2008/0269157 A1 | 10/2008 | Srivastava et al. |
| 2008/0274457 A1 | 11/2008 | Eng et al. |
| 2008/0281568 A1 | 11/2008 | Kao et al. |
| 2009/0020433 A1 | 1/2009 | Cohen et al. |
| 2009/0036415 A1 | 2/2009 | Rubin et al. |
| 2009/0062144 A1 | 3/2009 | Guo |
| 2009/0075921 A1 | 3/2009 | Ikegawa |
| 2009/0149333 A1 | 6/2009 | Knudsen et al. |
| 2009/0191535 A1 | 7/2009 | Connelly et al. |
| 2009/0204333 A1 | 8/2009 | Friend et al. |
| 2009/0239221 A1 | 9/2009 | Chinnaiyan et al. |
| 2009/0280490 A1 | 11/2009 | Baker et al. |
| 2009/0298082 A1 | 12/2009 | Klee et al. |
| 2010/0021538 A1 | 1/2010 | Byun et al. |
| 2010/0055704 A1 | 3/2010 | Giordano et al. |
| 2010/0075384 A1 | 3/2010 | Kong et al. |
| 2010/0099093 A1 | 4/2010 | Weaver et al. |
| 2010/0131286 A1 | 5/2010 | Houlgatte et al. |
| 2010/0131432 A1 | 5/2010 | Kennedy et al. |
| 2010/0137164 A1 | 6/2010 | Rubin et al. |
| 2010/0178653 A1 | 7/2010 | Aharonov et al. |
| 2010/0215638 A1 | 8/2010 | Ijin et al. |
| 2010/0257617 A1 | 10/2010 | Ami et al. |
| 2010/0279327 A1 | 11/2010 | Ossovskaya |
| 2010/0285979 A1 | 11/2010 | Zeiger et al. |
| 2011/0009286 A1 | 1/2011 | Andre et al. |
| 2011/0045462 A1 | 2/2011 | Fu et al. |
| 2011/0092375 A1 | 4/2011 | Zamore et al. |
| 2011/0136683 A1 | 6/2011 | Davicioni |
| 2011/0152110 A1 | 6/2011 | Vierlinger et al. |
| 2011/0166838 A1 | 7/2011 | Gehrmann |
| 2011/0178163 A1 | 7/2011 | Chowdhury |
| 2011/0212855 A1 | 9/2011 | Rafnar et al. |
| 2011/0229894 A1 | 9/2011 | Levy et al. |
| 2011/0230372 A1 | 9/2011 | Willman et al. |
| 2011/0236903 A1 | 9/2011 | McClelland |
| 2011/0287946 A1 | 11/2011 | Gudmundsson et al. |
| 2011/0294123 A1 | 12/2011 | Nakamura et al. |
| 2011/0312520 A1 | 12/2011 | Kennedy et al. |
| 2012/0015839 A1 | 1/2012 | Chinnaiyan |
| 2012/0015843 A1 | 1/2012 | Von et al. |
| 2012/0041274 A1 | 2/2012 | Stone et al. |
| 2012/0108453 A1 | 5/2012 | Smit et al. |
| 2012/0115743 A1 | 5/2012 | Davicioni et al. |
| 2012/0122698 A1 | 5/2012 | Stacey et al. |
| 2012/0122718 A1 | 5/2012 | Reisman |
| 2012/0157334 A1 | 6/2012 | Beaudenon-Huibregtse et al. |
| 2012/0172243 A1 | 7/2012 | Davicioni et al. |
| 2012/0214165 A1 | 8/2012 | Walfish et al. |
| 2012/0220474 A1 | 8/2012 | Kennedy et al. |
| 2012/0304318 A1 | 11/2012 | Ohnuma et al. |
| 2013/0004974 A1 | 1/2013 | Klee et al. |
| 2013/0023434 A1 | 1/2013 | Van |
| 2013/0142728 A1 | 6/2013 | Beaudenon-Huibregtse et al. |
| 2013/0150257 A1 | 6/2013 | Abdueva et al. |
| 2013/0172203 A1 | 7/2013 | Yeatman et al. |
| 2013/0184999 A1 | 7/2013 | Ding |
| 2013/0196866 A1 | 8/2013 | Pestano et al. |
| 2013/0225662 A1 | 8/2013 | Kennedy et al. |
| 2013/0231258 A1 | 9/2013 | Wilde et al. |
| 2013/0267443 A1 | 10/2013 | Chinnaiyan |
| 2013/0273543 A1 | 10/2013 | Gudmundsson et al. |
| 2013/0302808 A1 | 11/2013 | Vasmatzis |
| 2013/0302810 A1 | 11/2013 | Latham et al. |
| 2013/0303826 A1 | 11/2013 | Jurisica et al. |
| 2014/0030714 A1 | 1/2014 | Paschke et al. |
| 2014/0080731 A1 | 3/2014 | Davicioni et al. |
| 2014/0087961 A1 | 3/2014 | Sulem et al. |
| 2014/0099261 A1 | 4/2014 | Keutgen et al. |
| 2014/0121126 A1 | 5/2014 | Bivona et al. |
| 2014/0143188 A1 | 5/2014 | Mackey et al. |
| 2014/0228237 A1 | 8/2014 | Kennedy et al. |
| 2014/0243240 A1 | 8/2014 | Soldin et al. |
| 2014/0302042 A1 | 10/2014 | Chin et al. |
| 2014/0303002 A1 | 10/2014 | Shak et al. |
| 2014/0303034 A1 | 10/2014 | Gascoyne et al. |
| 2014/0315199 A1 | 10/2014 | Rhodes et al. |
| 2014/0315739 A1 | 10/2014 | Aharonov et al. |
| 2014/0349856 A1 | 11/2014 | Schnabel et al. |
| 2014/0349864 A1 | 11/2014 | Kennedy et al. |
| 2014/0371096 A1 | 12/2014 | Umbright et al. |
| 2015/0038376 A1 | 2/2015 | Tian et al. |
| 2015/0099665 A1 | 4/2015 | Rosenfeld et al. |
| 2015/0141470 A1 | 5/2015 | Garraway et al. |
| 2015/0253331 A1 | 9/2015 | Zijlstra |
| 2015/0275306 A1 | 10/2015 | Bernards et al. |
| 2015/0284802 A1 | 10/2015 | Chinnaiyan |
| 2015/0292030 A1 | 10/2015 | McConkey |
| 2015/0299808 A1 | 10/2015 | Gonzalez et al. |
| 2015/0307947 A1 | 10/2015 | Basu et al. |
| 2015/0329915 A1 | 11/2015 | Davicioni et al. |
| 2015/0368724 A1 | 12/2015 | Aharonov et al. |
| 2016/0024586 A1 | 1/2016 | Delfour et al. |
| 2016/0032395 A1 | 2/2016 | Davicioni et al. |
| 2016/0032400 A1 | 2/2016 | Gomis et al. |
| 2016/0068915 A1 | 3/2016 | Kennedy et al. |
| 2016/0076108 A1 | 3/2016 | Davicioni et al. |
| 2016/0115546 A1 | 4/2016 | Rosenfeld et al. |
| 2016/0120832 A1 | 5/2016 | Rabinowitz et al. |
| 2016/0251729 A1 | 9/2016 | Chinnaiyan |
| 2016/0312294 A1 | 10/2016 | Walker |
| 2016/0312305 A1 | 10/2016 | Kennedy et al. |
| 2016/0312306 A1 | 10/2016 | Kennedy et al. |
| 2016/0312307 A1 | 10/2016 | Kennedy et al. |
| 2016/0312308 A1 | 10/2016 | Kennedy et al. |
| 2017/0016076 A1 | 1/2017 | Barnett-Itzhaki et al. |
| 2017/0145513 A1 | 5/2017 | Kennedy et al. |
| 2017/0166980 A1 | 6/2017 | Fahey, III et al. |
| 2017/0218455 A1 | 8/2017 | Steelman |
| 2017/0329894 A1 | 11/2017 | Kennedy et al. |
| 2018/0016642 A1 | 1/2018 | Kennedy et al. |
| 2018/0030540 A1 | 2/2018 | Davicioni et al. |
| 2018/0068058 A1 | 3/2018 | Abdueva et al. |
| 2018/0112275 A1 | 4/2018 | Davicioni et al. |
| 2018/0122508 A1 | 5/2018 | Wilde et al. |
| 2018/0127832 A1 | 5/2018 | Kennedy et al. |
| 2018/0282817 A1 | 10/2018 | You |
| 2018/0291459 A1 | 10/2018 | Al-Deen Ashab et al. |
| 2019/0017799 A1 | 1/2019 | Nesheim |
| 2019/0204322 A1 | 7/2019 | Alshalalfa et al. |
| 2020/0181710 A1 | 6/2020 | Steelman |
| 2020/0191773 A1 | 6/2020 | Kitano et al. |
| 2020/0224276 A1 | 7/2020 | Chinnaiyan et al. |
| 2021/0054464 A1 | 2/2021 | Faruki |
| 2021/0130902 A1 | 5/2021 | Da Vicioni |
| 2022/0177974 A1 | 6/2022 | Davicioni |
| 2022/0213557 A1 | 7/2022 | De Jong |
| 2023/0115828 A1 | 4/2023 | De Jong |
| 2023/0151429 A1 | 5/2023 | Davicioni |
| 2023/0220485 A1 | 7/2023 | Davicioni |
| 2024/0002944 A1 | 1/2024 | Schaeffer |
| 2024/0319192 A1 | 9/2024 | Davicioni |
| 2024/0360517 A1 | 10/2024 | Davicioni |

(56) References Cited

U.S. PATENT DOCUMENTS

| | | | |
|---|---|---|---|
| 2024/0417800 | A1 | 12/2024 | Ashab |
| 2025/0171854 | A1 | 5/2025 | Davicioni |

FOREIGN PATENT DOCUMENTS

| | | |
|---|---|---|
| EP | 1 777 523 | 4/2007 |
| EP | 2 366 800 | 9/2011 |
| WO | WO 90/015070 | 12/1990 |
| WO | WO 92/010092 | 6/1992 |
| WO | WO 93/009668 | 5/1993 |
| WO | WO 93/022684 | 11/1993 |
| WO | WO 98/045420 | 10/1998 |
| WO | WO 01/060860 | 8/2001 |
| WO | WO 01/066753 | 9/2001 |
| WO | WO 02/000929 | 1/2002 |
| WO | WO 02/083921 | 10/2002 |
| WO | WO 03/012067 | 2/2003 |
| WO | WO 04/037972 | 5/2004 |
| WO | WO 05/040396 | 5/2005 |
| WO | WO 05/085471 | 9/2005 |
| WO | WO 05/100608 | 10/2005 |
| WO | WO 06/047484 | 5/2006 |
| WO | WO 06/091776 | 8/2006 |
| WO | WO 06/110264 | 10/2006 |
| WO | WO 06/127537 | 11/2006 |
| WO | WO 06/135596 | 12/2006 |
| WO | WO 07/056049 | 5/2007 |
| WO | WO 07/070621 | 6/2007 |
| WO | WO 07/081720 | 7/2007 |
| WO | WO 07/081740 | 7/2007 |
| WO | WO 08/023087 | 2/2008 |
| WO | WO 08/046911 | 4/2008 |
| WO | WO 08/086478 | 7/2008 |
| WO | WO 08/112283 | 9/2008 |
| WO | WO 09/009432 | 1/2009 |
| WO | WO 09/020521 | 2/2009 |
| WO | WO 09/020905 | 2/2009 |
| WO | WO 09/029266 | 3/2009 |
| WO | WO 09/045115 | 4/2009 |
| WO | WO 09/074968 | 6/2009 |
| WO | WO 09/108860 | 9/2009 |
| WO | WO 09/143603 | 12/2009 |
| WO | WO 10/018601 | 2/2010 |
| WO | WO 10/056374 | 5/2010 |
| WO | WO 10/073248 | 7/2010 |
| WO | WO 10/099598 | 9/2010 |
| WO | WO 10/123626 | 10/2010 |
| WO | WO 10/124372 | 11/2010 |
| WO | WO 11/150453 | 12/2011 |
| WO | WO 12/031008 | 3/2012 |
| WO | WO 12/068383 | 5/2012 |
| WO | WO 12/135008 | 10/2012 |
| WO | WO 13/006495 | 1/2013 |
| WO | WO 13/088457 | 6/2013 |
| WO | WO 13/116472 | 8/2013 |
| WO | WO 13/116742 | 8/2013 |
| WO | WO 14/028884 | 2/2014 |
| WO | WO 14/043803 | 3/2014 |
| WO | WO 14/085666 | 5/2014 |
| WO | WO 14/138101 | 9/2014 |
| WO | WO 14/151764 | 9/2014 |
| WO | WO 15/024942 | 2/2015 |
| WO | WO 15/071876 | 5/2015 |
| WO | WO 15/073949 | 5/2015 |
| WO | WO 16/141127 | 9/2016 |
| WO | WO 17/059549 | 4/2017 |
| WO | WO 17/062505 | 4/2017 |
| WO | WO 18/161081 | 9/2018 |
| WO | WO 18/165600 | 9/2018 |
| WO | WO 19/023517 | 1/2019 |
| WO | WO 19/133697 | 7/2019 |

OTHER PUBLICATIONS

Adamo and Ladomery, "The Oncogene ERG: A Key Factor in Prostate Cancer," *Oncogene*(2016), 35:403-414.

Affymetrix GeneChip Human Genome U133 Array Set HG-U133A, Geo, Mar. 11, 2002, retrieved on Mar. 11, 2002.

Affymetrix, Human Exon 1.0 ST Array—Support Materials, https://www.affymetrix.com/support/technical/byproduct.affx?product=huexon-st, Jan. 1, 2006 (Jan. 1, 2006).

Affymetrix: Data Sheet, "GeneChip® Exon Array System for Human, Mouse, and Rat," Internet Citation, [Online] Jan. 25, 2012 [Retrieved from the Internet] Intp://www.biainformatics.atickland.aciaz/workshops/1O_March_2011 1Exon_EOST_Datash eet.pdf, 8 pages.

Agell et al., "A 12-Gene Expression Signature Is Associated with Aggressive Histological in Prostate Cancer: SEC14L1 and TCEB1 Genes Are Potential Markers of Progression," Am J Pathol (2012) vol. 181 (5), pp. 1585-1594.

Alberts et al., "Vesicular traffic in the secretory and endocytic pathways," Molecular Biology of the Cell (1994) 3rd Ed., p. 465.

Aldred et al., "Papillary and follicular thyroid carcinomas show distinctly different microarray expression profiles and can be distinguished by a minimum of five genes," J Clin Oncol. (2004) 22(17):3531-9.

Alkhateeb et al., Mar. 13, 2019, Transcriptomics signature from next-generation sequencing data reveals new transcriptomic biomarkers related to prostate cancer, Cancer Informatics, 18:1-12.

Altintas et al., Jun. 2013 Differentially expressed androgen-regulated genes in androgen-sensitive tissues reveal potential biomarkers of early prostate cancer, PLOS One, 8(6) :e66278.

Amling et al.: "Long-term hazard of progression after radical prostatectomy for clinically EB localized prostate cancer continued risk of biochemical failure after 5 years," J Urol. (2000) 164:101-105.

Amundadottir et al., "A common variant associated with prostate cancer in European and African populations," Nat Genet. (2006) 38:652-658.

Amundson et al., "Integrating global gene expression and radiation survival parameters across the 60 cell lines of the National Cancer Institute Anticancer Drug Screen," Cancer Research (2008) 68(2):415-424.

Anonymous, UCSC Genome Browser on Human Mar. 2006, NCBI36/hg18) Assembly, Mar. 2006, XP055587638, Retrieved from the Internet: URL:https://genome-euro.ucsc.edu/cgi-bin/hgTracks?db=hg18&&lastVirtModeType=default&lastVirtModeExtraState=&virtModeType=default&virtMode=0&nonVirtPosition=&position=chr5%3A1402512 6%2D14062770&hgsid=232148223_IY1y9VS-0Lh0jhldEBQ3nViBrQuB5 [retrieved on May 10, 2019].

Ateeq et al., Mar. 2, 2011, Therapeutic targeting of SPINK1-positive prostate cancer, Sci Transl Med, 3(72):1-18.

Ausubel, et al. Current Protocols in Molecular Biology. Wiley & Sons, New York (1995) Table of Contents.

Baetke et al., "Molecular Pathways Involved in Prostate Carcinogenesis: Insights from Public Microarray Datasets," PLoS ONE (2012) 7(11):e49831, 1-11.

Baggerly et al., "Deriving Chemosensitivity from Cell Lines: Forensic Bioinformatics and Reproducible Research in High-Throughput Biology," The Annals of Applied Sciences (2009) vol. 3, No. 4, pp. 1309-1334.

Ballman et al., "Faster cyclic loess: normalizing RNA arrays via linear models," Bioinformatics, 2004, 20 :2778-2786.

Bannert et al., "Retroelements and the human genome: new perspectives on an old relation." PNAS (Oct. 5, 2004) vol. 101, Suppl. 2, pp. 14572-14579.

Barlow et al., "Analysis of Case-Cohort Designs," J Clin Epidemiol (1999) vol. 52 (12), 1165-1172.

Bauer et al., "Identification of Markers of Taxane Sensitivity Using Proteomic and Genomic Analyses of Breast Tumor from Patients Receiving Neoadjuvant Paclitaxel and Radiation," Clin. Cancer Res. (2010) 16(2):681-690, American Association for Cancer Research.

Becht et al., Oct. 20, 2016, Estimating the population abundance of tissue-infiltrating immune and stromal cell populations using gene expression, Gemone Biology, 52(Suppl 2):218.

(56) References Cited

OTHER PUBLICATIONS

Benner et al., "Evolution, language and analogy in functional genomics," TRENDS in Genetics, (Jul. 2001) vol. 17, pp. 414-418.
Bergstralh et al., "Software for optimal matching in observation al studies," Epidemiology (1996) 7(3):331-332.
Best et al., "Molecular differentiation of high- and moderate-grade human prostate cancer by cDNA microarray analysis", Diagn Mol Pathol. (2003) 12(2):63-70.
Bhaskar et al., Oct. 1, 2003, E-selective up-regulation allows for targeted drug delivery in prostate cancer, Cancer Research 63:6387-6394.
Bibikova et al., "Expression signatures that correlated with Gleason score and relapse in prostate cancer," Genomics (2007) 89(6):666-672.
Bibikova et al., "Gene expression profiles in formalin-fixed, paraffin-embedded tissues obtained with a novel assay for microarray analysis," Clin Chem., 2004, 50:2384-2386.
Bibikova et al., "Quantitative gene expression profiling in formalin-fixed, paraffin-embedded tissues using universal bead arrays," Am J Pathol. (2004) 165:1799-1807.
Birney et al., "Identification and analysis of functional elements in 1% of the human genome by the ENCODE pilot project." Nature Jun. 14, 2007; 447(7146):799-816.
Bismar et al., "ERG Protein Expression Reflects Hormonal Treatment Response and is Associated with Gleason Score and Prostate Cancer Specific Mortality," Eur. J. Cancer (2012), 48:538-546,Elsevier Ltd.
Biton et al., Nov. 20, 2014, Independent component analysis uncovers the landscape of thebladder tumor transcriptome and reveals insights into luminal and basal subtypes, Cell Reports, 9(4):1235-1245.
Blute et al., "Use of Gleason score, prostate specific antigen, seminal vesicle and margin status to predict biochemical failure after radical prostatectomy," J Urol (2001) 165: 119-125.
Boorjian et al., "Long-term risk of clinical progression after biochemical recurrence following radical prostatectomy: the impact of time from surgery to recurrence." Eur Urol. (Jun. 2011) 59(6):893-9.
Boormans et al., "Identification of TDRD1 as a direct target gene of ERG in primary prostate cancer," Int J Cancer (2013) vol. 133 (2), pp. 335-345.
Bostwick et al., "Prognostic factors in prostate cancer: College of American Pathologists consensus statement," Arch Pathol Lab Med (2000) 124(7):995-1000.
Bott et al., "Prostate cancer management: (2) an update on locally advanced and metastatic disease", Postgrad Med J, Dec. 3, 2003, 79(937), 643-645.
Brase et al., "*TMPRSS2-ERG*—specific transcriptional modulation is associated with prostate cancer biomarkers and TGF-ß signaling," BMC Cancer (2011) 11(507):1-8.
Breiman, "Random Forests," Machine Learning (2001) 45:5-32.
Brouha et al., "Hot L1s account for the bulk of retrotransposition in the human population." Pnas USA (Apr. 29, 2003) 100(9):5280-5.
Bueno et al., "A diagnostic test for prostate cancer from gene expression profiling data," J Urol, Feb. 2004; 171(2 Pt 1):903-6.
Bull et al., "Identification of potential diagnostic markers of prostate cancer and prostatic intraepithelial neoplasia using cDNA microarray," British J Cancer (Jun. 1, 2001) 84(11):1512-1519.
Bussemakers et al., "DD3: a new prostate-specific gene, highly overexpressed in prostate cancer." Cancer Res. (Dec. 1, 1999) 59(23):5975-9.
Carninci et al., "The transcriptional landscape of the mammalian genome," Science (Sept. 2, 2005) 09(5740): 1559-63.
Cerutti et al. "Diagnosis of suspicious thyroid nodules using four protein biomarkers," Clin Cancer Res. (2006) 12(11 Pt 1):3311-8.
Chalitchagorn et al., "Distinctive pattern of LINE-1 methylation level in normal tissues and the association with carcinogenesis." Oncogene (Nov. 18, 2004) 23(54):8841-6.
Che et al.: "Prognostic Value of Abnormal p53 Expression in Locally Advanced Prostate Cancer Treated With Androgen Deprivation and Radiotherapy: A Study Based on RTOG 9202"; International Journal of Radiation: Oncology Biology Physics (Nov. 15, 2007) vol. 69, No. 4, pp. 1117-1123.
Chen et al., "Deregulation of a Hox Protein Regulatory Network Spanning Prostate Cancer Initiation and Progression," Clin Cancer Res (Jun. 2012) 18(16):4291-4302.
Chen et al., "Hepsin and maspin are inversely expressed in laser capture microdissectioned prostate cancer," J Urol. (Apr. 2003) 169(4):1316-1319.
Chen et al., "Significance of noninvasive diagnosis of prostate cancer with cytologic examination of prostatic fluid," J Nippon Med Sch. (Jun. 2006) 73(3):129-135.
Chen et al., 2002, Discordant protein and mRNA expression in lung adenocarcinomas, Molecular & Cellular Proteomics 1.4, pp. 304-313.
Chen et al.: "Molecular determinants of resistance to antiandrogen therapy"; Nature Medicine, Nature Publishing Group, New York, NY (Jan. 1, 2004) vol. 10, No. 1, pp. 33-39.
Cheng et al. "Cell Proliferation in Prostate Cancer Patients with Lymph Node Metastasis", Clin Cancer Res (Oct. 1999) 5(10):2820-2823.
Cheung et al., "Natural variation in human gene expression assessed in lymphoblastoid cells," Nature Genetics (2003) vol. 33, pp. 422-425.
Cheville et at., "Gene Panel Model Predictive of Outcome in Men at High-Risk of Systemic|Progression and Death From Prostate Cancer After Radical Retropubic Prostatectomy," Journal Of Clinical Oncology (Aug. 20, 2008) vol. 26 , No. 24.
Chifman et al., "Conservation of immune gene signatures in solid tumors and prognostic implications," BMC Cancer (2016) 16:911, pp. 1-17 DOI 10.1186/S12885-016-2948-Z.
Cho et al., "Hypermethylation of CpG island loci and hypomethylation of LINE-1 and Alu repeats in prostate adenocarcinoma and their relationship to clinicopathological features", J Pathol (Feb. 2007) 211(3):269-77.
Choi et al., Feb. 2014, Identification of distinct basal and luminal subtypes of muscle-invasive bladder cancer with different sensitivities to frontline chemotherapy, Cancer Cell, 25(2):152-165.
Choi et al., Jun. 24, 2014, Intrinsic basal and luminal subtypes of muscle-invasive bladder cancer, Nature Reviews Urology, 11(7):400-410.
Chow et al., "LINE-1 activity in facultative heterochromatin formation during X chromosome inactivation," Cell (Jun. 11, 2010) 141(6):956-69.
Cibas, et al. "The Bethesda System for Reporting Thyroid Cytopathology," Am J Clin Pathol. (Nov. 2009) 132(5):658-65. doi: 10.1309/AJCPPHLWMI3JV4LA.
Clancy et al., "Profiling networks of distinct immune-cells in tumors," BMC Bioinformatics (2016) 17:263, pp. 1-15. DOI 10.1186/s12859-016-1141-3.
Clark-Langone et al. "Biomarker discovery for colon cancer using a 761 gene RT-PCR assay 2007," BMC Genomics (2007) 8:279 pp. 1-18.
Cologne et al., "Optimal Case-Control Matching in Practice," Epidemiology Resources Inc. (1995) 6(3):271-275.
Cooper et al., "Mechanisms of Disease: biomarkers and molecular targets from microarray gene expression studies in prostate cancer ," Nat Clin Pract Urol. (2007) Dee:4(12):677-87.
Cooperberg et al., "The CAPRA-S score: A straightforward tool for improved prediction of outcomes after radical prostatectomy," Cancer (2011) vol. 117 (22), pp. 5039-5046.
Cordaux et al., "The impact of retrotransposons on human genome evolution." Nat Rev Genet. (Oct. 2009) 10(10):691-703.
Cordon-Cardo et al., "Improved prediction of prostate cancer recurrence through systems pathology," The Journal of Clinical Investigation (Jul. 2007) vol. 117, No. 7, pp. 1876-1883.
Couzin-Frankel, Jennifer, "As Questions Grow, Duke Halts Trials, Launches Investigation," Science (Aug. 6, 2010) vol. 329, pp. 614-615.
Cuzik et al., "Prognostic value of an RNA expression signature derived from cell cycle proliferation genes in patients with prostate cancer: a retrospective study," thelancet.com/oncology (Mar. 2011) vol. 12, pp. 245-255.

(56) References Cited

OTHER PUBLICATIONS

Dahlman et al., "Effect of androgen deprivation therapy on the expression of prostate cancer biomarkers MSMB and MSMB-binding protein CRISP3," Prostate Cancer and Prostatic Diseases (2010) 13:369-375.

Dalela et a., Jun. 20, 2017, Genomic classifier augments the role of pathological features in identifying optimal candidates for adjuvant radiation therapy in patients with prostate cancer: development and internal validation of a multivariable prognostic model, Journal of Clinical Oncology, 35(18):1982-1990.

Dalela et al., "Contemporary Role of the Decipher Test in Prostate Cancer Management: Current Practice and Future Perspectives," Rev. Urol. (2016), 18(1):1-9, MedReviews®, LLC.

Dalsgaard Sorensen et al.: "Discovery of prostate cancer biomarkers by microarray gene expression profiling"; Expert Review of Molecular Diagnostics, vol. 10, No. 1, Jan. 1, 2010, pp. 49-64.

D'Amico et al., "Cancer-specific mortality after surgery or radiation for patients with clinically localized prostate cancer managed during the prostate-specific antigen era," J Clin Oncol. (2003) 21:2163-2172.

D'Amico et al., "Determinants of prostate cancer-specific survival after radiation therapy for patients with clinically localized prostate cancer," J Clin Oncol. (2002) 20:4567-4573.

Damrauer et al., Feb. 25, 2014, Intrinsic subtypes of high-grade bladder cancer reflect the hallmarks of breast cancer biology, Proc Natl Acad Sci USA, 111(8):3110-3115.

Dawood, Shaheenah, "Novel Biomarkers of Metastatic Cancer," Expert Rev. Mo/. Diagn. (2010) 10(5):581-590, Expert Reviews Ltd.

Day et al., "Estimating enrichment of repetitive elements from high-throughput sequence data." Genome Biol. (2010) 11 (6):R69.

De Klein et al., "A cellular oncogene is translocated to the Philadelphia chromosome in chronic myelocytic leukaemia." Nature (Dec. 23, 1982) 300(5894):765-7.

De Marzo et al., "Pathological and molecular mechanisms of prostate carcinogenesis: implications for diagnosis, detection, prevention, and treatment," J Cell Biochem. (Feb. 15, 2004) 91(3):459-477.

Dechassa et al., "Architecture of the SWI/SNF-nucleosome complex," Mol Cell Biol. (Oct. 2008) vol. 28, No. 19, pp. 6010-6021.

Demichelis et al., "TMPRSS2:ERG gene fusion associated with lethal prostate cancer in a watchful waiting cohort," Oncogene (2007) 26:4596-4599.

Den et al., Mar. 10, 2015, Genomic classifier identifies men with adverse pathology after racial prostatectomy who benefit from adjuvant radiation therapy, Journal of Clinical Oncology, 33(8):944-951.

Dhanasekaran et al., "Delineation of prognostic biomarkers in prostate cancer," Nature (2001) 412:822-826.

Dhani et al., 2011, Phase II study of cytarabine in men with docetaxel-refractory, castration-resistant prostate cancer with evaluation of TMPRSS2-ERG and SPINK1 as serum biomarkers, BJUI, 110:840-845.

Dougherty, "The fundamental role of pattern recognition for gene-expression/microarray data in bioinformatics," Pattern recognition (2005) 38:2226-2228.

Droz et al., Aug. 2014, Management of prostate cancer in older patients: updated recommendations of a working group of the International Society of Geriatric Oncology, The Lancet, 15:e404-e414.

Eder et al., "Genes differentially expressed in prostate cancer," BJU Int. (May 2004) 93(8): 1151-1155.

Edwards et al., "Expression analysis onto microarrays of randomly selected cDNA clones highlights HOXB13 as a marker of human prostate cancer," Br J Cancer. (Jan. 31, 2005) 92(2):376-381.

Edwards et al.: "MicroRNAs and Ultraconserved Genes as Diagnostic Markers and Therapeutic Targets in Cancer and Cardiovascular Diseases", Journal of Cardiovascular Translational Research (May 5, 2010) vol. 3, No. 3, pp. 271-279.

Englisch, et al., "Chemically Modified Oligonucleotides as Probes and Inhibitors," Angew. Chem. Int. Ed. Eng. (1991) 30:613-629.

Epstein et al., "Prognostic factors and reporting of prostate carcinoma in radical AU prostatectomy and pelvic lymphadenectomy specimens," Scand. J. Urol. Nephrol. Suppl. (2005) 216:34-63.

Erho et al., "Discovery and Validation of a Prostate Cancer Genomic Classifier that Predicts Early Metastasis Following Radical Prostatectomy," PLoS ONE (2013) 8(6):e66855, 1-12.

Ernst et al., "Decrease and gain of gene expression are equally discriminatory markers for prostate carcinoma: a gene expression analysis on total and microdissected prostate tissue," Am J Pathol. (Jun. 2002) 160(6):2169-2180.

Etzioni et al. "The case for early detection", Nature Reviews | Cancer (Apr. 2003) vol. 3, pp. 1-10.

Fan et al., "Concordance among gene- expression-based predictors for breast cancer," N Engl J Med. (2006) 355:560-569.

Feng et al., "Luminal and basal subtyping of prostate cancer," *J Clin Oncol* (Feb. 20, 2017) 35(6).

Feroze-Merzoug et al., "Molecular profiling in prostate cancer," Cancer Metastasis Rev. 1 (2001) 20(3-4):165-71.

Fine et al., "A Proportional Hazards Model for the Subdistribution of a Competing Risk," Journal of the American Statistical Association (1999) vol. 94 (446), pp. 496-509.

Finley et al., "Advancing the molecular diagnosis of thyroid nodules: defining benign lesions by molecular profiling," Thyroid (2005) 15(6):562-8.

Finley et al., "Discrimination of benign and malignant thyroid nodules by molecular profiling," Ann Surg. (2004) 240(3):425-36; discussion 436-7.

Fischer et al., Sep. 2, 2019, A radiogenomic approach for decoding molecular mechanisms underlying tumor progression prostate cancer, Cancers, 11(9), 18 pp.

Fodor et al., "Light-directed, spatially addressable parallel chemical synthesis," Science (Feb. 15, 1991) 251(4995):767-773.

Foley et al., "Molecular pathology of prostate cancer: the key to identifying new biomarkers of disease," Endocrine-Related Cancer (2004) 11:477-488.

Fontaine, et al., "Increasing the number of thyroid lesions classes in microarray analysis improves the relevance of diagnostic markers," PLoS One (Oct. 29, 2009) 4(10):e7632. doi: 10.1371/journal.pone. 0007632.

Forker et al. 2015, Biomarkers of Tumour Radiosensitivity and Predicting Benefit from Radiotherapy, 27: 561-569.

Fryknas et al., "Molecular markers for discrimination of benign and malignant follicular thyroid tumors," Tumour Biol. (2006) 27(4):211-20.

Fu et al., "Regulation of apoptosis by a prostate-specific and prostate cancer-associated noncoding gene, PCGEM1." DNA Cell Biol. (Mar. 2006) 25(3): 135-41.

Fujarewicz et al., "A multi-gene approach to differentiate papillary thyroid carcinoma from benign lesions: gene selection using support vector machines with bootstrapping," Endocr Relat Cancer (Sep. 2007) 14(3):809-26.

Gait. Chapter 16: Oligoribonucleotides. Antisense Research and Applications, Crooke and Lebleu Eds., CRC Press (1993) pp. 289-302.

Galamb et al., "Diagnostic mRNA Expression Patterns of Inflamed, Benign, and Malignant ColorectalBiopsy Specimen and their Correlation with Peripheral Blood Results," Cancer Epidemiology, Biomarkers & Prevention (Oct. 2008) 17(10):2835-2845.

Galavotti et al., Apr. 2012, The autophagy-associated factors DRAM1 and p62 regulate cell migration and invasion in glioblastoma stem cells, Oncogene, 32:699-712.

Gao et al. 2019, DeepCC: a novel deep learning-based framework for cancer molecular subtype classification. Oncogenesis, 8(44):1-12.

Gao et al., "VISTA is an inhibitory immune checkpoint that is increased after ipilimumab therapy in patients with prostate cancer," Nat Med. (May 2017) 23(5):551-555.

Garber et al., "Diversity of gene expression in adenocarcinoma of the lung," PNAS (Nov. 20, 2001) vol. 98, No. 24, pp. 13784-13789.

(56) References Cited

OTHER PUBLICATIONS

Genevieve de Saint Basile et al., "Severe Combined Immunodeficiency Caused By Deficiency In Either The li Or the E Subunit Of CD3," Journal of Clinical Investigation (2004) vol. 114, No. 10. p. 1512-1517.
Gentles et al., Jul. 20, 2015, The prognostic landscape of genes and infiltrating immune cells across human cancers, Nature Medicine, 21(8):938-945.
Gibb et al., "The functional role of long non-coding RNA in human carcinomas", Molecular Cancer, Biomed Central, London, GB (Apr. 13, 2011) vol. 10, No. 1, p. 38.
Giordano et al., "Organ-Specific Molecular Classification of Primary Lung, Colon, and Ovarian Adenocarcinomas Using Gene Expression Profiles," Am J Pathol (2001) 159(4):1231-1238.
Gleason: "Histologic grading and clinical staging of prostatic carcinoma", Urologic pathology: the prostate, (Tannenbaum, ed.) (1977) Lea & Febiger, Philadelphia, PA, pp. 171-197.
Gleason: "Histologic grading of prostate cancer: a perspective"; Hum. Pathol. (1992) 23(3):273-279.
Gleave et al., "Randomized comparative study of 3 versus 8-month neoadjuvant hormonal therapy before radical prostatectomy : biochemical and pathological effects," J Urol. (2001) 166:500-507.
Glinsky et al., "Gene expression profiling predicts clinical outcome of prostate cancer," J Clin Investigation (2004) 113(6):913-923.
Glinsky et al., "Microarray analysis identifies a death-from-cancer signature predicting therapy i failure in patients with multiple types of cancer," J Clin Invest. (2005) 115: 1503-1521.
Gonzalgo et al.: "Molecular pathways to prostate cancer"; J Urol. (2003) 170(6 Pt 1):2444-2452.
Gore et al., Aug. 1, 2017, Decipher test impacts decision making among patients considering adjuvant and salvage treatment after radical prostatectomy: interim results from the multicenter prospective PRO-IMPACT study, Cancer, pp. 2850-2959.
Grambsch et al., "Proportional Hazards Tests and Diagnostics Based on Weighted Residuals," Biometrika (2013) vol. 81 (3), pp. 515-526.
Greenbaum et al.: "Comparing protein abundance and mRNA expression levels on a genomic scale"; Genome Biology (2003) 4(9):117.1-117.8.
Griffith et al., "Meta-analysis and meta-review of thyroid cancer gene expression profiling studies identifies important diagnostic biomarkers," J Clin Oncol. (2006) 24(31):5043-51.
Griffith, et al. Biomarker panel diagnosis of thyroid cancer: a critical review. Expert Rev Anticancer Ther. (Sep. 2008) 8(9):1399-413. doi: 10.1586/14737140.8.9.1399.
Gupta et al., "Long non-coding RNA HOTAIR reprograms chromatin state to promote cancer metastasis," Nature (Apr. 15, 2010) 464(7291): 1071-6.
Guttman et al., "Ab initio reconstruction of transcriptomes of pluripotent and lineage committed cells reveals gene structures of thousands of lincRNAs," Nat Biotechnol. (May 2010) 28(5):503-10.
Guttman et al., "Chromatin signature reveals over a thousand highly conserved large non-coding RNAs in mammals", Nature (Mar. 12, 2009) 458(7235):223-7.
Ha et al., Nov. 12, 2009, Comparison of affymetrix gene array with the exon array shows potential application for detection of transcript isoform variation, BMC Genomics, 19(1):519.
Haiman et al.: "Multiple regions within 8q24 independently affect risk for prostate cancer"; Nat Genet. (2007) 39:638-644.
Halvorson et al., 2018, Interpreting GLM results: making sense of some odd ratios: a tutorial and improvements to present practices in reporting and visualizing quantities of interest for binary and count outcome models, National Research Service Award, NIH, pp. 1-39.
Hamada et al., "Diagnostic usefulness of PCR profiling of the differentially expressed marker genes in thyroid papillary carcinomas," Cancer Lett. (Jun. 28, 2005) 224(2):289-301. Epub Nov. 18, 2004.
He et al., "The antisense transcriptomes of human cells", Science (Dec. 19, 2008) 322(5909): 1855-7.

Heagerty et al., "Time-Dependent ROC Curves for Censored Survival Data and a Diagnostic Marker," Biometrics (2000) vol. 56 (2), pp. 337-344.
Heemers, H. V. et al.: "Identification of a Clinically Relevant Androgen-Dependent Gene Signature in Prostate Cancer"; Cancer Research, vol. 71, No. 5 (2011) pp. 1978-1988.
Heidenreich et al., "EAU Guidelines on Prostate Cancer. Part 1: Screening, Diagnosis, and Treatment of Clinically Localised Disease," European Urology (2011) vol. 59, pp. 61-71.
Henrotin et al.: "Type II collagen peptides for measuring cartilage degradation," Biorheology (2004) 41 (3 -4): Abstract.
Henshall et al., "Survival Analysis of Genome-Wide Gene Expression Profiles of Prostate cancers Identifies New Prognostic Targets of Disease Relapse," Cancer Research (Jul. 15, 2003) 63, 14196-4203.
Holzbeierlein et al., "Gene expression analysis of human prostate carcinoma during hormonal therapy identifies androgen-responsive genes and mechanisms of therapy resistance," Am. J . Pathol. (Jan. 2004) 164(1):217-227.
Hornberger et al., "A Multigene Prognostic Assay for Selection of Adjuvant Chemotherapy in Patients with T3, Stage II Colon Cancer: Impact on Quality-Adjusted Life Expectancy and Costs, " Value In Health 15 (2012) pp. 1014-1021.
Huarte et al., "Large non-coding RNAs: missing links in cancer?" Human Molecular Genetics (Oct. 15, 2010) 19(2): R152- R161.
Hughes et al., "Molecular pathology of prostate cancer," J Clin Pathol. (Jul. 2005) 58(7):673-684.
Hughes et al., "Topoisomerase II—a expression increases with increasing Gleason score and with hormone insensitivity in prostate carcinoma," J Clin Pathol. (Jul. 2006) 59(7): 721-724.
Humphrey et al: "Histologic grade, DNA ploidy, and intraglandular tumor extent as indicators of tumor progression of clinical Stage B prostatic carcinoma"; Am J Surg Pathol (1991) 15(12):1165-1170.
Ida et al., "Topoisomerase II alpha protein expression Is predictive of outcome in Gleason score 7 prostate cancer patients treated surgically and is dependent on ERG status." Mod Pathol. (Feb. 2010) Abstract 1895, 23 : 424A-425A.
Iljin et al., Nov. 1, 2006, TMPRSS2 fusions with oncogenic ETS factors in prostate cancer involve unbalanced genomic rearrangements and are associated with HDAC1 and epigenetic reprogramming, Cancer Res., 66(21):10242-10246.
Inamura, Apr. 2018, Bladder Cancer: new insights into its molecular pathology, Cancers (Basel), 10(4):100.
Ito et al., "Linkage of elevated ets-2 expression to hepatocarcinogenesis," Anticancer Research (2002) 22(4):2385-2389.
Jemal et al.: "Cancer statistics," CA Cancer J Clin. (2005) 55:10-30.
Jenkins et al., "Prognostic significance of ailetic imbalance of chromosome arms 71, 8p, 16q, and 18q in stage T3NOMO prostate cancer," Genes, Chromosomes & Cancer (1998) 21:131-143.
Jhavar et al., "Integration of ERG gene mapping and gene-expression profiling identifies distinct categories of human prostate cancer," BJUI (2008) vol. 103 (9), pp. 1256-1269.
Jhavar et al., "Technical Advance: Detection of *TMPRSS2-ERG* Translocations in Human Prostate Cancer by Expression Profiling Using GeneChip Human Exon 1.0 ST Arrays," J Mol. Diag (Jan. 2008) vol. 10, No. 1, pp. 50-57.
Jones et al., "Frequent mutations of chromatin remodeling gene ARID1A in ovarian clear cell carcinoma" Science (Oct. 8, 2010) 330(6001):228-31.
Kaikkonen et al., 2018, ANO7 is associated with aggressive prostate cancer, Int. J. Cancer, 143:479-2487.
Kanehisa, "Use of statistical criteria for screening potential homologies in nucleic acid sequences," Nucleic Acids Res. (Jan. 11, 1984) 12(1 Pt 1):203-13.
Karan et al., "Current status of the molecular genetics of human prostatic adenocarcinomas," Int J Cancer, 2003, 103(3):285-293.
Karayi et al., "Molecular biology of prostate cancer," Prostate Cancer Prostatic Dis. (2004) 7(1):6-20.
Karnes et al., "Radical prostatectomy for high-risk prostate cancer," Jpn. J. Clin. Oneal. (Oct. 19, 2009) 40 (1): 3-9, Epub.

(56) References Cited

OTHER PUBLICATIONS

Karnes et al., "The ability of biomarkers to predict systemic progression in men with high-risk prostate cancer treated surgically is dependent on ERG status," Cancer Res. (Nov. 9, 2010) 70(22):8994-9002, Epub.

Kasraeian, et al., "A comparison of fine-needle aspiration, core biopsy, and surgical biopsy in the diagnosis of extremity soft tissue masses," Clin Orthop Relat Res. (Nov. 2010) 468(11):2992-3002.

Kawamorita et al., "Radical prostatectomy for high-risk prostate cancer: Biochemical outcome," International Journal of Urology (2009) 16:733-738.

Kebebew et al., "Diagnostic and extent of disease multigene assay for malignant thyroid neoplasms," Cancer (2006) 106(12):2592-7.

Kelly et al., 2012, Agreement in Risk Prediction Between the 21-Gene Recurrence Score Assay (Oncotype DX) and the PAM50 Breast Cancer Intrinsic Classifier™ in Early-Stage Estrogen Receptor-Positive Breast Cancer, The Oncologist, 17:492-498.

Kestin, "Potential survival advantage with early androgen deprivation for biochemical failure after external beam radiotherapy: the importance of accurately defining biochemical disease status," Int J Rad Oncol Biol Phys. (2004) 60:453-62.

Khor et al.: "Bcl-2 and Bax Expression Predict Prostate Cancer Outcome in Men Treated with Androgen Deprivation and Radiotherapy on Radiation Therapy Oncology Group Protocol 92-02"; Clinical Cancer Research (Jun. 15, 2007) vol. 13, No. 12, pp. 3585-3590.

Kiessling, et al., "D-Tmpp: A novel androgen-regulated gene preferentially expressed in prostate and prostate cancer that is the first characterized member of an eukaryotic gene family," The Prostate (2005) 64:387-400.

Kikuchi et al., "Expression profiles of non-small cell lung cancers on cDNA microarrays: identification of genes for prediction of lymph-node metastasis and sensitivity to anti-cancer drugs," Oncogene (2003) 22, pp. 2192-2205.

Kishi et al., "Expression of the surviving gene in prostate cancer: correlation with clinicopathological characteristics, proliferative activity and apoptosis," J Urol. (May 2004) 171(5): 1855-1860.

Klee et al., "Candidate Serum Biomarkers for Prostate Adenocarcinoma identified by mRNA Differences in Prostate Tissue and Verified with Protein Measurements in Tissue and Blood," Clinical Chemistry (2012) 58(3):599-609.

Knowles et al., Dec. 23, 2014, Molecular biology of bladder cancer: new insights into pathogenesis and clinical diversity, Nature Reviews Cancer, 15(1):25-41.

Kosari et al., "Identification of biomarkers for prostate cancer," Clin. Cancer Res. (2008) 1734-1743.

Koshkin et al., "LNA (locked nucleic acids): An RNA mimic forming exceedingly stable LNA," LNA duplexes. J Am Chem Soc (1998) 120:13252-13253.

Koshkin et al., "LNA (locked nucleic acids): synthesis of the adenine, cytosine, guanine 5-methylcytosine, thymine and uracil bicyclonucleoside monomers, oligomerisation, and unprecedented nucleic acid recognition," Tetrahedron (1998) 54(14):3607-3630.

Kronick, 2004, Creation of the whole human genome microarray, Expert Review of Proteomics, 1:19-28.

Kroschwitz The Concise Encyclopedia Of Polymer Science And Engineering (1990) (pp. 858-859).

Kube et al., "Optimization of laser capture microdissection and RNA amplification for gene expression profiling of prostate cancer," BMC Mol. Biol. (2007) 8:25.

Kumar, et al., "The first analogues of LNA (locked nucleic acids): phosphorothioate-LNA and 2'-thio-LNA," Bioorg Med Chem Lett. (Aug. 18, 1998) 8(16):2219-22.

Kumar-Sinha et al., "Molecular markers to identify patients al risk for recurrence after primary treatment for prostate cancer," Urology, 62 Suppl 1:19-35, Dec. 29, 2003.

Kunarso et al., "Transposable elements have rewired the core regulatory network of human embryonic stem cells," Nat Genet (Jul. 2010) 42(7):631-4.

Landers et al.: "Use of multiple biomarkers for a molecular diagnosis of prostate cancer"; Int. J. Cancer (May 10, 2005) 114 pp. 950-956.

Lapointe et al., "Gene expression profiling identifies clinically relevant subtypes of prostate cancer," PNAS USA (2004) 101:811-816.

Latulippe et al., "Comprehensive Gene Expression Analysis of Prostate Cancer Reveals Distinct Transcriptional Programs Associated with Metastatic Disease," Cancer Res. (2002) 62:4499-4506.

Lawton et al., "Updated results of the phase III Radiation Therapy Oncology Group (RTOG) trial 85-31 evaluating the potential benefit of androgen suppression following standard radiation therapy for unfavorable prognosis carcinoma of the prostate," Int J Rad Oncol Biol Phys. (2001) 49:937-946.

Leyten et al., "Identification of a Candidate Gene Panel for the Early Diagnosis of Prostate Cancer," Clinical Cancer Research (2015) 21(13):3061-3070.

Lin et al., "Cox Regression with Incomplete Covariate Measurements," Journal of the American Statistical Association (1993) vol. 88 (424), pp. 1341-1349.

Lin et al., "Nuclear receptor-induced chromosomal proximity and DNA breaks underlie specific translocations in cancer," Cell (Dec. 11, 2009) 139(6):1069-83.

Liong et al., "Blood-Based Biomarkers of Aggressive Prostate Cancer," Plos One (Sep. 2012) vol. 7, Issue 7, e45802, pp. 1-7.

Liu et al., 2014, Synergistic killing of lung cancer cells by cisplatin and radiation via autophagy and apoptosis, Oncology Letters, 7:1903-1910.

Livingston et al., "Homo sapiens CDC20 Cell Division Cycle 20 Homolog (CDC20)," Gene (Apr. 24, 2006).

Lockstone, "Exon array data analysis using Affymetrix power tools and R statistical software," Briefings in bioinformatics (2011) vol. 12 (6), pp. 634-644.

Lunardi et al., "A co-clinical approach identified mechanisms and potential therapies for androgen deprivation resistance in prostate cancer," Nature Genetics (Jul. 2013) vol. 45, No. 7, pp. 747-757.

Luo et al., "Gene expression analysis of prostate cancers," Molecular Carcinogenesis (Jan. 2002) 33(1):25-35.

Luo et al., "Human Prostate Cancer and Benign Prostatic Hyperplasia : Molecular Dissection by Gene Expression Profiling," Cancer Res. (2001) 61:4683-4688.

Magee et al., "Expression Profiling Reveals Hepsin Overexpression in Prostate Cancer," Cancer Res. (2001) 61:5692-5696.

Martens-Uzunova, E. S. et al.: "Diagnostic and prognostic signatures from the small non-coding RNA transcriptome in prostate cancer", ONCOGENE (Jul. 18, 2011) vol. 31, No. 8, pp. 978-991.

Martin, "A New Access to 2'-O-Alkylated Ribonucleosides and Properties of 2'-O-Alkylated Oligoribonucleotides," Helv. Chim. Acta. (1995) 78:486-504. (in German with English abstract).

Marx et al., Jan.-Mar. 2021, Reduced anoctamin 7 (ANO7) expression is a strong and independent predictor of poor prognosis in prostate cancer, Cancer Biol Med, 18(1):245-255.

Mazzanti, et al., "Using gene expression profiling to differentiate benign versus malignant thyroid tumors," Cancer Res. (Apr. 15, 2004) 64(8):2898-903.

McCall et al., "Frozen robust multiarray analysis (fRMA)", Biostatistics (2010) vol. 11 (2), 242-253.

McConkey et al., Apr. 2015, Therapeutic opportunities in the intrinsic subtypes of muscle-invasive bladder cancer, Hematology/Oncology Clinics of North America, 29(2):377-394.

McConkey et al., May 2016, A prognostic gene expression signature in the molecular classification of chemotherapy-naïve urothelial cancer is predictive of clinical outcomes from neoadjuvant chemotherapy: a phase 2 trial of dose-dense methotrexate, vinblastine, doxorubicin, and cisplatin with bevacizumab in urothelial cancer, European Urology, 69(5):855-862.

Mendiratta et al., "Genomic signatures associated with the development, progression, rand outcome of prostate cancer," Molecular diagnosis & therapy (2007) 11(6):345-54.

Mercer, DW, "Use of multiple markers to enhance clinical utility", Immunol Ser. (1990) 53: 39-54.

Metsala et al., 2023, Progression-association with an aggressive phenotype? Cancer Res., 83(11_Supplement):A010.

(56) References Cited

OTHER PUBLICATIONS

Michiels et al. 2005, Prediction of cancer outcome with microarrays: a multiple random validation strategy, Lancet, 365:488-492.
Mineva et al., "Differential expression of alphaB-crystallin and Hsp27-1 in anaplastic thyroid carcinomas because of tumor-specific alphaB-crystallin gene (CRYAB) silencing," Cell Stress Chaperones (Autumn 2005) 10(3):171-84.
Mitelman, "Recurrent chromosome aberrations in cancer," Mutation Research (2000) 462: 247-253.
Montironi et al., "Carcinoma of the prostate: inherited susceptibility, somatic gene defects and androgen receptors," Virchows Arch. (Jun. 2004) 444(6):503-508.
Moul et al., "Early versus delayed hormonal therapy for prostate specific antigen only recurrence of prostate cancer after radical prostatectomy," J Urol. (2004) 171:1141- 1147.
IMOUL, "Prostate specific antigen only progression of prostate cancer," J Urol. (2000) 163:1632-42.
Mühlenbruch et al., "Multiple imputation was a valid approach to estimate absolute risk from a prediction model based on case-cohort data," Journal of Clinical Epidemiology (2017) 84:130-141.
Nakagawa et al., "A Tissue Biomarker Panel Predicting Systemic Progression after PSA Recurrence Post-Definitive Prostate Cancer Therapy," PLos ONE (2008) 3(5):e2318, 14 pages.
Nelson, "Predicting prostate cancer behavior using transcript profiles," J Urol. (Nov. 2004) 172(5 Pt 2):S28-32; discussion S33.
Nevins et al., Aug. 2007, Mining gene expression profiles: expression signatures as cancer phenotypes, Genetics, 8:601-609.
Newson, Roger, "Confidence intervals for rank statistics: Somers' D and extensions," The Stata Journal (Sep. 2006) 6(3):309- 334.
Nielsen et al., "Sequence-selective recognition of DNA by strand displacement with a thymine-substituted polyamide," Science (1991) 254: 1497-1500.
Noordzij et al. "The prognostic value of CD44 isoforms in prostate cancer patients treated by radical prostatectomy", Clin Cancer Res (May 1997) 3(5): 805-815.
Norman, James, "Thyroid Nodule Ultrasound", Endocrine website (Updated Oct. 13, 2010) http://www.endocrineweb.com/noduleus.html.
Ohl et al., "Gene expression studies in prostate cancer tissue: which reference gene should be selected for normalization?," J. Mol. Med . (2005) 83(12):1014-1024.
Ong et al., Expression Profiling Identifies a Novel "-Methylacyl-CoA Racemase Exon with Fumarate Hydratase Homology," Cancer Research (Jun. 15, 2003) 63:3296-3301.
Oosumi et al., "Mariner transposons in humans", Nature (Dec. 14, 1995) 378 (6558): 672.
Ozen et al., Sep. 24, 2007, Widespread deregulation of microRNA expression in human prostate cancer, Oncogene, 27:1788-1793.
Parker et al., "High expression levels of surviving protein independently predict a poor outcome for patients who undergo surgery for clear cell renal cell carcinoma," Cancer (2006) 107:37-45.
Parker et al., Mar. 10, 2009, Supervised risk predictor of breast cancer based on intrinsic subtypes, Journal of Clinical Oncology, 27(8): 1160-1167 with appendix Figure A3.
Pascal et al., "Correlation of mRNA and protein levels: Cell type-specific gene expression of cluster designation antigens in the prostate," BMC Genomics (2008) 9:246 (13 pages).
Patel et al., "Preoperative PSA velocity is an independent prognostic factor for relapse after radical prostatectomy," J Clin Oncol. (2005) 23:6157-6162.
Paulo et al., "Molecular Subtyping of Primary Prostate Cancer Reveals Specific and Shared Target Genes of Different ETS Rearrangements," *Neoplasia* (Jul. 2012) 14(7):600-611.
Penney et al., "mRNA Expression Signature of Gleason Grade Predicts Lethal Prostate Cancer," J Clin Oncol (Jun. 10, 2011) vol. 29, No. 17, pp. 2391-2396 and Appendix.
Pereira et al., "Coagulation factor V and VIIIN ratio as predictors of outcome in paracetamol induced fulminant hepatic failure: relation to other prognostic indicators," Gut (1992) 33:98-102.
Perez et al., "Long, abundantly expressed non-coding transcripts are altered in cancer," Human Molecular Genetics (2008) vol. 17, No. 5, pp. 642-655. Published online Nov. 15, 207.
Pienta et al. "The current state of preclinical prostate cancer animal models"; Prostate (2008) 69: 629-639.
Pilepich et al., "Phase III radiation therapy oncology group (RTOG) trial 86-10 of androgen deprivation adjuvant to definitive radiotherapy in locally advanced carcinoma of the prostate," Int. J. Radiation Oncology Biol. Phys. (2001) vol. 50, No. 5, pp. 1243-1252.
Pinover et al., "Validation of a treatment policy for patients with prostate specific antigen failure after three-dimensional conformal prostate radiation therapy," Cancer (Feb. 15, 2003) vol. 97, No. 4, pp. 1127-1133.
Pittoni et al., "The Dark Side of Mast Cell-Targeted Therapy in Prostate Cancer," Cancer Res. (2012) 72(4):831-835.
Porkka et al., "RAD21 and KIAA0196 at 8q24 are amplified and overexpressed in prostate cancer," Genes Chromosomes Cancer (2007) 39:1-10.
Porkka et al: Molecular mechanisms of prostate cancer'; Eur Urol. (2004) 45(6):683-691.
Pound et al., "Natural history of progression after PSA elevation following radical prostatectomy," JAMA (1999) 281:1591-1597.
Prasad et al., "Identification of genes differentially expressed in benign versus malignant thyroid tumors," Clin Cancer Res. (2008) 14(11):3327-37.
Prat et al. 2012, PAM50 assay and the three-gene model for identifying the major and clinically relevant molecular subtypes of breast cancer. Breast Cancer Res Treat, 135:301-306.
Prensner et al., "Transcriptome Sequencing Identifies PCAT-1, a Novel lincRNA Implicated in Prostate Cancer Progression," (2012) 29 (8): 742-749.
Prensner et al., Dec. 2014, RNA biomarkers associated with metastatic progression in prostate cancer: a multi-institutional high-throughput analysis of SChLAP1, The Lancet/Oncology, 15:1469-1480.
Probe Set Listing for the Affymetrix Human Genome U133 Plus 2.0 array (Accessed from https://www.affymetrix.com/analysis/index.affx on Jul. 1, 2015) (Year: 2015).
Puskas, et al., "Gene profiling identifies genes specific for well-differentiated epithelial thyroid tumors," Cell Mol Biol (Noisy-le-grand) (Sep. 5, 2005) 51(2):177-86.
Rabbits, "Chromosomal translocations in human cancer", Nature (Nov. 10, 1994) 372: 143-149.
Reddy et al., "Clinical utility of microarray-derived genetic signatures in predicting outcomes in prostate cancer," Clinical Genitourinary Cancer (2006) 5(3):187-189.
Reis et al., "Antisense intronic non-coding RNA levels correlate to the degree of tumor differentiation in prostate cancer," Oncogene (2004) 23(39):6684-6692.
Rhodes et al., "Large-scale meta-analysis of cancer microarray data identifies common transcriptional profiles of neoplastic transformation and progression," Proc Nat Acad Sci USA (2004) 101:9309-9314.
Rhodes et al., "Multiplex biomarker approach for determining risk of prostate specific antigen-defined recurrence of prostate cancer," J Nat Cancer Inst. (May 7, 2003) vol. 95, No. 9, pp. 661-668.
Rhodes et al., "ONCOMINE: A Cancer Microarray Database and Integrated Data-Mining Platform," Neoplasia (2004) 6:1-6.
Rinn et al., "Functional demarcation of active and silent chromatin domains in human HOX loci by noncoding RNAs," Cell (Jun. 29, 2007) 129(7):1311-23.
Roberts et al., "The SWI/SNF complex-chromatin and cancer." Nat Rev Cancer (Feb. 2004) 4(2):133-42.
Robertson et al., "DNA in radical prostatectomy specimens. Prognostic value of tumor ploidy," Acta Oncologica (1991) 30(2):205-207.
Robertson et al., "Reconstructing the ancient mariners of humans." Nat Genet. (Apr. 1996) 12(4):360-1.
Robinson et al., "A dynamic programming approach for the alignment of signal peaks in multiple gas chromatography-mass spectrometry experiments," BMC Bioinformatics (2007) 8.1:419.

(56) References Cited

OTHER PUBLICATIONS

Robinson, et al., "A comparison of Affymetrix gene expression arrays," BMC Bioinformatics (Nov. 15, 2007) 8:449.
Romanuik et al., "LNCaP Atlas: Gene expression associated with in vivo progression to castration-recurrent prostate cancer," GMB Medical Genomics (2010) 3:43, pp. 1-19.
Ross et al., "Tissue-based Genomics Augments Post-prostatectomy Risk Stratification in a Natural History Cohort of Intermediate- and High-Risk Men," European Urology 69 (2016) pp. 157-165.
Rotblat et al., "A Possible Role for Long Non-Coding RNA in Modulating Signaling Pathways," Med. Hvnotheses (2011) 77:962-965, Elsevier.
Rotunno et al., "A Gene Expression Signature from Peripheral Whole Blood for Stage I Lung Adenocarcinoma," Cancer Prevention Research (Jul. 8, 2011) 4(10) 1599-1607.
Rowley, "A new Consistent Chromosomal Abnormal ity in Chronic Myelogenous Leukaemia Identified by Quinacrine fluorescence and Giemsa Staining," Nature (Jun. 1, 1973) 243:290-293.
Rowley, "Chromosome translocations: dangerous liaisons revisited," Nature Reviews: Cancer (Dec. 2001) 1):245-250.
Rubin et al., "Molecular genetics of human prostate cancer," Modern Pathol. (2004) 17(3):380-388.
Saito-Hisaminato et al., "Genome-Wide Profiling of Gene Expression in 29 Normal Human Tissues with a cDNA Microarray," DNA Research (2002) vol. 9, pp. 35-45.
Saligan et al., "Supervised Classification by Filter Methods and Recursive Feature Elimination Predicts Rick of Radiotherapy-Related Fatigue in Patients with Prostate Cancer," Cancer Informatics (2014) 13: 141-152.
Sandler et al., "Overall survival after prostate-specific-antigen-detected recurrence following conformal radiation therapy," Int J Rad Oncol Biol Phys. (2000) 48:629-633.
Sanghvi, "Heterocyclic base modifications in nucleic acids and their applications in antisense oligonucleotides in Antisense Research and Applications," Crooke, S. T. and Lebleu, B., ed., CRC Press. (1993) Ch 15 274-285.
Saramaki et al., "Amplification of EIF3S3 gene is associated with advanced stage in prostate cancer," Am J Pathol. (2001) 159:2089-2094.
Sato et al., "Clinical significance of alterations of chromosome 8 in high-grade, advanced, nonmetastatic prostate carcinoma," J Natl Cancer Inst. (1999) 91:1574-1580.
Savinainen et al., "Expression and copy number analysis of TRPS 1, EIF3S3 and MYC genes in breast and prostate cancer," Br J Cancer (2004) 90: 1041-1046.
Savinainen et al., "Over expression of EIF3S3 promotes cancer cell growth," The Prostate (2006) 66: 1144-1150.
Schlomm et al., "Molecular staging of prostate cancer in the year 2007," World .J. Urol. (Mar. 2007) 25(1):19-30.
Schmidt et al., "Lack of interferon consensus sequence binding protein (ICSBP) transcripts in human myeloid leukemias," Blood (1998) 91:22-29.
Schumacher et al., "A Common 8q24 Variant in Prostate and Breast Cancer from a Large Nested Case-Control Study," Cancer Res. (2007) 67:2951-2956.
Seiler et al., Oct. 2017, Impact of molecular subtypes in muscle-invasive bladder cancer on predicting response and survival after neoadjuvant chemotherapy, European Urology, 72(4):544-554.
Setlur et al., 2008, Estrogen-dependent signaling in a molecularly distinct subclass of aggressive prostate cancer, Journal of the National Cancer Institute, 100:815-813.
Severi et al., "The Common Variant rs1447295 on Chromosome 8q24 and Prostate Cancer Risk:|Results from an Australian Population-based Case-Control Study", Cancer Epidemiology, Biomarkers & Prevention (2007) 16:610-611.
Shariat et al., "An updated catalog of prostate cancer predictive tools," Cancer (2008) 113(11):3062-6.
Shariat et al., "Surviving expression is associated with features of biologically aggressive prostate carcinoma," Cancer (2004) 100(4): 751-757.

Shen et al., "The SWI/SNF ATPase Brm is a gatekeeper of proliferative control in prostate cancer," Cancer Res. (Dec. 15, 2008) 68(24):10154-62.
Shibru et al., "Does the 3-gene diagnostic assay accurately distinguish benign from malignant thyroid neoplasms?" Cancer (Sep. 1, 2008) 113(5):930-5. doi: 10.1002/cncr.23703.
Shipley et al., "Radiation therapy for clinically localized prostate cancer: a multi-institutional pooled analysis," JAMA (1999) 281:1598-1604.
Simmons et al., "Natural history of biochemical recurrence after radical prostatectomy: risk assessment for secondary therapy," Eur Urol. (May 2007) 51(5):1175-84.
Singh et al., "Gene expression correlates of clinical prostate cancer behavior," Cancer Cell (Mar. 2002) vol. 1, pp. 1203-1209.
Singh et al., "LNA (locked nucleic acids): synthesis and high-affinity nucleic acid recognition," Chem Commun (1998) 4:455-456.
Singh et al., "Synthesis of 2'-amino-LNA: A novel conformationally restricted high-affinity oligonucleotide analogues with a handle," J Org Chem (1998) 63:10035-10039.
Sinnott et al., 2016, Prognostic utility of a new mRNA expression signature of Gleason score, Clinical Cancer Research 23(1):81-87.
Slotkin et al., "Transposable elements and the epigenetic regulation of the genome." Nat Rev Genet. (Apr. 2007) 8(4):272-85.
Smit et al., "High-Resolution ERG-Expression Profiling on GeneChip Exon 1.0 ST Arrays in Primary and Castration-Resistant Prostate Cancer," *BJU International* (2013), 111(5):836-842, BJU International.
Solo et al., "Prevalence of prostate cancer (PC) clinical states (CS) in the United States: Estimates using a dynamic progression model," ASCO Annual Meeting, Journal of Clinical Oncology (May 20, 2011) vol. 29, No. 15, Abstract 4637.
Sparano et al., 2015, Prospective Validation of a 21-Gene Expression Assay in Breast Cancer New Eng. J. Med. 373:20 2005-2014.
Srikantan et al., "PCGEM1, a prostate-specific gene, is overexpressed in prostate cancer," PNAS (Oct. 24, 2000) 97(22): 12216-12221.
Stamey et al., "Molecular genetic profiling of Gleason grade 415 prostate cancers compared to benign prostatic hyperplasia," J Urol. (2001) 166(6):2171-2177.
Stanbrough et al., "Increased Expression of Genes Converting Adrenal Androgens to Testosterone in Androgen-Independent Prostate Cancer," Cancer Res (Mar. 1, 2006) 66(5):2815-2825.
Stavenhagen et al., "An ancient provirus has imposed androgen regulation on the adjacent mouse sex-limited protein Jene." Cell (Oct. 21, 1988) 55(2):247-54.
Stephenson et al., "Integration of gene expression profiling and clinical variables to predict prostate carcinoma recurrence after radical prostatectomy," Cancer (Jul. 15, 2005) 104(2):290-298.
Stephenson et al., "Postoperative Nomogram Predicting the 10-Year Probability of Prostate Cancer Recurrence After Radical Prostatectomy," J Clin Oncol (2008) vol. 23 (28), pp. 7005-7012.
Subramanian et al., "Gene set enrichment analysis: A knowledge-based approach for interpreting genome-wide expression profiles," PNAS USA (2005) 102:15545-15550.
Sun et al., "Aberrant expression of SWI/SNF catalytic subunits BRG1/BRM is associated with tumor development and increased invasiveness in prostate cancers," Prostate (Feb. 1, 2007) 67(2):203-13.
Taft et al., "Non-coding RNAs: regulators of disease," J Pathol. (Jan. 2010) 220(2):126-39.
Takayama et al., "TACC2 Is an Androgen-Responsive Cell Cycle Regulator Promoting Androgen-Mediated and Castration-Resistant Growth of Prostate Cancer," Mol Endocrinol (May 2012) 26(5):748-761.
Talantov et al., "Gene Based Prediction of Clinically Localized Prostate Cancer Progression After Radical Prostatectomy," The Journal Of Urology (Oct. 2010) vol. 184, 1521-1528.
Taylor et al., "Integrative genomic profiling of human prostate cancer," Cancer Cell (Jul. 13, 2010) vol. 18 (1), pp. 11-22.
Thompson et al., "Adjuvant and Salvage Radiotherapy After Prostatectomy: AUA/ASTRO Guideline," J Urol. (2013) 190(2):441-449.

(56) References Cited

OTHER PUBLICATIONS

Thompson et al., "Is the GPSM scoring algorithm for patients with prostate cancer valid in the contemporary era?" J Urol. (Aug. 2007) vol. 178 (2), 459-463.
Thorsen et al., "Alternative Splicing in Colon, Bladder, and Prostate Cancer Identified by Exon Array Analysis," Molecular & Cellular Proteomics (Mar. 18, 2008) vol. 7, No. 7, pp. 1214-1224.
Tockman et al., "Considerations in bringing a cancer biomarker to clinical application," Cancer Research (1992) 52:2711-2718.
Tollefson et al., "Stratification of Patient Risk Based on Prostate-Specific Antigen Doubling Time After Radical Retropubic Prostatectomy," Mayo Clin Proc. (2007) 82:422-427.
Tomlins et al., "Distinct classes of chromosomal rearrangements create oncogenic ETS gene fusions in prostate cancer," Nature (Aug. 2, 2007) 448(7153):595-9.
Tomlins et al., "Integrative molecular concept modeling of prostate cancer progression," Nat Genet. (2007) 39:41-51.
Tomlins et al., "Recurrent Fusion of TMPRSS2 and ETS Transcription Factor Genes in Prostate Cancer," Science (2005) 310(5748):644-648.
Tomlins et al., "TMPRSS2:ETV4 Gene Fusions Define a Third Molecular Subtype of Prostate Cancer," Cancer Res. (2006) 66:3396-3400.
Tricoli et al., "Detection of prostate cancer and predicting progression: current and future diagnostic markers," Clinical Cancer Research (Jun. 15, 2004) 10:3943-3953.
True et al., "A molecular correlate to the Gleason grading system for prostate adenocarcinoma," PNAS (Jul. 18, 2006) vol. 103, No. 29, p. 10991-10996.
Tsuchiya et al., "Clinical significance in situ hybridization analysis in pathologic of alterations of chromosome 8 detected by fluorescence organ-confined prostate cancer," Genes Chromosomes Cancer (2002) 34:363-371.
Tsuchiya et al., "Mapping and gene expression profile of the minimally overrepresented 8q24 region in prostate cancer," Am J Pathol. (May 2002) 160(5):1799-1806.
Vainio, 2011, High-throughput screening for novel prostate cancer drug targets, dissertation, Turun Yliopisot, University of Turku, Finland, 74 pp.
Vanaja et al., "*PDLIM4* Repression by Hypermethylation as a Potential Biomarker for Prostate Cancer," Clin. Cancer Res. (2006) 12(4):1128-1136.
Vanaja et al., "Transcriptional Silencing of Zinc Finger Protein 185 Identified Profiling Is Associated with Prostate Cancer Progression," Cancer Research (Jul. 15, 2003) 63:3877-3882.
Varambally et al., "Integrative Genomic and Proteomic Analysis of Prostate Cancer Reveals Signatures of Metastatic Progression," Cancer Cell (Nov. 2005) 8(5):393-406.
Varela et al., "Exome sequencing identifies frequent mutation of the SWI/SNF complex gene PBRM1 in renal carcinoma," Nature (Jan. 27, 2011) 469(7331):539-42.
Varricchi et al., "Are Mast Cells MASTers in Cancer?" Front Immunol. ePub (Apr. 12, 2017) 8:424.
Versteege et al., "Truncating mutations of hSNF5/INI1 in aggressive paediatric cancer." Nature (Jul. 9, 1998) 394 6689):203-6.
Vickers et al., "Extensions to decision curve analysis, a novel method for evaluating diagnostic tests, prediction models and molecular markers," BMC Medical Informatics and Decision Making, (2008) 8(53):1-17.
Visakorpi, "The molecular genetics of prostate cancer," Urology (2003) 62(5 Suppl 1):3-10.
Wang et al., "RNA-Seq: a revolutionary tool for transcriptomics," Nature Reviews/Genetics (Jan. 2009) vol. 10, pp. 57-63.
Wang et al., "Two common chromosome 8q24 variants are associated with increased risk for prostate cancer," Cancer Res. (2007) 67:2944-2950.
Warrick et al., 2016, FOXA1, GATA3 and PPARy cooperate to drive luminal subtype in bladder cancer: a molecular analysis of established human cell lines, Scientific Reports, 6:38531, DOI: 10.1038, 15 pp.
Watson et al., "Future opportunities for the diagnosis and treatment of prostate cancer," Prostate Cancer Prostatic Dis. (2004) 7:S8-S13.
Weber et al., "The prognostic value of expression of HIF1[alpha], EGFR and VEGF-A, in localized prostate cancer for intermediate- and high-risk patients treated with radiation therapy with or without androgen deprivation therapy," Radiation Oncology (Apr. 30, 2012) vol. 7, No. 66, 8 pages.
Welsh et al., "Analysis of Gene Expression Identifies Candidate Markers and Pharmacological Targets in Prostate Cancer," Cancer Res. (Aug. 15, 2001) 61:5974-5978.
Wiegand et al., "ARID1A mutations in endometriosis-associated ovarian carcinomas," N Engl J Med. (Oct. 14, 2010) 363 (16):1532-43.
Willman et al., "Immunohistochemical staining for DNA topoisomerase II-alpha in benign, premalignant, and malignant lesions of the prostate," Prostate (Mar. 1, 2000) 42(4):280-286.
Winkler et al.: "Stage D1 prostatic adenocarcinoma: significance of nuclear DNA ploidy patterns studied by flow cytometry," Mayo Clin Proc. (1988) 63(2): 103-112.
Wyatt et al., "Heterogeneity in the inter-tumor transcriptome of high risk prostate cancer," *Genome Biology* (Aug. 26, 2014) vol. 15, No. 8, pp. 2-14.
Xiong et al., Dec. 2017, Low CCL17 expression associated with unfavorable postoperative prognosis of patients with clear cell renal cll carcinoma, BMC Cancer, 17(1):117.
Yap et al., "Molecular interplay of the noncoding Rna Anril and methylated histone H3 lysine 27 by polycomb CBX7 n transcriptional silencing of INK4a," Mol Cell. (Jun. 11, 2010) 38(5):662-74.
Yates et al., "X:Map: annotation and visualization of genome structure for Affymetrix exon array analysis," Nucleic Acids Res. (2008) vol. 36:D780-D786.
Yeager et al., "Genome-wide association study of prostate cancer identifies a second risk locus at 8q24," Nat Genet (2007) 39:645-649.
Yegnasubramanian et al., "DNA hypomethylation arises later in prostate cancer progression than CpG island hypermethylation and contributes to metastatic tumor heterogeneity," Cancer Res. (Nov. 1, 2008) 68(21): pp. 8954-8967.
Yeliin et al., "Widespread occurrence of antisense transcription in the human genome," Nat Biotechnol. (2003) 21(4):379-86.
You et al., Jun. 14, 2016, Integrated classification of prostate cancer reveals a novel luminal subtype with poor outcome, Cancer Research 76(17):4948-4958.
Yu et al., "An integrated network of androgen receptor, polycomb, and TMPRSS2-ERG gene fusions in prostate cancer progression," Cancer Cell. (May 18, 2010) 17(5):443-54.
Yu et al., "Gene expression alterations in prostate cancer predicting tumor aggression and preceding development of malignancy," J Clin Oncol. (Jul. 15, 2004) 22(14):2790-2799.
Yukinawa et al., "A multi-class predictor based on a probabilistic model: application to gene expression profiling-based diagnosis of thyroid tumors," BMC Genomics (Jul. 27, 2006) 7:190.
Zanetta et al., "Flow-cytometric analysis of deoxyribonucleic acid content in advanced ovarian carcinoma: its importance in long-term survival," Am J Obstet Gynecol (1996) 175(5): 1217-1225.
Zelefsky et al., "High dose radiation delivered by intensity modulated conformal radiotherapyimproves the outcome of localized prostate cancer," The Journal of Urology (Sep. 2001) 166(3):876-881.
Zelefsky et al., "Neoadjuvant hormonal therapy improves the therapeutic ratio in patients with bulky prostatic cancer treated with three-dimensional conformal radiation therapy," Int J Radiat Oncol Biol Phys. (1994) 29:755-761.
Zhang et al. Apr. 2019, 21-Gene Recurrence Score Assay Could Not Predict Benefit of Post-mastectomy Radiotherapy in T1-2 N1mic ER-Pos ve HER2 Negative Breast Cancer, Frontiers in Oncology, 9(270): 8 pp.
Zhang et al., Sep. 18, 2014, Proteogenomic characterization of human colon and rectal cancer, Nature, 513(7518):382-387.
Zhao et al., "Development and validation of a 24-gene predictor of response to postoperative radiotherapy in prostate cancer: a matched, retrospective analysis," Lancet Oncol (2016) 17, pp. 1612-1620.
GenBank Accession No. AA462934 dated Jun. 10, 1997, 2 pages.

(56) References Cited

OTHER PUBLICATIONS

GenBank Accession No. AA920095 dated Apr. 20, 1998, 2 pages.
GenBank Accession No. AB028840 dated Jan. 12, 2000, 2 pages.
GenBank Accession No. AB030836 dated Oct. 23, 1999, 2 pages.
GenBank Accession No. AB036741 dated Dec. 22, 2000, 3 pages.
GenBank Accession No. AF077349 dated Dec. 14, 2000, 2 pages.
GenBank Accession No. AF077351 dated Dec. 20, 2000, 3 pages.
GenBank Accession No. AF115517 dated Nov. 23, 2005, 4 pages.
GenBank Accession No. AI413910 dated Feb. 9, 1999, 2 pages.
GenBank Accession No. AI414999 dated Feb. 9, 1999, 2 pages.
GenBank Accession No. AI425960 dated Mar. 9, 1999, 2 pages.
GenBank Accession No. AI851940 dated Jul. 15, 1999, 2 pages.
GenBank Accession No. AK018022 dated Sep. 19, 2008, 4 pages.
GenBank Accession No. AK019341 dated Sep. 19, 2008, 3 pages.
GenBank Accession No. AK019342 dated Sep. 19, 2008, 3 pages.
lGenBank Accession No. AK034387 dated Sep. 19, 2008, 4 pages.
GenBank Accession No. AK038229 dated Sep. 19, 2008, 4 pages.
GenBank Accession No. AK038434 dated Sep. 19, 2008, 4 pages.
GenBank Accession No. AK041534 dated Sep. 19, 2008, 4 pages.
GenBank Accession No. AK042683 dated Sep. 19, 2008, 4 pages.
GenBank Accession No. AK136096 dated Sep. 19, 2008, 4 pages.
GenBank Accession No. AK136101 dated Sep. 19, 2008, 4 pages.
GenBank Accession No. AK142768 dated Sep. 19, 2008, 3 pages.
GenBank Accession No. AL591433 dated Jan. 15, 2009, 56 pages.
GenBank Accession No. BC004702 dated Jul. 15, 2006, 3 pages.
GenBank Accession No. BC055737 dated Jul. 15, 2006, 2 pages.
GenBank Accession No. BC086799 dated Sep. 21, 2006, 3 pages.
GenBank Accession No. BF449664 dated Dec. 1, 2000, 1 page.
GenBank Accession No. BG063957 dated Jan. 26, 2001, 2 pages.
GenBank Accession No. BG077309 dated Dec. 17, 2003, 2 pages.
GenBank Accession No. BM114282 dated Jan. 30, 2002, 2 pages.
GenBank Accession No. BY023910 dated Dec. 6, 2002, 2 pages.
GenBank Accession No. CN724527 dated May 18, 2004, 2 pages.
GenBank Accession No. NM_000130 dated Oct. 18, 2009, 6 pages.
GenBank Accession No. NM_000493 dated Mar. 15, 2009, 4 pages.
GenBank Accession No. NM_000598, GI No. 62243067 , dated Jun. 6, 2010, 5 pages.
GenBank Accession No. NM_000688, GI No. 40316942, dated Nov. 4, 2010, 5 pages.
GenBank Accession No. NM_001013398; GI No. 62243247, dated Jun. 6, 2010, 5 pages.
lGenBank Accession No. NM_001034 dated Oct. 5, 2009, 5 pages.
GenBank Accession No. NM_001039573, GI No. 221316683, dated Mar. 4, 2010, 5 pages.
GenBank Accession No. NM_001049 dated Jun. 21, 2009, 4 pages.
GenBank Accession No. NM_001067 dated Oct. 18, 2009, 5 pages.
GenBank Accession No. NM_001098533, GI No. 237858579, dated May 7, 2010, 5 pages.
GenBank Accession No. NM_001136154 dated Jan. 8, 12, 6 pages.
GenBank Accession No. NM_001130851; GI No. 195927024, dated Mar. 5, 2010, 4 pages.
GenBank Accession No. NM_001136155 dated Jan. 8, 2012, 6 pages.
GenBank Accession No. NM_001143998, GI No. 221316675, dated Mar. 4, 2010, 5 pages.
GenBank Accession No. NM_001143999, GI No. 221316679, dated Mar. 5, 2010, 5 pages.
GenBank Accession No. NM_001144001, GI No. 221316686, dated Mar. 4, 2010, 5 pages.
GenBank Accession No. NM_001160367, GI No. 237858581, dated May 7, 2010, 5 pages.
GenBank Accession No. NM_001786 dated Nov. 1, 2009, 4 pages.
GenBank Accession No. NM_001844 dated Sep. 28, 2009, 7 pages.
GenBank Accession No. NM_003003, GI No. 221316681, dated Mar. 4, 2010, 5 pages.
GenBank Accession No. NM_003014; GI No. 170784837, dated Mar. 13, 2010, 5 pages.
GenBank Accession No. NM_003184; GI No. 115527086, dated Mar. 4, 2010, 7 pages.
GenBank Accession No. NM_003873.3 dated Oct. 18, 2009, 4 pages.
GenBank Accession No. NM_004336; GI No. 211938448, dated Mar. 14, 2010, 6 pages.
GenBank Accession No. NM_004449 dated Jan. 8, 2012, 6 pages.
GenBank Accession No. NM_005025.2 dated Jul. 12, 2009, 4 pages.
GenBank Accession No. NM_005192, GI No. 195927023, dated Mar. 4, 2010, 4 pages.
GenBank Accession No. NM_005651.1 dated Oct. 27, 2009, 3 pages.
GenBank Accession No. NM_006265, GI No. 208879448, dated Apr. 11, 2010, 6 pages.
GenBank Accession No. NM_006558 dated 812109, 3 pages.
GenBank Accession No. NM_006727 dated Oct. 18, 2009, 3 pages.
GenBank Accession No. NM_006819; GI No. 110225356, dated May 17, 2010, 5 pages.
GenBank Accession No. NM_012152; GI No. 183396778, dated Apr. 5, 2010, 5 pages.
GenBank Accession No. NM_014846; GI No. 120952850, dated Mar. 4, 2010, 6 pages.
GenBank Accession No. NM_016623; GI No. 42734437, dated Mar. 29, 2009, 4 pages.
GenBank Accession No. NM_018930 dated Feb. 10, 2008, _ pages.
GenBank Accession No. NM_031966 GI No. 34304372, dated Jun. 6, 2010, 5 pages.
GenBank Accession No. NM_032334; GI No. 223468686, dated Mar. 5, 2010, 3 pages.
GenBank Accession No. NM_052987, GI No. 237858574, dated May 17, 2010, 5 pages.
GenBank Accession No. NM_052988, GI No. 237858573, dated May 17, 2010, 5 pages.
GenBank Accession No. NM_080546; GI No. 112363101, dated May 17, 2010, 6 pages.
GenBank Accession No. NM_080607 dated Sep. 3, 2009, 2 pages.
GenBank Accession No. NM_133445 dated Sep. 20, 2009, 5 pages.
GenBank Accession No. NM_138455; GI No. 34147546, dated May 7, 2010, 3 pages.
GenBank Accession No. NM_182918 dated Jan. 8, 2012, 6 pages.
GenBank Accession No. NM_199166, GI No. 40316938, dated Apr. 11, 2010, 5 pages.
GenBank Accession No. NP_001058 dated Dec. 25, 2011, 9 pages.
GenBank Accession No. W34764 dated May 13, 1996, 2 pages.
Supplemental Table 1 of U.S. Appl. No. 61/057,698, filed May 30, 2008, 13 pages.
Supplemental Table 2 of U.S. Appl. No. 61/057,698, filed May 30, 2008, 15 pages.
Supplemental Table 3 of U.S. Appl. No. 61/057,698, filed May 30, 2008, 21 pages.
Supplemental Table 4 of U.S. Appl. No. 61/057,698, filed May 30, 12008, 1 page.
Supplemental Table 5 of U.S. Appl. No. 61/057,698, filed May 30, 12008, 2 pages.
Supplemental Table 6 of U.S. Appl. No. 61/057,698, filed May 30, 2008, 1 page.
International Search Report and Written Opinion dated Dec. 21, 2018 for PCT/US18/45058.
Deininger et al., Apr. 1, 2005, The development of imatinib as a therapeutic agent for chronic myeloid leukemia, Blood, 105(7):2640-2653.
Feng et al., Feb. 16, 2017, Luminal and basal subtyping of prostate cancer, PowerPoint presentation, 2017 Genitourinary Cancers Symposium, 16 pp.
ASTRO 2022: Prognostic and predictive performance of a 24-gene post-opeative radiation therapy outcomes score (PORTOS) in a phase 3 randomized trial of dose-intensified salvage radiotherapy after radical prostatectomy (SAKK 09/10), presentation by Dr. Dal Pra, 8 pp.
Christenson et al., Jun. 2018, Parp inhibitors for homologous recombination-deficient prostate cancer, Expert Opinion on Emerging Drugs, 23(2):123-133.
Gorlov et al., 2010, Prioritizing genes associated with prostate cancer development, BMC Cancer, 10:599.

(56) References Cited

OTHER PUBLICATIONS

Kamat et al., 2016, Bladder cancer, Lance, 388(10061):2796-2810.
Kardos et al., 2016, Claudin-low bladder tumors are immune infiltrated and actively immune suppressed. JCI insight, 1(3), e85902.
Liu et al., 2020, Immune-related biomarker risk score predicts prognosis in prostate cancer, Aging, 12(22):22776-22793.
Shi et al., Jun. 20, 2020, LPAR1, correlated with immune infiltrates, is a potential prognostic biomarker in prostate cancer, Frontiers in Oncology, 10:846, 10 pp.
Den et al., 2014, Genomic prostate cancer classifier predicts biochemical failure and metastases in patients after postoperative radiation therapy, International Journal of Radiation Oncology, 89(5):1038-1046.
Hall et al., 2014, PD27-04 Sipuleucel-t-induced antigen spread: immune response to prostate-specific antigen correlates with improved overall survival, The Journal of Urology, 191(4S): e765-e766.
Yearley et al., Jun. 15, 2017, PD-L2 expression in human tumors: relevance to anti-PD-1 therapy in cancer, Clinical Cancer Research, 23(12):3158-3167.

\* cited by examiner

| Association of Tumor Immune Content with Outcomes |||
|---|---|---|
| Cell Type | Literature | This Study |
| Mast Cells | ✚ (15) | ✚ |
| NK Cells | ✚ (16) | ✚ |
| Macrophages | ▬ (12) | ▬ |
| T Cells | ▬ (13,14) | ▬ |
| B Cells | ⊘ (12,13) | ⊘ |
| T Regs | ⊘ (12,13) | ⊘ |
| Dendritic Cells | N/A | ✚ |

✚ Higher levels associated with better prognosis
▬ Higher levels associated with worse prognosis
⊘ No clear association

FIG. 2F

USE OF IMMUNE CELL-SPECIFIC GENE EXPRESSION FOR PROGNOSIS OF PROSTATE CANCER AND PREDICTION OF RESPONSIVENESS TO RADIATION THERAPY

CROSS-REFERENCE TO RELATED APPLICATIONS

This application is a U.S. National Phase under 35 U.S.C. § 371 of International Application No. PCT/US2018/045058, filed Aug. 2, 2018, which claims priority to the U.S. Provisional Patent Application Ser. No. 62/541,566, filed on Aug. 4, 2017, which is hereby incorporated by reference herein in its entirety.

FIELD OF THE INVENTION

The present disclosure pertains to the field of personalized medicine and methods for treating cancer, such as, for example, prostate cancer. In particular, the disclosure relates to the use of immune cell-specific gene expression in determining prognosis and identifying individuals in need of treatment for prostate cancer who will be responsive to radiation therapy.

BACKGROUND OF THE INVENTION

Cancer is the uncontrolled growth of abnormal cells anywhere in a body. The abnormal cells are termed cancer cells, malignant cells, or tumor cells. Many cancers and the abnormal cells that compose the cancer tissue are further identified by the name of the tissue that the abnormal cells originated from (for example, prostate cancer). Cancer cells can proliferate uncontrollably and form a mass of cancer cells. Cancer cells can break away from this original mass of cells, travel through the blood and lymph systems, and lodge in other organs where they can again repeat the uncontrolled growth cycle. This process of cancer cells leaving an area and growing in another body area is often termed metastatic spread or metastatic disease. For example, if prostate cancer cells spread to a bone (or anywhere else), it can mean that the individual has metastatic prostate cancer.

Standard clinical parameters such as tumor size, grade, lymph node involvement and tumor-node-metastasis (TNM) staging (American Joint Committee on Cancer) may correlate with outcome and serve to stratify patients with respect to (neo)adjuvant chemotherapy, immunotherapy, antibody therapy and/or radiotherapy regimens. Incorporation of molecular markers in clinical practice may define tumor subtypes that are more likely to respond to targeted therapy. However, stage-matched tumors grouped by histological or molecular subtypes may respond differently to the same treatment regimen. Additional key genetic and epigenetic alterations may exist with important etiological contributions. A more detailed understanding of the molecular mechanisms and regulatory pathways at work in cancer cells and the tumor microenvironment (TME) could dramatically improve the design of novel anti-tumor drugs and inform the selection of optimal therapeutic strategies. The development and implementation of diagnostic, prognostic and therapeutic biomarkers to characterize the biology of each tumor may assist clinicians in making important decisions with regard to individual patient care and treatment.

The systemic treatment of prostate cancer has focused since the 1940s on inhibition of androgen receptor (AR) signaling, and more recently, the use of cytotoxic chemotherapy. The use of alternative strategies, such as immunotherapy, has been less successful in prostate cancer. Sipuleucel-T, an autologous cellular therapy against a prostate specific protein is the first FDA approved immunotherapy in prostate cancer (Cha et al. (2011) *J Clin Oncol* 29, 3677-3685). However, despite an improvement in overall survival, the rates of objective clinical responses are low (Kantoff et al. (2010) *N Engl J Med* 363, 411-422). Furthermore, multiple recent randomized trials with anti-CTLA-4 drugs have failed to reach their primary endpoint despite often remarkable objective responses in some patients (Beer et al. (2017) *J Clin Oncol* 35, 40-47; Kwon et al. (2014) *Lancet Oncol* 15, 700-712). Fortunately, recent data in advanced castration-resistant prostate cancer post-enzalutamide have demonstrated a 30% objective response rate to PD-1 blockade (Graff et al. (2016) *Oncotarget* 7, 52810-52817), and have re-energized the potential of immunotherapy in prostate cancer.

One barrier to the success of immunotherapy in oncology is understanding predictors of response. Hypothesized predictive biomarkers include the overall tumor mutational burden (Van Allen et al. (2015) *Science* 350, 207-211) or expression of the target (e.g. PD-L1 (Patel et al. (2015) *Mol Cancer Ther* 14, 847-856). However, in prostate cancer there is a relatively low mutational burden (s. c. m. o. Cancer Genome Atlas Research Network. Electronic address, N. Cancer Genome Atlas Research, The Molecular Taxonomy of Primary Prostate Cancer. *Cell* 163, 1011-1025), and limited to no PD-L1 expression in primary tumors (Martin et al. (2015) *Prostate Cancer Prostatic Dis* 18, 325-332). Furthermore, prostate cancer is thought to have a low degree of immune infiltration (Fong et al. (2014) *J Natl Cancer Inst* 106 106(11), pii: dju268), and the interaction between the different components of adaptive and innate immunity and the tumor are not well understood (Modena et al. (2016) *Oncol Rev* 10, 293).

The impact of immune content and specific immune cell types on prostate cancer biology is highly complex. For example, tumor associated macrophages appear to be pro-tumorogenic, and are positively associated with aggressive pathologic features and recurrence after prostatectomy (Strasner et al. (2015) *Front Oncol* 5, 128). T-cell infiltration has also been shown to be associated with progression (Flammiger et al. (2012) *APMIS* 120, 901-908) and prostate cancer-specific survival, albeit in a small, heterogeneous cohort including both localized and metastatic patients (McArdle et al. (2004) *Br J Cancer* 91, 541-543). In contrast, intra-tumoral mast cells are negatively associated with Gleason score and metastasis in a murine model, as well as adverse clinicopathologic factors and biochemical recurrence in prostatectomy patients (Lanciotti et al. (2014) *Biomed Res Int* 2014, 486798). Likewise, intra-prostatic natural killer (NK) cells appear to be associated with a lower risk of progression (Gannon et al. (2009) *J Immunol Methods* 348, 9-17). B-cells and regulatory T-cells (T-regs) have not been shown to be associated with pathologic variables or recurrence (Strasner et al., supra; Flammiger et al., supra). Despite numerous studies investigating various immune components and their interplay with prostate cancer, there are substantial short-comings that limit strong clinical conclusions to be made given the often heterogeneous cohorts, small sample sizes, and limited follow-up to assess long-term clinically meaningful endpoints.

This background information is provided for the purpose of making known information believed by the applicant to be of possible relevance to the present disclosure. No admission is necessarily intended, nor should be construed, that any of the preceding information constitutes prior art against the present disclosure.

SUMMARY OF THE INVENTION

The present disclosure relates to methods, systems and kits for the diagnosis, prognosis and the determination of cancer progression of prostate cancer in a subject. In particular, the disclosure relates to the use of immune cell-specific gene expression in determining prognosis and identifying individuals in need of treatment for prostate cancer who will be responsive to radiation therapy.

In some embodiments, the disclosure includes a method for determining a prognosis and treating a patient for cancer, the method comprising: a) obtaining a biological sample comprising cancer cells from the patient; b) measuring levels of immune cell-specific gene expression in the biological sample; c) calculating levels of one or more immune cell types in the biological sample based on the levels of immune cell-specific gene expression; d) determining the prognosis of the patient based on the levels of the one or more immune cell types in the biological sample; and e) administering a treatment to the subject based on the prognosis. In some embodiments, the cancer is prostate cancer. In some embodiments, the one or more immune cell types are selected from the group consisting of activated mast cells, resting mast cells, activated natural killer (NK) cells, resting NK cells, activated dendritic cells, resting dendritic cells, M0 macrophages, M1 macrophages, M2 macrophages, and T cells. In some embodiments, the treatment is selected from the group consisting of surgery, chemotherapy, radiation therapy, immunotherapy/biological therapy, hormonal therapy, and photodynamic therapy. In some embodiments, the immune cell-specific gene is selected from the group consisting of CTLA-4, PD-1, PD-L1, and PD-L2. In some embodiments, the immune cell-specific gene is one or more genes selected from Table 2. In some embodiments, the immune cell-specific gene comprises or consists of at least 1, 2, 3, 4, 5, 6, 7, 8, 9, 10, 11, 12, 13, 14, 15, 16, 17, 18, 19, 20, 21, 22, 23, 24, 25, 30, 35, 40, 50, 60, 70, 80, 90, 100, 125, 150, 175, 200, 225, or 250 genes selected from Table 2. In some embodiments, the immune cell-specific gene comprises or consists of all of the genes in Table 2. In some embodiments, the immune cell-specific gene is one or more genes selected from CCL17, LTA, SERPINB2, CCL1, XCL2, SERPINB7, SLAMF7, EBI3, CCL22, IL24, IL2RA, CD1E, IL1A, IFNG, CD1B, IL9, XCL1, ZBP1, LTB, VNN2, CSF2, IL17F, KLRC3, CYP1B1, PROK2, CD3G, TNFAIP6, IL22, GZMB, GNLY, KLRF1, IL1B, GPR132, CD80, IL12B, BLK, ALOX15, CCR7, PTPRC, CCL24, CTLA4, BANK1, STK4, TNFRSF4, PLA2G7, PMAIP1, NFE2, ICOS, CCL3, NCOA3, CXCL5, KLRD1, TLR10, TCL1A, TNF, GM2A, LCK, FCAR, LEF1, KIR3DL2, TNIP3, NKG7, PLXNC1, TFRC, ZAP70, MMP9, GZMA, EREG, PILRA, SELL, IGSF6, P2RY8, CLC, CD1C, IRF4, SLC7A11, CCND2, MYBL1, TOP2A, IL3RA, FSCN1, GPR84, DAPP1, FPR1, IFI16, CXCL11, MNDA, LAT, FCN1, IL4I1, PRF1, BTLA, CXCL3, EMR2, EOMES, ITGA4, LILRB1, CD86, IL18RAP, LAG3, CARD11, TNFRSF1B, CD1A, TRAF1, RGS18, MAP4K1, IL2RB, APOBEC3G, CRLF2, PLEK, HLA-DOB, GZMK, ZBED2, LILRA1, CCL4, GCA, ABTB1, APOBEC3A, CTSW, CCR3, IL19, RASGRP2, LYN, CX3CR1, MYO1G, RPEL1, NCF4, SOD2, SAMD3, GPR18, GZMM, KLRC4, CSF3R, BIRC3, CXCL1, CD7, CD69, PTGDR, MCM10, ICAM3, P2RX5, HK3, TNFRSF9, RIT1, PTPRCAP, LST1, ANP32E, CD79B, ITK, ITGAL, NUPL1, CST7, CCR2, ADAMS, INHBA, QPCT, MYO1F, SYK, HSPA6, CD37, TBX21, ZFYVE16, TNFSF13B, CXCR6, PPBP, BCL11B, BIN2, CRTAM, TLR1, IL23A, S100A12, RUNX3, SAMSN1, UBE2J1, SLC38A6, CD8A, LILRB2, RASGRP3, NCR3, GBP5, RLN3, SLC16A3, LYAR, CORO1A, PLAUR, NCF2, YPEL1, RNASE6, CCR1, CCL5, CBL, SNX9, LSP1, PIK3CD, CDCA5, CYBB, ARHGAP9, TBC1D13, CD79A, DTNB, PTPN22, ADORA2A, DPEP2, MSC, S100A9, MPEG1, SEC14L1, ITGB7, RAC2, CCL13, KYNU, MARCKS, KIR3DL1, DCSTAMP, IL7R, IL1RN, CD19, TREM2, CXCR5, GNA15, FCER1A, CD48, CFLAR, BCL2A1, CXCR4, FBXO5, RASSF4, CD3D, USP15, ASPM, G6PD, TLR2, GPR114, CCL20, CENPH, CD3E, MTF1, FRAT2, POU2AF1, UBE2S, UHRF1, RASGRP4, NUSAP1, KLRB1, HELLS, EVI2B, JAM3, CKLF, CXCL10, TBL1X, MCM2, RNASE2, HAVCR1, FCGR2B, EAF2, TLR8, RRM2, STAT1, GLIPR1, MMP14, CD2, REL, SLAMF1, and MMP12.

In some embodiments, the disclosure includes a method for determining a prognosis and treating a patient for prostate cancer, the method comprising: a) obtaining a biological sample comprising prostate cancer cells from the patient; b) measuring levels of immune cell-specific gene expression in the biological sample; c) calculating levels of one or more immune cell types in the biological sample based on the levels of immune cell-specific gene expression, wherein said one or more immune cell types are selected from the group consisting of activated mast cells, resting mast cells, activated natural killer (NK) cells, resting NK cells, activated dendritic cells, resting dendritic cells, M0 macrophages, M1 macrophages, M2 macrophages, and T cells; d) determining the prognosis of the patient based on the levels of the one or more immune cell types in the biological sample; and e) administering a treatment to the subject based on the prognosis, wherein the treatment is selected from the group consisting of surgery, chemotherapy, radiation therapy, immunotherapy/biological therapy, hormonal therapy, and photodynamic therapy. In some embodiments, the immune cell-specific gene is selected from the group consisting of CTLA-4, PD-1, PD-L1, and PD-L2. In some embodiments, the immune cell-specific gene is one or more genes selected from Table 2

In some embodiments, the disclosure includes a method for determining a prognosis and treating a patient for prostate cancer, the method comprising: a) obtaining a biological sample comprising prostate cancer cells from the patient; b) measuring levels of immune cell-specific gene expression in the biological sample; c) calculating levels of one or more immune cell types in the biological sample based on the levels of immune cell-specific gene expression, wherein said one or more immune cell types are selected from the group consisting of activated mast cells, resting mast cells, activated natural killer (NK) cells, resting NK cells, activated dendritic cells, resting dendritic cells, M0 macrophages, M1 macrophages, M2 macrophages, and T cells; d) determining the prognosis of the patient based on the levels of the one or more immune cell types in the biological sample; and e) administering a treatment to the subject based on the prognosis, wherein the treatment is selected from the group consisting of surgery, chemotherapy, radiation therapy, immunotherapy/biological therapy, hormonal therapy, and photodynamic therapy. In some embodiments, the immune cell-specific gene is selected from the group consisting of CTLA-4, PD-1, PD-L1, and PD-L2. In some embodiments, the immune cell-specific gene is one or more genes selected from Table 2

In some embodiments, the disclosure includes a method for determining a prognosis for a patient having prostate cancer, the method comprising: a) obtaining a biological sample comprising prostate cancer cells from the patient; b) measuring levels of immune cell-specific gene expression in the biological sample; c) calculating levels of one or more immune cell types in the biological sample based on the levels of immune cell-specific gene expression, wherein said one or more immune cell types are selected from the group consisting of activated mast cells, resting mast cells, activated natural killer (NK) cells, resting NK cells, activated dendritic cells, resting dendritic cells, M0 macrophages, M1 macrophages, M2 macrophages, and T cells; and d) determining the prognosis of the patient based on the levels of the one or more immune cell types in the biological sample. In some embodiments, the method further comprises administering a treatment to the subject based on the prognosis, wherein the treatment is selected from the group consisting of surgery, chemotherapy, radiation therapy, immunotherapy/biological therapy, hormonal therapy, and photodynamic therapy. In some embodiments, the immune cell-specific gene is selected from the group consisting of CTLA-4, PD-1, PD-L1, and PD-L2. In some embodiments, the immune cell-specific gene is one or more genes selected from Table 2

In some embodiments, the prognosis of the patient is determined based on the calculated levels of activated and resting mast cells. For example, higher levels of activated mast cells compared to a reference value indicate that that the patient will have longer distant metastasis free survival. Higher levels of resting mast cells compared to a reference value indicate that the that the patient will have shorter distant metastasis free survival. A higher ratio of activated mast cells to resting mast cells compared to a reference value indicates that the patient will have longer distant metastasis free survival.

In some embodiments, the prognosis of the patient is determined based on the calculated levels of activated and resting NK cells. For example, higher levels of activated NK cells compared to a reference value indicate that that the patient will have longer distant metastasis free survival. Higher levels of resting NK cells compared to a reference value indicate that the that the patient will have shorter distant metastasis free survival. A higher ratio of activated NK cells to resting NK cells compared to a reference value indicates that the patient will have longer distant metastasis free survival.

In some embodiments, the prognosis of the patient is determined based on the calculated levels of activated and resting dendritic cells. For example, higher levels of activated dendritic cells compared to a reference value indicate that that the patient will have longer distant metastasis free survival. Higher levels of resting dendritic cells compared to a reference value indicate that the that the patient will have shorter distant metastasis free survival. A higher ratio of activated dendritic cells to resting dendritic cells compared to a reference value indicates that the patient will have longer distant metastasis free survival.

In some embodiments, the prognosis of the patient is determined based on the calculated levels of macrophages. For example, higher levels of M0 macrophages compared to a reference value indicate that that the patient will have longer distant metastasis free survival. Higher levels of M1 macrophages or M2 macrophages compared to reference values for M1 macrophages and M2 macrophages indicate that the that the patient will have shorter distant metastasis free survival. A higher ratio of M1 and M2 macrophages to M0 macrophages indicates that the patient will have a shorter distant metastasis free survival.

In some embodiments, the prognosis of the patient is determined based on the calculated levels of T cells. For example, higher levels of T cells (e.g., CD8 T-cells or CD4 T-cells, naive or activated memory T cells) compared to a reference value for the T cells indicate that that the patient will have shorter distant metastasis free survival.

In some embodiments, the prognosis of the patient is determined based on levels of T cell-specific CTLA-4 gene expression, wherein higher levels of T cell-specific CTLA-4 gene expression compared to a reference value indicate that the patient will have shorter biochemical recurrence free survival.

In some embodiments, the prognosis of the patient is determined based on levels of immune cell-specific gene expression of PD-1, wherein higher levels of immune cell-specific gene expression of PD-1 indicate that the patient will have longer biochemical recurrence free survival, longer distant metastasis free survival, or longer prostate cancer-specific survival.

In some embodiments, the prognosis of the patient is determined based on levels of immune cell-specific gene expression of PD-L1, wherein higher levels of immune cell-specific gene expression of PD-L1 indicate that the patient will have shorter biochemical recurrence free survival, shorter distant metastasis free survival, or shorter prostate cancer-specific survival.

In some embodiments, the prognosis of the patient is determined based on levels of immune cell-specific gene expression of PD-L2, wherein higher levels of immune cell-specific gene expression of PD-L2 indicate that the patient will have shorter biochemical recurrence free survival, shorter distant metastasis free survival, or shorter prostate cancer-specific survival.

In some embodiments, the method further comprises calculating an immune content score based on the levels of immune cell-specific gene expression, wherein a higher immune content score for the patient compared to reference value ranges for a control subject indicates that the patient will have shorter biochemical recurrence free survival, shorter distant metastasis free survival, shorter prostate cancer-specific survival, or shorter overall survival than the control subject.

The biological sample obtained from a patient is typically a prostate biopsy or tumor sample, but can be any sample from bodily fluids or tissue of the patient that contains prostate cancer cells. In some embodiments, nucleic acids comprising immune cell-specific gene sequences are further isolated from the biological sample, and/or purified, and/or amplified prior to analysis.

The expression levels of immune cell-specific genes can be determined by a variety of methods including, but not limited to in situ hybridization, PCR-based methods, array-based methods, immunohistochemical methods, RNA assay methods, and immunoassay methods. Levels of immune cell-specific gene expression can be determined, for example, using one or more reagents such as nucleic acid probes, nucleic acid primers, and antibodies.

In another aspect, the disclosure includes a method for predicting responsiveness to radiation therapy and treating a patient for prostate cancer, the method comprising: a) obtaining a biological sample comprising prostate cancer cells from the patient; b) measuring gene expression levels of PD-L2 in the biological sample, wherein higher levels of PD-L2 gene expression compared to reference value ranges for a control subject indicate that the patient will benefit from radiation therapy; and c) treating the patient with radiation therapy if the PD-L2 gene expression levels indicate that the patient will benefit from radiation therapy.

In some embodiments, the method is performed before treatment of the patient with radiation therapy or while the patient is undergoing treatment with radiation therapy.

In some embodiments, the gene expression levels of PD-L2 are determined by using a method selected from the group consisting of in situ hybridization, a PCR-based method, an array-based method, an immunohistochemical method, an RNA assay method and an immunoassay method. The gene expression levels of PD-L2 can be determined, for example, using one or more reagents selected from the group consisting of PD-L2-specific nucleic acid probes, PD-L2-specific nucleic acid primers, and PD-L2-specific antibodies.

In some embodiments, the methods described herein are performed before or after the patient undergoes radical prostatectomy.

The significance of the levels of immune cell-specific gene expression may be evaluated using, for example, a T-test, P-value, KS (Kolmogorov Smirnov) P-value, accuracy, accuracy P-value, positive predictive value (PPV), negative predictive value (NPV), sensitivity, specificity, AUC, AUC P-value (Auc.pvalue), Wilcoxon Test P-value, Median Fold Difference (MFD), Kaplan Meier (KM) curves, survival AUC (survAUC), Kaplan Meier P-value (KM P-value), Univariable Analysis Odds Ratio P-value (uvaORPval), multivariable analysis Odds Ratio P-value (mvaORPval), Univariable Analysis Hazard Ratio P-value (uvaHRPval) and Multivariable Analysis Hazard Ratio P-value (mvaHRPval). The significance of the expression level of the one or more targets may be based on two or more metrics selected from the group comprising AUC, AUC P-value (Auc.pvalue), Wilcoxon Test P-value, Median Fold Difference (MFD), Kaplan Meier (KM) curves, survival AUC (survAUC), Univariable Analysis Odds Ratio P-value (uvaORPval), multivariable analysis Odds Ratio P-value (mvaORPval), Kaplan Meier P-value (KM P-value), Univariable Analysis Hazard Ratio P-value (uvaHRPval) or Multivariable Analysis Hazard Ratio P-value (mvaHRPval).

In another aspect, the disclosure includes a method for predicting responsiveness to radiation therapy for a patient having prostate cancer, the method comprising: a) obtaining a biological sample comprising prostate cancer cells from the patient; and b) measuring gene expression levels of PD-L2 in the biological sample, wherein higher levels of PD-L2 gene expression compared to reference value ranges for a control subject indicate that the patient will benefit from radiation therapy. In some embodiments, the method further comprises treating the patient with radiation therapy if the PD-L2 gene expression levels indicate that the patient will benefit from radiation therapy.

In some embodiments, the method is performed before treatment of the patient with radiation therapy or while the patient is undergoing treatment with radiation therapy.

In some embodiments, the gene expression levels of PD-L2 are determined by using a method selected from the group consisting of in situ hybridization, a PCR-based method, an array-based method, an immunohistochemical method, an RNA assay method and an immunoassay method. The gene expression levels of PD-L2 can be determined, for example, using one or more reagents selected from the group consisting of PD-L2-specific nucleic acid probes, PD-L2-specific nucleic acid primers, and PD-L2-specific antibodies.

In some embodiments, the methods described herein are performed before or after the patient undergoes radical prostatectomy.

The significance of the levels of immune cell-specific gene expression may be evaluated using, for example, a T-test, P-value, KS (Kolmogorov Smirnov) P-value, accuracy, accuracy Pvalue, positive predictive value (PPV), negative predictive value (NPV), sensitivity, specificity, AUC, AUC P-value (Auc.pvalue), Wilcoxon Test P-value, Median Fold Difference (MFD), Kaplan Meier (KM) curves, survival AUC (survAUC), Kaplan Meier P-value (KM P-value), Univariable Analysis Odds Ratio P-value (uvaORPval), multivariable analysis Odds Ratio Pvalue (mvaORPval), Univariable Analysis Hazard Ratio P-value (uvaHRPval) and Multivariable Analysis Hazard Ratio P-value (mvaHRPval). The significance of the expression level of the one or more targets may be based on two or more metrics selected from the group comprising AUC, AUC P-value (Auc.pvalue), Wilcoxon Test P-value, Median Fold Difference (MFD), Kaplan Meier (KM) curves, survival AUC (survAUC), Univariable Analysis Odds Ratio P-value (uvaORPval), multivariable analysis Odds Ratio P-value (mvaORPval), Kaplan Meier P-value (KM P-value), Univariable Analysis Hazard Ratio P-value (uvaHRPval) or Multivariable Analysis Hazard Ratio P-value (mvaHRPval).

An embodiment of the disclosure includes a method comprising: (a) obtaining an expression level of one or more immune cell-specific genes in a sample from a subject suspected of having prostate cancer; (b) calculating levels of one or more immune cell types in the biological sample based on the levels of the immune cell-specific gene expression; (c) calculating an immune content score based on the level of expression of the immune cell-specific genes to determine whether or not the subject is likely to benefit from radiation therapy, wherein an immune content score greater than 0 indicates that the subject will benefit from radiation therapy and an immune content score less than or equal to 0 indicates that the subject will not benefit from radiation therapy; and d) administering radiation therapy to the subject if the immune content score indicates that the subject will benefit from the radiation therapy, or administering a cancer treatment other than radiation therapy to the subject if the immune content score indicates the subject will not benefit from radiation therapy. In some embodiments, the immune cell genes comprise at least two genes selected from Table 2. In some embodiments, the immune cell gene comprises or consists of at least 1, 2, 3, 4, 5, 6, 7, 8, 9, 10, 11, 12, 13, 14, 15, 16, 17, 18, 19, 20, 21, 22, 23, 24, 25, 30, 35, 40, 50, 60, 70, 80, 90, 100, 125, 150, 175, 200, 225, or 250 genes selected from Table 2. In some embodiments, the immune cell gene comprises or consists of all of the genes in Table 2.

Some embodiments comprise a method for treating a patient for cancer, the method comprising: a) obtaining or having obtained a level of expression of one or more immune cell-specific genes in a biological sample comprising cancer cells from the patient; b) calculating levels of one or more immune cell types in the biological sample based on the level of expression of one or more immune cell-specific genes in the biological sample; c) determining if the patient as at risk of developing metastatic cancer or not at risk of developing metastatic cancer, based on the level of expression of one or more immune cell-specific genes in the biological sample; and d) administering a treatment to the patient if the patient is determined to be at risk of developing metastatic cancer based on the level of expression of one or more immune cell-specific genes in the biological sample, or monitoring without administering the treatment to the subject if the subject is determined to not be at risk of developing metastatic cancer based on the level of expression of one or more immune cell-specific genes in the biological sample.

In some embodiments the cancer is selected from the list consisting of lymphoma, leukemia, multiple myeloma, melanoma, and cancers of the brain, lung, esophagus, breast, uterus, ovary, prostate, kidney, colon, and rectum. In some embodiments the immune cell-specific gene comprises or consists of at least 1, 2, 3, 4, 5, 6, 7, 8, 9, 10, 11, 12, 13, 14, 15, 16, 17, 18, 19, 20, 21, 22, 23, 24, 25, 30, 35, 40, 50, 60, 70, 80, 90, 100, 125, 150, 175, 200, 225, or 250 genes selected from Table 2. In some embodiments the immune cell-specific gene includes all of the genes in Table 2. In some embodiments the immune cell-specific gene comprises or consists of one, two, three, or all four of CTLA-4, PD-1, PD-L1, and PD-L2. In some embodiments the immune cell-specific gene comprises or consists of: CTLA-4; PD-1; PD-L1; PD-L2; CTLA-4 and PD-1; CTLA-4 and PD-L1; CTLA-4 and PD-L2; PD-1 and PD-L1; PD-1 and PD-L2; PD-L1 and PD-L2; CTLA-4, PD-1, and PD-L1; CTLA-4, PD-1, and PD-L2; CTLA-4, PD-L1, and PD-L2; PD-1, PD-L1, and PD-L2; and CTLA-4, PD-1, PD-L1, and PD-L2.

These and other embodiments of the subject disclosure will readily occur to those of skill in the art in view of the disclosure herein.

INCORPORATION BY REFERENCE

All publications, patents, and patent applications mentioned in this specification are herein incorporated by reference in their entireties to the same extent as if each individual publication, patent, or patent application was specifically and individually indicated to be incorporated by reference.

BRIEF DESCRIPTION OF THE DRAWINGS

FIGS. 2A-2F show Kaplan-Meier curves showing the association of individual immune cell types and clinical outcomes in 678 (out of the original 1,567) retrospective samples with confident de-convolution. Active mast cells compared to resting (FIG. 2A), active NK cells compared to resting (FIG. 2B), and active dendritic cells compared to resting (FIG. 2C) are associated with improved distant metastasis free survival endpoint. M1 and M2 macrophages normalized to M0 macrophages (FIG. 2D), and total T cell content (FIG. 2E), are associated with worse distant metastasis free survival. Variables are stratified as quartiles for the plots, and p-values are calculated using Cox regression on a continuous variable to illustrate a dose-response. FIG. 2F shows a comparison of individual tumor immune cell associations with outcome in literature with this study.

FIG. 3J shows a box-plot demonstrating that PD-L2 is expressed significantly higher in 9393 prostate cancer samples than PD-L1 (T-test $p<0.0001$)

DETAILED DESCRIPTION OF THE INVENTION

Figure 1A:
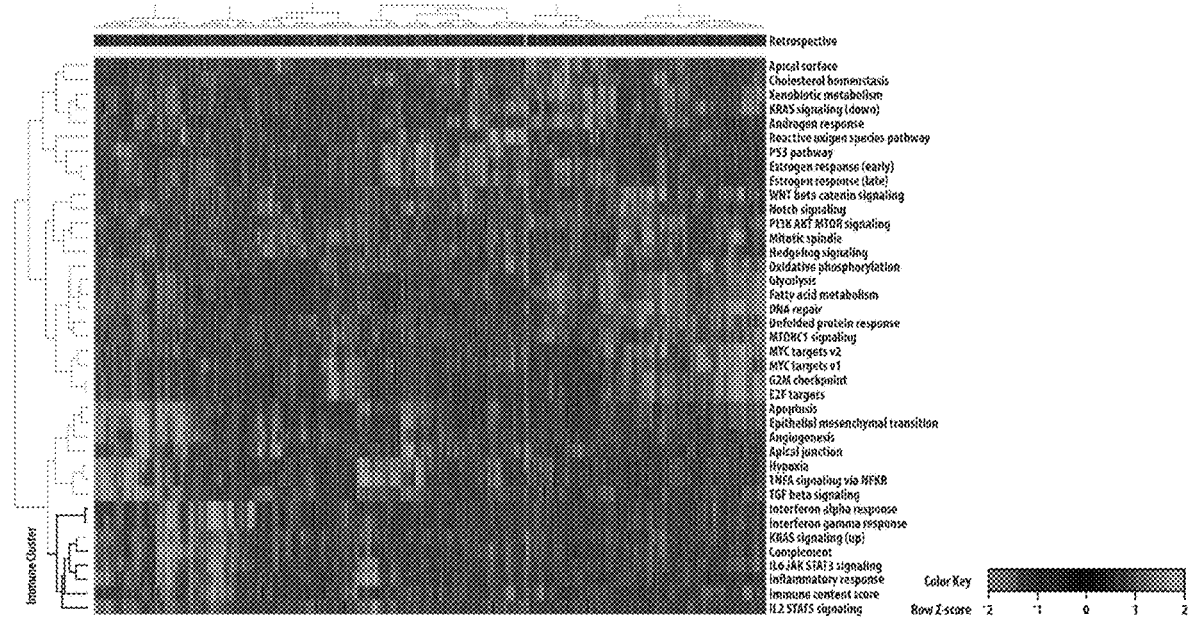
FIG. 1A shows that unsupervised hierarchical clustering of hallmark pathways in 9393 prospective and retrospective prostatectomy samples reveals an immune-related cluster in prostate cancer. The immune content score also falls within this cluster and is correlated with the immune hallmark pathways.
Figure 1B:
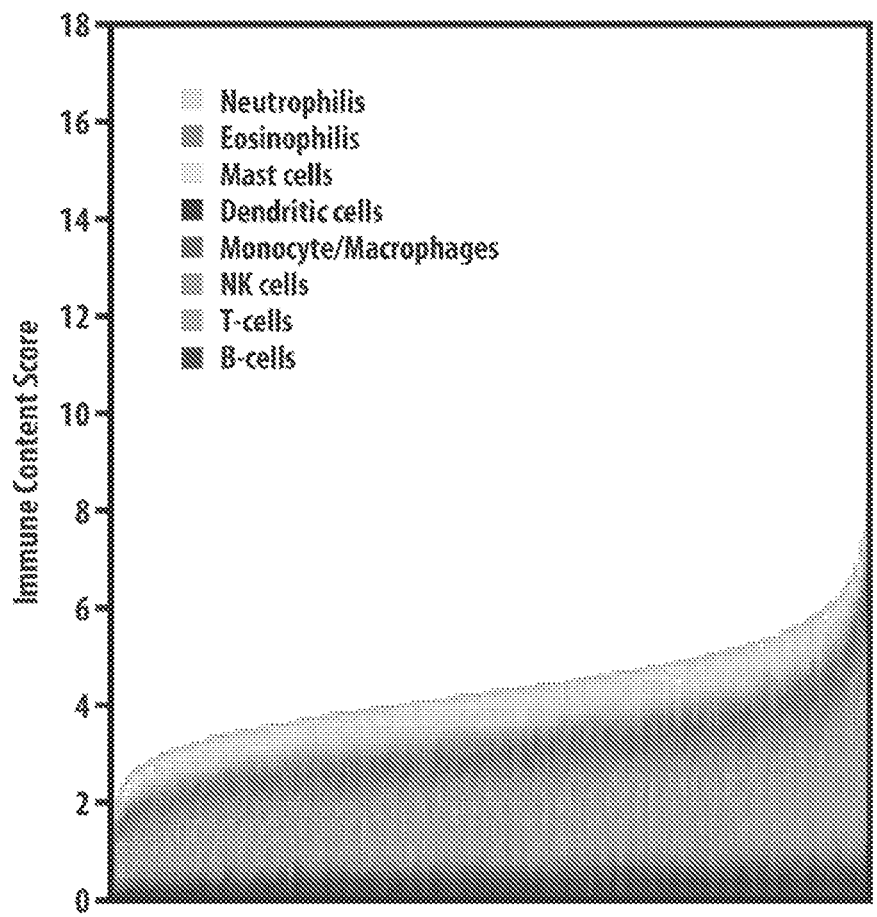
FIG. 1B shows a bar plot illustrating the distribution of immune content scores in 6372 prospective and retrospective prostatectomy samples after removal of samples without confident de-convolution (out of the original 9393). Immune content scores in 1,567 retrospective samples are significantly associated with worse bRFS (FIG. 1C), DMFS (FIG. 1D), PCSS (FIG. 1E), and OS (FIG. 1F). Variables are stratified as quartiles for the plots, and p-values are calculated using Cox regression on a continuous variable to illustrate a dose-response.
Figure 1C:
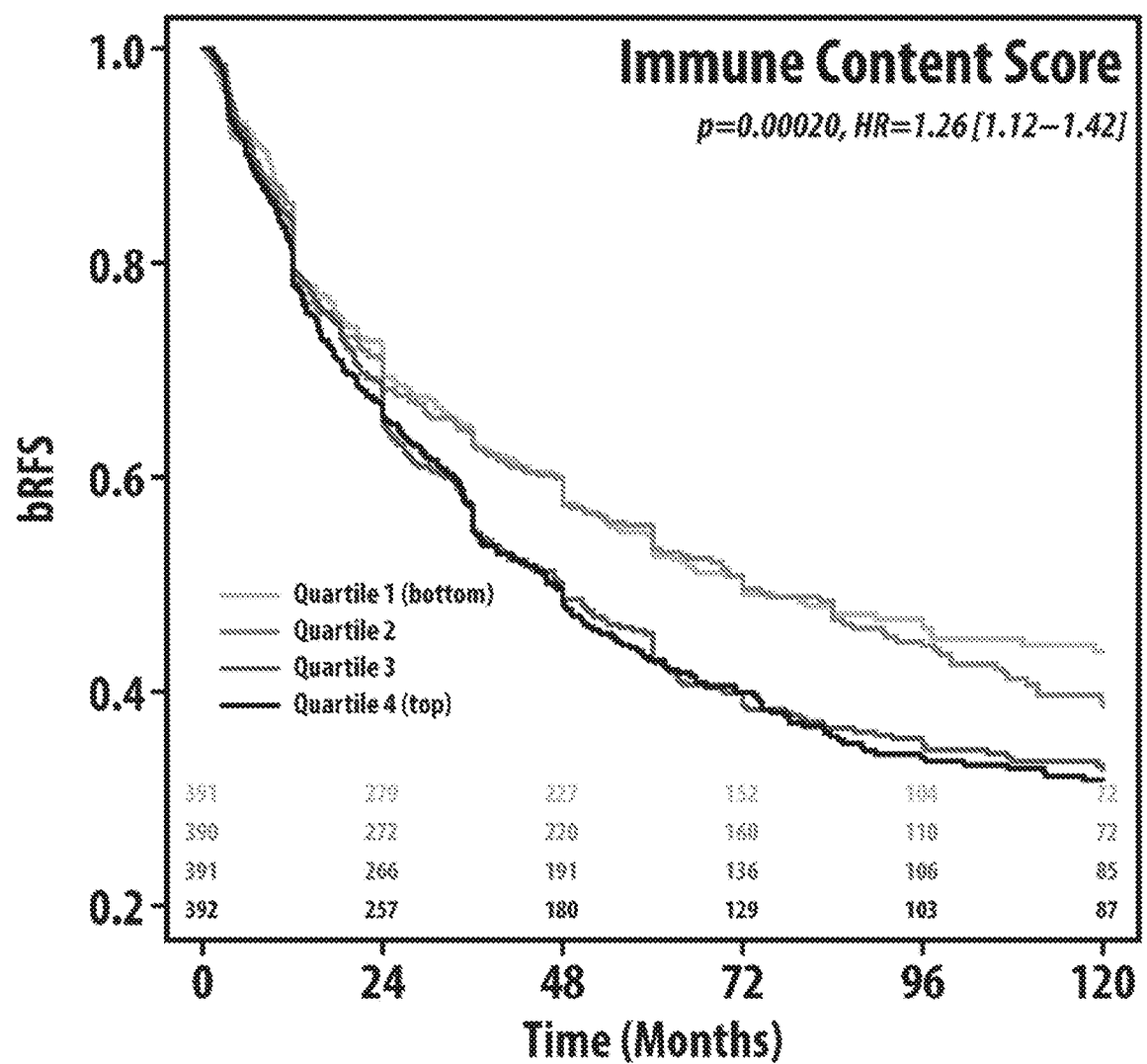
Figure 1D:
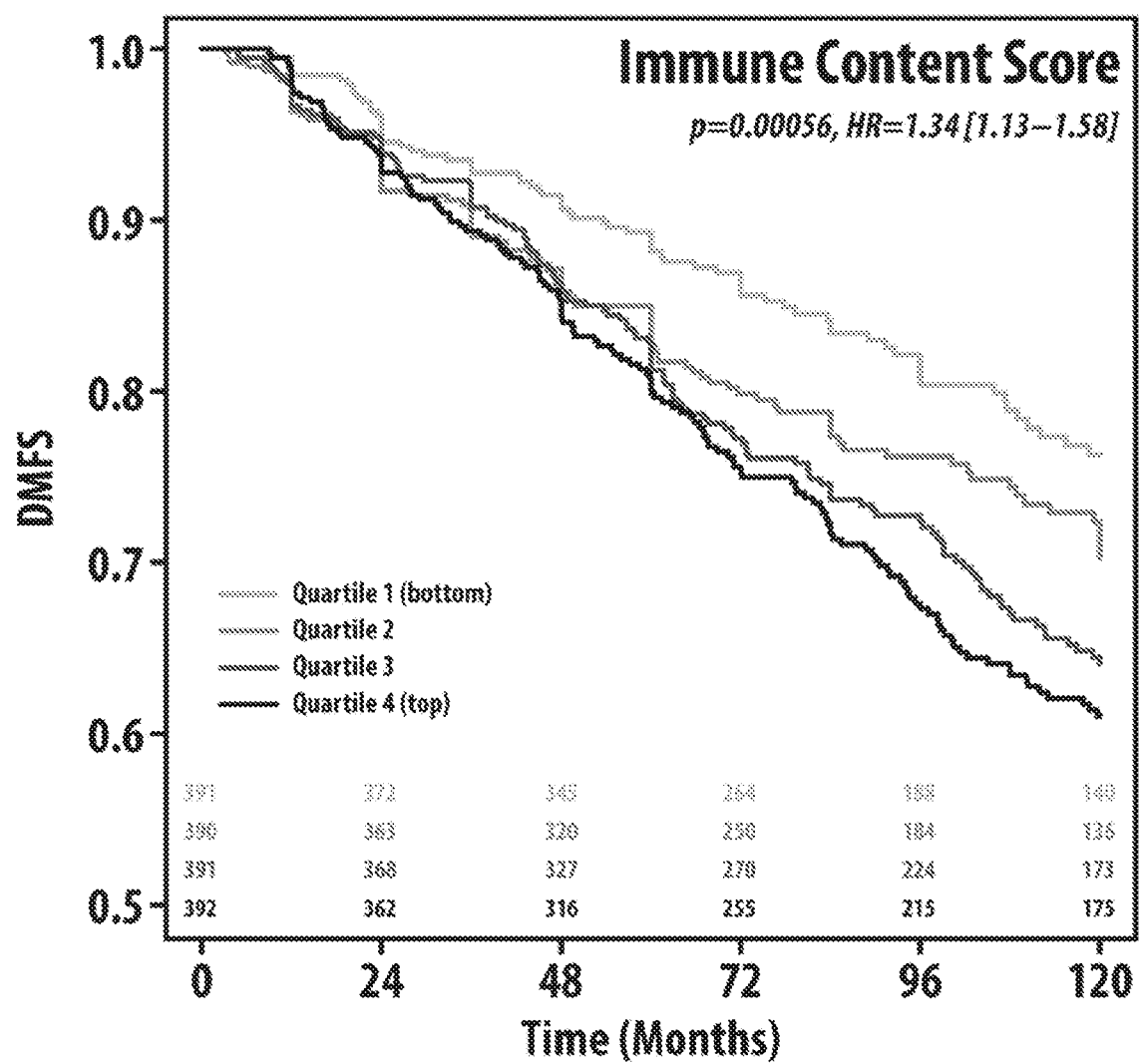
Figure 1E:
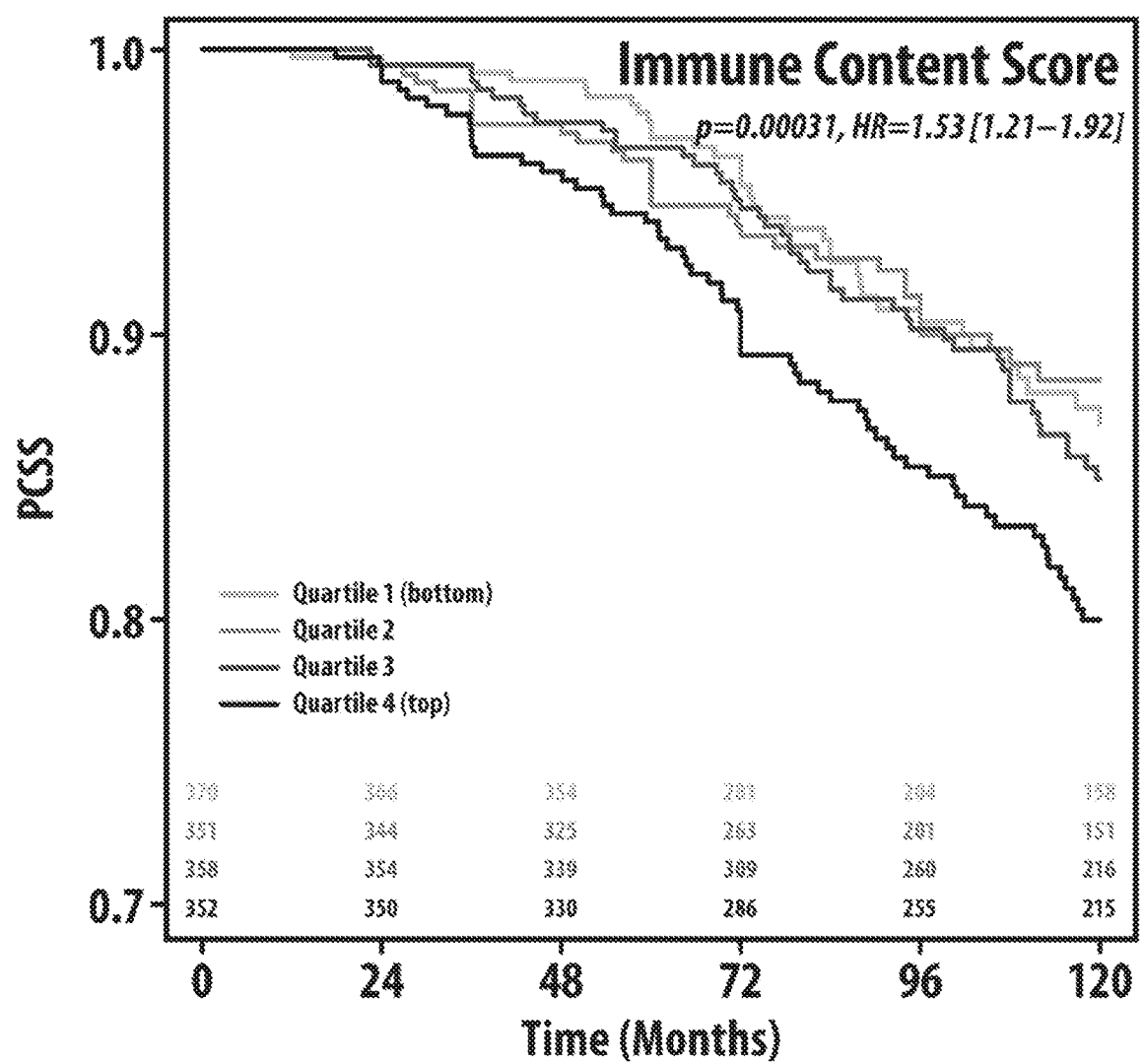
Figure 1F:
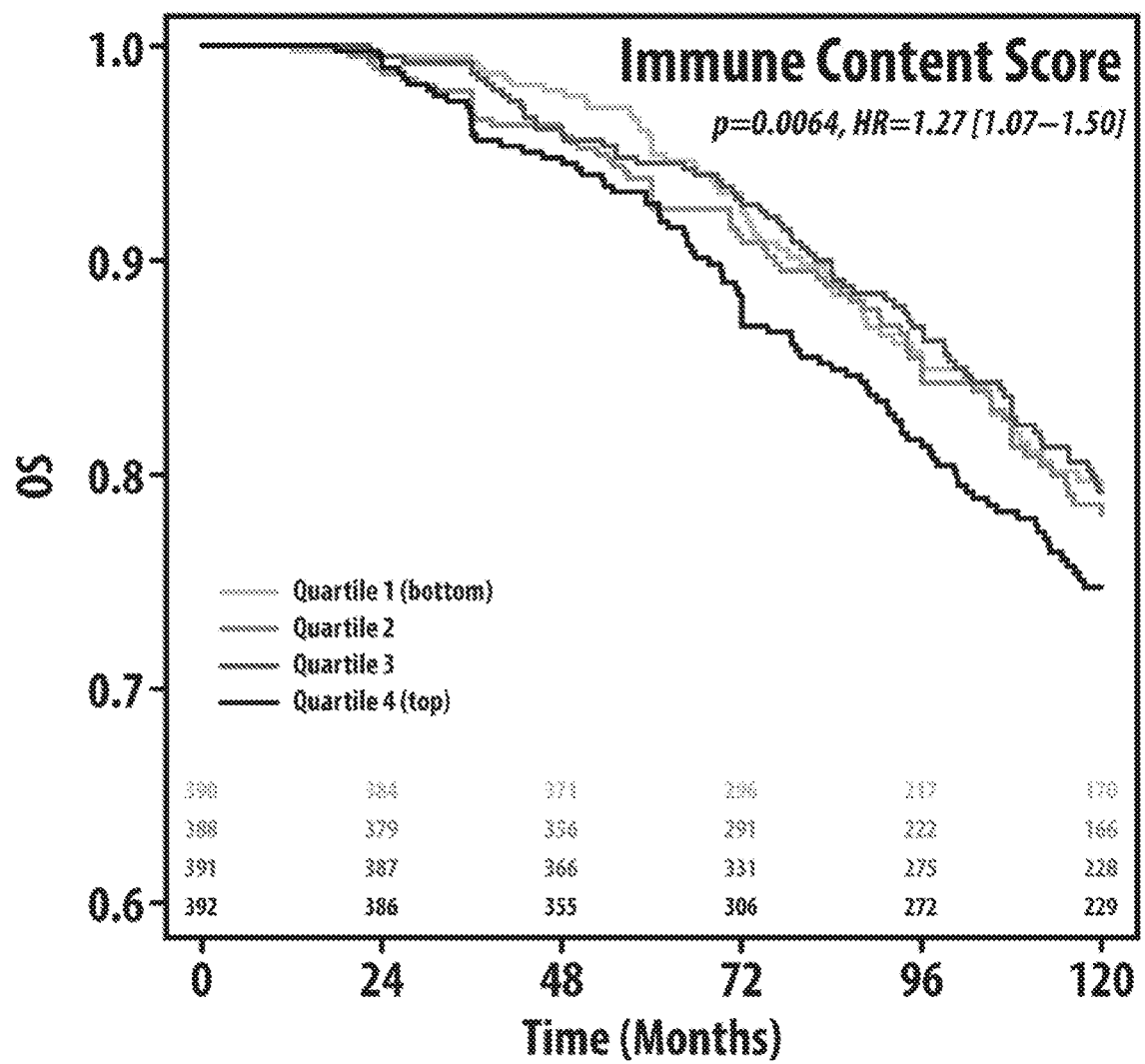
Figure 2A:
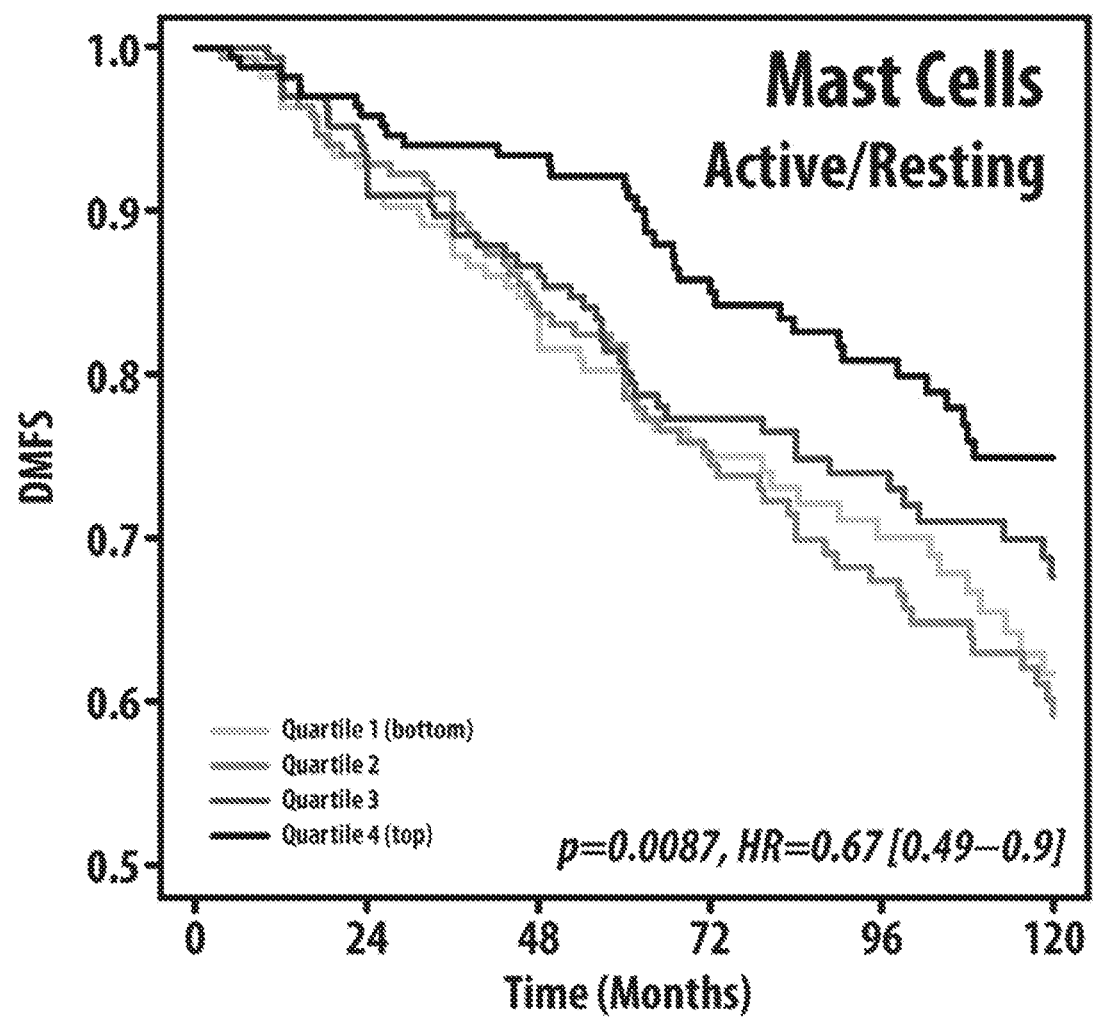
Figure 2B:
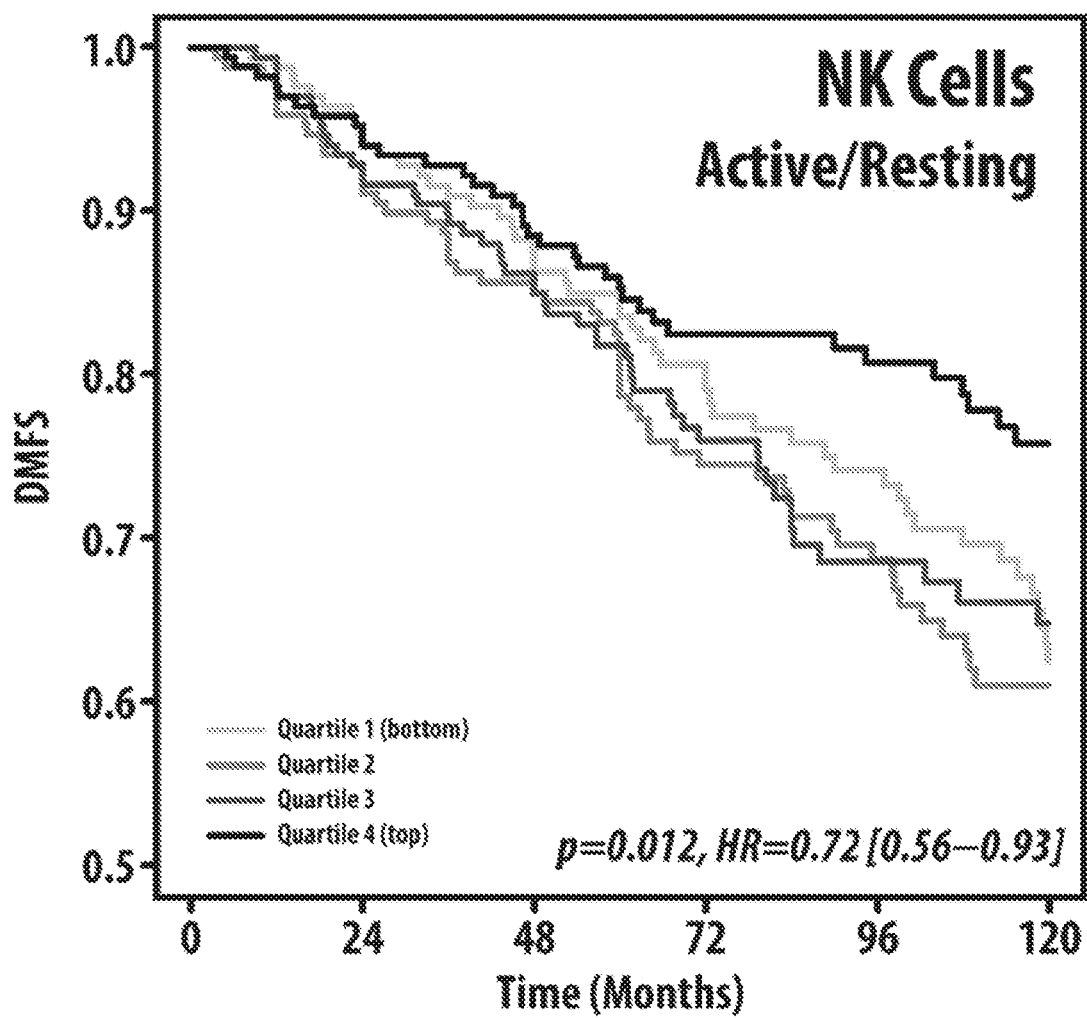
Figure 2C:
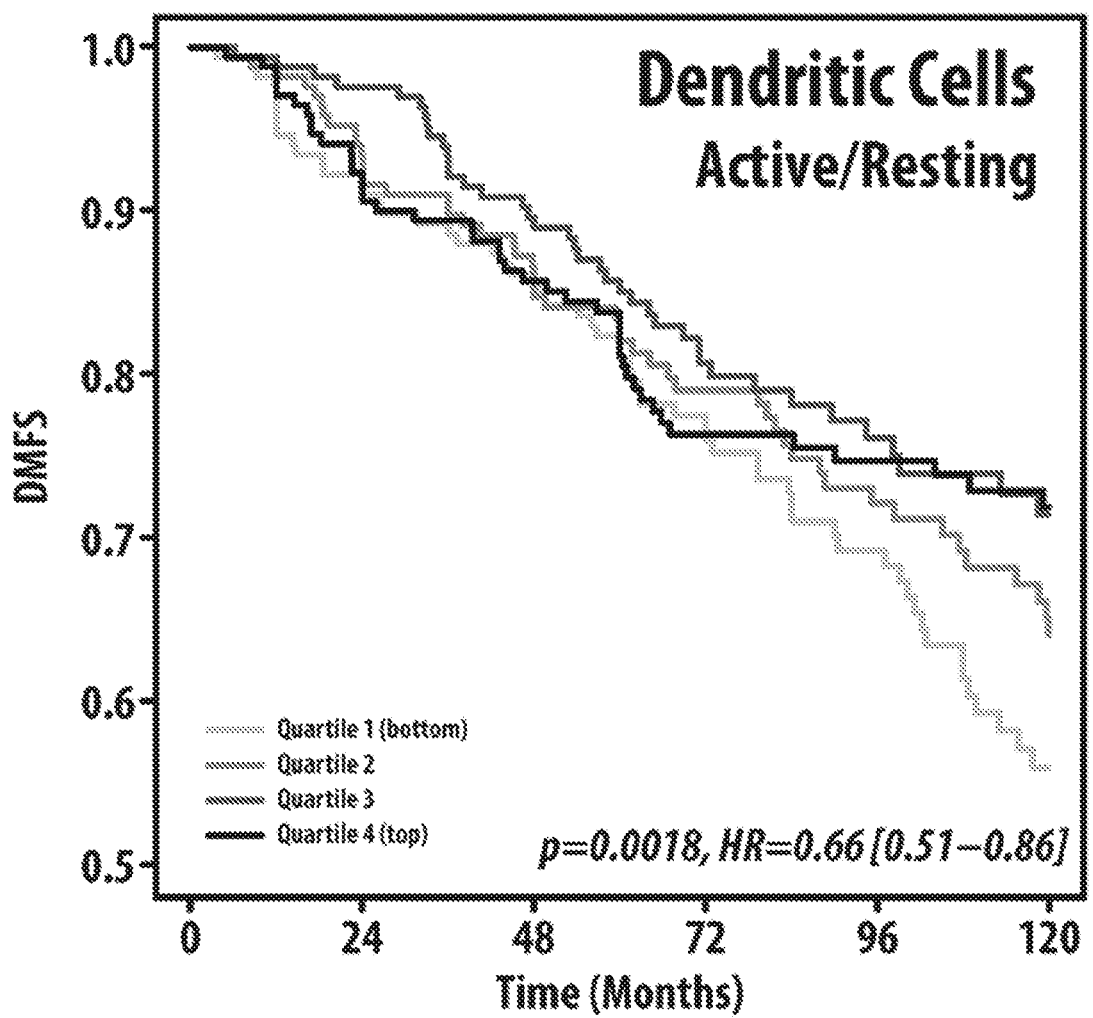
Figure 2D:
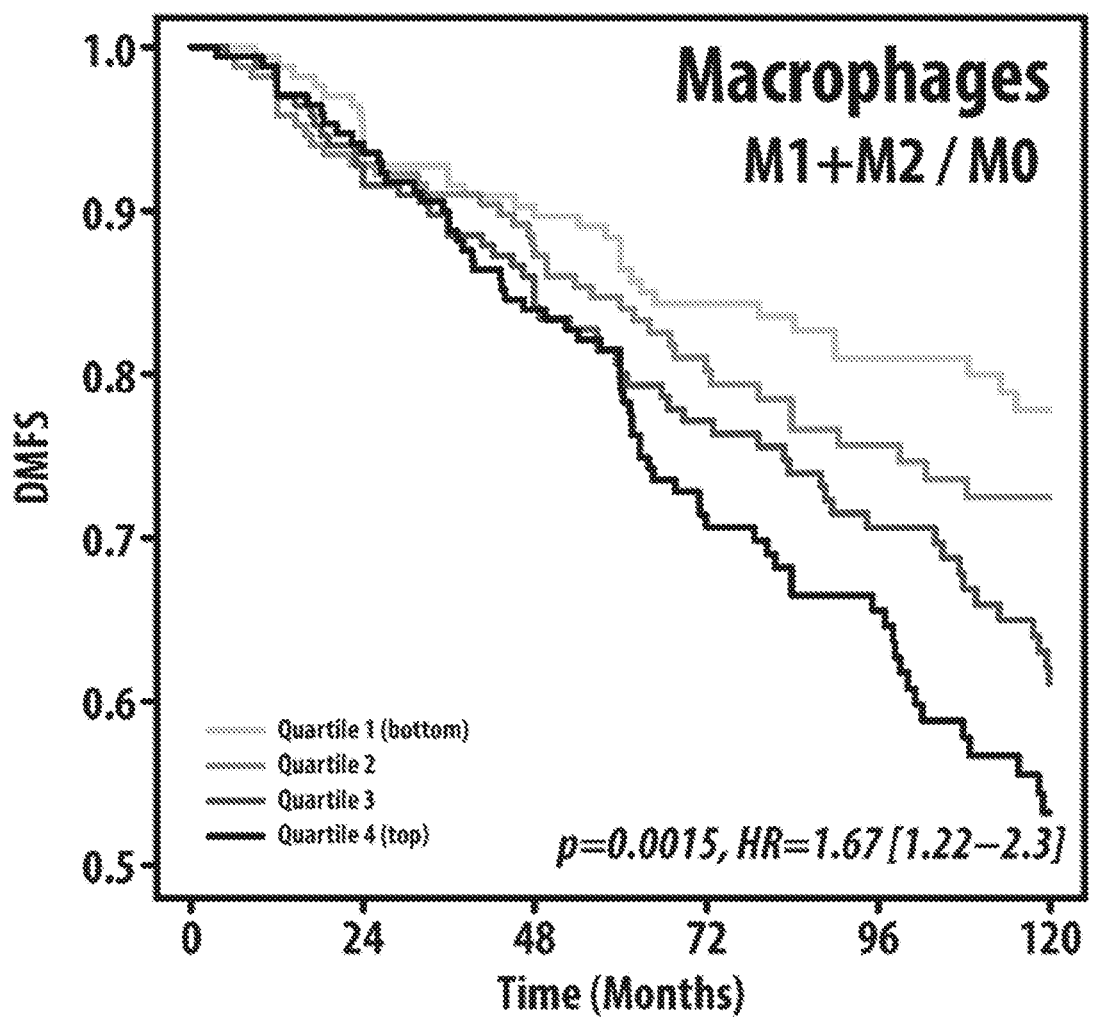
Figure 2E:
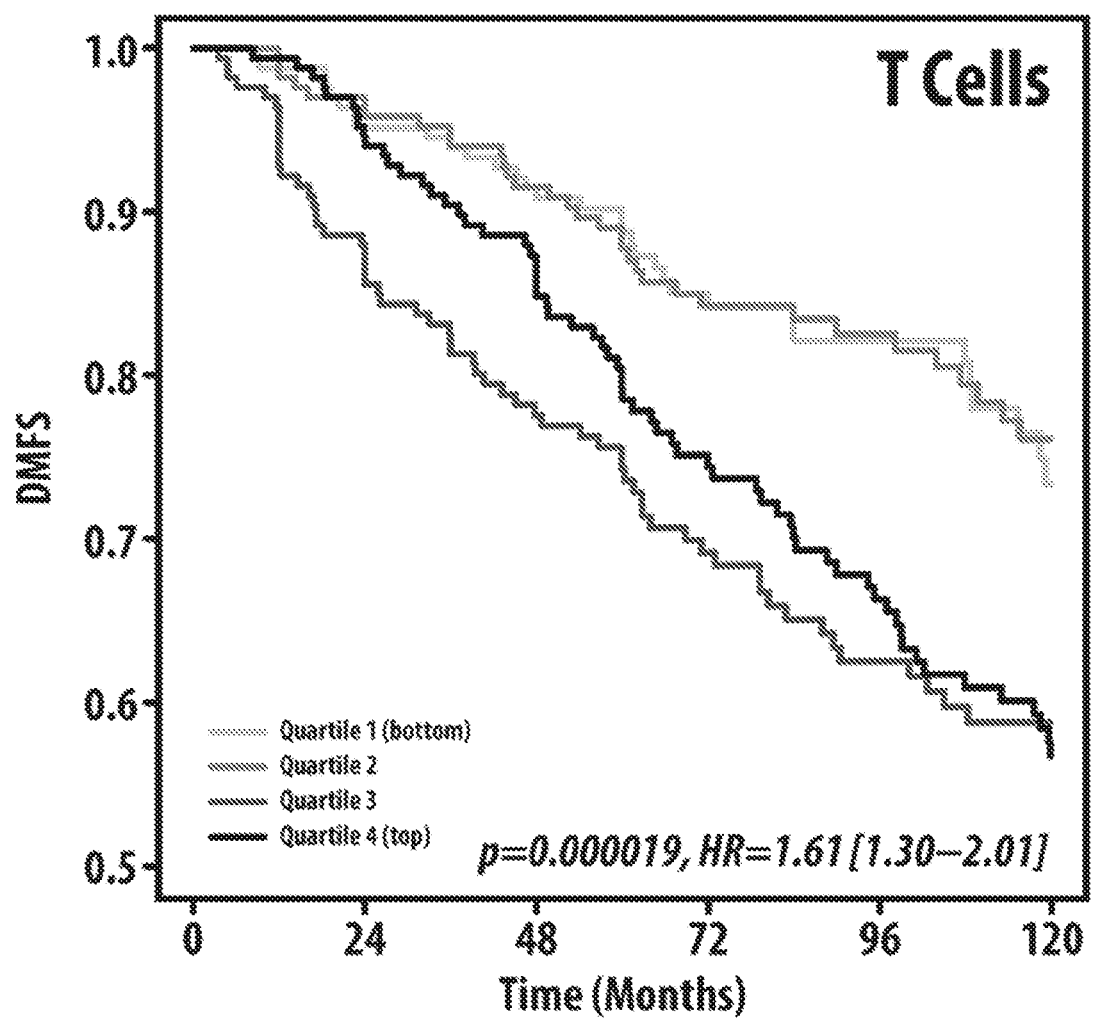
Figure 3A:
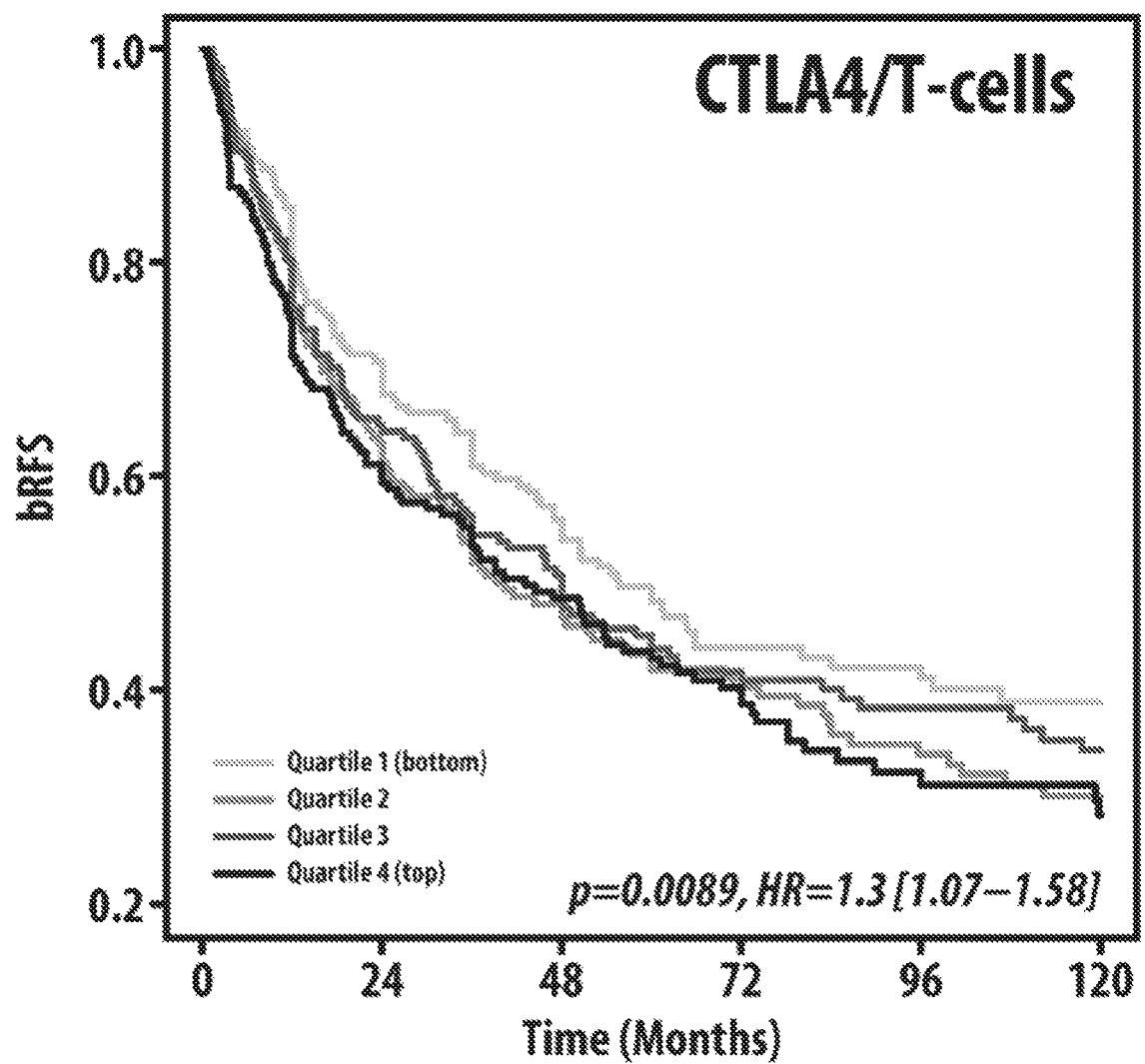
FIGS. 3A-3J show Kaplan-Meier curves showing the association of immune checkpoint molecules and clinical outcomes in 678 retrospective samples with confident de-convolution (for CTLA-4) or all 1,567 retrospective samples (for PD-1 and PD-L1). Associations of CTLA4 normalized to T-cell content with biochemical recurrence free survival (FIG. 3A), distant metastasis free survival (FIG. 3B), and prostate cancer specific survival (FIG. 3C). Associations of PD-1 normalized to immune content score (ICS) with biochemical recurrence free survival (FIG. 3D), distant metastasis free survival (FIG. 3E) and prostate cancer specific survival (FIG. 3F). Associations of PD-L2 with biochemical recurrence free survival (FIG. 3G), distant metastasis free survival (FIG. 3H), and prostate cancer specific survival (FIG. 3I). Variables are stratified as quartiles for the plots, and p-values are calculated using Cox regression on a continuous variable to illustrate a dose-response.
Figure 3B:
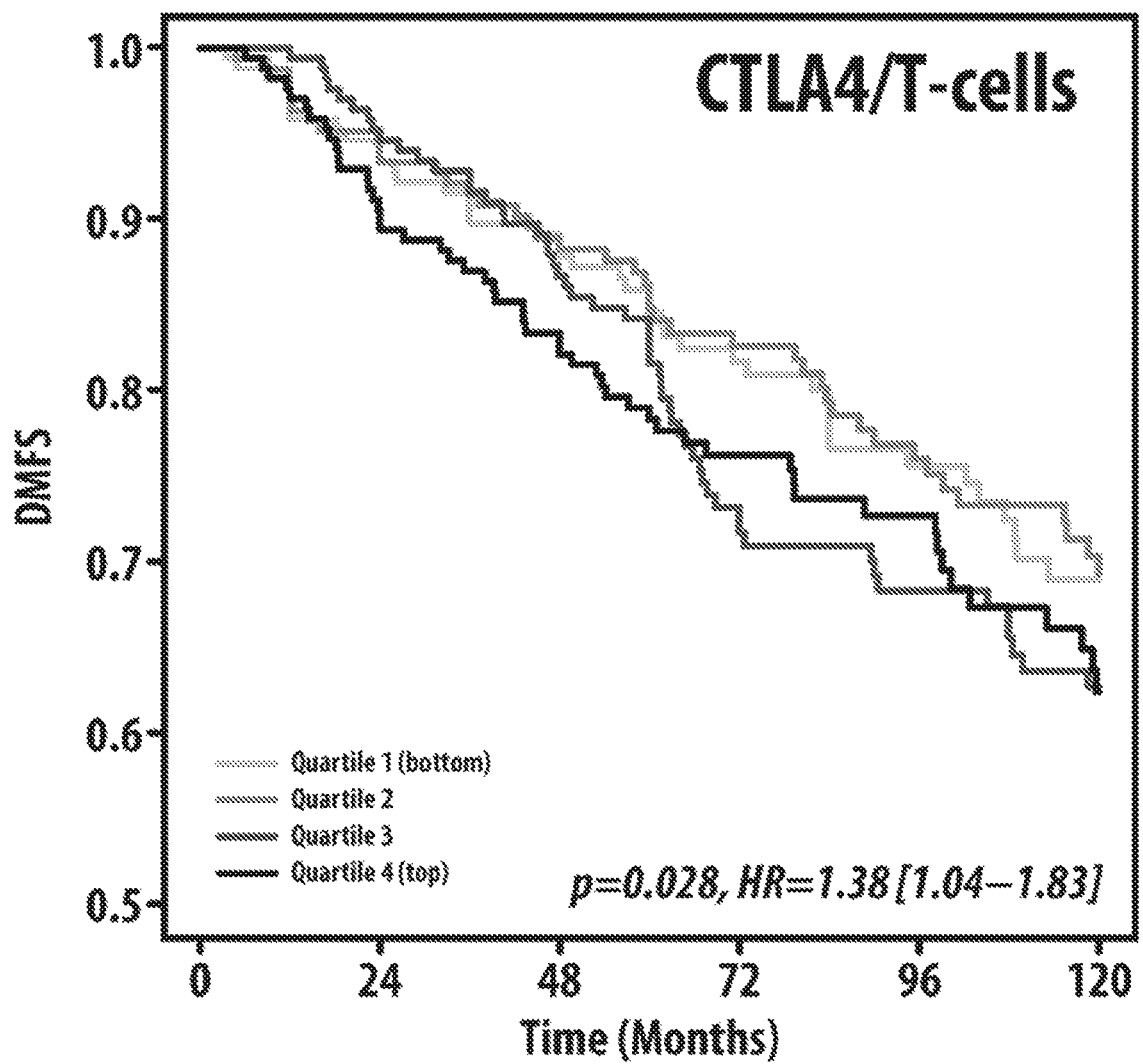
Figure 3C:
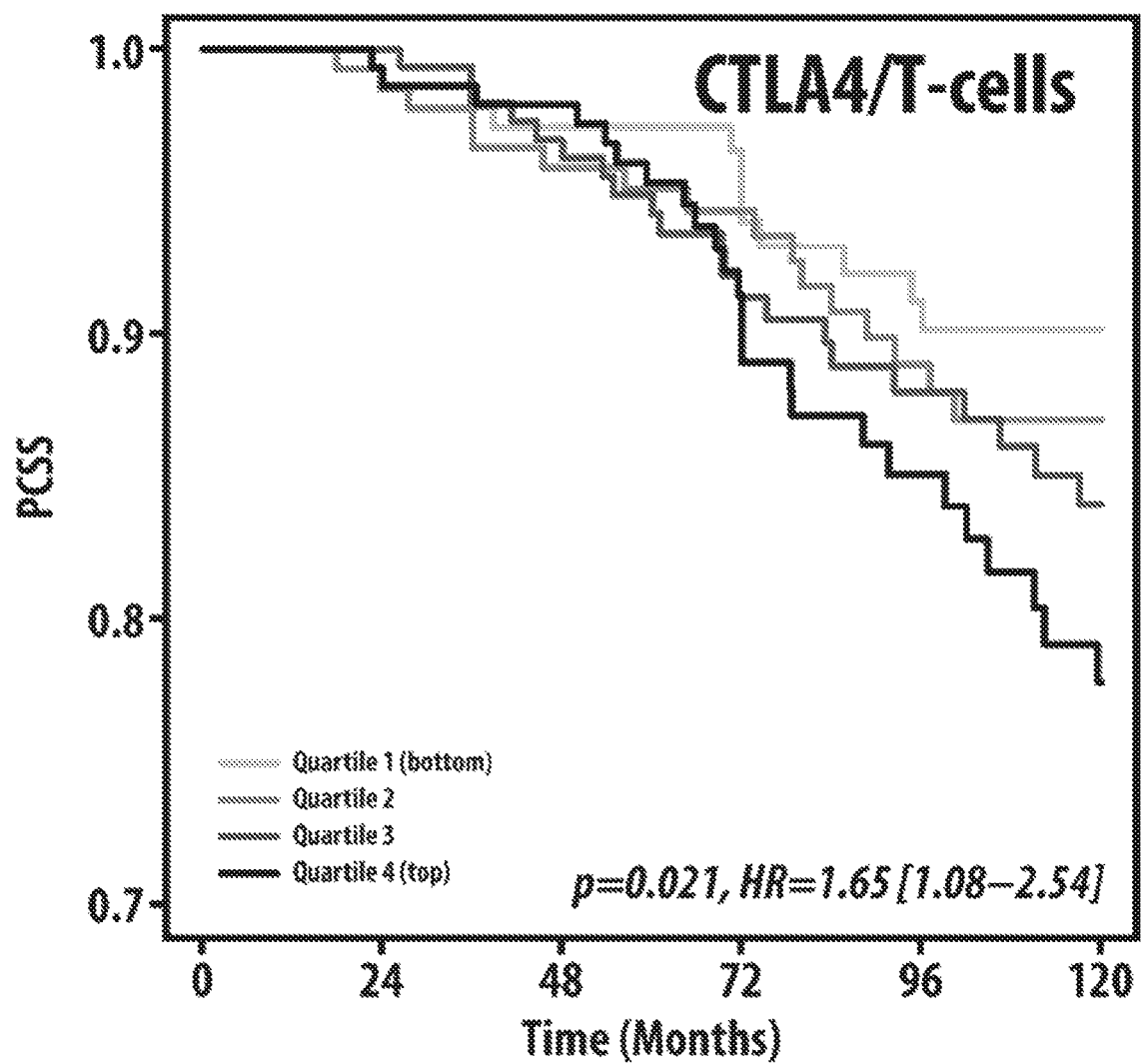
Figure 3D:
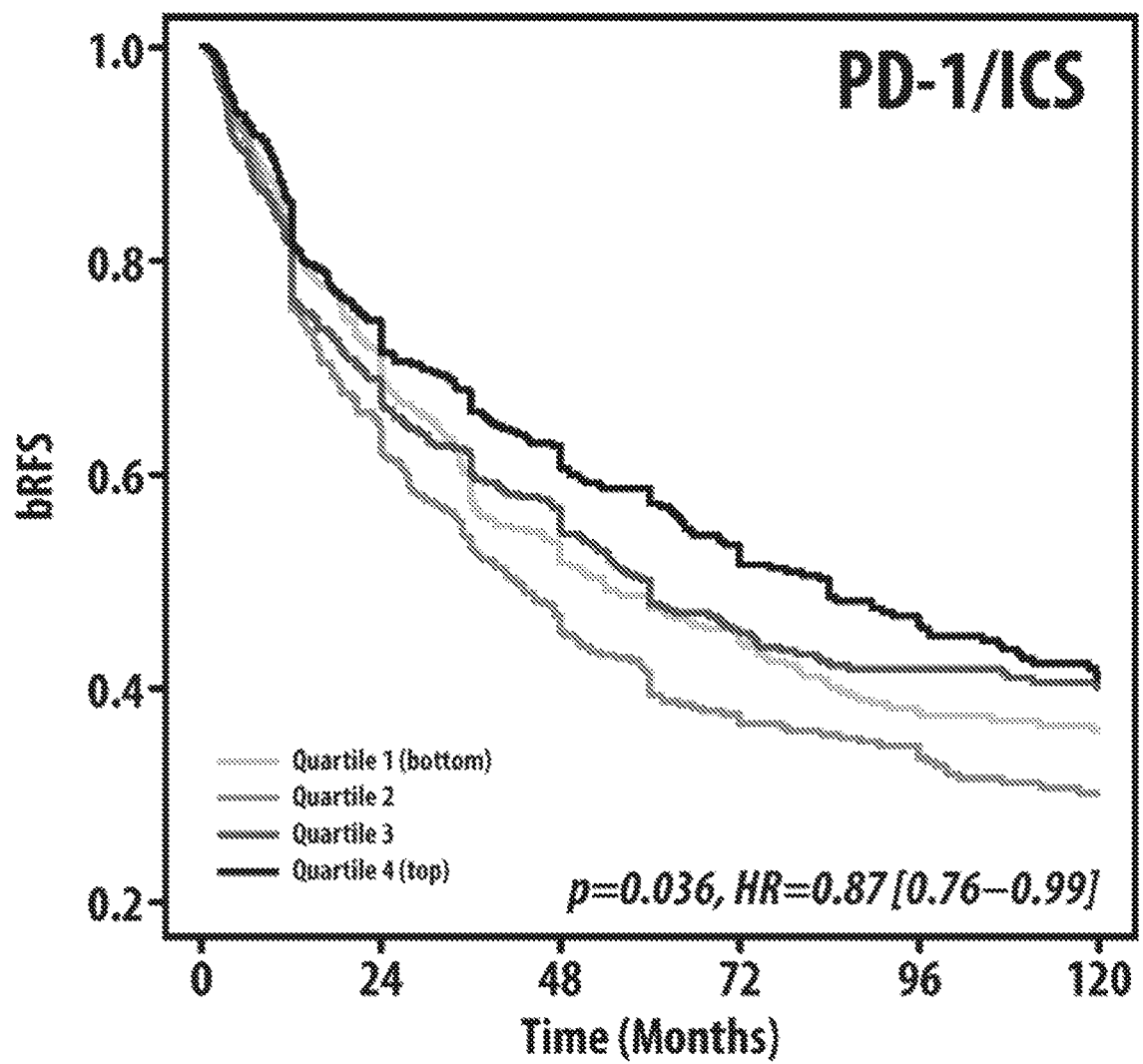
Figure 3E:
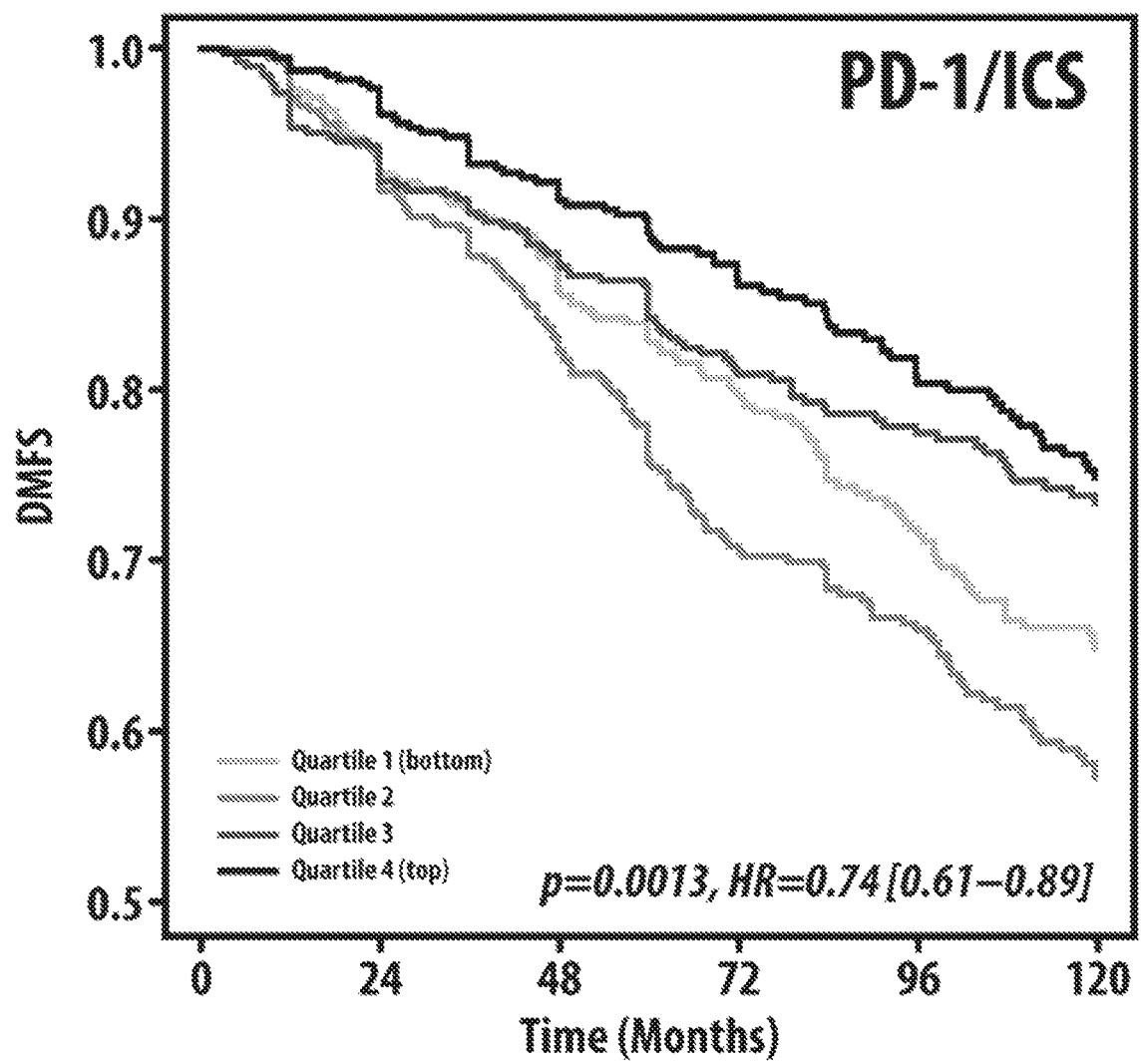
Figure 3F:
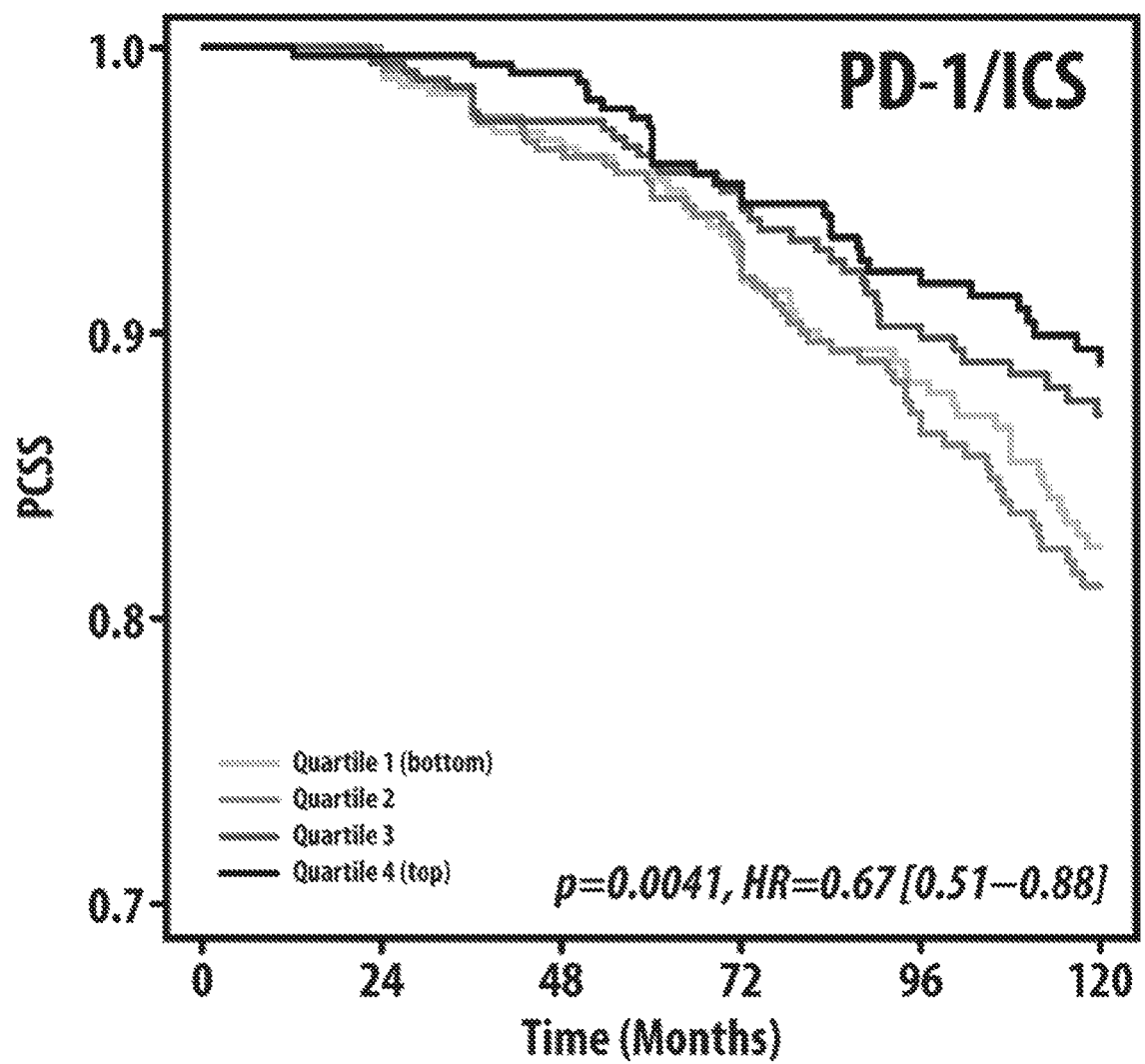
Figure 3G:
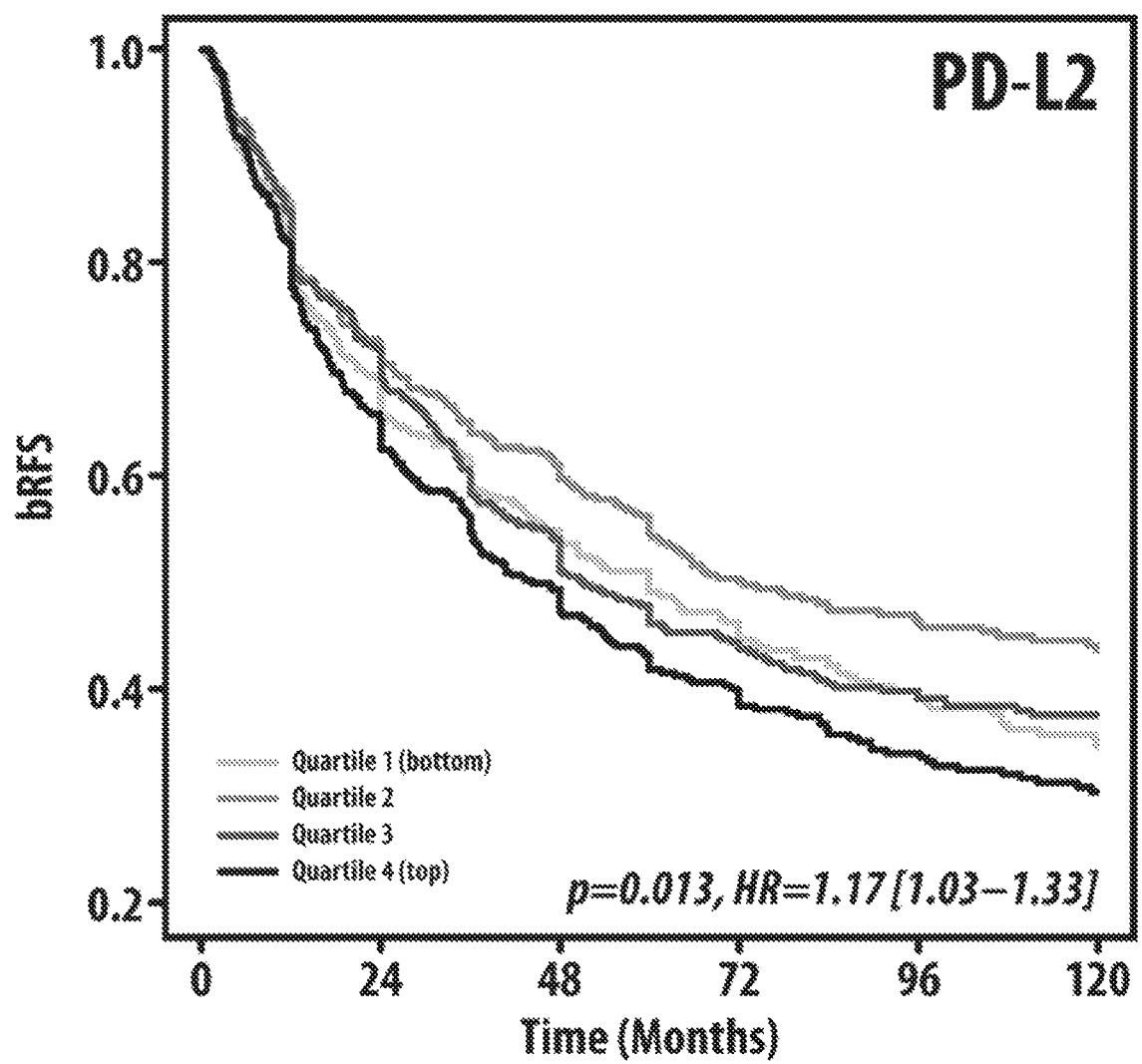
Figure 3H:
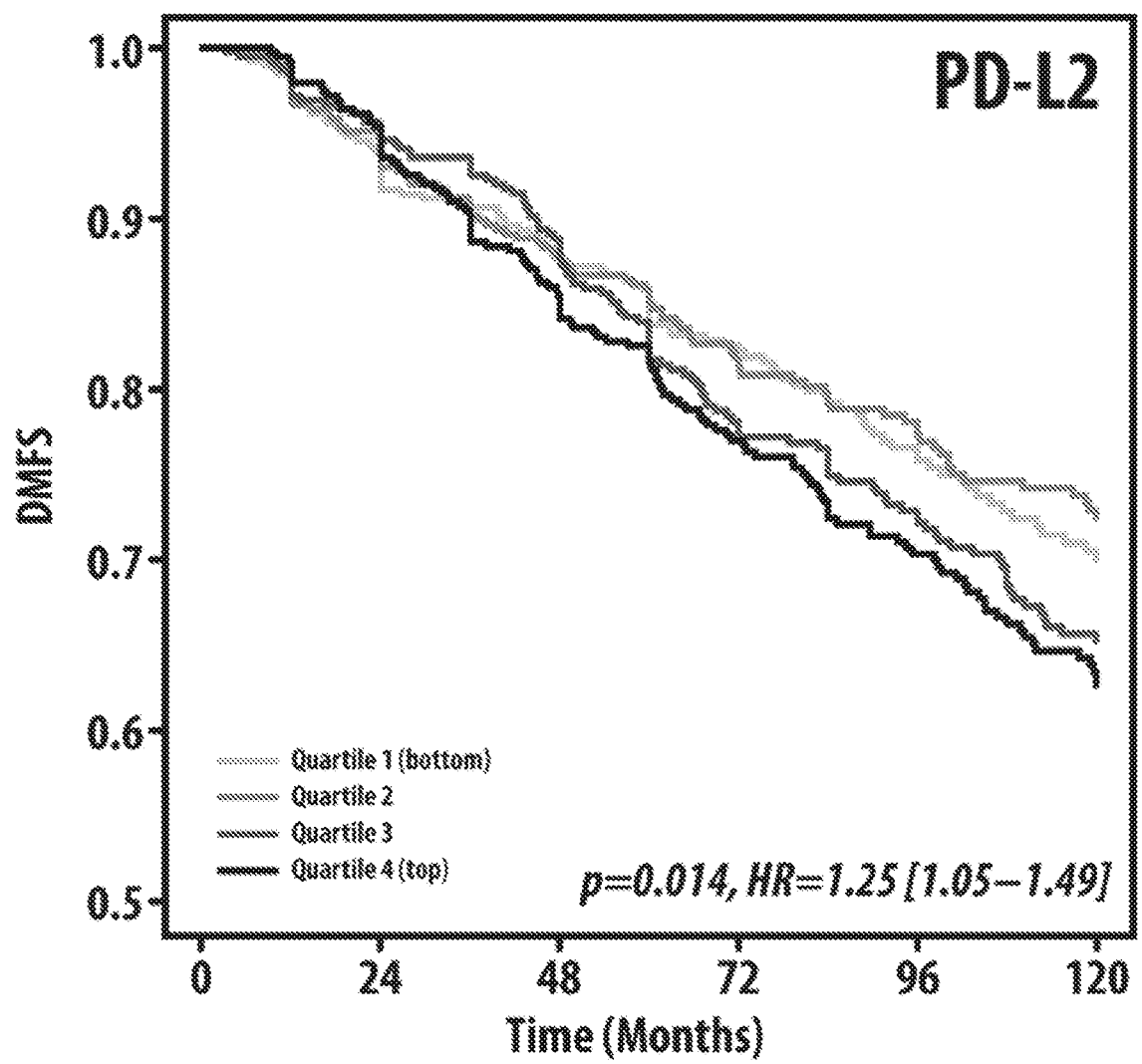
Figure 3I:
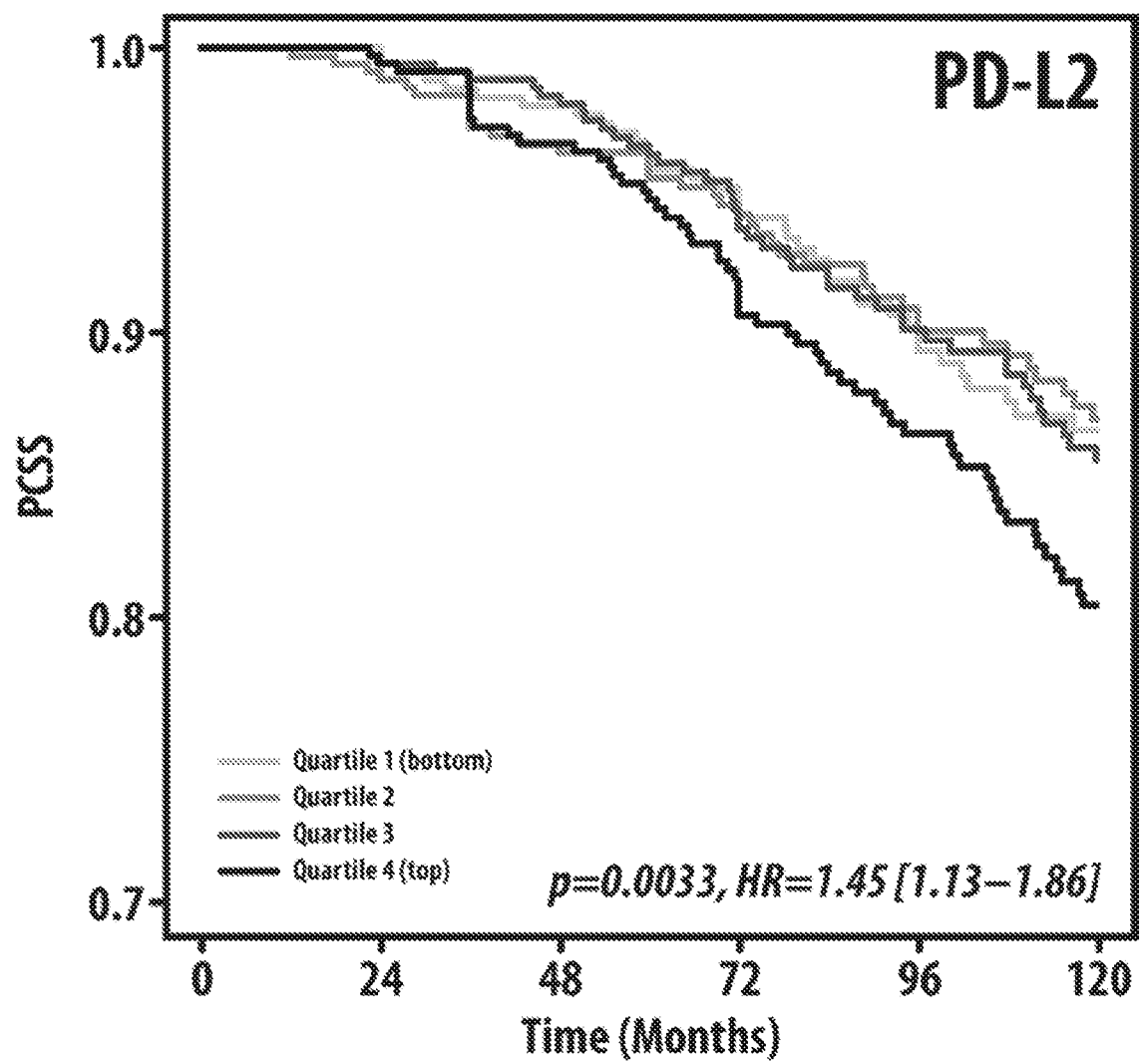
Figure 3J:
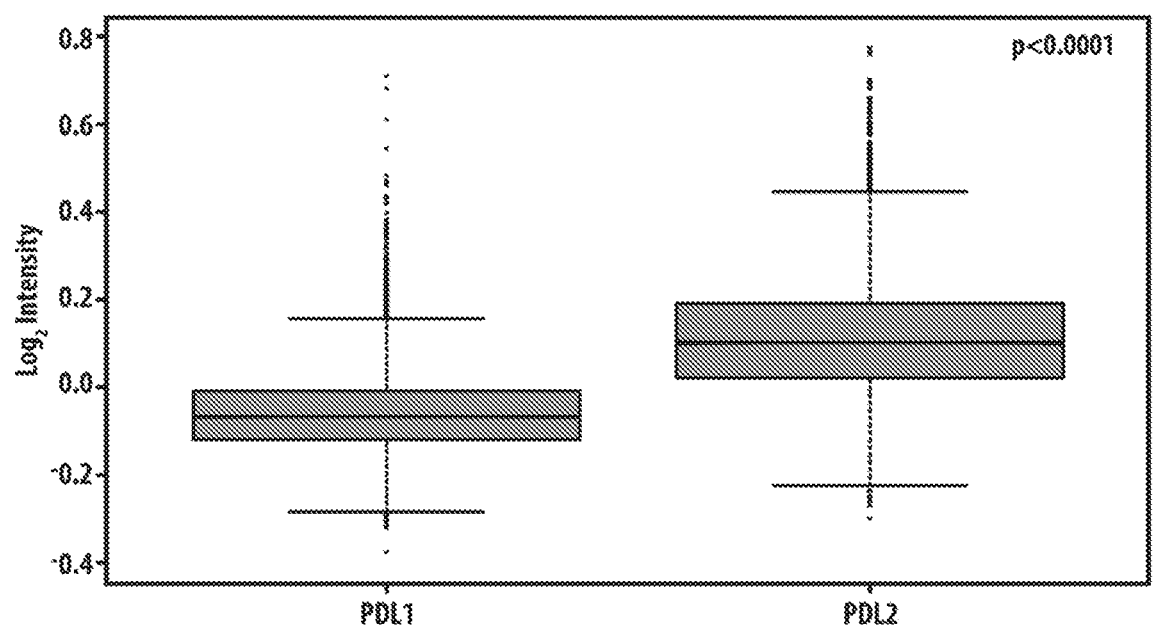
Figure 4A:
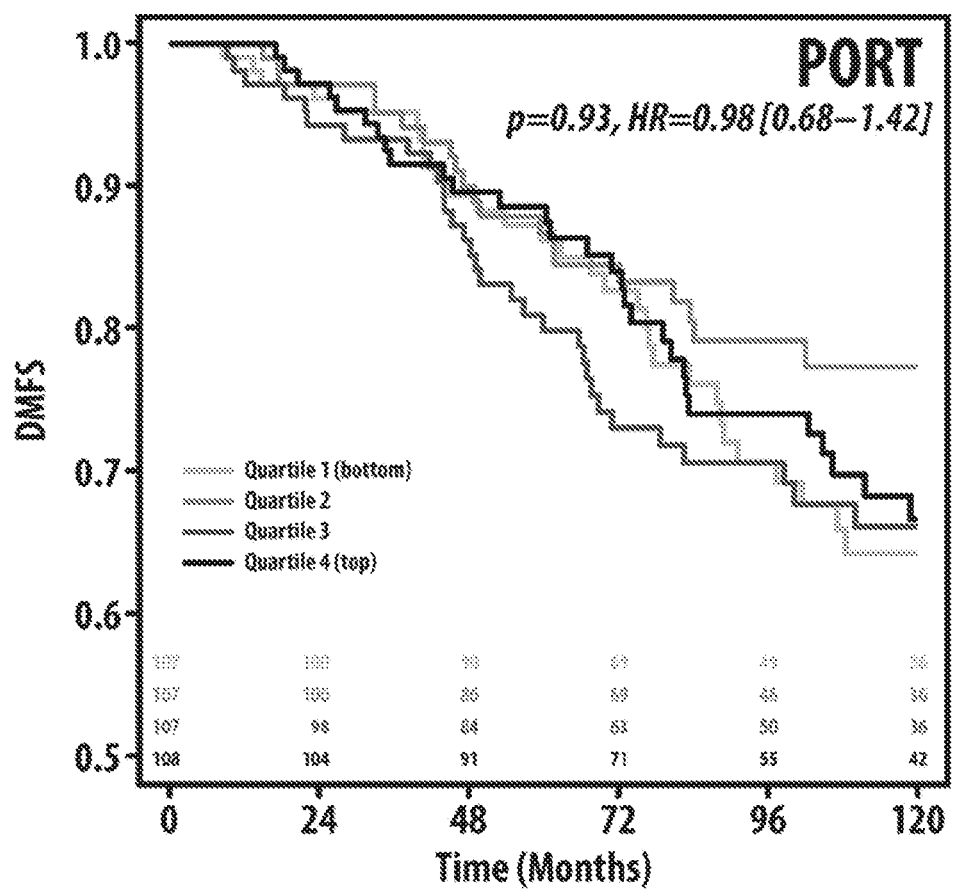
FIGS. 4A and 4B show Kaplan-Meier curves showing the interaction between PD-L2 and DMFS in 1,002 retrospective samples stratified by patients treated with PORT (FIG. 4A) or not (FIG. 4B). Variables are stratified as quartiles for the plots, and p-values are calculated using Cox regression on a continuous variable. PD-L2 is prognostic only in patients who did not receive PORT, suggesting that high PD-L2 patients may benefit more from PORT as they have worse outcomes to the low PD-L2 patients without PORT, but similar outcomes with PORT.
Figure 4B:
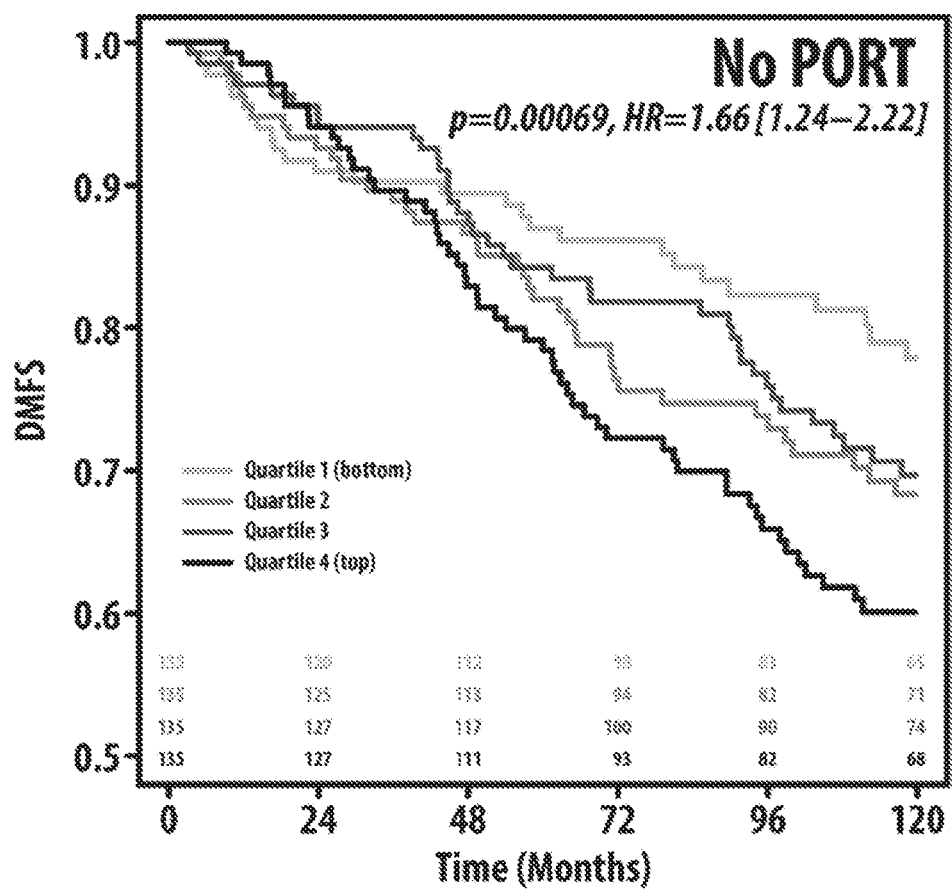
Figure 5A:
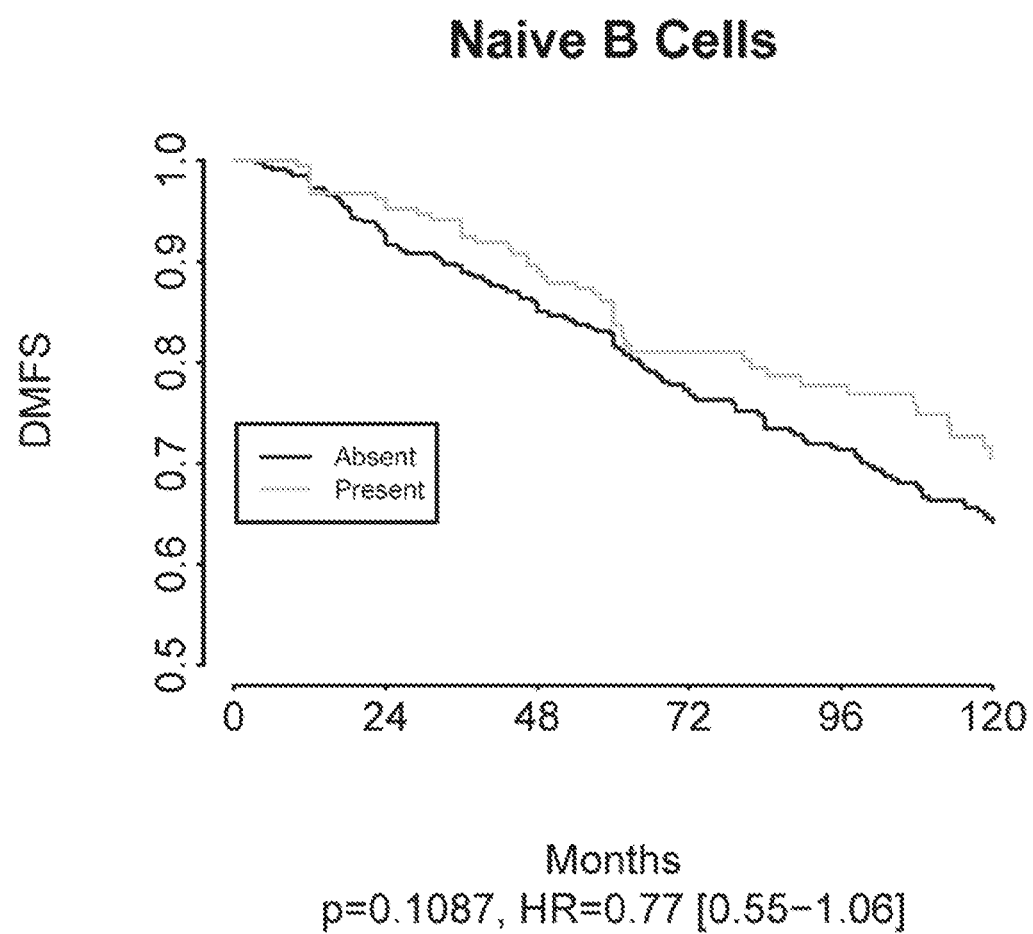
FIGS. 5A-5V show Kaplan-Meier curves showing the association of individual immune cell types predicted by Cibersort and clinical outcomes in 678 (out of an original 1,567) retrospective samples with confident de-convolution ($p \leq 0.1$).
Figure 5B:
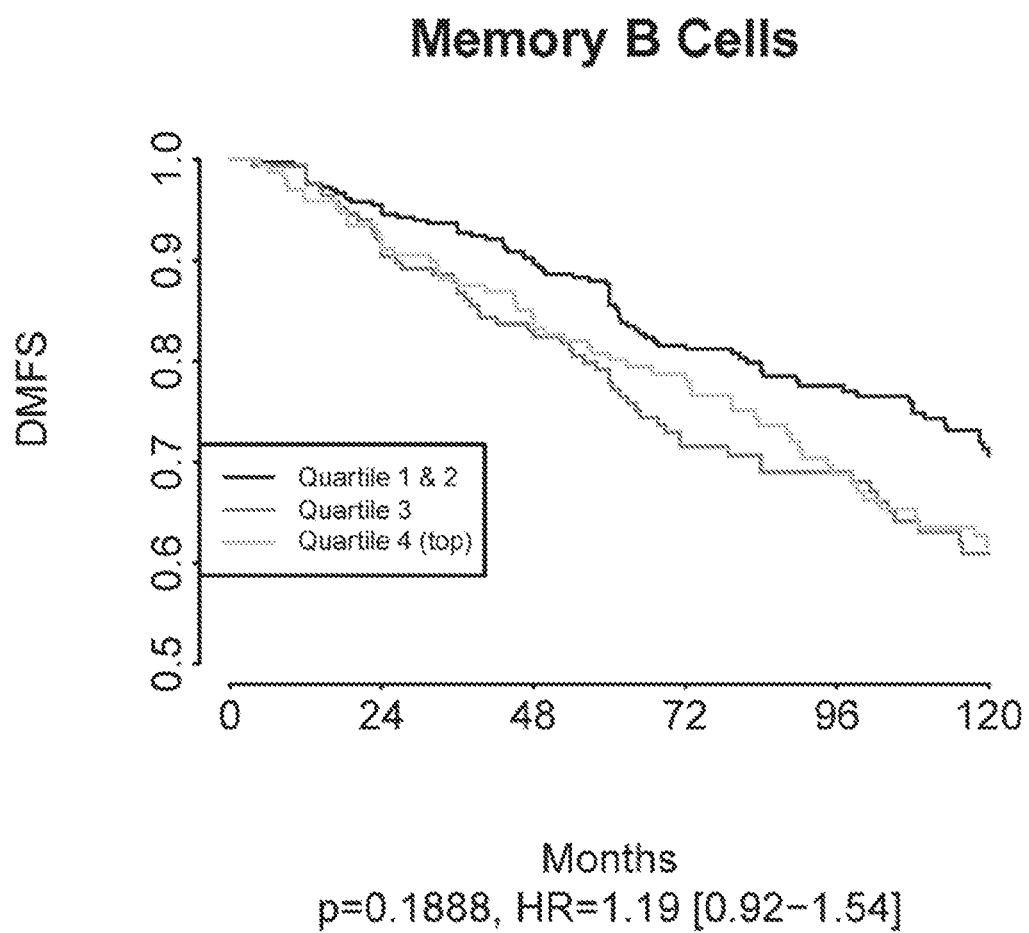
Figure 5C:
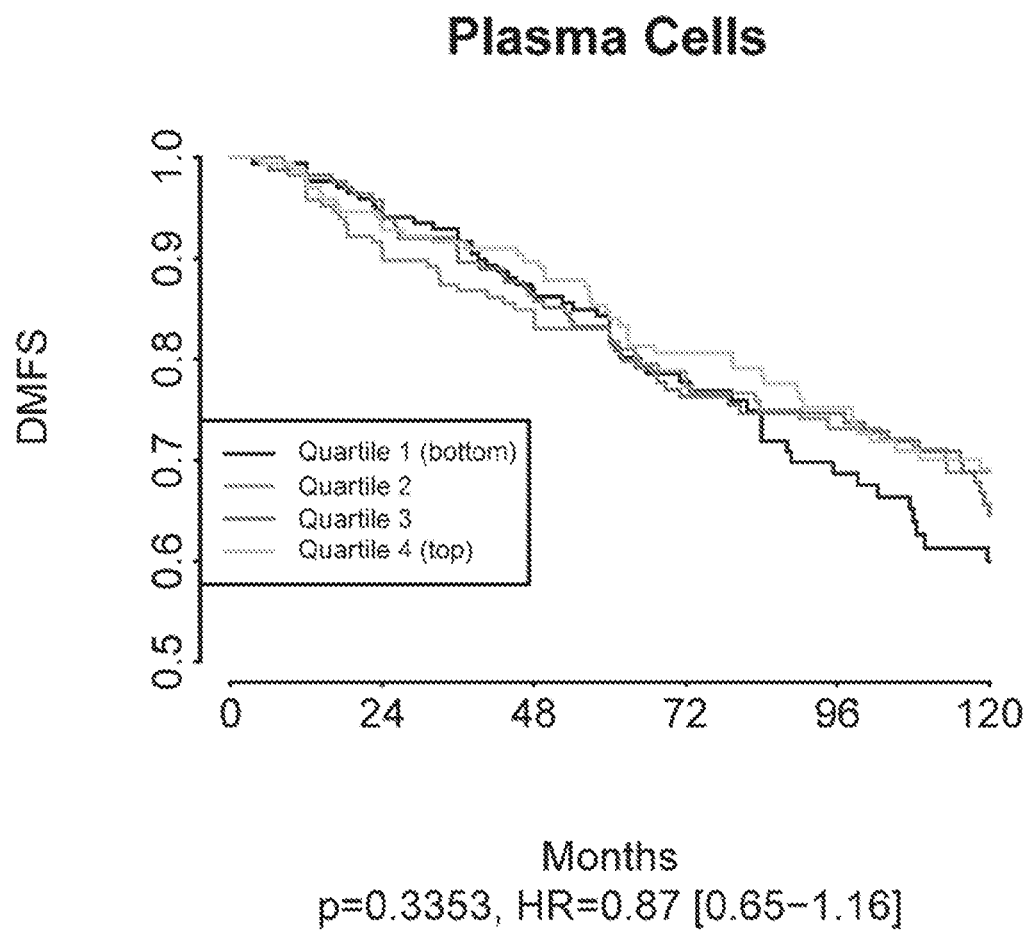
Figure 5D:
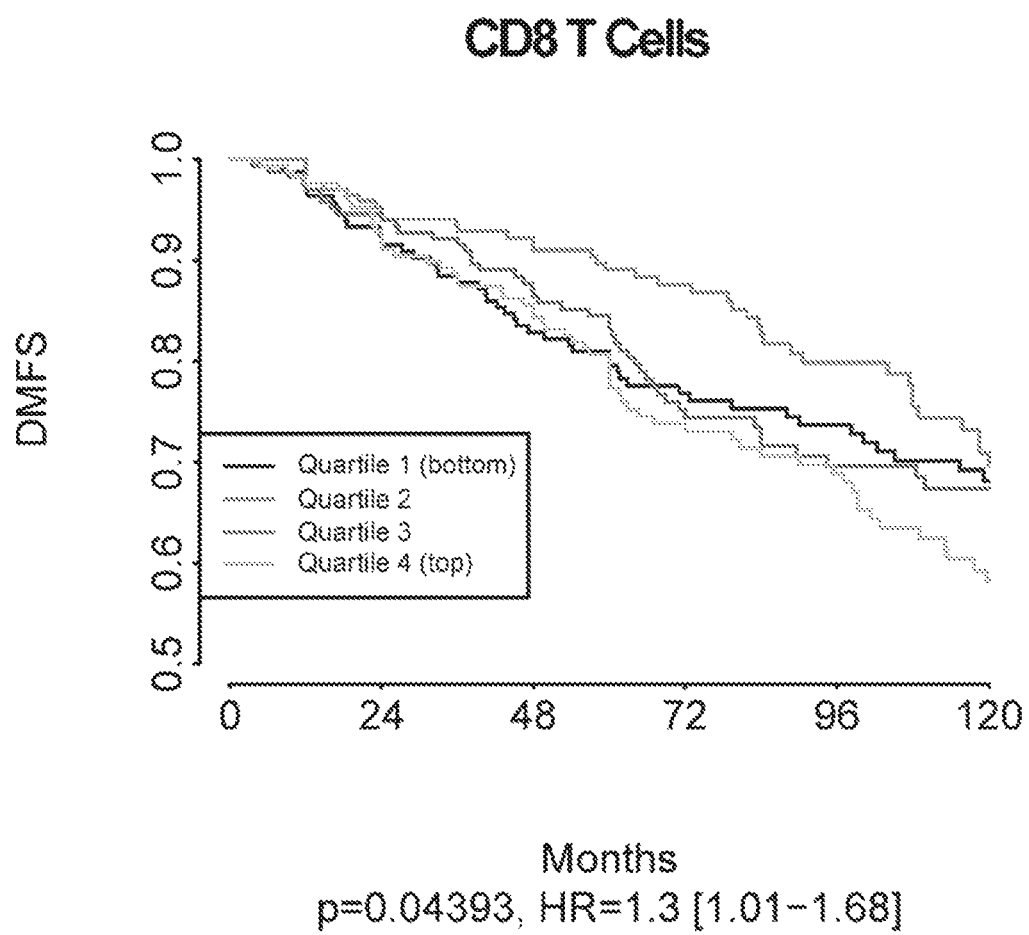
Figure 5E:
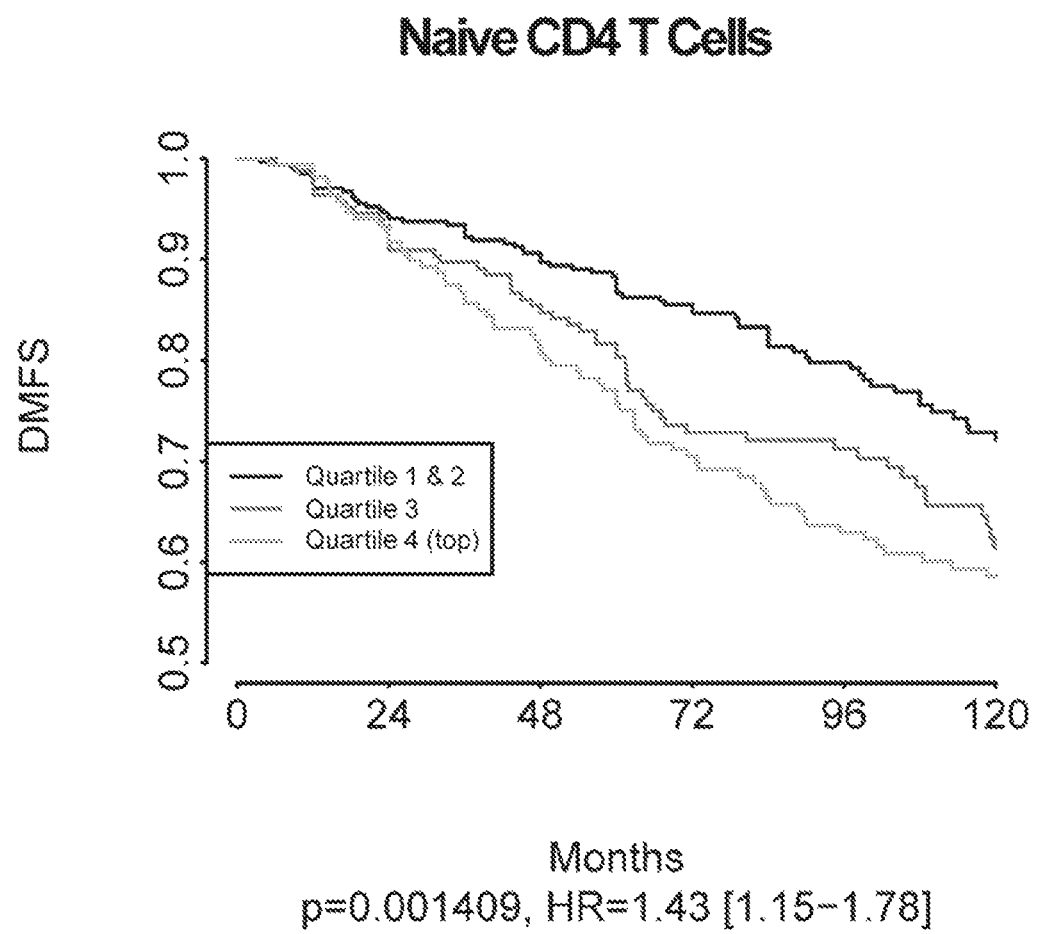
Figure 5F:
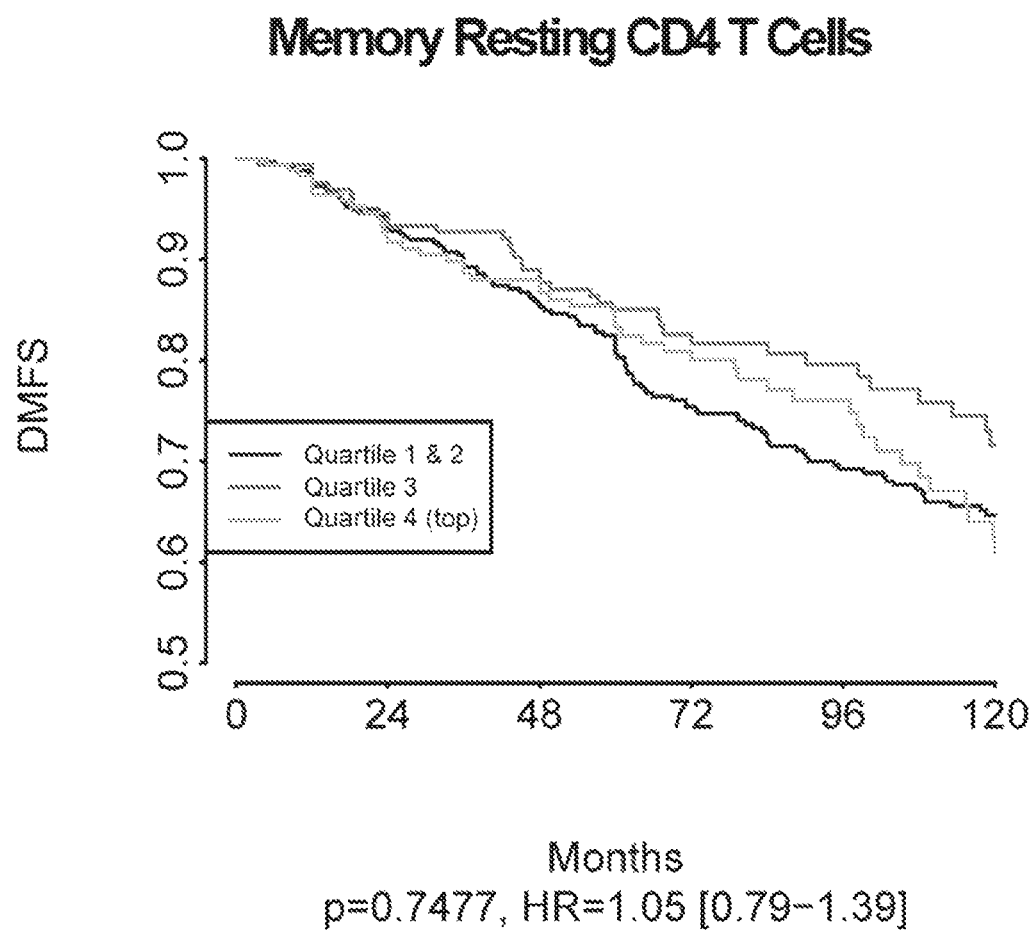
Figure 5G:
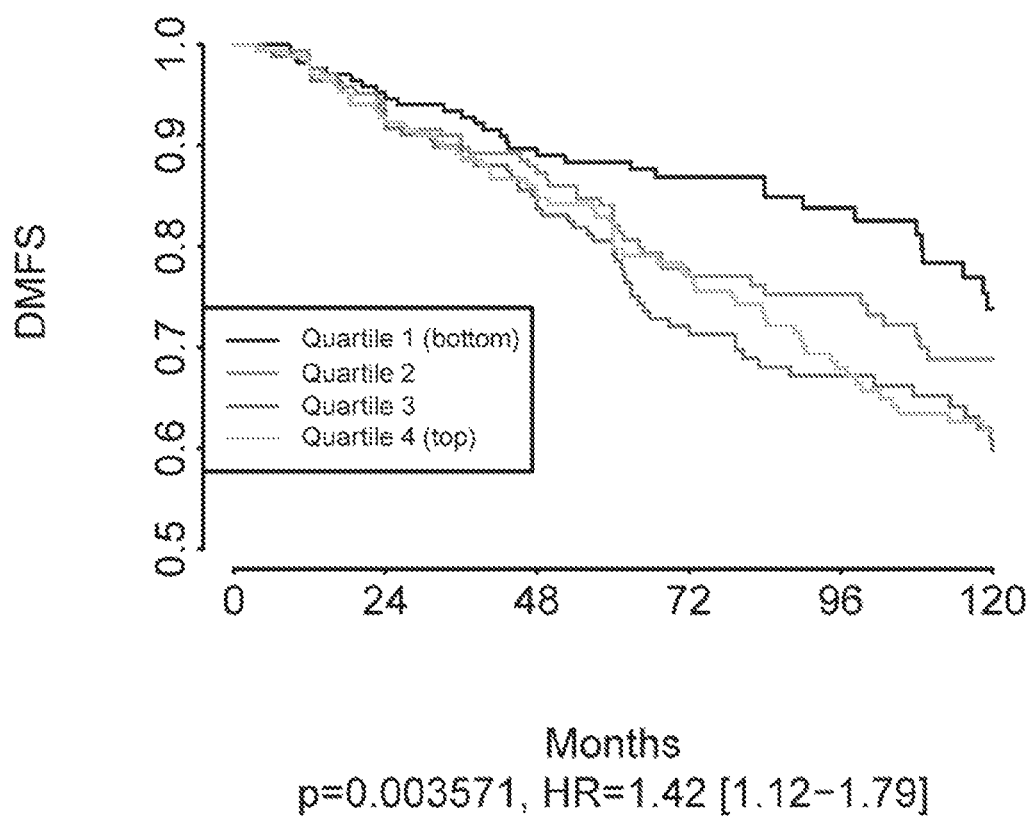
Figure 5H:
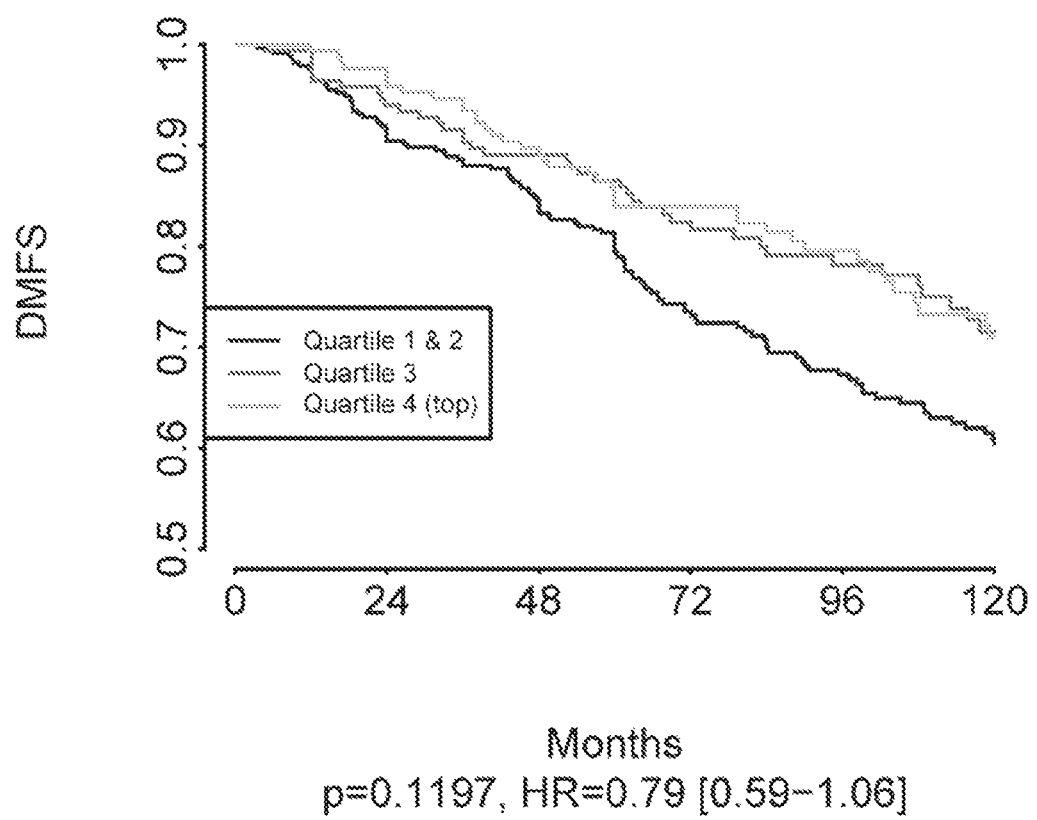
Figure 5I:
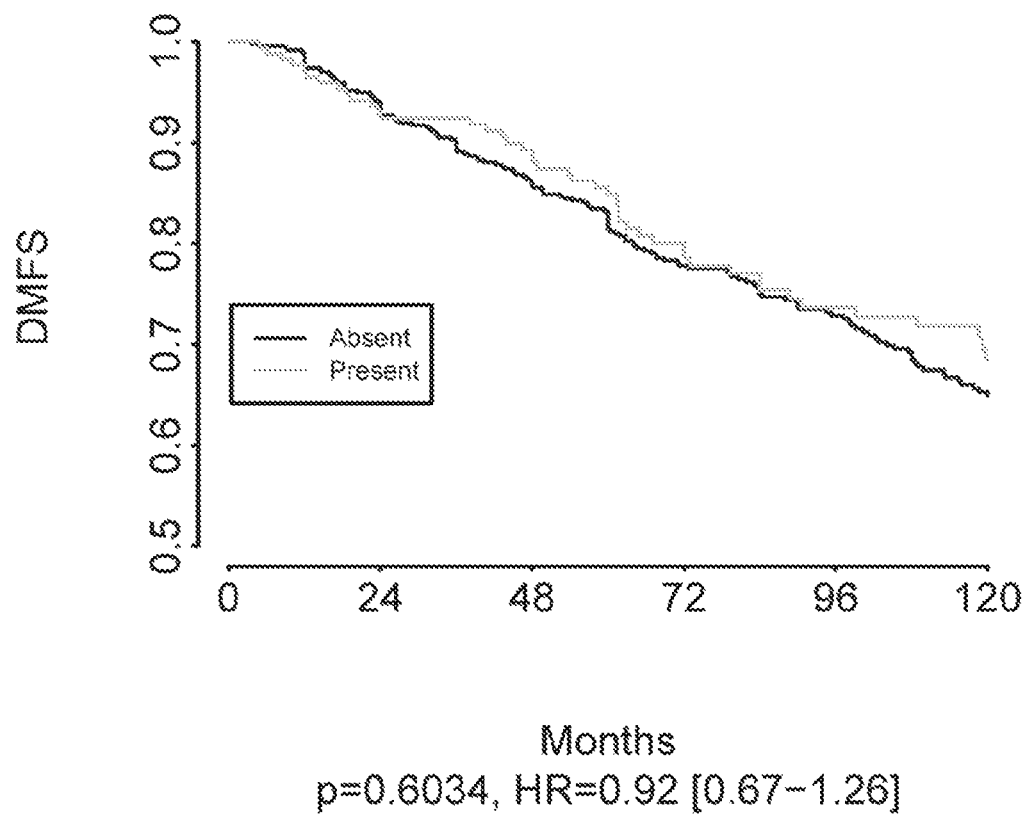
Figure 5J:
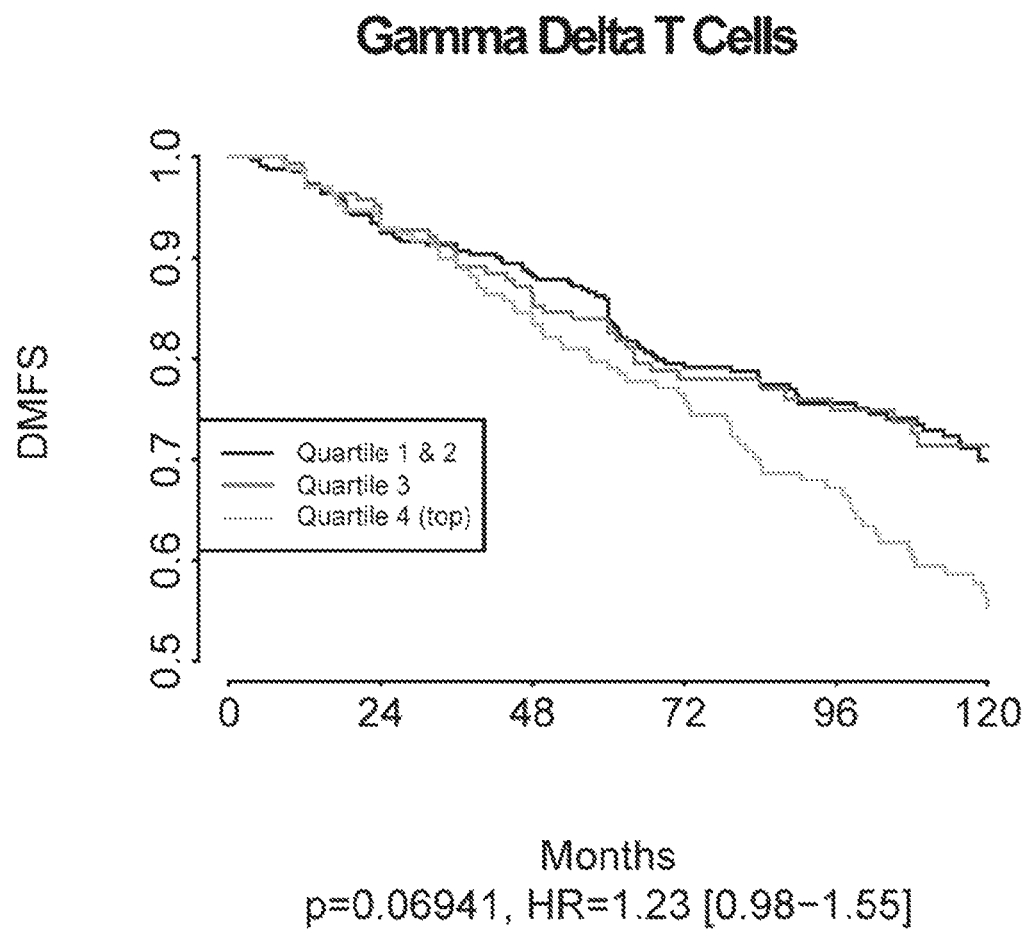
Figure 5K:
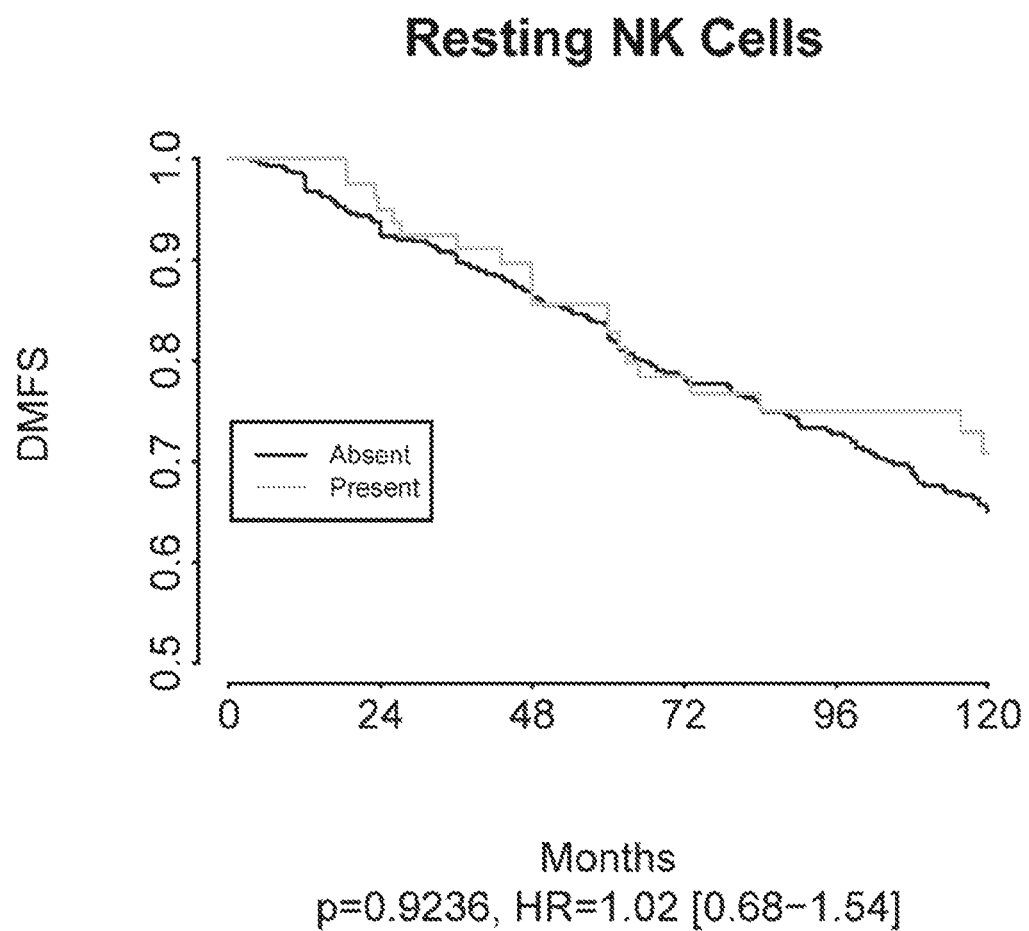
Figure 5L:
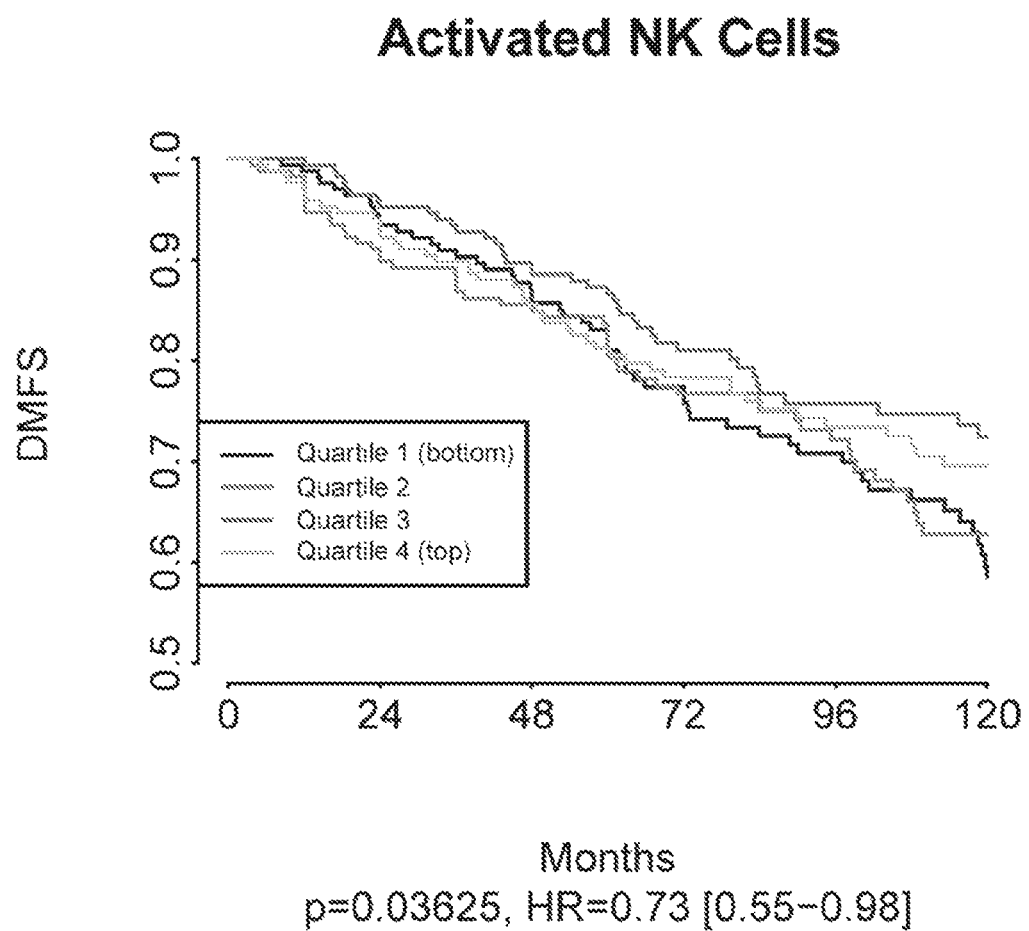
Figure 5M:
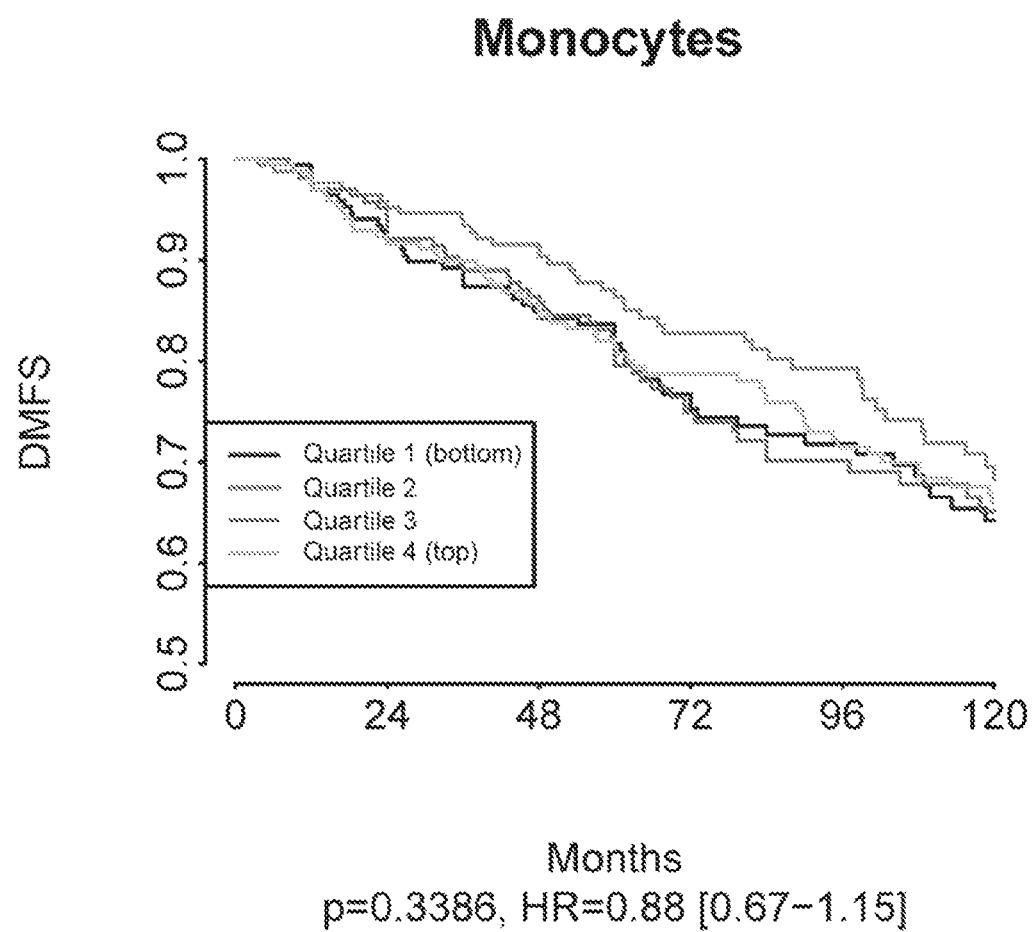
Figure 5N:
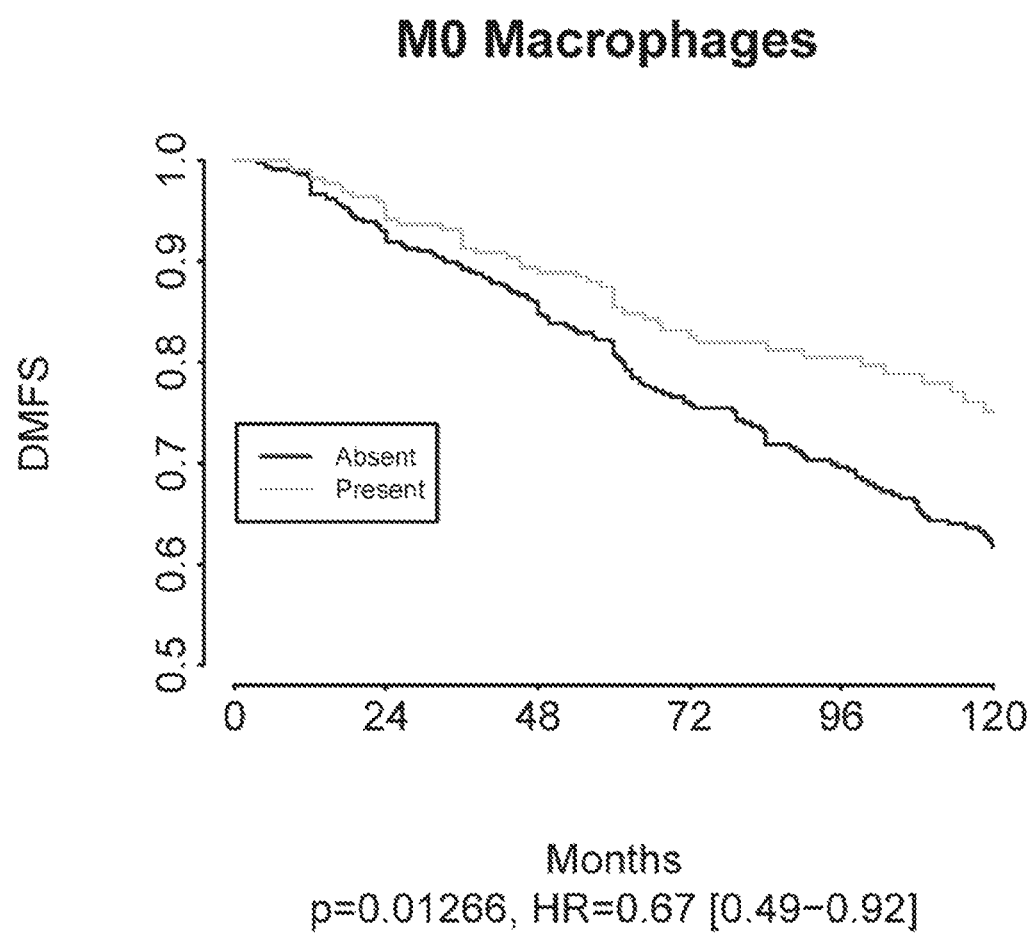
Figure 5O:
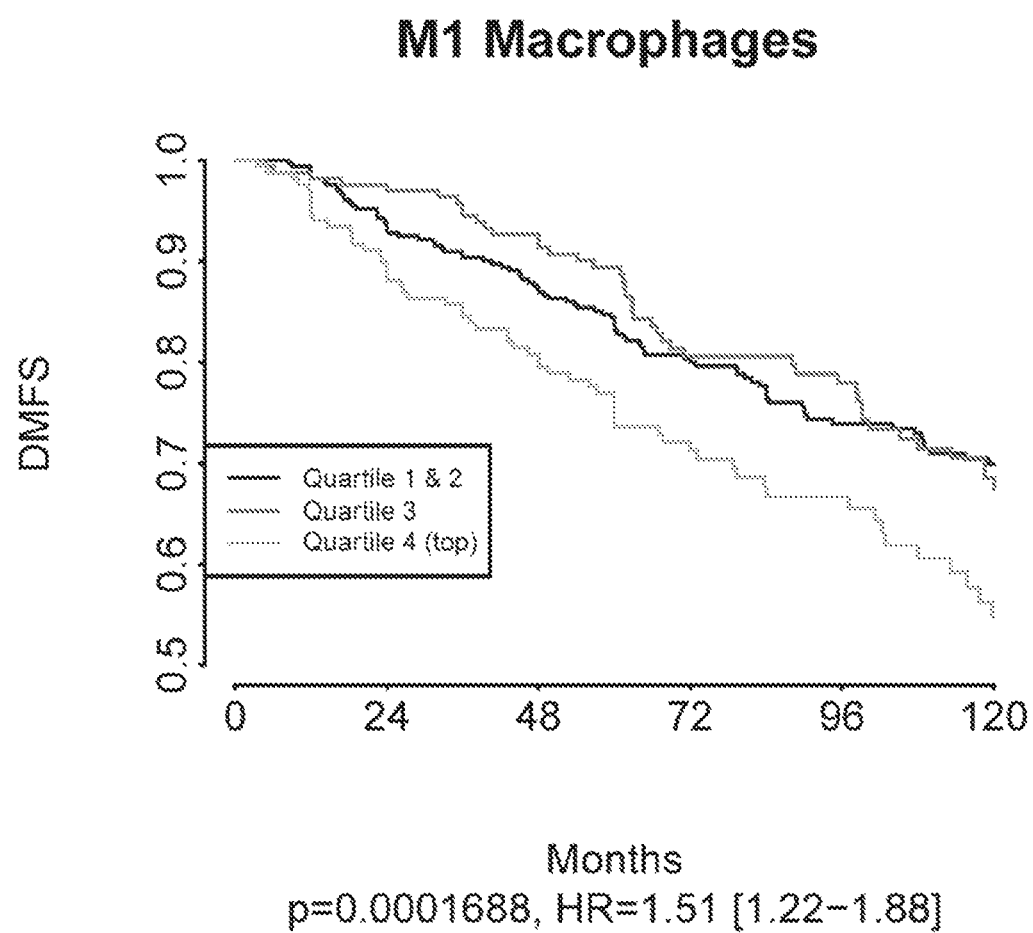
Figure 5P:
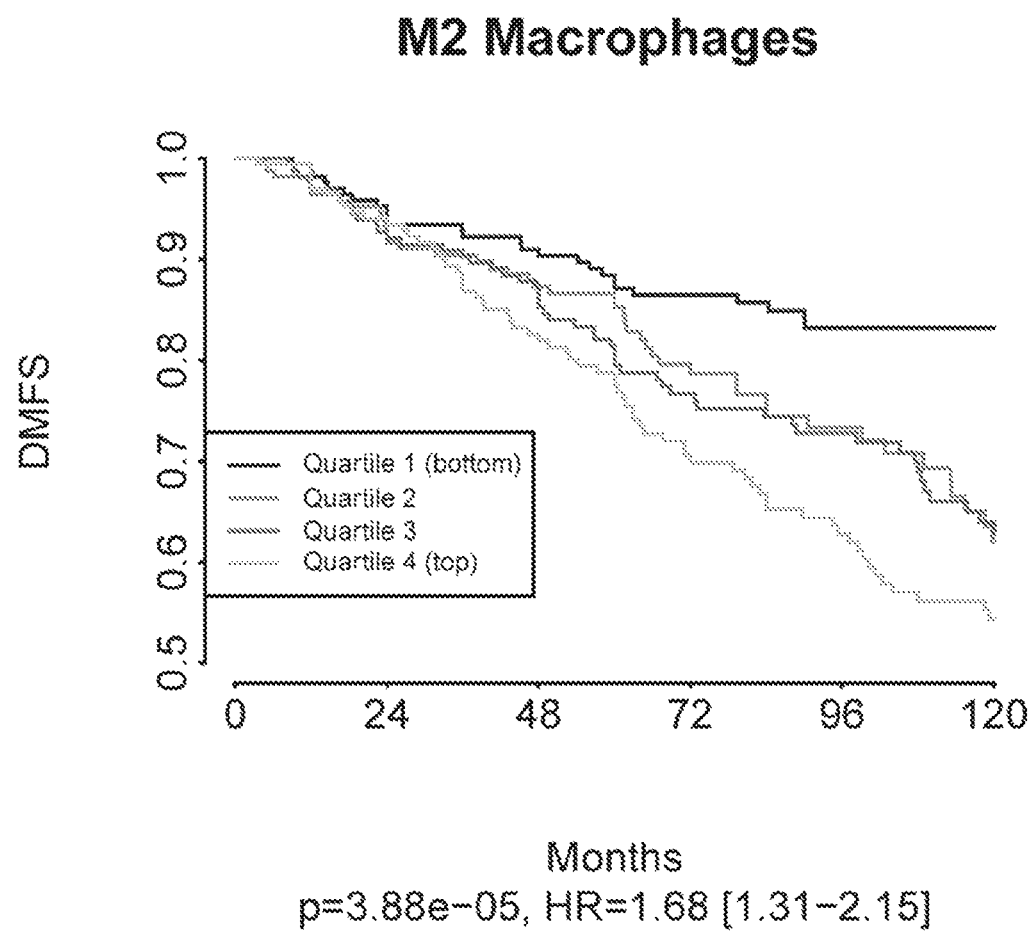
Figure 5Q:
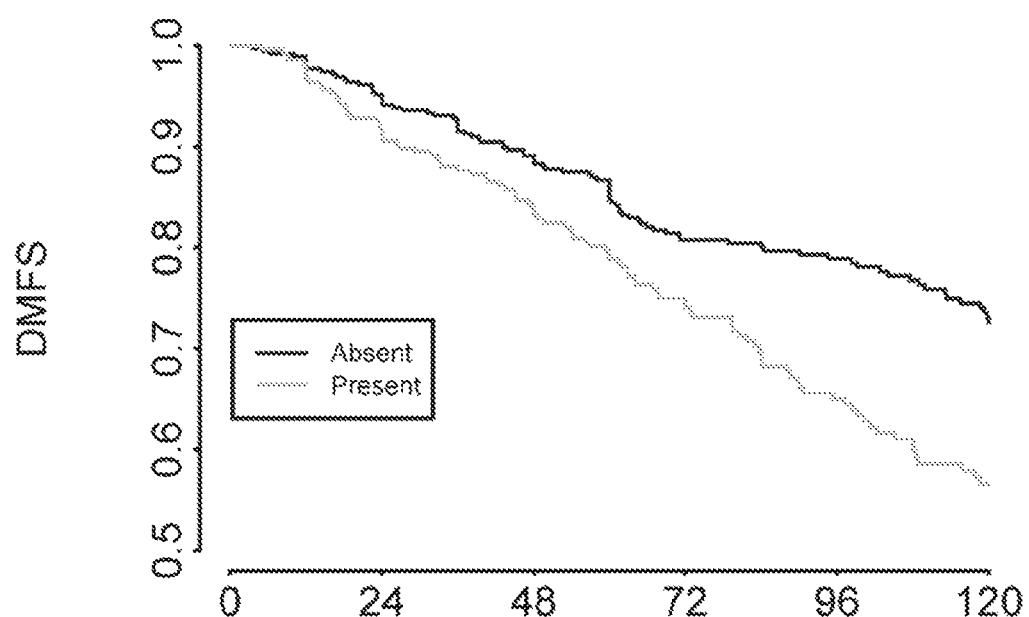
Figure 5R:
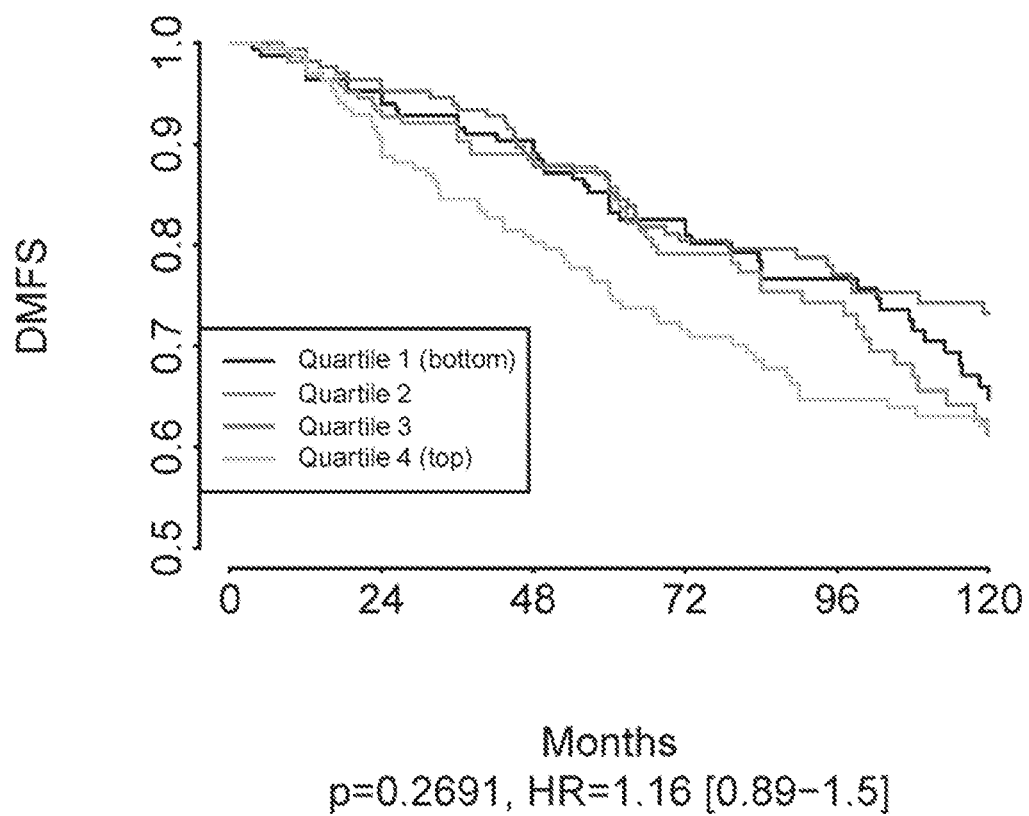
Figure 5S:
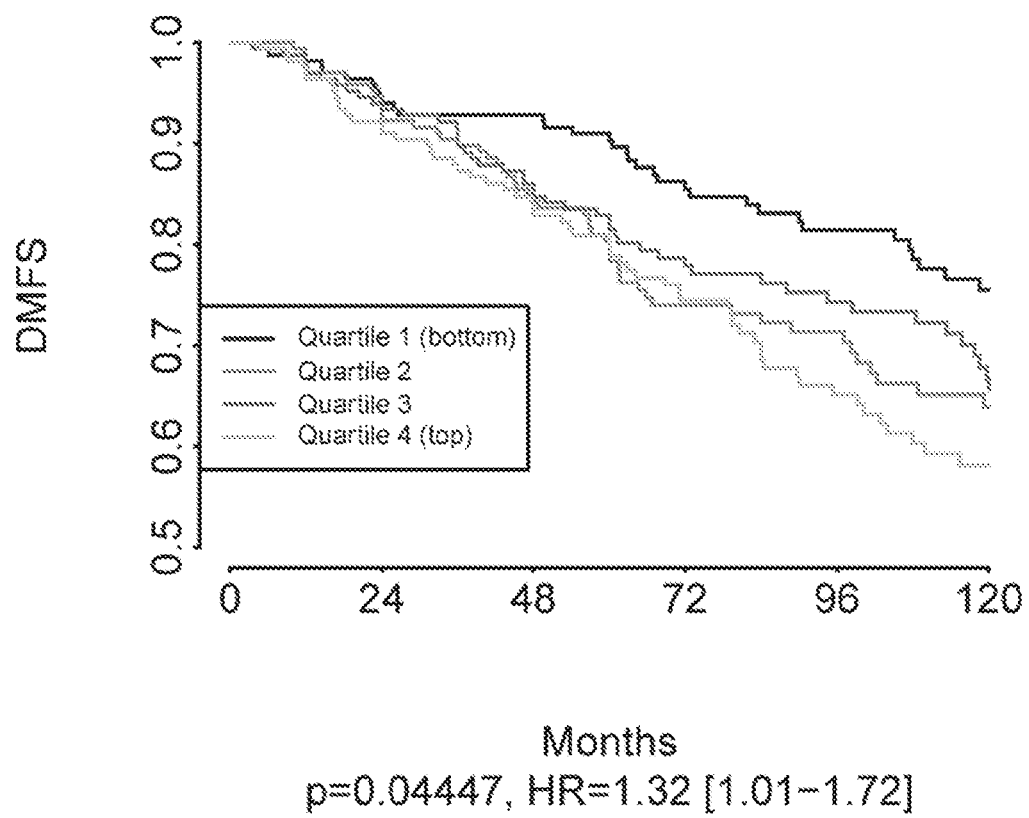
Figure 5T:
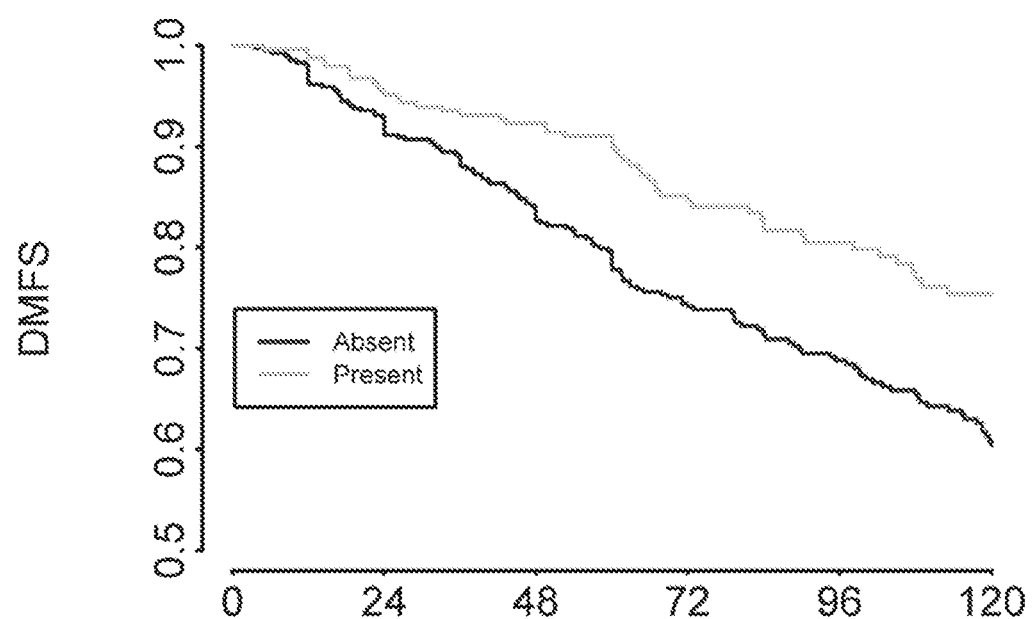
Figure 5U:
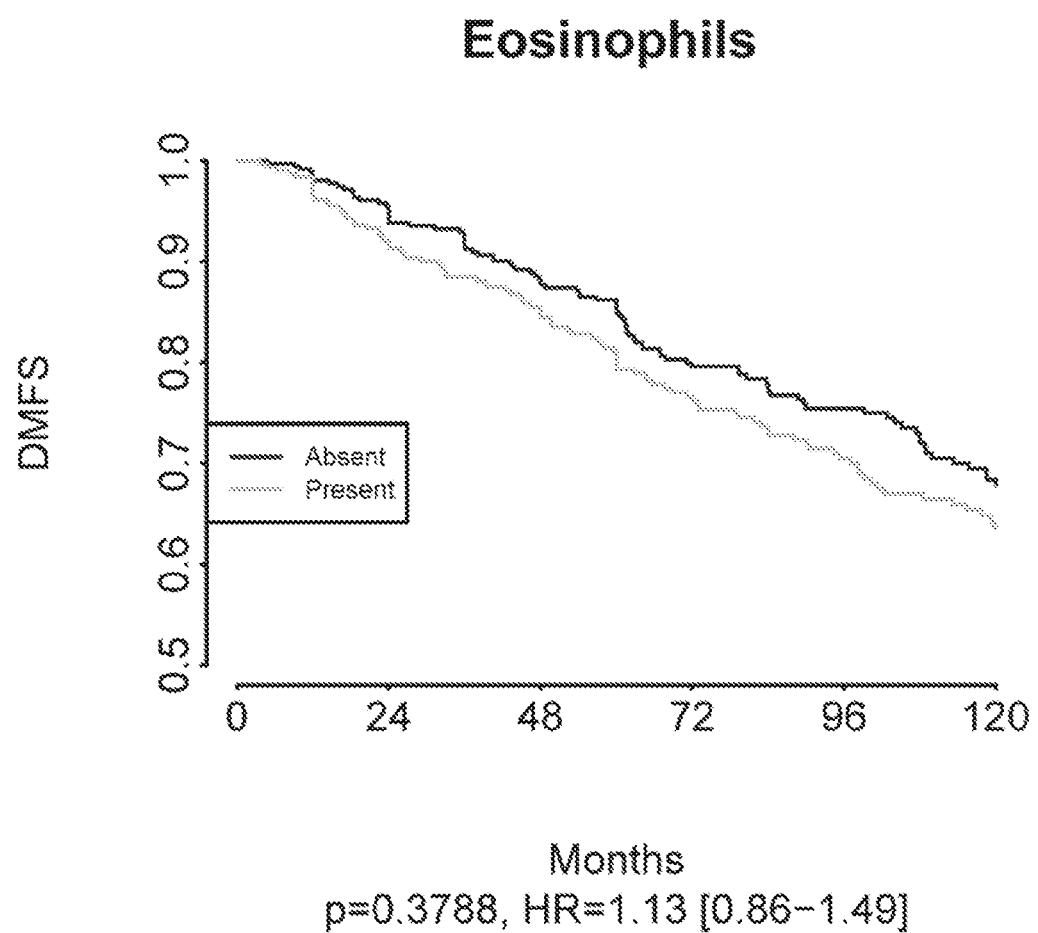
Figure 5V:
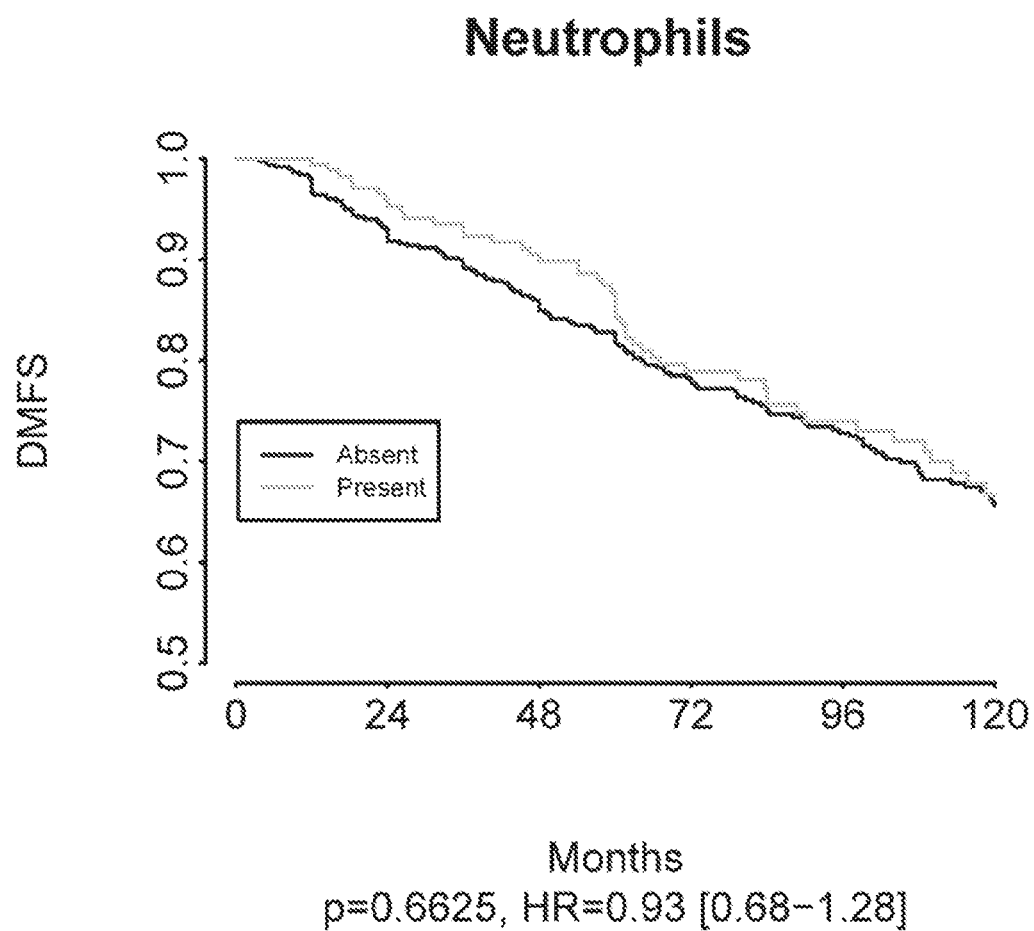

The present disclosure includes systems and methods for diagnosing, predicting, and/or monitoring the status or outcome of a prostate cancer in a subject using expression-based analysis of a plurality of targets. Generally, the method comprises (a) optionally providing a sample from a subject; (b) assaying the expression level for a plurality of targets in the sample; and (c) diagnosing, predicting and/or monitoring the status or outcome of a prostate cancer based on the expression level of the plurality of targets.

Assaying the expression level for a plurality of targets in the sample may comprise applying the sample to a microarray. In some instances, assaying the expression level may comprise the use of an algorithm. The algorithm may be used to produce a classifier. In some embodiments, the classifier comprises a probe selection region. In some instances, assaying the expression level for a plurality of targets comprises detecting and/or quantifying the plurality of targets. In some embodiments, assaying the expression level for a plurality of targets comprises sequencing the plurality of targets. In some embodiments, assaying the expression level for a plurality of targets comprises amplifying the plurality of targets. In some embodiments, assaying the expression level for a plurality of targets comprises quantifying the plurality of targets. In some embodiments, assaying the expression level for a plurality of targets comprises conducting a multiplexed reaction on the plurality of targets.

Further disclosed herein are methods for subtyping prostate cancer. Generally, the method comprises: (a) providing a sample comprising prostate cancer cells from a subject; (b) assaying the expression level for a plurality of targets in the sample; and (c) subtyping the cancer based on the expression level of the plurality of targets. In some instances, subtyping the prostate cancer comprises determining whether the cancer would respond to an anti-cancer therapy (e.g. radiation therapy). In some embodiments, subtyping the prostate cancer comprises identifying the cancer as non-responsive to an anti-cancer therapy.

It is to be understood that this disclosure is not limited to the particular methodology, compositions, articles or machines described, as such methods, compositions, articles or machines can, of course, vary. It is also to be understood that the terminology used herein is for the purpose of describing some embodiments only, and is not intended to limit the scope of the present disclosure.

Prognosis of Prostate Cancer Based on Immune Cell-Specific Gene Expression

In one aspect, the disclosure includes a method for determining the prognosis of a patient with prostate cancer by measuring immune cell-specific gene expression in a biological sample collected from the patient and calculating the levels of different immune cell types based on mixed cellular gene expression data. In some embodiments, the immune cell-specific gene comprises, or consists of, at least 1, 2, 3, 4, 5, 6, 7, 8, 9, 10, 11, 12, 13, 14, 15, 16, 17, 18, 19, 20, 21, 22, 23, 24, 25, 30, 35, 40, 50, 60, 70, 80, 90, 100, 125, 150, 175, 200, 225, or 250 genes selected from Table 2. In some embodiments, the immune cell-specific gene comprises or consists of all of the genes in Table 2. The relative levels of different immune cell types can be estimated based on mixed cellular gene expression data using known computational methods. See, e.g., A. R. Abbas et al., Immune response in silico (IRIS): immune-specific genes identified from a compendium of microarray expression data. *Genes Immun* 6, 319-331 (2005); A. M. Newman et al., Robust enumeration of cell subsets from tissue expression profiles. *Nat Methods* 12, 453-457 (2015); herein incorporated by reference in their entireties. In some embodiments, the CIBERSORT algorithm ((Newman et al., supra) is used to calculate relative levels of different immune cell types from immune cell-specific expression data. For example, the levels of one or more immune cell types selected from the group consisting of activated mast cells, resting mast cells, activated natural killer (NK) cells, resting NK cells, activated dendritic cells, resting dendritic cells, M0 macrophages, M1 macrophages, M2 macrophages, and T cells can be calculated based on their immune cell type-specific gene expression.

In some embodiments, the prognosis of the patient is determined based on the calculated levels of activated and resting mast cells. For example, higher levels of activated mast cells compared to a reference value indicate that that the patient will have longer distant metastasis free survival. Higher levels of resting mast cells compared to a reference value indicate that the that the patient will have shorter distant metastasis free survival. A higher ratio of activated mast cells to resting mast cells compared to a reference value indicates that the patient will have longer distant metastasis free survival.

In some embodiments, the prognosis of the patient is determined based on the calculated levels of activated and resting NK cells. For example, higher levels of activated NK cells compared to a reference value indicate that that the patient will have longer distant metastasis free survival. Higher levels of resting NK cells compared to a reference value indicate that the that the patient will have shorter distant metastasis free survival. A higher ratio of activated NK cells to resting NK cells compared to a reference value indicates that the patient will have longer distant metastasis free survival.

In some embodiments, the prognosis of the patient is determined based on the calculated levels of activated and resting dendritic cells. For example, higher levels of activated dendritic cells compared to a reference value indicate that that the patient will have longer distant metastasis free survival. Higher levels of resting dendritic cells compared to a reference value indicate that the that the patient will have shorter distant metastasis free survival. A higher ratio of activated dendritic cells to resting dendritic cells compared to a reference value indicates that the patient will have longer distant metastasis free survival.

In some embodiments, the prognosis of the patient is determined based on the calculated levels of macrophages. For example, higher levels of M0 macrophages compared to a reference value indicate that that the patient will have longer distant metastasis free survival. Higher levels of M1 macrophages or M2 macrophages compared to reference values for M1 macrophages and M2 macrophages indicate that the that the patient will have shorter distant metastasis free survival. A higher ratio of M1 and M2 macrophages to M0 macrophages indicates that the patient will have a shorter distant metastasis free survival.

In some embodiments, the prognosis of the patient is determined based on the calculated levels of T cells. For example, higher levels of T cells (e.g., CD8 T-cells or CD4 T-cells, naive or activated memory T cells) compared to reference values for T cells indicate that that the patient will have shorter distant metastasis free survival.

In some embodiments, the prognosis of the patient is determined based on levels of T cell-specific CTLA-4 gene expression, wherein higher levels of T cell-specific CTLA-4 gene expression compared to a reference value indicate that the patient will have shorter biochemical recurrence free survival.

In some embodiments, the prognosis of the patient is determined based on levels of immune cell-specific gene expression of PD-1, wherein higher levels of immune cell-specific gene expression of PD-1 indicate that the patient will have longer biochemical recurrence free survival, longer distant metastasis free survival, or longer prostate cancer-specific survival.

In some embodiments, the prognosis of the patient is determined based on levels of immune cell-specific gene expression of PD-L1, wherein higher levels of immune cell-specific gene expression of PD-L1 indicate that the patient will have shorter biochemical recurrence free survival, shorter distant metastasis free survival, or shorter prostate cancer-specific survival.

In some embodiments, the prognosis of the patient is determined based on levels of immune cell-specific gene expression of PD-L2, wherein higher levels of immune cell-specific gene expression of PD-L2 indicate that the patient will have shorter biochemical recurrence free survival, shorter distant metastasis free survival, or shorter prostate cancer-specific survival.

In some embodiments, the method further comprises calculating an immune content score based on the levels of immune cell-specific gene expression, wherein a higher immune content score for the patient compared to reference value ranges for a control subject indicates that the patient will have shorter biochemical recurrence free survival, shorter distant metastasis free survival, shorter prostate cancer-specific survival, or shorter overall survival than the control subject.

Further disclosed herein are methods for determining whether an individual who has prostate cancer is likely to respond to treatment with radiation therapy. The method comprises: a) obtaining a biological sample comprising prostate cancer cells from the patient; and b) measuring gene expression levels of PD-L2 in the biological sample, wherein higher levels of PD-L2 gene expression compared to reference value ranges for a control subject indicate that the patient will benefit from radiation therapy. The method may further comprise treating the patient with radiation therapy if the PD-L2 gene expression levels indicate that the patient will benefit from the radiation therapy.

Targets

In some embodiments, assaying the expression level of immune cell-specific genes comprises detecting and/or quantifying a plurality of target nucleic acid analytes. In some embodiments, assaying the expression level of immune cell-specific genes comprises sequencing a plurality of target nucleic acids. In some embodiments, assaying the expression level of immune cell-specific gene comprises amplifying a plurality of target nucleic acids. In some embodiments, assaying the expression level of immune cell-specific gene comprises conducting a multiplexed reaction on a plurality of target analytes. In some embodiments, the immune cell-specific gene is selected from the group consisting of CTLA-4, PD-1, PD-L1, and PD-L2. In some embodiments, the immune cell-specific gene is CTLA-4. In some embodiments, the immune cell-specific gene is PD-1. In some embodiments, the immune cell-specific gene is PD-L1. In some embodiments, the immune cell-specific gene is PD-L2. In some embodiments, the immune cell-specific gene comprises or consists of one, two, three, or all four of CTLA-4, PD-1, PD-L1, and PD-L2, for example: CTLA-4 and PD-1; CTLA-4 and PD-L1; CTLA-4 and PD-L2; PD-1 and PD-L1; PD-1 and PD-L2; PD-L1 and PD-L2; CTLA-4, PD-1, and PD-L1; CTLA-4, PD-1, and PD-L2; CTLA-4, PD-L1, and PD-L2; PD-1, PD-L1, and PD-L2; and CTLA-4, PD-1, PD-L1, and PD-L2. CTLA-4, PD-1, PD-L1, and PD-L2 are official HUGO Gene Nomenclature Committee (HNGC) gene symbols.

The methods disclosed herein often comprise assaying the expression level of a plurality of targets. The plurality of targets may comprise coding targets and/or non-coding targets of a protein-coding gene or a non protein-coding gene. A protein-coding gene structure may comprise an exon and an intron. The exon may further comprise a coding sequence (CDS) and an untranslated region (UTR). The protein-coding gene may be transcribed to produce a pre-mRNA and the pre-mRNA may be processed to produce a mature mRNA. The mature mRNA may be translated to produce a protein.

A non protein-coding gene structure may comprise an exon and intron. Usually, the exon region of a non protein-coding gene primarily contains a UTR. The non protein-coding gene may be transcribed to produce a pre-mRNA and the pre-mRNA may be processed to produce a non-coding RNA (ncRNA).

A coding target may comprise a coding sequence of an exon. A non-coding target may comprise a UTR sequence of an exon, intron sequence, intergenic sequence, promoter sequence, non-coding transcript, CDS antisense, intronic antisense, UTR antisense, or non-coding transcript antisense. A non-coding transcript may comprise a non-coding RNA (ncRNA).

In some instances, the plurality of targets comprises one or more immune cell-specific gene expression products (e.g., mRNAs or proteins). In some instances, the plurality of targets comprises at least about 2, at least about 3, at least about 4, at least about 5, at least about 6, at least about 7, at least about 8, at least about 9, at least about 10, at least about 15, at least about 20, at least about 25, at least about 30, at least about 35, at least about 40, at least about 45, or at least about 50 targets.

In some instances, the plurality of targets comprises a coding target, non-coding target, or any combination thereof. In some instances, the coding target comprises an exonic sequence. In other instances, the non-coding target comprises a non-exonic or exonic sequence. In some embodiments, a non-coding target comprises a UTR sequence, an intronic sequence, antisense, or a non-coding RNA transcript. In some instances, a non-coding target comprises sequences which partially overlap with a UTR sequence or an intronic sequence. A non-coding target also includes non-exonic and/or exonic transcripts. Exonic sequences may comprise regions on a protein-coding gene, such as an exon, UTR, or a portion thereof. Non-exonic sequences may comprise regions on a protein-coding, non protein-coding gene, or a portion thereof. For example, non-exonic sequences may comprise intronic regions, promoter regions, intergenic regions, a non-coding transcript, an exon anti-sense region, an intronic anti-sense region, UTR anti-sense region, non-coding transcript anti-sense region, or a portion thereof. In other instances, the plurality of targets comprises a non-coding RNA transcript.

The plurality of targets may comprise one or more targets selected from a classifier disclosed herein. The classifier may be generated from one or more models or algorithms. The one or more models or algorithms may be Naïve Bayes (NB), recursive Partitioning (Rpart), random forest (RF), support vector machine (SVM), k-nearest neighbor (KNN), high dimensional discriminate analysis (HDDA), or a combination thereof. The classifier may have an AUC of equal to or greater than 0.60. The classifier may have an AUC of equal to or greater than 0.61. The classifier may have an AUC of equal to or greater than 0.62. The classifier may have an AUC of equal to or greater than 0.63. The classifier may have an AUC of equal to or greater than 0.64. The classifier may have an AUC of equal to or greater than 0.65. The classifier may have an AUC of equal to or greater than 0.66. The classifier may have an AUC of equal to or greater than 0.67. The classifier may have an AUC of equal to or greater than 0.68. The classifier may have an AUC of equal to or greater than 0.69. The classifier may have an AUC of equal to or greater than 0.70. The classifier may have an AUC of equal to or greater than 0.75. The classifier may have an AUC of equal to or greater than 0.77. The classifier may have an AUC of equal to or greater than 0.78. The classifier may have an AUC of equal to or greater than 0.79. The classifier may have an AUC of equal to or greater than 0.80. The AUC may be clinically significant based on its 95% confidence interval (CI). The accuracy of the classifier may be at least about 70%. The accuracy of the classifier may be at least about 73%. The accuracy of the classifier may be at least about 75%. The accuracy of the classifier may be at least about 77%. The accuracy of the classifier may be at least about 80%. The accuracy of the classifier may be at least about 83%. The accuracy of the classifier may be at least about 84%. The accuracy of the classifier may be at least about 86%. The accuracy of the classifier may be at least about 88%. The accuracy of the classifier may be at least about 90%. The p-value of the classifier may be less than or equal to 0.05. The p-value of the classifier may be less than or equal to 0.04. The p-value of the classifier may be less than or equal to 0.03. The p-value of the classifier may be less than or equal to 0.02. The p-value of the classifier may be less than or equal to 0.01. The p-value of the classifier may be less than or equal to 0.008. The p-value of the classifier may be less than or equal to 0.006. The p-value of the classifier may be less than or equal to 0.004. The p-value of the classifier may be less than or equal to 0.002. The p-value of the classifier may be less than or equal to 0.001.

The plurality of targets may comprise one or more targets selected from a Random Forest (RF) classifier. The plurality of targets may comprise two or more targets selected from a Random Forest (RF) classifier. The plurality of targets may comprise three or more targets selected from a Random Forest (RF) classifier. The plurality of targets may comprise 2, 3, 4, 5, 6, 7, 8, 9, 10, 11, 12, 13, 14, 15, 20, 25, 30, 35, 40, 45, 50, or more targets selected from a Random Forest (RF) classifier. The RF classifier may be an RF2, and RF3, or an RF4 classifier. The RF classifier may be an RF22 classifier (e.g., a Random Forest classifier with 22 targets).

The plurality of targets may comprise one or more targets selected from an SVM classifier. The plurality of targets may comprise 2, 3, 4, 5, 6, 7, 8, 9, 10 or more targets selected from an SVM classifier. The plurality of targets may comprise 12, 13, 14, 15, 17, 20, 22, 25, 27, 30 or more targets selected from an SVM classifier. The plurality of targets may comprise 32, 35, 37, 40, 43, 45, 47, 50, 53, 55, 57, 60 or more targets selected from an SVM classifier. The SVM classifier may be an SVM2 classifier.

The plurality of targets may comprise one or more targets selected from a KNN classifier. The plurality of targets may comprise 2, 3, 4, 5, 6, 7, 8, 9, 10 or more targets selected from a KNN classifier. The plurality of targets may comprise 12, 13, 14, 15, 17, 20, 22, 25, 27, 30 or more targets selected from a KNN classifier. The plurality of targets may comprise 32, 35, 37, 40, 43, 45, 47, 50, 53, 55, 57, 60 or more targets selected from a KNN classifier. The plurality of targets may comprise 65, 70, 75, 80, 85, 90, 95, 100 or more targets selected from a KNN classifier.

The plurality of targets may comprise one or more targets selected from a Naïve Bayes (NB) classifier. The plurality of targets may comprise 2, 3, 4, 5, 6, 7, 8, 9, 10 or more targets selected from an NB classifier. The plurality of targets may comprise 12, 13, 14, 15, 17, 20, 22, 25, 27, 30 or more targets selected from an NB classifier. The plurality of targets may comprise 32, 35, 37, 40, 43, 45, 47, 50, 53, 55, 57, 60 or more targets selected from a NB classifier. The plurality of targets may comprise 65, 70, 75, 80, 85, 90, 95, 100 or more targets selected from a NB classifier. The plurality of targets may comprise one or more targets selected from a recursive Partitioning (Rpart) classifier. The plurality of targets may comprise 2, 3, 4, 5, 6, 7, 8, 9, 10 or more targets selected from an Rpart classifier. The plurality of targets may comprise 12, 13, 14, 15, 17, 20, 22, 25, 27, 30 or more targets selected from an Rpart classifier. The plurality of targets may comprise 32, 35, 37, 40, 43, 45, 47, 50, 53, 55, 57, 60 or more targets selected from an Rpart classifier. The plurality of targets may comprise 65, 70, 75, 80, 85, 90, 95, 100 or more targets selected from an Rpart classifier.

The plurality of targets may comprise one or more targets selected from a high dimensional discriminate analysis (HDDA) classifier. The plurality of targets may comprise two or more targets selected from a high dimensional discriminate analysis (HDDA) classifier. The plurality of targets may comprise three or more targets selected from a high dimensional discriminate analysis (HDDA) classifier. The plurality of targets may comprise 5, 6, 7, 8, 9, 10, 11, 12, 13, 14, 15 or more targets selected from a high dimensional discriminate analysis (HDDA) classifier.

Probes/Primers

The present disclosure provides for a probe set for diagnosing, monitoring and/or predicting a status or outcome of a prostate cancer in a subject comprising a plurality of probes, wherein (i) the probes in the set are capable of detecting an expression level of at least one target; and (ii) the expression level determines the cancer status of the subject with at least about 40% specificity.

The probe set may comprise one or more polynucleotide probes. Individual polynucleotide probes comprise a nucleotide sequence derived from the nucleotide sequence of the target sequences or complementary sequences thereof. The nucleotide sequence of the polynucleotide probe is designed such that it corresponds to, or is complementary to the target sequences. The polynucleotide probe can specifically hybridize under either stringent or lowered stringency hybridization conditions to a region of the target sequences, to the complement thereof, or to a nucleic acid sequence (such as a cDNA) derived therefrom.

The selection of the polynucleotide probe sequences and determination of their uniqueness may be carried out in silico using techniques known in the art, for example, based on a BLASTN search of the polynucleotide sequence in question against gene sequence databases, such as the Human Genome Sequence, UniGene, dbEST or the non-redundant database at NCBI. In some embodiments, the polynucleotide probe is complementary to a region of a target mRNA derived from a target sequence in the probe set. Computer programs can also be employed to select probe sequences that may not cross hybridize or may not hybridize non-specifically.

In some instances, microarray hybridization of RNA, extracted from prostate cancer tissue samples and amplified, may yield a dataset that is then summarized and normalized by the fRMA technique. After removal (or filtration) of cross-hybridizing PSRs, and PSRs containing less than 4 probes, the remaining PSRs can be used in further analysis. Following fRMA and filtration, the data can be decomposed into its principal components and an analysis of variance model is used to determine the extent to which a batch effect remains present in the first 10 principal components.

These remaining PSRs can then be subjected to filtration by a T-test between CR (clinical recurrence) and non-CR samples. Using a p-value cut-off of 0.01, the remaining features (e.g., PSRs) can be further refined. Feature selection can be performed by regularized logistic regression using the elastic-net penalty. The regularized regression may be bootstrapped over 1000 times using all training data; with each iteration of bootstrapping, features that have non-zero co-efficient following 3-fold cross validation can be tabulated. In some instances, features that were selected in at least 25% of the total runs were used for model building.

The polynucleotide probes of the present disclosure may range in length from about 15 nucleotides to the full length of the coding target or non-coding target. In some embodiments, the polynucleotide probes are at least about 15 nucleotides in length. In some embodiments, the polynucleotide probes are at least about 20 nucleotides in length. In a further embodiment, the polynucleotide probes are at least about 25 nucleotides in length. In some embodiments, the polynucleotide probes are between about 15 nucleotides and about 500 nucleotides in length. In some embodiments, the polynucleotide probes are between about 15 nucleotides and about 450 nucleotides, about 15 nucleotides and about 400 nucleotides, about 15 nucleotides and about 350 nucleotides, about 15 nucleotides and about 300 nucleotides, about 15 nucleotides and about 250 nucleotides, about 15 nucleotides and about 200 nucleotides in length. In some embodiments, the probes are at least 15 nucleotides in length. In some embodiments, the probes are at least 15 nucleotides in length. In some embodiments, the probes are at least 20 nucleotides, at least 25 nucleotides, at least 50 nucleotides, at least 75 nucleotides, at least 100 nucleotides, at least 125 nucleotides, at least 150 nucleotides, at least 200 nucleotides, at least 225 nucleotides, at least 250 nucleotides, at least 275 nucleotides, at least 300 nucleotides, at least 325 nucleotides, at least 350 nucleotides, at least 375 nucleotides in length.

The polynucleotide probes of a probe set can comprise RNA, DNA, RNA or DNA mimetics, or combinations thereof, and can be single-stranded or double-stranded. Thus the polynucleotide probes can be composed of naturally-occurring nucleobases, sugars and covalent internucleoside (backbone) linkages as well as polynucleotide probes having non-naturally-occurring portions which function similarly. Such modified or substituted polynucleotide probes may provide desirable properties such as, for example, enhanced affinity for a target gene and increased stability. The probe set may comprise a coding target and/or a non-coding target. In some embodiments, the probe set comprises a combination of a coding target and non-coding target.

In some embodiments, the probe set comprise a plurality of target sequences that hybridize to at least about 5 coding targets and/or non-coding targets. In some embodiments, the probe set comprise a plurality of target sequences that hybridize to at least about 10 coding targets and/or non-coding targets. In some embodiments, the probe set comprise a plurality of target sequences that hybridize to at least about 15 coding targets and/or non-coding targets. In some embodiments, the probe set comprise a plurality of target sequences that hybridize to at least about 20 coding targets and/or non-coding targets. In some embodiments, the probe set comprise a plurality of target sequences that hybridize to at least about 30 coding targets and/or non-coding targets.

The system of the present disclosure further provides for primers and primer pairs capable of amplifying target sequences defined by the probe set, or fragments or subsequences or complements thereof. The nucleotide sequences of the probe set may be provided in computer-readable media for in silico applications and as a basis for the design of appropriate primers for amplification of one or more target sequences of the probe set.

Primers based on the nucleotide sequences of target sequences can be designed for use in amplification of the target sequences. For use in amplification reactions such as PCR, a pair of primers can be used. The exact composition of the primer sequences may not critical in some embodiments, but for some embodiments the primers may hybridize to specific sequences of the probe set under stringent conditions, particularly under conditions of high stringency, as known in the art. The pairs of primers are usually chosen so as to generate an amplification product of at least about 50 nucleotides, more usually at least about 100 nucleotides. Algorithms for the selection of primer sequences are generally known, and are available in commercial software packages. These primers may be used in standard quantitative or qualitative PCR-based assays to assess transcript expression levels of RNAs defined by the probe set. In some embodiments, these primers may be used in combination with probes, such as molecular beacons in amplifications using real-time PCR.

In some embodiments, the primers or primer pairs, when used in an amplification reaction, specifically amplify at least a portion of a nucleic acid sequence of a target (or subgroups thereof as set forth herein), an RNA form thereof, or a complement to either thereof.

A label can optionally be attached to or incorporated into a probe or primer polynucleotide to allow detection and/or quantitation of a target polynucleotide representing the target sequence of interest. The target polynucleotide may be the expressed target sequence RNA itself, a cDNA copy thereof, or an amplification product derived therefrom, and may be the positive or negative strand, so long as it can be specifically detected in the assay being used. Similarly, an antibody may be labeled.

In certain multiplex formats, labels used for detecting different targets may be distinguishable. The label can be attached directly (e.g., via covalent linkage) or indirectly, e.g., via a bridging molecule or series of molecules (e.g., a molecule or complex that can bind to an assay component, or via members of a binding pair that can be incorporated into assay components, e.g. biotin-avidin or streptavidin). Many labels are commercially available in activated forms which can readily be used for such conjugation (for example through amine acylation), or labels may be attached through known or determinable conjugation schemes, many of which are known in the art.

Labels useful in the disclosure described herein include any substance which can be detected when bound to or incorporated into the biomolecule of interest. Any effective detection method can be used, including optical, spectroscopic, electrical, piezoelectrical, magnetic, Raman scattering, surface plasmon resonance, colorimetric, calorimetric, etc. A label is typically selected from a chromophore, a lumiphore, a fluorophore, one member of a quenching system, a chromogen, a hapten, an antigen, a magnetic particle, a material exhibiting nonlinear optics, a semiconductor nanocrystal, a metal nanoparticle, an enzyme, an antibody or binding portion or equivalent thereof, an aptamer, and one member of a binding pair, and combinations thereof. Quenching schemes may be used, wherein a quencher and a fluorophore as members of a quenching pair may be used on a probe, such that a change in optical parameters occurs upon binding to the target introduce or quench the signal from the fluorophore. One example of such a system is a molecular beacon. Suitable quencher/fluorophore systems are known in the art. The label may be bound through a variety of intermediate linkages. For example, a polynucleotide may comprise a biotin-binding species, and an optically detectable label may be conjugated to biotin and then bound to the labeled polynucleotide. Similarly, a polynucleotide sensor may comprise an immunological species such as an antibody or fragment, and a secondary antibody containing an optically detectable label may be added.

Chromophores useful in the methods described herein include any substance which can absorb energy and emit light. For multiplexed assays, a plurality of different signaling chromophores can be used with detectably different emission spectra. The chromophore can be a lumophore or a fluorophore. Typical fluorophores include fluorescent dyes, semiconductor nanocrystals, lanthanide chelates, polynucleotide-specific dyes and green fluorescent protein.

In some embodiments, polynucleotides of the disclosure comprise at least 20 consecutive bases of the nucleic acid sequence of a target or a complement thereto. The polynucleotides may comprise at least 21, 22, 23, 24, 25, 27, 30, 32, 35, 40, 45, 50, or more consecutive bases of the nucleic acids sequence of a target.

The polynucleotides may be provided in a variety of formats, including as solids, in solution, or in an array. The polynucleotides may optionally comprise one or more labels, which may be chemically and/or enzymatically incorporated into the polynucleotide.

In some embodiments, one or more polynucleotides provided herein can be provided on a substrate. The substrate can comprise a wide range of material, either biological, nonbiological, organic, inorganic, or a combination of any of these. For example, the substrate may be a polymerized Langmuir Blodgett film, functionalized glass, Si, Ge, GaAs, GaP, $SiO_2$, $SiN_4$, modified silicon, or any one of a wide variety of gels or polymers such as (poly)tetrafluoroethylene, (poly)vinylidenedifluoride, polystyrene, cross-linked polystyrene, polyacrylic, polylactic acid, polyglycolic acid, poly(lactide coglycolide), polyanhydrides, poly(methyl methacrylate), poly(ethylene-co-vinyl acetate), polysiloxanes, polymeric silica, latexes, dextran polymers, epoxies, polycarbonates, or combinations thereof. Conducting polymers and photoconductive materials can be used.

The substrate can take the form of an array, a photodiode, an optoelectronic sensor such as an optoelectronic semiconductor chip or optoelectronic thin-film semiconductor, or a biochip. The location(s) of probe(s) on the substrate can be addressable; this can be done in highly dense formats, and the location(s) can be microaddressable or nanoaddressable.

Diagnostic Samples

Diagnostic samples for use with the systems and in the methods of the present disclosure comprise nucleic acids suitable for providing RNAs expression information. In principle, the biological sample from which the expressed RNA is obtained and analyzed for target sequence expression can be any material suspected of comprising prostate cancer tissue or cells. The diagnostic sample can be a biological sample used directly in a method of the disclosure. In some embodiments, the diagnostic sample can be a sample prepared from a biological sample.

In some embodiments, the sample or portion of the sample comprising or suspected of comprising cancer tissue or cells can be any source of biological material, including cells, tissue or fluid, including bodily fluids. Non-limiting examples of the source of the sample include an aspirate, a needle biopsy, a cytology pellet, a bulk tissue preparation or a section thereof obtained for example by surgery or autopsy, lymph fluid, blood, plasma, serum, tumors, and organs. In some embodiments, the sample is from urine. In some embodiments, the sample is from blood, plasma or serum. In some embodiments, the sample is from saliva.

The samples may be archival samples, having a known and documented medical outcome, or may be samples from current patients whose ultimate medical outcome is not yet known.

In some embodiments, the sample may be dissected prior to molecular analysis. The sample may be prepared via macrodissection of a bulk tumor specimen or portion thereof, or may be treated via microdissection, for example via Laser Capture Microdissection (LCM).

The sample may initially be provided in a variety of states, as fresh tissue, fresh frozen tissue, fine needle aspirates, and may be fixed or unfixed. Frequently, medical laboratories routinely prepare medical samples in a fixed state, which facilitates tissue storage. A variety of fixatives can be used to fix tissue to stabilize the morphology of cells, and may be used alone or in combination with other agents. Exemplary fixatives include crosslinking agents, alcohols, acetone, Bouin's solution, Zenker solution, Hely solution, osmic acid solution and Carnoy solution.

Crosslinking fixatives can comprise any agent suitable for forming two or more covalent bonds, for example an aldehyde. Sources of aldehydes typically used for fixation include formaldehyde, paraformaldehyde, glutaraldehyde or formalin. In some embodiments, the crosslinking agent comprises formaldehyde, which may be included in its native form or in the form of paraformaldehyde or formalin. One of skill in the art would appreciate that for samples in which crosslinking fixatives have been used special preparatory steps may be necessary including for example heating steps and proteinase-k digestion; see methods.

One or more alcohols may be used to fix tissue, alone or in combination with other fixatives. Exemplary alcohols used for fixation include methanol, ethanol and isopropanol.

Formalin fixation is frequently used in medical laboratories. Formalin comprises both an alcohol, typically methanol, and formaldehyde, both of which can act to fix a biological sample.

Whether fixed or unfixed, the biological sample may optionally be embedded in an embedding medium. Exemplary embedding media used in histology including paraffin, Tissue-Tek® V.I.P.™, Paramat, Paramat Extra, Paraplast, Paraplast X-tra, Paraplast Plus, Peel Away Paraffin Embedding Wax, Polyester Wax, Carbowax Polyethylene Glycol, Polyfin™, Tissue Freezing Medium TFMFM, Cryo-Gef™, and OCT Compound (Electron Microscopy Sciences, Hatfield, PA). Prior to molecular analysis, the embedding material may be removed via any suitable techniques, as known in the art. For example, where the sample is embedded in wax, the embedding material may be removed by extraction with organic solvent(s), for example xylenes. Kits are commercially available for removing embedding media from tissues. Samples or sections thereof may be subjected to further processing steps as needed, for example serial hydration or dehydration steps.

In some embodiments, the sample is a fixed, wax-embedded biological sample. Frequently, samples from medical laboratories are provided as fixed, wax-embedded samples, most commonly as formalin-fixed, paraffin embedded (FFPE) tissues.

Whatever the source of the biological sample, the target polynucleotide that is ultimately assayed can be prepared synthetically (in the case of control sequences), but typically is purified from the biological source and subjected to one or more preparative steps. The RNA may be purified to remove or diminish one or more undesired components from the biological sample or to concentrate it. Conversely, where the RNA is too concentrated for the particular assay, it may be diluted.

RNA Extraction

RNA can be extracted and purified from biological samples using any suitable technique. A number of techniques are known in the art, and several are commercially available (e.g., FormaPure nucleic acid extraction kit, Agencourt Biosciences, Beverly MA, High Pure FFPE RNA Micro Kit, Roche Applied Science, Indianapolis, IN). RNA can be extracted from frozen tissue sections using TRIzol (Invitrogen, Carlsbad, CA) and purified using RNeasy Protect kit (Qiagen, Valencia, CA). RNA can be further purified using DNAse I treatment (Ambion, Austin, TX) to eliminate any contaminating DNA. RNA concentrations can be made using a Nanodrop ND-1000 spectrophotometer (Nanodrop Technologies, Rockland, DE). RNA can be further purified to eliminate contaminants that interfere with cDNA synthesis by cold sodium acetate precipitation. RNA integrity can be evaluated by running electropherograms, and RNA integrity number (RIN, a correlative measure that indicates intactness of mRNA) can be determined using the RNA 6000 PicoAssay for the Bioanalyzer 2100 (Agilent Technologies, Santa Clara, CA).

Kits

Kits for performing the desired method(s) are also provided, and comprise a container or housing for holding the components of the kit, one or more vessels containing one or more nucleic acid(s), and optionally one or more vessels containing one or more reagents. The reagents include those described in the composition of matter section above, and those reagents useful for performing the methods described, including amplification reagents, and may include one or more probes, primers or primer pairs, enzymes (including polymerases and ligases), intercalating dyes, labeled probes, and labels that can be incorporated into amplification products.

In some embodiments, the kit comprises primers or primer pairs specific for those subsets and combinations of target sequences described herein. The primers or pairs of primers suitable for selectively amplifying the target sequences. The kit may comprise at least two, three, four or five primers or pairs of primers suitable for selectively amplifying one or more targets. The kit may comprise at least 5, 10, 15, 20, 30, 40, 50, 60, 70, 80, 90, 100, 110, or more primers or pairs of primers suitable for selectively amplifying one or more targets.

In some embodiments, the primers or primer pairs of the kit, when used in an amplification reaction, specifically amplify a non-coding target, coding target, exonic, or non-exonic target described herein, a nucleic acid sequence corresponding to a target, an RNA form thereof, or a complement to either thereof. The kit may include a plurality of such primers or primer pairs which can specifically amplify a corresponding plurality of different amplify a non-coding target, coding target, exonic, or non-exonic transcript described herein, a nucleic acid sequence corresponding to a target, RNA forms thereof, or complements thereto. At least two, three, four or five primers or pairs of primers suitable for selectively amplifying the one or more targets can be provided in kit form. In some embodiments, the kit comprises from five to fifty primers or pairs of primers suitable for amplifying the one or more targets.

The reagents may independently be in liquid or solid form. The reagents may be provided in mixtures. Control samples and/or nucleic acids may optionally be provided in the kit. Control samples may include tissue and/or nucleic acids obtained from or representative of tumor samples from patients showing no evidence of disease, as well as tissue and/or nucleic acids obtained from or representative of tumor samples from patients that develop systemic cancer.

The nucleic acids may be provided in an array format, and thus an array or microarray may be included in the kit. The kit optionally may be certified by a government agency for use in prognosing the disease outcome of cancer patients and/or for designating a treatment modality.

Instructions for using the kit to perform one or more methods of the disclosure can be provided with the container, and can be provided in any fixed medium. The instructions may be located inside or outside the container or housing, and/or may be printed on the interior or exterior of any surface thereof. A kit may be in multiplex form for concurrently detecting and/or quantitating one or more different target polynucleotides representing the expressed target sequences.

Amplification and Hybridization

Following sample collection and nucleic acid extraction, the nucleic acid portion of the sample comprising RNA that is or can be used to prepare the target polynucleotide(s) of interest can be subjected to one or more preparative reactions. These preparative reactions can include in vitro transcription (IVT), labeling, fragmentation, amplification and other reactions. mRNA can first be treated with reverse transcriptase and a primer to create cDNA prior to detection, quantitation and/or amplification; this can be done in vitro with purified mRNA or in situ, e.g., in cells or tissues affixed to a slide.

"Amplification" has its plain and ordinary meaning as understood by one of skill in the art in view of this disclosure, and includes any process of producing at least one copy of a nucleic acid, in this case an expressed RNA, and in many cases produces multiple copies. An amplification product can be RNA or DNA, and may include a complementary strand to the expressed target sequence. DNA amplification products can be produced initially through reverse translation and then optionally from further amplification reactions. The amplification product may include all or a portion of a target sequence, and may optionally be labeled. A variety of amplification methods are suitable for use, including polymerase-based methods and ligation-based methods. Exemplary amplification techniques include the polymerase chain reaction method (PCR), the lipase chain reaction (LCR), ribozyme-based methods, self-sustained sequence replication (3SR), nucleic acid sequence-based amplification (NASBA), the use of Q Beta replicase, reverse transcription, nick translation, and the like.

In some embodiments, asymmetric amplification reactions is used to preferentially amplify one strand representing the target sequence that is used for detection as the target polynucleotide. In some cases, the presence and/or amount of the amplification product itself may be used to determine the expression level of a given target sequence. In other instances, the amplification product may be used to hybridize to an array or other substrate comprising sensor polynucleotides which are used to detect and/or quantitate target sequence expression.

The first cycle of amplification in polymerase-based methods typically forms a primer extension product complementary to the template strand. If the template is single-stranded RNA, a polymerase with reverse transcriptase activity is used in the first amplification to reverse transcribe the RNA to DNA, and additional amplification cycles can be performed to copy the primer extension products. The primers for a PCR are designed to hybridize to regions in their corresponding template that can produce an amplifiable segment; thus, each primer hybridizes so that its 3' nucleotide is paired to a nucleotide in its complementary template strand that is located 3' from the 3' nucleotide of the primer used to replicate that complementary template strand in the PCR.

The target polynucleotide can be amplified by contacting one or more strands of the target polynucleotide with a primer and a polymerase having suitable activity to extend the primer and copy the target polynucleotide to produce a full-length complementary polynucleotide or a smaller portion thereof. Any enzyme having a polymerase activity that can copy the target polynucleotide can be used, including DNA polymerases, RNA polymerases, reverse transcriptases, enzymes having more than one type of polymerase or enzyme activity. The enzyme can be thermolabile or thermostable. Mixtures of enzymes can also be used. Exemplary enzymes include: DNA polymerases such as DNA Polymerase I ("Pol I"), the Klenow fragment of Pol I, T4, T7, Sequenase® T7, Sequenase® Version 2.0 T7, Tub, Taq, Tth, Pfic, Pfu, Tsp, Tfl, Tli and *Pyrococcus* sp GB-D DNA polymerases; RNA polymerases such as *E. coli*, SP6, T3 and T7 RNA polymerases; and reverse transcriptases such as AMV, M-MuLV, MMLV, RNAse H MMLV (SuperScript®), SuperScript® II, ThermoScript®, HIV-1, and RAV2 reverse transcriptases. All of these enzymes are commercially available. Exemplary polymerases with multiple specificities include RAV2 and Tli (exo-) polymerases. Exemplary thermostable polymerases include Tub, Taq, Tth, Pfic, Pfu, Tsp, Tfl, Tli and *Pyrococcus* sp. GB-D DNA polymerases.

Suitable reaction conditions are chosen to permit amplification of the target polynucleotide, including pH, buffer, ionic strength, presence and concentration of one or more salts, presence and concentration of reactants and cofactors such as nucleotides and magnesium and/or other metal ions (e.g., manganese), optional cosolvents, temperature, thermal cycling profile for amplification schemes comprising a polymerase chain reaction, and may depend in part on the polymerase being used as well as the nature of the sample. Cosolvents include formamide (typically at from about 2 to about 10%), glycerol (typically at from about 5 to about 10%), and DMSO (typically at from about 0.9 to about 10%). Techniques may be used in the amplification scheme in order to minimize the production of false positives or artifacts produced during amplification. These include "touchdown" PCR, hot-start techniques, use of nested primers, or designing PCR primers so that they form stem-loop structures in the event of primer-dimer formation and thus are not amplified. Techniques to accelerate PCR can be used, for example centrifugal PCR, which allows for greater convection within the sample, and comprising infrared heating steps for rapid heating and cooling of the sample. One or more cycles of amplification can be performed. An excess of one primer can be used to produce an excess of one primer extension product during PCR. In some embodiments, the primer extension product produced in excess is the amplification product to be detected. A plurality of different primers may be used to amplify different target polynucleotides or different regions of a particular target polynucleotide within the sample.

An amplification reaction can be performed under conditions which allow an optionally labeled sensor polynucleotide to hybridize to the amplification product during at least part of an amplification cycle. When the assay is performed in this manner, real-time detection of this hybridization event can take place by monitoring for light emission or fluorescence during amplification, as known in the art.

Where the amplification product is to be used for hybridization to an array or microarray, a number of suitable commercially available amplification products are available. These include amplification kits available from NuGEN, Inc. (San Carlos, CA), including the WT-Ovation™ System, WT-Ovation™ System v2, WT-Ovation™ Pico System, WT-Ovation™ FFPE Exon Module, WT-Ovation™ FFPE Exon Module RiboAmp and RiboAmp$^{Plus}$ RNA Amplification Kits (MDS Analytical Technologies (formerly Arcturus) (Mountain View, CA), Genisphere, Inc. (Hatfield, PA), including the RampUp Plus™ and SenseAmp™ RNA Amplification kits, alone or in combination. Amplified nucleic acids may be subjected to one or more purification reactions after amplification and labeling, for example using magnetic beads (e.g., RNAC lean magnetic beads, Agencourt Biosciences).

Multiple RNA biomarkers can be analyzed using real-time quantitative multiplex RT-PCR platforms and other multiplexing technologies such as GenomeLab GeXP Genetic Analysis System (Beckman Coulter, Foster City, CA), SmartCycler® 9600 or GeneXpert® Systems (Cepheid, Sunnyvale, CA), ABI 7900 HT Fast Real Time PCR system (Applied Biosystems, Foster City, CA), LightCycler® 480 System (Roche Molecular Systems, Pleasanton, CA), xMAP 100 System (Luminex, Austin, TX) Solexa Genome Analysis System (Illumina, Hayward, CA), OpenArray Real Time qPCR (BioTrove, Woburn, MA) and BeadXpress System (Illumina, Hayward, CA).

Detection and/or Quantification of Target Sequences

Any method of detecting and/or quantitating the expression of the encoded target sequences can in principle be used. The expressed target sequences can be directly detected and/or quantitated, or may be copied and/or amplified to allow detection of amplified copies of the expressed target sequences or its complement.

Methods for detecting and/or quantifying a target can include Northern blotting, sequencing, array or microarray hybridization, by enzymatic cleavage of specific structures (e.g., an Invader® assay, Third Wave Technologies, e.g. as described in U.S. Pat. Nos. 5,846,717, 6,090,543; 6,001,567; 5,985,557; and 5,994,069) and amplification methods, e.g. RT-PCR, including in a TaqMan® assay (PE Biosystems, Foster City, Calif., e.g. as described in U.S. Pat. Nos. 5,962,233 and 5,538,848), and may be quantitative or semi-quantitative, and may vary depending on the origin, amount and condition of the available biological sample. Combinations of these methods may also be used. For example, nucleic acids may be amplified, labeled and subjected to microarray analysis.

In some instances, target sequences may be detected by sequencing. Sequencing methods may comprise whole genome sequencing or exome sequencing. Sequencing methods such as Maxim-Gilbert, chain-termination, or high-throughput systems may also be used. Additional, suitable sequencing techniques include classic dideoxy sequencing reactions (Sanger method) using labeled terminators or primers and gel separation in slab or capillary, sequencing by synthesis using reversibly terminated labeled nucleotides, pyrosequencing, 454 sequencing, allele specific hybridization to a library of labeled oligonucleotide probes, sequencing by synthesis using allele specific hybridization to a library of labeled clones that is followed by ligation, real time monitoring of the incorporation of labeled nucleotides during a polymerization step, and SOLiD sequencing.

Additional methods for detecting and/or quantifying a target include single-molecule sequencing (e.g., Helicos, PacBio), sequencing by synthesis (e.g., Illumina, Ion Torrent), sequencing by ligation (e.g., ABI SOLID), sequencing by hybridization (e.g., Complete Genomics), in situ hybridization, bead-array technologies (e.g., Luminex xMAP, Illumina BeadChips), branched DNA technology (e.g., Panomics, Genisphere). Sequencing methods may use fluorescent (e.g., Illumina) or electronic (e.g., Ion Torrent, Oxford Nanopore) methods of detecting nucleotides.

Reverse Transcription for QRT-PCR Analysis

Reverse transcription can be performed by any method known in the art. For example, reverse transcription may be performed using the Omniscript kit (Qiagen, Valencia, CA), Superscript III kit (Invitrogen, Carlsbad, CA), for RT-PCR. Target-specific priming can be performed in order to increase the sensitivity of detection of target sequences and generate target-specific cDNA.

TaqMan® Gene Expression Analysis

TaqMan®RT-PCR can be performed using Applied Biosystems Prism (ABI) 7900 HT instruments in a 5 1.11 volume with target sequence-specific cDNA equivalent to 1 ng total RNA.

Primers and probes concentrations for TaqMan analysis are added to amplify fluorescent amplicons using PCR cycling conditions such as 95° C. for 10 minutes for one cycle, 95° C. for 20 seconds, and 60° C. for 45 seconds for 40 cycles. A reference sample can be assayed to ensure reagent and process stability. Negative controls (e.g., no template) should be assayed to monitor any exogenous nucleic acid contamination.

Classification Arrays

The present disclosure contemplates that a probe set or probes derived therefrom may be provided in an array format. In the context of the present disclosure, "array" has its plain and ordinary meaning as understood by one of skill in the art in view of this disclosure, and includes a spatially or logically organized collection of polynucleotide probes. An array comprising probes specific for a coding target, non-coding target, or a combination thereof may be used. In some embodiments, an array comprising probes specific for two or more of transcripts of a target, or a product derived thereof, can be used. Desirably, an array may be specific for 5, 10, 15, 20, 25, 30 or more of transcripts of a target. Expression of these sequences may be detected alone or in combination with other transcripts. In some embodiments, an array is used which comprises a wide range of sensor probes for prostate-specific expression products, along with appropriate control sequences. In some instances, the array may comprise the Human Exon 1.0 ST Array (HuEx 1.0 ST, Affymetrix, Inc., Santa Clara, CA).

Typically the polynucleotide probes are attached to a solid substrate and are ordered so that the location (on the substrate) and the identity of each are known. The polynucleotide probes can be attached to one of a variety of solid substrates capable of withstanding the reagents and conditions necessary for use of the array. Examples include, but are not limited to, polymers, such as (poly)tetrafluoroethylene, (poly)vinylidenedifluoride, polystyrene, polycarbonate, polypropylene and polystyrene; ceramic; silicon; silicon dioxide; modified silicon; (fused) silica, quartz or glass; functionalized glass; paper, such as filter paper; diazotized cellulose; nitrocellulose filter; nylon membrane; and polyacrylamide gel pad. Substrates that are transparent to light are useful for arrays that may be used in an assay that involves optical detection.

Examples of array formats include membrane or filter arrays (for example, nitrocellulose, nylon arrays), plate arrays (for example, multiwell, such as a 24-, 96-, 256-, 384-, 864- or 1536-well, microtitre plate arrays), pin arrays, and bead arrays (for example, in a liquid "slurry"). Arrays on substrates such as glass or ceramic slides are often referred to as chip arrays or "chips." Such arrays are well known in the art. In some embodiments, the Cancer Prognosticarray is a chip.

Data Analysis

In some embodiments, one or more pattern recognition methods can be used in analyzing the expression level of target sequences. The pattern recognition method can comprise a linear combination of expression levels, or a nonlinear combination of expression levels. In some embodiments, expression measurements for RNA transcripts or combinations of RNA transcript levels are formulated into linear or non-linear models or algorithms (e.g., an 'expression signature') and converted into a likelihood score. This likelihood score indicates the probability that a biological sample is from a patient who may exhibit no evidence of disease, who may exhibit systemic cancer, or who may exhibit biochemical recurrence. The likelihood score can be used to distinguish these disease states. The models and/or algorithms can be provided in machine readable format, and may be used to correlate expression levels or an expression profile with a disease state, and/or to designate a treatment modality for a patient or class of patients.

Assaying the expression level for a plurality of targets may comprise the use of an algorithm or classifier. Array data can be managed, classified, and analyzed using techniques known in the art. Assaying the expression level for a plurality of targets may comprise probe set modeling and data pre-processing. Probe set modeling and data pre-processing can be derived using the Robust Multi-Array (RMA) algorithm or variants GC-RMA, fRMA, Probe Logarithmic Intensity Error (PLIER) algorithm or variant iterPLIER. Variance or intensity filters can be applied to pre-process data using the RMA algorithm, for example by removing target sequences with a standard deviation of <10 or a mean intensity of <100 intensity units of a normalized data range, respectively.

In some embodiments, assaying the expression level for a plurality of targets may comprise the use of a machine learning algorithm. The machine learning algorithm may comprise a supervised learning algorithm. Examples of supervised learning algorithms may include Average One-Dependence Estimators (AODE), Artificial neural network (e.g., Backpropagation), Bayesian statistics (e.g., Naive Bayes classifier, Bayesian network, Bayesian knowledge base), Case-based reasoning, Decision trees, Inductive logic programming, Gaussian process regression, Group method of data handling (GMDH), Learning Automata, Learning Vector Quantization, Minimum message length (decision trees, decision graphs, etc.), Lazy learning, Instance-based learning Nearest Neighbor Algorithm, Analogical modeling, Probably approximately correct learning (PAC) learning, Ripple down rules, a knowledge acquisition methodology, Symbolic machine learning algorithms, Subsymbolic machine learning algorithms, Support vector machines, Random Forests, Ensembles of classifiers, Bootstrap aggregating (bagging), and Boosting. Supervised learning may comprise ordinal classification such as regression analysis and Information fuzzy networks (IFN). In some embodiments, supervised learning methods may comprise statistical classification, such as AODE, Linear classifiers (e.g., Fisher's linear discriminant, Logistic regression, Naive Bayes classifier, Perceptron, and Support vector machine), quadratic classifiers, k-nearest neighbor, Boosting, Decision trees (e.g., C4.5, Random forests), Bayesian networks, and Hidden Markov models.

The machine learning algorithms may also comprise an unsupervised learning algorithm. Examples of unsupervised learning algorithms may include artificial neural network, Data clustering, Expectation-maximization algorithm, Self-organizing map, Radial basis function network, Vector Quantization, Generative topographic map, Information bottleneck method, and IBSEAD. Unsupervised learning may also comprise association rule learning algorithms such as Apriori algorithm, Eclat algorithm and FP-growth algorithm. Hierarchical clustering, such as Single-linkage clustering and Conceptual clustering, may also be used. In some embodiments, unsupervised learning may comprise partitional clustering such as K-means algorithm and Fuzzy clustering.

In some instances, the machine learning algorithms comprise a reinforcement learning algorithm. Examples of reinforcement learning algorithms include, but are not limited to, temporal difference learning, Q-learning and Learning Automata. In some embodiments, the machine learning algorithm may comprise Data Pre-processing.

In some embodiments, the machine learning algorithms may include, but are not limited to, Average One-Dependence Estimators (AODE), Fisher's linear discriminant, Logistic regression, Perceptron, Multilayer Perceptron, Artificial Neural Networks, Support vector machines, Quadratic classifiers, Boosting, Decision trees, C4.5, Bayesian networks, Hidden Markov models, High-Dimensional Discriminant Analysis, and Gaussian Mixture Models. The machine learning algorithm may comprise support vector machines, Naïve Bayes classifier, k-nearest neighbor, high-dimensional discriminant analysis, or Gaussian mixture models. In some instances, the machine learning algorithm comprises Random Forests.

Therapeutic Regimens

Diagnosing, predicting, or monitoring a status or outcome of a cancer may comprise treating a cancer or preventing a cancer progression. In addition, diagnosing, predicting, or monitoring a status or outcome of a cancer may comprise identifying or predicting responders or non-responders to an anti-cancer therapy (e.g., radiation therapy). In some instances, diagnosing, predicting, or monitoring may comprise determining a therapeutic regimen. Determining a therapeutic regimen may comprise administering an anti-cancer therapy. In some embodiments, determining a therapeutic regimen may comprise modifying, recommending, continuing or discontinuing an anti-cancer regimen. In some embodiments, if a subject is prognosed or determined as having a benign tumor that is not metastatic based on the expression of one or more genes as described herein, the therapeutic regimen comprises monitoring the patient without providing a treatment. In some instances, if the sample expression patterns are consistent with the expression pattern for a known disease or disease outcome, the expression patterns can be used to designate one or more treatment modalities (e.g., therapeutic regimens, anti-cancer regimen). An anti-cancer regimen may comprise one or more anti-cancer therapies. Examples of anti-cancer therapies include surgery, chemotherapy, radiation therapy, immunotherapy/biological therapy, and photodynamic therapy.

Surgical oncology uses surgical methods to diagnose, stage, and treat cancer, and to relieve certain cancer-related symptoms. Surgery may be used to remove the tumor (e.g., excisions, resections, debulking surgery), reconstruct a part of the body (e.g., restorative surgery), and/or to relieve symptoms such as pain (e.g., palliative surgery). Surgery may also include cryosurgery. Cryosurgery (also called cryotherapy) may use extreme cold produced by liquid nitrogen (or argon gas) to destroy abnormal tissue. Cryosurgery can be used to treat external tumors, such as those on the skin. For external tumors, liquid nitrogen can be applied directly to the cancer cells with a cotton swab or spraying device. Cryosurgery may also be used to treat tumors inside the body (internal tumors and tumors in the bone). For internal tumors, liquid nitrogen or argon gas may be circulated through a hollow instrument called a cryoprobe, which is placed in contact with the tumor. An ultrasound or MRI may be used to guide the cryoprobe and monitor the freezing of the cells, thus limiting damage to nearby healthy tissue. A ball of ice crystals may form around the probe, freezing nearby cells. Sometimes more than one probe is used to deliver the liquid nitrogen to various parts of the tumor. The probes may be put into the tumor during surgery or through the skin (percutaneously). After cryosurgery, the frozen tissue thaws and may be naturally absorbed by the body (for internal tumors), or may dissolve and form a scab (for external tumors).

Chemotherapeutic agents may also be used for the treatment of cancer. Examples of chemotherapeutic agents include alkylating agents, anti-metabolites, plant alkaloids and terpenoids, vinca alkaloids, podophyllotoxin, taxanes, topoisomerase inhibitors, and cytotoxic antibiotics. Cisplatin, carboplatin, and oxaliplatin are examples of alkylating agents. Other alkylating agents include mechlorethamine, cyclophosphamide, chlorambucil, ifosfamide. Alkylating agents may impair cell function by forming covalent bonds with the amino, carboxyl, sulfhydryl, and phosphate groups in biologically important molecules. In some embodiments, alkylating agents may chemically modify a cell's DNA.

Anti-metabolites are another example of chemotherapeutic agents. Anti-metabolites may masquerade as purines or pyrimidines and may prevent purines and pyrimidines from becoming incorporated in to DNA during the "S" phase (of the cell cycle), thereby stopping normal development and division. Antimetabolites may also affect RNA synthesis. Examples of metabolites include azathioprine and mercaptopurine.

Alkaloids may be derived from plants and block cell division may also be used for the treatment of cancer. Alkyloids may prevent microtubule function. Examples of alkaloids are vinca alkaloids and taxanes. Vinca alkaloids may bind to specific sites on tubulin and inhibit the assembly of tubulin into microtubules (M phase of the cell cycle). The vinca alkaloids may be derived from the Madagascar periwinkle, *Catharanthus roseus* (formerly known as *Vinca rosea*). Examples of vinca alkaloids include, but are not limited to, vincristine, vinblastine, vinorelbine, or vindesine. Taxanes are diterpenes produced by the plants of the genus *Taxus* (yews). Taxanes may be derived from natural sources or synthesized artificially. Taxanes include paclitaxel (Taxol) and docetaxel (Taxotere). Taxanes may disrupt microtubule function. Microtubules are essential to cell division, and taxanes may stabilize GDP-bound tubulin in the microtubule, thereby inhibiting the process of cell division. Thus, in essence, taxanes may be mitotic inhibitors. Taxanes may also be radiosensitizing and often contain numerous chiral centers.

In some embodiments, chemotherapeutic agents include podophyllotoxin. Podophyllotoxin is a plant-derived compound that may help with digestion and may be used to produce cytostatic drugs such as etoposide and teniposide. They may prevent the cell from entering the G1 phase (the start of DNA replication) and the replication of DNA (the S phase).

Topoisomerases are essential enzymes that maintain the topology of DNA. Inhibition of type I or type II topoisomerases may interfere with both transcription and replication of DNA by upsetting proper DNA supercoiling. Some chemotherapeutic agents may inhibit topoisomerases. For example, some type I topoisomerase inhibitors include camptothecins: irinotecan and topotecan. Examples of type II inhibitors include amsacrine, etoposide, etoposide phosphate, and teniposide.

Another example of chemotherapeutic agents is cytotoxic antibiotics. Cytotoxic antibiotics are a group of antibiotics that are used for the treatment of cancer because they may interfere with DNA replication and/or protein synthesis. Cytotoxic antibiotics include, but are not limited to, actinomycin, anthracyclines, doxorubicin, daunorubicin, valrubicin, idarubicin, epirubicin, bleomycin, plicamycin, and mitomycin.

In some instances, the anti-cancer treatment may comprise radiation therapy. Radiation can come from a machine outside the body (external-beam radiation therapy) or from radioactive material placed in the body near cancer cells (internal radiation therapy, more commonly called brachytherapy). Systemic radiation therapy uses a radioactive substance, given by mouth or into a vein that travels in the blood to tissues throughout the body.

External-beam radiation therapy may be delivered in the form of photon beams (either x-rays or gamma rays). A photon is the basic unit of light and other forms of electromagnetic radiation. An example of external-beam radiation therapy is called 3-dimensional conformal radiation therapy (3D-CRT). 3D-CRT may use computer software and advanced treatment machines to deliver radiation to very precisely shaped target areas. Many other methods of external-beam radiation therapy are currently being tested and used in cancer treatment. These methods include, but are not limited to, intensity-modulated radiation therapy (IMRT), image-guided radiation therapy (IGRT), Stereotactic radiosurgery (SRS), Stereotactic body radiation therapy (SBRT), and proton therapy.

Intensity-modulated radiation therapy (IMRT) is an example of external-beam radiation and may use hundreds of tiny radiation beam-shaping devices, called collimators, to deliver a single dose of radiation. The collimators can be stationary or can move during treatment, allowing the intensity of the radiation beams to change during treatment sessions. This kind of dose modulation allows different areas of a tumor or nearby tissues to receive different doses of radiation. IMRT is planned in reverse (called inverse treatment planning) In inverse treatment planning, the radiation doses to different areas of the tumor and surrounding tissue are planned in advance, and then a high-powered computer program calculates the required number of beams and angles of the radiation treatment. In contrast, during traditional (forward) treatment planning, the number and angles of the radiation beams are chosen in advance and computers calculate how much dose may be delivered from each of the planned beams. The goal of IMRT is to increase the radiation dose to the areas that need it and reduce radiation exposure to specific sensitive areas of surrounding normal tissue.

Another example of external-beam radiation is image-guided radiation therapy (IGRT). In IGRT, repeated imaging scans (CT, MRI, or PET) may be performed during treatment. These imaging scans may be processed by computers to identify changes in a tumor's size and location due to treatment and to allow the position of the patient or the planned radiation dose to be adjusted during treatment as needed. Repeated imaging can increase the accuracy of radiation treatment and may allow reductions in the planned volume of tissue to be treated, thereby decreasing the total radiation dose to normal tissue.

Tomotherapy is a type of image-guided IMRT. A tomotherapy machine is a hybrid between a CT imaging scanner and an external-beam radiation therapy machine. The part of the tomotherapy machine that delivers radiation for both imaging and treatment can rotate completely around the patient in the same manner as a normal CT scanner. Tomotherapy machines can capture CT images of the patient's tumor immediately before treatment sessions, to allow for very precise tumor targeting and sparing of normal tissue.

Stereotactic radiosurgery (SRS) can deliver one or more high doses of radiation to a small tumor. SRS uses extremely accurate image-guided tumor targeting and patient positioning Therefore, a high dose of radiation can be given without excess damage to normal tissue. SRS can be used to treat small tumors with well-defined edges. It is most commonly used in the treatment of brain or spinal tumors and brain metastases from other cancer types. For the treatment of some brain metastases, patients may receive radiation therapy to the entire brain (called whole-brain radiation therapy) in addition to SRS. In some embodiments, SRS requires the use of a head frame or other device to immobilize the patient during treatment to ensure that the high dose of radiation is delivered accurately.

Stereotactic body radiation therapy (SBRT) delivers radiation therapy in fewer sessions, using smaller radiation fields and higher doses than 3D-CRT in most cases. SBRT may treat tumors that lie outside the brain and spinal cord. Because these tumors are more likely to move with the normal motion of the body, and therefore cannot be targeted as accurately as tumors within the brain or spine, SBRT is usually given in more than one dose. SBRT can be used to treat small, isolated tumors, including cancers in the lung and liver. SBRT systems may be known by their brand names, such as the CyberKnife®.

In proton therapy, external-beam radiation therapy may be delivered by proton. Protons are a type of charged particle. Proton beams differ from photon beams mainly in the way they deposit energy in living tissue. Whereas photons deposit energy in small packets all along their path through tissue, protons deposit much of their energy at the end of their path (called the Bragg peak) and deposit less energy along the way. Use of protons may reduce the exposure of normal tissue to radiation, possibly allowing the delivery of higher doses of radiation to a tumor.

Other charged particle beams such as electron beams may be used to irradiate superficial tumors, such as skin cancer or tumors near the surface of the body, but they cannot travel very far through tissue.

Internal radiation therapy (brachytherapy) is radiation delivered from radiation sources (radioactive materials) placed inside or on the body. Several brachytherapy techniques are used in cancer treatment. Interstitial brachytherapy may use a radiation source placed within tumor tissue, such as within a prostate tumor. Intracavitary brachytherapy may use a source placed within a surgical cavity or a body cavity, such as the chest cavity, near a tumor. Episcleral brachytherapy, which may be used to treat melanoma inside the eye, may use a source that is attached to the eye. In brachytherapy, radioactive isotopes can be sealed in tiny pellets or "seeds." These seeds may be placed in patients using delivery devices, such as needles, catheters, or some other type of carrier. As the isotopes decay naturally, they give off radiation that may damage nearby cancer cells. Brachytherapy may be able to deliver higher doses of radiation to some cancers than external-beam radiation therapy while causing less damage to normal tissue.

Brachytherapy can be given as a low-dose-rate or a high-dose-rate treatment. In low-dose-rate treatment, cancer cells receive continuous low-dose radiation from the source over a period of several days. In high-dose-rate treatment, a robotic machine attached to delivery tubes placed inside the body may guide one or more radioactive sources into or near a tumor, and then removes the sources at the end of each treatment session. High-dose-rate treatment can be given in one or more treatment sessions. An example of a high-dose-rate treatment is the MammoSite® system. Bracytherapy may be used to treat patients with breast cancer who have undergone breast-conserving surgery.

The placement of brachytherapy sources can be temporary or permanent. For permanent brachytherapy, the sources may be surgically sealed within the body and left there, even after all of the radiation has been given off. In some instances, the remaining material (in which the radioactive isotopes were sealed) does not cause any discomfort or harm to the patient. Permanent brachytherapy is a type of low-dose-rate brachytherapy. For temporary brachytherapy, tubes (catheters) or other carriers are used to deliver the radiation sources, and both the carriers and the radiation sources are removed after treatment. Temporary brachytherapy can be either low-dose-rate or high-dose-rate treatment. Brachytherapy may be used alone or in addition to external-beam radiation therapy to provide a "boost" of radiation to a tumor while sparing surrounding normal tissue.

In systemic radiation therapy, a patient may swallow or receive an injection of a radioactive substance, such as radioactive iodine or a radioactive substance bound to a monoclonal antibody. Radioactive iodine (131I) is a type of systemic radiation therapy commonly used to help treat cancer, such as thyroid cancer. Thyroid cells naturally take up radioactive iodine. For systemic radiation therapy for some other types of cancer, a monoclonal antibody may help target the radioactive substance to the right place. The antibody joined to the radioactive substance travels through the blood, locating and killing tumor cells. For example, the drug ibritumomab tiuxetan (Zevalin®) may be used for the treatment of certain types of B-cell non-Hodgkin lymphoma (NHL). The antibody part of this drug recognizes and binds to a protein found on the surface of B lymphocytes. The combination drug regimen of tositumomab and iodine I 131 tositumomab (Bexxar®) may be used for the treatment of certain types of cancer, such as NHL. In this regimen, nonradioactive tositumomab antibodies may be given to patients first, followed by treatment with tositumomab antibodies that have 131I attached. Tositumomab may recognize and bind to the same protein on B lymphocytes as ibritumomab. The nonradioactive form of the antibody may help protect normal B lymphocytes from being damaged by radiation from 131I.

Some systemic radiation therapy drugs relieve pain from cancer that has spread to the bone (bone metastases). This is a type of palliative radiation therapy. The radioactive drugs samarium-153-lexidronam (Quadramet®) and strontium-89 chloride (Metastron®) are examples of radiopharmaceuticals may be used to treat pain from bone metastases.

Biological therapy (sometimes called immunotherapy, biotherapy, biologic therapy, or biological response modifier (BRM) therapy) uses the body's immune system, either directly or indirectly, to fight cancer or to lessen the side effects that may be caused by some cancer treatments. Biological therapies include interferons, interleukins, colony-stimulating factors, monoclonal antibodies, vaccines, gene therapy, and nonspecific immunomodulating agents.

Interferons (IFNs) are types of cytokines that occur naturally in the body. Interferon alpha, interferon beta, and interferon gamma are examples of interferons that may be used in cancer treatment.

Like interferons, interleukins (ILs) are cytokines that occur naturally in the body and can be made in the laboratory. Many interleukins have been identified for the treatment of cancer. For example, interleukin-2 (IL-2 or aldesleukin), interleukin 7, and interleukin 12 have may be used as an anti-cancer treatment. IL-2 may stimulate the growth and activity of many immune cells, such as lymphocytes, that can destroy cancer cells. Interleukins may be used to treat a number of cancers, including leukemia, lymphoma, and brain, colorectal, ovarian, breast, kidney and prostate cancers.

Colony-stimulating factors (CSFs) (sometimes called hematopoietic growth factors) may also be used for the treatment of cancer. Some examples of CSFs include, but are not limited to, G-CSF (filgrastim) and GM-CSF (sargramostim). CSFs may promote the division of bone marrow stem cells and their development into white blood cells, platelets, and red blood cells. Bone marrow is critical to the body's immune system because it is the source of all blood cells. Because anticancer drugs can damage the body's ability to make white blood cells, red blood cells, and platelets, stimulation of the immune system by CSFs may benefit patients undergoing other anti-cancer treatment, thus CSFs may be combined with other anti-cancer therapies, such as chemotherapy. CSFs may be used to treat a large variety of cancers, including lymphoma, leukemia, multiple myeloma, melanoma, and cancers of the brain, lung, esophagus, breast, uterus, ovary, prostate, kidney, colon, and rectum.

Another type of biological therapy includes monoclonal antibodies (MOABs or MoABs). These antibodies may be produced by a single type of cell and may be specific for a particular antigen. To create MOABs, a human cancer cells may be injected into mice. In response, the mouse immune system can make antibodies against these cancer cells. The mouse plasma cells that produce antibodies may be isolated and fused with laboratory-grown cells to create "hybrid" cells called hybridomas. Hybridomas can indefinitely produce large quantities of these pure antibodies, or MOABs. MOABs may be used in cancer treatment in a number of ways. For instance, MOABs that react with specific types of cancer may enhance a patient's immune response to the cancer. MOABs can be programmed to act against cell growth factors, thus interfering with the growth of cancer cells.

MOABs may be linked to other anti-cancer therapies such as chemotherapeutics, radioisotopes (radioactive substances), other biological therapies, or other toxins. When the antibodies latch onto cancer cells, they deliver these anti-cancer therapies directly to the tumor, helping to destroy it. MOABs carrying radioisotopes may also prove useful in diagnosing certain cancers, such as colorectal, ovarian, and prostate.

Rituxan® (rituximab) and Herceptin® (trastuzumab) are examples of MOABs that may be used as a biological therapy. Rituxan may be used for the treatment of non-Hodgkin lymphoma. Herceptin can be used to treat metastatic breast cancer in patients with tumors that produce excess amounts of a protein called HER2. In some embodiments, MOABs are used to treat lymphoma, leukemia, melanoma, and cancers of the brain, breast, lung, kidney, colon, rectum, ovary, prostate, and other areas.

Cancer vaccines are another form of biological therapy. Cancer vaccines may be designed to encourage the patient's immune system to recognize cancer cells. Cancer vaccines may be designed to treat existing cancers (therapeutic vaccines) or to prevent the development of cancer (prophylactic vaccines). Therapeutic vaccines may be injected in a person after cancer is diagnosed. These vaccines may stop the growth of existing tumors, prevent cancer from recurring, or eliminate cancer cells not killed by prior treatments. Cancer vaccines given when the tumor is small may be able to eradicate the cancer. On the other hand, prophylactic vaccines are given to healthy individuals before cancer develops. These vaccines are designed to stimulate the immune system to attack viruses that can cause cancer. By targeting these cancer-causing viruses, development of certain cancers may be prevented. For example, cervarix and gardasil are vaccines to treat human papilloma virus and may prevent cervical cancer. Therapeutic vaccines may be used to treat melanoma, lymphoma, leukemia, and cancers of the brain, breast, lung, kidney, ovary, prostate, pancreas, colon, and rectum. Cancer vaccines can be used in combination with other anti-cancer therapies.

Gene therapy is another example of a biological therapy. Gene therapy may involve introducing genetic material into a person's cells to fight disease. Gene therapy methods may improve a patient's immune response to cancer. For example, a gene may be inserted into an immune cell to enhance its ability to recognize and attack cancer cells. In another approach, cancer cells may be injected with genes that cause the cancer cells to produce cytokines and stimulate the immune system.

In some instances, biological therapy includes nonspecific immunomodulating agents. Nonspecific immunomodulating agents are substances that stimulate or indirectly augment the immune system. Often, these agents target key immune system cells and may cause secondary responses such as increased production of cytokines and immunoglobulins. Two nonspecific immunomodulating agents used in cancer treatment are bacillus Calmette-Guerin (BCG) and levamisole. BCG may be used in the treatment of superficial bladder cancer following surgery. BCG may work by stimulating an inflammatory, and possibly an immune, response. A solution of BCG may be instilled in the bladder. Levamisole is sometimes used along with fluorouracil (5-FU) chemotherapy in the treatment of stage III (Dukes' C) colon cancer following surgery. Levamisole may act to restore depressed immune function.

Photodynamic therapy (PDT) is an anti-cancer treatment that may use a drug, called a photosensitizer or photosensitizing agent, and a particular type of light. When photosensitizers are exposed to a specific wavelength of light, they may produce a form of oxygen that kills nearby cells. A photosensitizer may be activated by light of a specific wavelength. This wavelength determines how far the light can travel into the body. Thus, photosensitizers and wavelengths of light may be used to treat different areas of the body with PDT.

In the first step of PDT for cancer treatment, a photosensitizing agent may be injected into the bloodstream. The agent may be absorbed by cells all over the body but may stay in cancer cells longer than it does in normal cells. Approximately 24 to 72 hours after injection, when most of the agent has left normal cells but remains in cancer cells, the tumor can be exposed to light. The photosensitizer in the tumor can absorb the light and produces an active form of oxygen that destroys nearby cancer cells. In addition to directly killing cancer cells, PDT may shrink or destroy tumors in two other ways. The photosensitizer can damage blood vessels in the tumor, thereby preventing the cancer from receiving necessary nutrients. PDT may also activate the immune system to attack the tumor cells.

The light used for PDT can come from a laser or other sources. Laser light can be directed through fiber optic cables (thin fibers that transmit light) to deliver light to areas inside the body. For example, a fiber optic cable can be inserted through an endoscope (a thin, lighted tube used to look at tissues inside the body) into the lungs or esophagus to treat cancer in these organs. Other light sources include light-emitting diodes (LEDs), which may be used for surface tumors, such as skin cancer. PDT is usually performed as an outpatient procedure. PDT may also be repeated and may be used with other therapies, such as surgery, radiation, or chemotherapy.

Extracorporeal photopheresis (ECP) is a type of PDT in which a machine may be used to collect the patient's blood cells. The patient's blood cells may be treated outside the body with a photosensitizing agent, exposed to light, and then returned to the patient. ECP may be used to help lessen the severity of skin symptoms of cutaneous T-cell lymphoma that has not responded to other therapies. ECP may be used to treat other blood cancers, and may also help reduce rejection after transplants.

Additionally, photosensitizing agent, such as porfimer sodium or Photofrin®, may be used in PDT to treat or relieve the symptoms of esophageal cancer and non-small cell lung cancer. Porfimer sodium may relieve symptoms of esophageal cancer when the cancer obstructs the esophagus or when the cancer cannot be satisfactorily treated with laser therapy alone. Porfimer sodium may be used to treat non-small cell lung cancer in patients for whom the usual treatments are not appropriate, and to relieve symptoms in patients with non-small cell lung cancer that obstructs the airways. Porfimer sodium may also be used for the treatment of precancerous lesions in patients with Barrett esophagus, a condition that can lead to esophageal cancer.

Laser therapy may use high-intensity light to treat cancer and other illnesses. Lasers can be used to shrink or destroy tumors or precancerous growths. Lasers are most commonly used to treat superficial cancers (cancers on the surface of the body or the lining of internal organs) such as basal cell skin cancer and the very early stages of some cancers, such as cervical, penile, vaginal, vulvar, and non-small cell lung cancer.

Lasers may also be used to relieve certain symptoms of cancer, such as bleeding or obstruction. For example, lasers can be used to shrink or destroy a tumor that is blocking a patient's trachea (windpipe) or esophagus. Lasers also can be used to remove colon polyps or tumors that are blocking the colon or stomach.

Laser therapy is often given through a flexible endoscope (a thin, lighted tube used to look at tissues inside the body). The endoscope is fitted with optical fibers (thin fibers that transmit light). It is inserted through an opening in the body, such as the mouth, nose, anus, or vagina. Laser light is then precisely aimed to cut or destroy a tumor.

Laser-induced interstitial thermotherapy (LITT), or interstitial laser photocoagulation, also uses lasers to treat some cancers. LITT is similar to a cancer treatment called hyperthermia, which uses heat to shrink tumors by damaging or killing cancer cells. During LITT, an optical fiber is inserted into a tumor. Laser light at the tip of the fiber raises the temperature of the tumor cells and damages or destroys them. LITT is sometimes used to shrink tumors in the liver.

Laser therapy can be used alone, but most often it is combined with other treatments, such as surgery, chemotherapy, or radiation therapy. In addition, lasers can seal nerve endings to reduce pain after surgery and seal lymph vessels to reduce swelling and limit the spread of tumor cells.

Lasers used to treat cancer may include carbon dioxide ($CO_2$) lasers, argon lasers, and neodymium:yttrium-aluminum-garnet (Nd:YAG) lasers. Each of these can shrink or destroy tumors and can be used with endoscopes. $CO_2$ and argon lasers can cut the skin's surface without going into deeper layers. Thus, they can be used to remove superficial cancers, such as skin cancer. In contrast, the Nd:YAG laser is more commonly applied through an endoscope to treat internal organs, such as the uterus, esophagus, and colon. Nd:YAG laser light can also travel through optical fibers into specific areas of the body during LITT. Argon lasers are often used to activate the drugs used in PDT.

For patients with high test scores consistent with systemic disease outcome after prostatectomy, additional treatment modalities such as adjuvant chemotherapy (e.g., docetaxel, mitoxantrone and prednisone), systemic radiation therapy (e.g., samarium or strontium) and/or anti-androgen therapy (e.g., surgical castration, finasteride, dutasteride) can be designated. Such patients would likely be treated immediately with anti-androgen therapy alone or in combination with radiation therapy in order to eliminate presumed micrometastatic disease, which cannot be detected clinically but can be revealed by the target sequence expression signature.

Such patients can also be more closely monitored for signs of disease progression. For patients with intermediate test scores consistent with biochemical recurrence only (BCR-only or elevated PSA that does not rapidly become manifested as systemic disease only localized adjuvant therapy (e.g., radiation therapy of the prostate bed) or short course of anti-androgen therapy would likely be administered. For patients with low scores or scores consistent with no evidence of disease (NED) adjuvant therapy would not likely be recommended by their physicians in order to avoid treatment-related side effects such as metabolic syndrome (e.g., hypertension, diabetes and/or weight gain), osteoporosis, proctitis, incontinence or impotence. Patients with samples consistent with NED could be designated for watchful waiting, or for no treatment. Patients with test scores that do not correlate with systemic disease but who have successive PSA increases could be designated for watchful waiting, increased monitoring, or lower dose or shorter duration anti-androgen therapy.

Target sequences can be grouped so that information obtained about the set of target sequences in the group can be used to make or assist in making a clinically relevant judgment such as a diagnosis, prognosis, or treatment choice.

A patient report is also provided comprising a representation of measured expression levels of a plurality of target sequences in a biological sample from the patient, wherein the representation comprises expression levels of target sequences corresponding to any one, two, three, four, five, six, eight, ten, twenty, thirty or more of the target sequences, the subsets described herein, or a combination thereof. In some embodiments, the representation of the measured expression level(s) may take the form of a linear or nonlinear combination of expression levels of the target sequences of interest. The patient report may be provided in a machine (e.g., a computer) readable format and/or in a hard (paper) copy. The report can also include standard measurements of expression levels of said plurality of target sequences from one or more sets of patients with known disease status and/or outcome. The report can be used to inform the patient and/or treating physician of the expression levels of the expressed target sequences, the likely medical diagnosis and/or implications, and optionally may recommend a treatment modality for the patient.

Also provided are representations of the gene expression profiles useful for treating, diagnosing, prognosticating, and otherwise assessing disease. In some embodiments, these profile representations are reduced to a medium that can be automatically read by a machine such as computer readable media (magnetic, optical, and the like). The articles can also include instructions for assessing the gene expression profiles in such media. For example, the articles may comprise a readable storage form having computer instructions for comparing gene expression profiles of the portfolios of genes described above. The articles may also have gene expression profiles digitally recorded therein so that they may be compared with gene expression data from patient samples. In some embodiments, the profiles are recorded in different representational format. A graphical recordation is one such format. Clustering algorithms can assist in the visualization of such data.

Clinical Associations and Patient Outcomes

Molecular subtypes of the present disclosure have distinct clinical associations. Clinical associations that correlate to molecular subtypes include, for example, preoperative serum PSA, Gleason score (GS), extraprostatic extension (EPE), surgical margin status (SM), lymph node involvement (LNI), and seminal vesicle invasion (SVI). In some embodiments, molecular subtypes of the present disclosure are used to predict patient outcomes such as biochemical recurrence (BCR), metastasis (MET) and prostate cancer death (PCSM) after radical prostatectomy.

Treatment Response Prediction

In some embodiments, the molecular subtypes of the present disclosure are useful for predicting response to radiation therapy. In some embodiments, the molecular subtypes of the present disclosure are useful for predicting response to radiation therapy following radical prostatectomy. Tumors with higher levels of PD-L2 have worse outcomes without radiation therapy when compared to tumors with lower PD-L2, but outcomes improve with radiation therapy (see Example 1). Therefore, higher levels of PD-L2 are predictive that a patient will benefit from radiation therapy.

In some embodiments, the methods of the present disclosure are useful for predicting survival outcomes of patients. Higher immune content scores correlate with shorter biochemical recurrence free survival, shorter distant metastasis free survival, shorter prostate cancer-specific survival, and shorter overall survival. Higher levels of activated mast cells, activated NK cells, and activated dendritic cells correlate with longer distant metastasis free survival, whereas higher levels of resting mast cells, resting NK cells, and resting dendritic cells correlate with shorter distant metastasis free survival. In addition, the prognosis of a patient may be determined based on the calculated levels of macrophages. For example, higher levels of M0 macrophages correlate with longer distant metastasis free survival, whereas higher levels of M1 macrophages or M2 macrophages correlate with shorter distant metastasis free survival. A higher ratio of M1 and M2 macrophages to M0 macrophages indicates that a patient will have a shorter distant metastasis free survival. Higher levels of T cells (e.g., CD8 T-cells or CD4 T-cells, naive or activated memory T cells) also correlate with shorter distant metastasis free survival. In some embodiments, the immune cell types assayed in the methods of the present disclosure are selected from the group consisting of activated mast cells, resting mast cells, activated natural killer (NK) cells, resting NK cells, activated dendritic cells, resting dendritic cells, M0 macrophages, M1 macrophages, M2 macrophages, and T cells.

In some embodiments, the prognosis of the patient is determined based on levels of gene expression of one or more biomarkers. For example, higher levels of T cell-specific CTLA-4 gene expression correlate with shorter biochemical recurrence free survival. Higher levels of immune cell-specific gene expression of PD-1 indicate that the patient will have longer biochemical recurrence free survival, longer distant metastasis free survival, or longer prostate cancer-specific survival. Higher levels of immune cell-specific gene expression of PD-L1 correlate with shorter biochemical recurrence free survival, shorter distant metastasis free survival, and shorter prostate cancer-specific survival. Higher levels of immune cell-specific gene expression of PD-L2 correlate with shorter biochemical recurrence free survival, shorter distant metastasis free survival, and shorter prostate cancer-specific survival.

EXAMPLES

Example 1: Immune Cell Types and Gene Expression is Prognostic for Prostate Cancer in Humans It is difficult and laborious to histologically quantify individual immune cell types in significant cohorts of prostate cancer samples, contributing to the inconclusive data in the literature. However, there exist computational tools, which allow for the estimation of relative immune content and relative contributions of different cell types based on mixed cellular gene expression data (Abbas et al., *Genes Immun* 6, 319-331 (2005); Newman et al., *Nat Methods* 12, 453-457 (2015)). In the largest high-throughput study in prostate cancer to date, we investigated the immune landscape of primary prostate cancer and the relationships between immune cell types, immunotherapy targets, and clinical outcomes in 1,567 retrospective radical prostatectomy samples with long-term metastasis and survival outcomes, and 7826 prospective radical prostatectomy samples from clinical use of a commercially available genome-wide assay.

Materials and Methods
Clinical Microarray Samples

Human Exon 1.0 ST microarray (Thermo-Fisher, Carlsbad, CA) data from formalin-fixed paraffin-embedded samples were obtained from six published retrospective radical prostatectomy cohorts (n=1,567) and one prospective radical prostatectomy cohort (n=7826). Microarray processing was performed in a CLIA-certified clinical operations laboratory (GenomeDx Biosciences, Inc, San Diego, CA) and normalization was performed as previously described (Zhao et al., *Lancet Oncol*, (2016); Zhao et al., *Clin Cancer Res* 22, 1777-1786 (2016)). Retrospective cohorts were obtained from the Mayo Clinic (MCI and MCII) (Karnes et al., *J Urol* 190, 2047-2053 (2013); Erho et al., *PLoS One* 8, e66855 (2013)), Cleveland Clinic (CC) (Klein et al., *Eur Urol* 67, 778-786 (2015)), Johns Hopkins University (JHU) (Ross et al., *Eur Urol*, 69, 157-165 (2015)), Thomas Jefferson University (TJU) (Den et al., *Int J Radiat Oncol Biol Phys* 89, 1038-1046 (2014)), and Durham VA (DVA) (Freedland et al., *Eur Urol,* 70, 588-596 (2016)). Data collection was approved and supervised by local institutional review boards (IRB). Microarray data is available on Gene Expression Omnibus with accession numbers GSE46691, GSE62116, GSE72291, GSE62667, GSE79956, GSE79957, and GSE79915. Additional details about each cohort can be found in the original manuscripts. De-identified, anonymized, and prospectively-collected patients from clinical use of the Decipher test from radical prostatectomy samples were obtained from Decipher GRID™ (ClinicalTrials.gov ID: NCT02609269) (Zhao et al., *JAMA Oncol*, (2017)). Clinical outcomes were available for the retrospective datasets, but were not available for the prospective cohort.

Pathway and Immune Content Analysis

Hallmark pathway gene lists were downloaded from the Molecular Signatures Database (Liberzon et al., *Cell Syst* 1, 417-425 (2015)), and pathways unrelated to prostate cancer were removed. Pathway scores were calculated by computing the average gene expression within each pathway. This same approach was used for calculating an estimated overall immune content score, but using the immune cell specific gene lists described by Abbas et al. with very conservative inclusion criteria of only genes with a fold-change≥10 in immune cells compared to normal tissues (Abbas et al., *Genes Immun* 6, 319-331 (2005)). We then de-convoluted the relative contributions of 22 different immune cell types using Cibersort (Newman et al., *Nat Methods* 12, 453-457 (2015)) and only included samples with a p-value≤0.1 in order to exclude samples with poor de-convolution results (this is also significantly associated with a higher estimated immune content score, $p<0.0001$). Finally, we scaled the relative cell-type specific Cibersort data by the immune content score (setting the minimum scaling factor to 1). To scale immune-specific genes or specific cell types to overall immune content or other cell types, both the numerator and denominator were first shifted to all be positive and then the ratio was log-transformed. For heatmaps, pathway scores were first scaled to Z-scores by sample and then by pathway.

Statistical Methods

The primary clinical endpoint was distant metastasis free survival, and secondary endpoints were biochemical recurrence free survival, prostate cancer specific survival, and overall survival. Cox regression was utilized to analyze all time-to-event data. All variables were treated as continuous variables in order to verify that our p-values represented a true "dose-response" relationship. All variables were scaled by two standard deviations (such that 1 unit of change is approximately 2SDs representing about ⅔ of the range in a normally distributed variable) in order to compare hazard ratios between variables with different ranges. Kaplan-Meier curves compared these data using quartiles. However, for some immune cell types, the majority (>50%) of the samples were estimated to have zero of that cell type. In those cases, we dichotomized those variables to either absent (0) or present (>0) and utilized a log-rank test. Predicting response to PORT used a multivariate interaction analysis adjusting for treatment selection bias using CAPRA-S, and for post-operative androgen deprivation therapy (ADT). P-values<0.05 were considered significant.

These results showed that immune cell types and immune-cell gene expression are prognostic for prostate cancer in humans. These results further showed that the methods of the present disclosure are useful for prognosing and treating prostate cancer in humans. The results also showed that methods of the present disclosure are useful for identifying individuals in need of treatment for prostate cancer who will be responsive to radiation therapy.

In another series of experiments, Human Exon 1.0 ST microarray (Thermo-Fisher, Carlsbad, CA) data from the formalin-fixed paraffin-embedded samples described above were analyzed as follows. Hallmark pathway gene lists were downloaded from the Molecular Signatures Database and pathways unrelated to prostate cancer were removed as shown in Table 1 below. Pathway scores were calculated by computing the mean gene expression within each pathway. For heatmaps, pathway scores were first scaled to Z-scores by sample and then by pathway.

TABLE 1

Excluded Hallmark Pathways

| Pathway | Rational for Exclusion |
| --- | --- |
| Adipogenesis | adipogenesis does not occur in the adult prostate |
| Myogenesis | myogenesis does not occur in the adult prostate |
| Protein secretion | too generic to be useful, as the pathway description does not specify what type of protein is being secreted |
| UV response | prostate tumors are not exposed to UV light |
| Heme metabolism | heme metabolism should be minimal in the prostate |

TABLE 1-continued

Excluded Hallmark Pathways

| Pathway | Rational for Exclusion |
| --- | --- |
| Coagulation | Coagulation factors are not made in the prostate |
| Bile acid metabolism | Bile acid is not metabolized in the prostate |
| Peroxisomes | Not known to play a major role in prostate tumorogenesis |
| Allograft rejection | No allografts are present in prostate tumors |
| Spermatogenesis | There is no spermatogenesis in the prostate |
| Pancreas beta cells | There are no pancreatic beta cells in the prostate |

Immune Content Score

The immune content score was calculated by first selecting immune cell specific genes described by Abbas et al. (Genes Immun 2005; 6(4):319-31) with a fold-change≥10 in immune cells compared to normal tissues which were present on our microarray platform. The immune content score of a particular sample is the mean gene expression of the 265 genes (see Table 2) plus a constant value: the minimum of the mean gene expression of the samples plus one. The gene symbols in Table 2 are the official HNGC gene symbols (see www.genenames.org/cgi-bin/statistics, last updated Feb. 8, 2018 02:08:36). The addition of the constant was performed to ensure that the values are ≥1 since the immune content score is also used as a scaling factor and thus, in some embodiments, needs to be positive. A minimum value of one was chosen so that scaling by the immune content score would not change any variables in the samples with the lowest immune content scores, as opposed to zero which would mean that any variables in the samples with the lowest immune content scores would become zero when multiplied.

TABLE 2

Immune Cell Specific Genes

| | | | | | | | | |
| --- | --- | --- | --- | --- | --- | --- | --- | --- |
| CCL17 | KLRF1 | TNIP3 | PRF1 | IL19 | NUPL1 | RLN3 | KYNU | UHRF1 |
| LTA | IL1B | NKG7 | BTLA | RASGRP2 | CST7 | SLC16A3 | MARCKS | RASGRP4 |
| SERPINB2 | GPR132 | PLXNC1 | CXCL3 | LYN | CCR2 | LYAR | KIR3DL1 | NUSAP1 |
| CCL1 | CD80 | TFRC | EMR2 | CX3CR1 | ADAM8 | CORO1A | DCSTAMP | KLRB1 |
| XCL2 | IL12B | ZAP70 | EOMES | MYO1G | INHBA | PLAUR | IL7R | HELLS |
| SERPINB7 | BLK | MMP9 | ITGA4 | RPEL1 | QPCT | NCF2 | IL1RN | EVI2B |
| SLAMF7 | ALOX15 | GZMA | LILRB1 | NCF4 | MYO1F | YPEL1 | CD19 | JAM3 |
| EBI3 | CCR7 | EREG | CD86 | SOD2 | SYK | RNASE6 | TREM2 | CKLF |
| CCL22 | PTPRC | PILRA | IL18RAP | SAMD3 | HSPA6 | CCR1 | CXCR5 | CXCL10 |
| IL24 | CCL24 | SELL | LAG3 | GPR18 | CD37 | CCL5 | GNA15 | TBL1X |
| IL2RA | CTLA4 | IGSF6 | CARD11 | GZMM | TBX21 | CBL | FCER1A | MCM2 |
| CD1E | BANK1 | P2RY8 | TNFRSF1B | KLRC4 | ZFYVE16 | SNX9 | CD48 | RNASE2 |
| IL1A | STK4 | CLC | CD1A | CSF3R | TNFSF13B | LSP1 | CFLAR | HAVCR1 |
| IFNG | TNFRSF4 | CD1C | TRAF1 | BIRC3 | CXCR6 | PIK3CD | BCL2A1 | FCGR2B |
| CD1B | PLA2G7 | IRF4 | RGS18 | CXCL1 | PPBP | CDCA5 | CXCR4 | EAF2 |
| IL9 | PMAIP1 | SLC7A11 | MAP4K1 | CD7 | BCL11B | CYBB | FBXO5 | TLR8 |
| XCL1 | NFE2 | CCND2 | IL2RB | CD69 | BIN2 | ARHGAP9 | RASSF4 | RRM2 |
| ZBP1 | ICOS | MYBL1 | APOBEC3G | PTGDR | CRTAM | TBC1D13 | CD3D | STAT1 |
| LTB | CCL3 | TOP2A | CRLF2 | MCM10 | TLR1 | CD79A | USP15 | GLIPR1 |
| VNN2 | NCOA3 | IL3RA | PLEK | ICAM3 | IL23A | DTNB | ASPM | MMP14 |
| CSF2 | CXCL5 | FSCN1 | HLA-DOB | P2RX5 | S100A12 | PTPN22 | G6PD | CD2 |
| IL17F | KLRD1 | GPR84 | GZMK | HK3 | RUNX3 | ADORA2A | TLR2 | REL |
| KLRC3 | TLR10 | DAPP1 | ZBED2 | TNFRSF9 | SAMSN1 | DPEP2 | GPR114 | SLAMF1 |
| CYP1B1 | TCL1A | FPR1 | LILRA1 | RIT1 | UBE2J1 | MSC | CCL20 | MMP12 |
| PROK2 | TNF | IFI16 | CCL4 | PTPRCAP | SLC38A6 | S100A9 | CENPH | |
| CD3G | GM2A | CXCL11 | GCA | LST1 | CD8A | MPEG1 | CD3E | |
| TNFAIP6 | LCK | MNDA | ABTB1 | ANP32E | LILRB2 | SEC14L1 | MTF1 | |
| IL22 | FCAR | LAT | APOBEC3A | CD79B | RASGRP3 | ITGB7 | FRAT2 | |
| GZMB | LEF1 | FCN1 | CTSW | ITK | NCR3 | RAC2 | POU2AF1 | |
| GNLY | KIR3DL2 | IL4I1 | CCR3 | ITGAL | GBP5 | CCL13 | UBE2S | |

Immune Cell Types

Cibersort is a method to estimate the relative proportion of different immune cell types. We restricted analyses using Cibersort to the 678 retrospective and 5694 prospective samples with a Cibersort de-convolution p-value≤0.1. This p-value threshold was chosen to exclude samples with poor de-convolution results, and is associated with a higher estimated immune content score (T-test p<0.0001). Ratios were calculated between the active versus inactive immune cell types from Cibersort. To avoid a divide-by-zero error, a small number (0.01) was added to both the numerator and the denominator in order to shift all values to be >0 and to allow for a ratio to be calculated. $Log_2$-transformation was applied to the ratios in order to make the values more easily comparable (e.g. 2 or ½ express the same change in magnitude). For T-cells, which were not divided into active and inactive subgroups by Cibersort, we estimated the total T-cell content by multiplying the relative cell-type specific Cibersort predicted fraction (which ranges from 0 to 1) by the immune content score Immune Checkpoint Molecules We investigated several immune checkpoint molecules that are targets of clinically utilized drugs (anti-CTLA-4, anti-PD-1, anti-PD-L1 and anti-PD-L2) for associations to clinical outcomes. CTLA-4 is thought to be highly specific to T-cells, thus, to correct for T-cell content per sample, we divided CTLA-4 gene expression values by the estimated total T-cell content (the sum of the relative fractions of T-cells from Cibersort multiplied by our immune content score). PD-1 is thought to be specific to immune cells (not only T-cells), thus PD-1 gene expression was divided by the immune content score. PD-L1 and PD-L2 expression were not scaled, because they are not thought to be immune cell specific. Gene set enrichment analysis (GSEA) was used to investigate which pathways are correlated to PD-L2. First, the Spearman's correlation coefficient was calculated for each gene to PD-L2 expression across all 9393 samples. The correlation coefficients were input as a pre-ranked list to run GSEA. 5815 gene sets from Hallmarks, C2:CP, and C5:GO-BP were included.

Statistical Methods

The primary clinical endpoint was distant metastasis free survival (DMFS). Secondary endpoints were biochemical recurrence free survival (bRFS), prostate cancer specific survival (PCSS), and overall survival (OS). Cox regression was used to analyze time-to-event data, with variables treated as continuous. Since the hazard ratio is interpreted per unit change, continuous variables input into the Cox models were divided by two standard deviations (such that 1 unit of change is approximately 2SDs representing about ⅔ of the range in a normally distributed variable) in order to standardize hazard ratios between variables with different ranges. While we discretized the variables into quartiles for visualization purposes in the Kaplan-Meier curves, the reported p-values and hazard ratios utilized Cox regression as described. Predicting response to PORT used a multivariate interaction analysis adjusting for treatment selection bias using CAPRA-S, and for post-operative androgen deprivation therapy (ADT). P-values<0.05 were considered statistically significant. All statistical tests were two-sided.

In total, 12 pre-specified variables were assessed against clinical endpoints: The immune content score, seven cell types, and four immune checkpoint targets targetable by current clinically used therapies (CTLA-4, PD-1, PD-L1, PD-L2). The seven cell types assessed for clinical endpoints are mast cells, dendritic cells, NK cells, T-cells, T-regs, B-cells, and macrophages. Monocytes were excluded since they are primarily confined to the blood and become macrophages upon extravasation. Eosinophils and neutrophils were excluded since over 50% of the samples had 0% of these cell types. Results show unadjusted p-values, all p-values for distant metastasis (the primary endpoint) remain statistically significant after adjusting for 12 variables using the Benjamini-Hochberg method (see Table 3). Subset analyses for each pre-specified variable with respect to PSA, Gleason score, extracapsular extension (ECE), seminal vesicle invasion (SVI), margin status, and lymph node involvement (LNI) are shown in FIGS. 6A-6I.

TABLE 3

Benjamini-Hochberg False Discovery Rate for the primary endpoint DMFS

|  | Unadjusted p-value DMFS | FDR-adjusted p-value DMFS |
| --- | --- | --- |
| ICS | 0.00056 | 0.00309 |
| T-regs | 0.22060 | 0.25169 |
| T-cells | 0.00002 | 0.00021 |
| B-cells | 0.92567 | 0.92567 |
| Macrophages | 0.00154 | 0.00499 |
| Mast Cells | 0.00871 | 0.01597 |
| NK cells | 0.1237 | 0.01926 |
| Dendritic cells | 0.00182 | 0.00499 |
| PD1 | 0.00228 | 0.00503 |
| CTLA4 | 0.02793 | 0.03414 |
| PDL1 | 0.23072 | 0.25379 |
| PDL2 | 0.01400 | 0.01926 |

Results

Immune Landscape of Prostate Cancer

Unsupervised hierarchical clustering of all samples (N=9393) was performed using the hallmark biological pathways to investigate underlying patterns. Notably, all of the immune-related pathways (interferon alpha, gamma, IL2, IL6, inflammatory response, and the complement pathway) were highly inter-correlated and formed an immune cluster. Our estimated immune content score clustered with the hallmark immune pathways, despite only 2-23% of available genes overlapping with those pathways. The androgen response pathway appeared inversely correlated with the immune pathways. We de-convoluted our expression data into individual immune cell types, and show the distribution of immune cell types in the 6372 samples (out of the original 9393) which were confidently predicted (p≤0.1).

Immune Cell Types are Prognostic

The associations between the immune content score and clinical outcomes in all 1567 samples (median follow-up: 10.2 years) was examined. Increased immune content score was associated with worse biochemical recurrence free survival (p=0.0002, HR=1.26 [95% CI=1.12-1.42]), distant metastasis free survival (p=0.0006, 1.34 [95% CI=1.13-1.58]), prostate cancer specific survival (p=0.0003, HR=1.53 [95% CI=1.21-1.92]), and overall survival (p=0.006, HR=1.27 [95% CI=1.07-1.50]). As shown in Table 4 below, the immune content score was concordantly associated with PSA, Gleason score, and LNI in both the retrospective and prospective data.

TABLE 4

Clinicopathologic variables and the immune content score

| | Retrospective | | | | | Prospective | | | | |
|---|---|---|---|---|---|---|---|---|---|---|
| | N | Mean | SD | Missing (%) | P-value | N | Mean | SD | Missing (%) | P-value |
| Age ≤65 | 990 | −0.0916 | 1.01 | 3 (0.002) | 1.07E−06 | 2945 | −0.0204 | 1.02 | 1362 (0.174) | 0.602085539 |
| Age >65 | 574 | 0.16 | 0.956 | | | 3519 | −0.00742 | 0.981 | | |
| PSA <10 | 907 | −0.0851 | 1.02 | 28 (0.018) | 5.31E−09 | 3730 | −0.0343 | 1 | 2945 (0.376) | 0.013904074 |
| PSA 10-20 | 389 | −0.0262 | 0.936 | | | 842 | −0.0539 | 0.962 | | |
| PSA >20 | 243 | 0.357 | 0.971 | | | 309 | 0.132 | 1 | | |
| Gleason 6 | 144 | −0.0887 | 0.906 | 4 (0.003) | 1.55E−06 | 481 | −0.162 | 0.95 | 1362 (0.174) | 4.46E−06 |
| Gleason 7 | 881 | −0.104 | 0.9 | | | 4612 | −0.0283 | 0.971 | | |
| Gleason 8-10 | 538 | 0.197 | 1.14 | | | 1371 | 0.0895 | 1.09 | | |
| Margins− | 772 | −0.0267 | 0.964 | 3 (0.002) | 0.2847589 | 3134 | −0.0545 | 1 | 1482 (0.189) | 0.001882767 |
| Margins+ | 792 | 0.0274 | 1.03 | | | 3210 | 0.0232 | 0.987 | | |
| No SVI | 1115 | −0.0801 | 0.933 | 5 (0.004) | 2.48E−06 | 5072 | −0.0184 | 0.975 | 1641 (0.21) | 0.584126558 |
| SVI | 446 | 0.207 | 1.13 | | | 1113 | 0.00134 | 1.11 | | |
| No LNI | 1393 | −0.0268 | 1.01 | 4 (0.003) | 0.000346874 | 5328 | −0.0199 | 0.992 | 2223 (0.284) | 0.0112286 |
| LNI | 170 | 0.248 | 0.93 | | | 275 | 0.157 | 1.13 | | |
| No ECE | 678 | −0.0547 | 0.9 | 7 (0.004) | 0.046731183 | 3011 | −0.0224 | 0.972 | 1620 (0.207) | 0.660201397 |
| ECE | 882 | 0.0447 | 1.07 | | | 3195 | −0.0112 | 1.03 | | |
| No RT | 1054 | −0.0165 | 0.968 | 3 (0.002) | 0.343073972 | | | | | |
| RT | 510 | 0.0364 | 1.07 | | | | | | | |
| No ADT | 870 | −0.0666 | 0.916 | 186 (0.119) | 1.59E−13 | | | | | |
| ADT | 511 | 0.361 | 1.08 | | | | | | | |

Figure 6A:
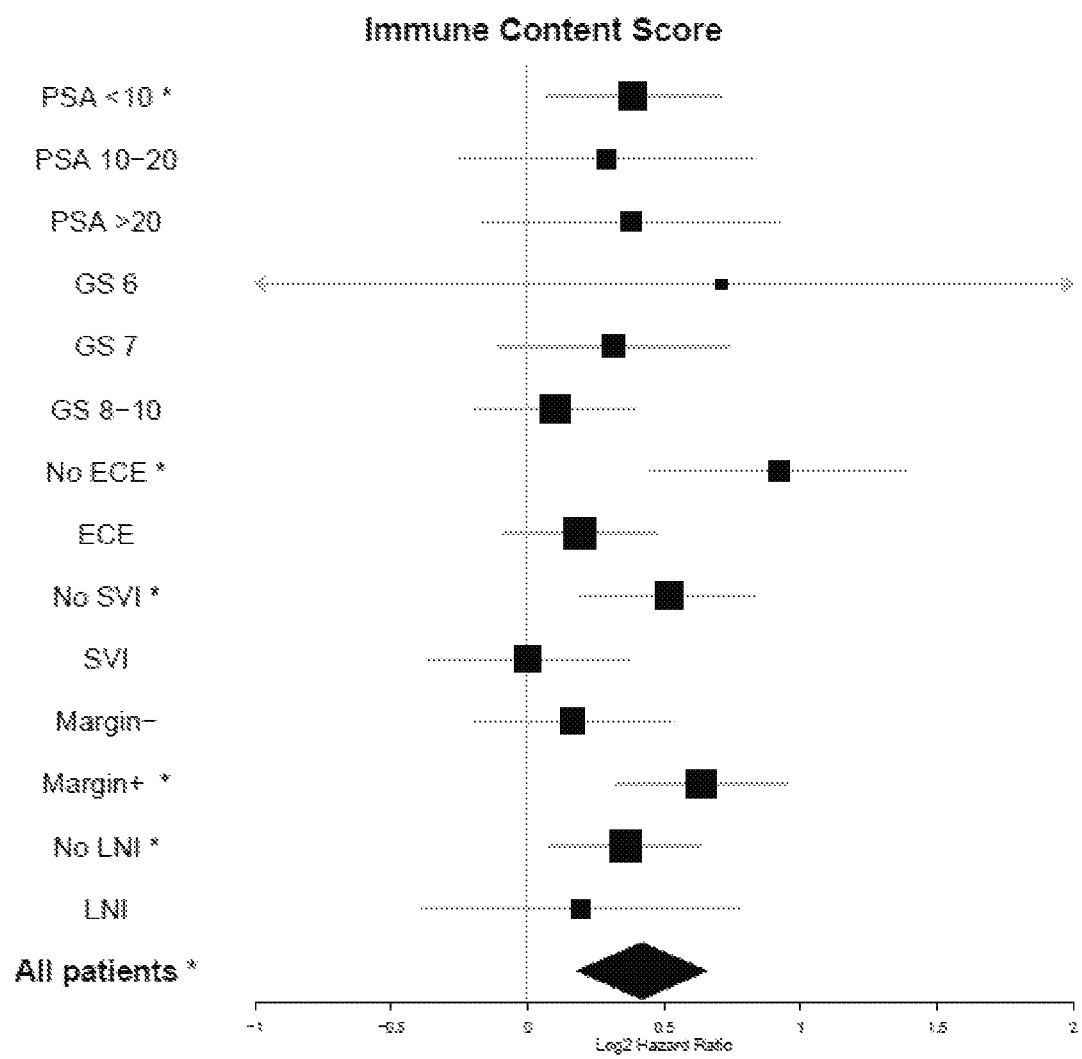
FIGS. 6A-6I shows forest plots with log 2 hazard ratios.
Figure 6B:
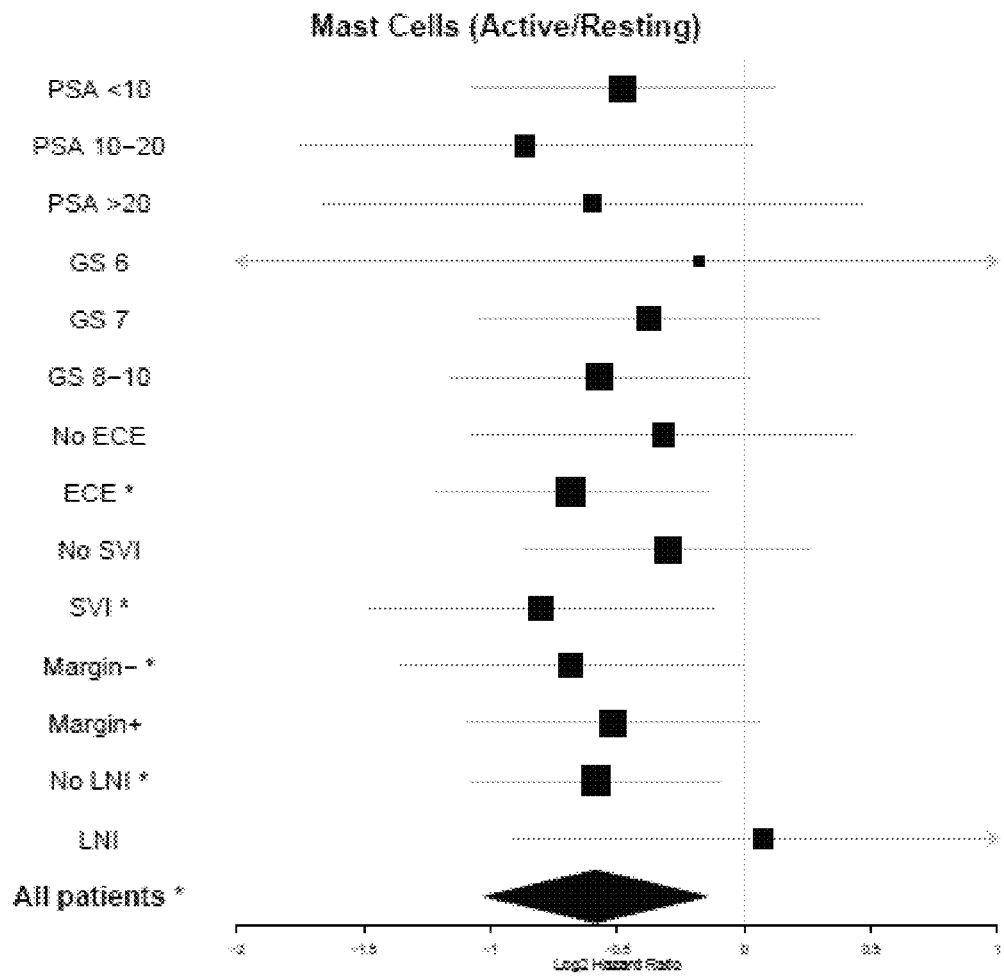
Figure 6C:
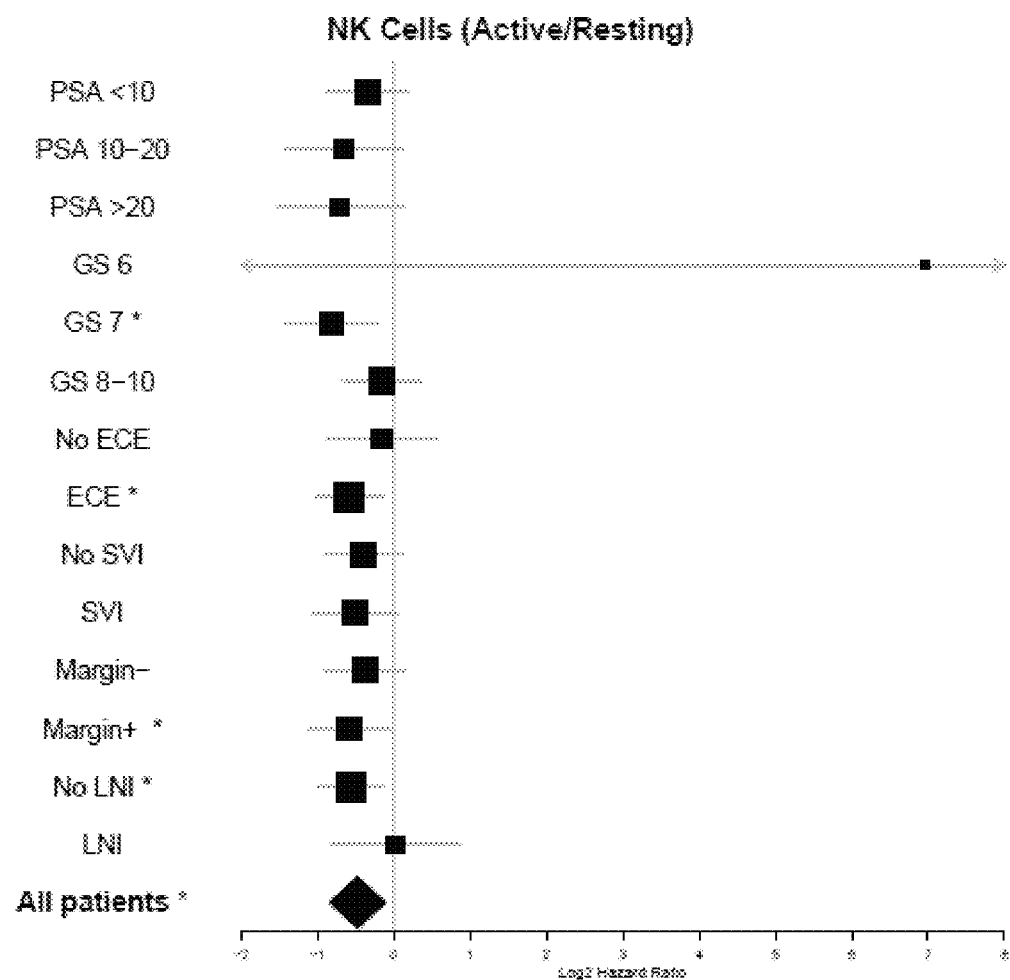
Figure 6D:
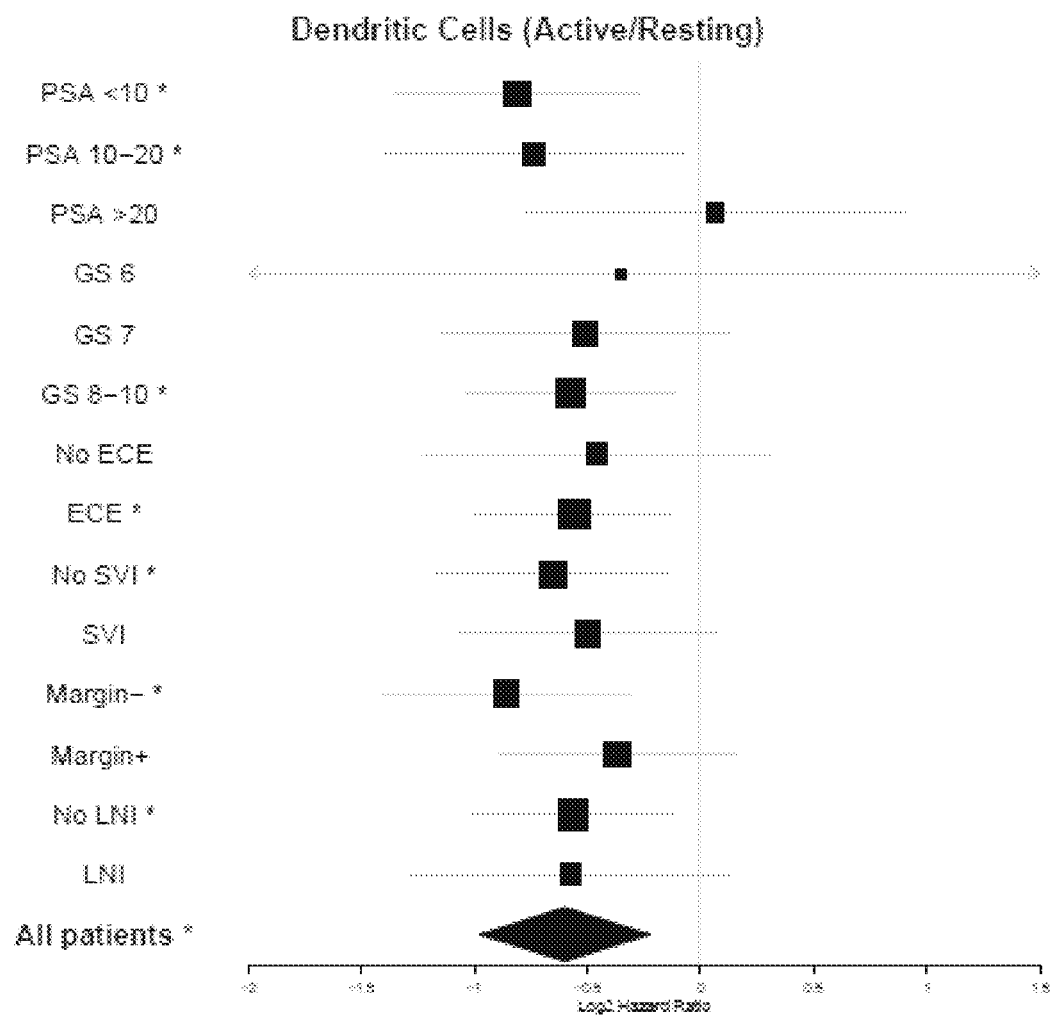
Figure 6E:
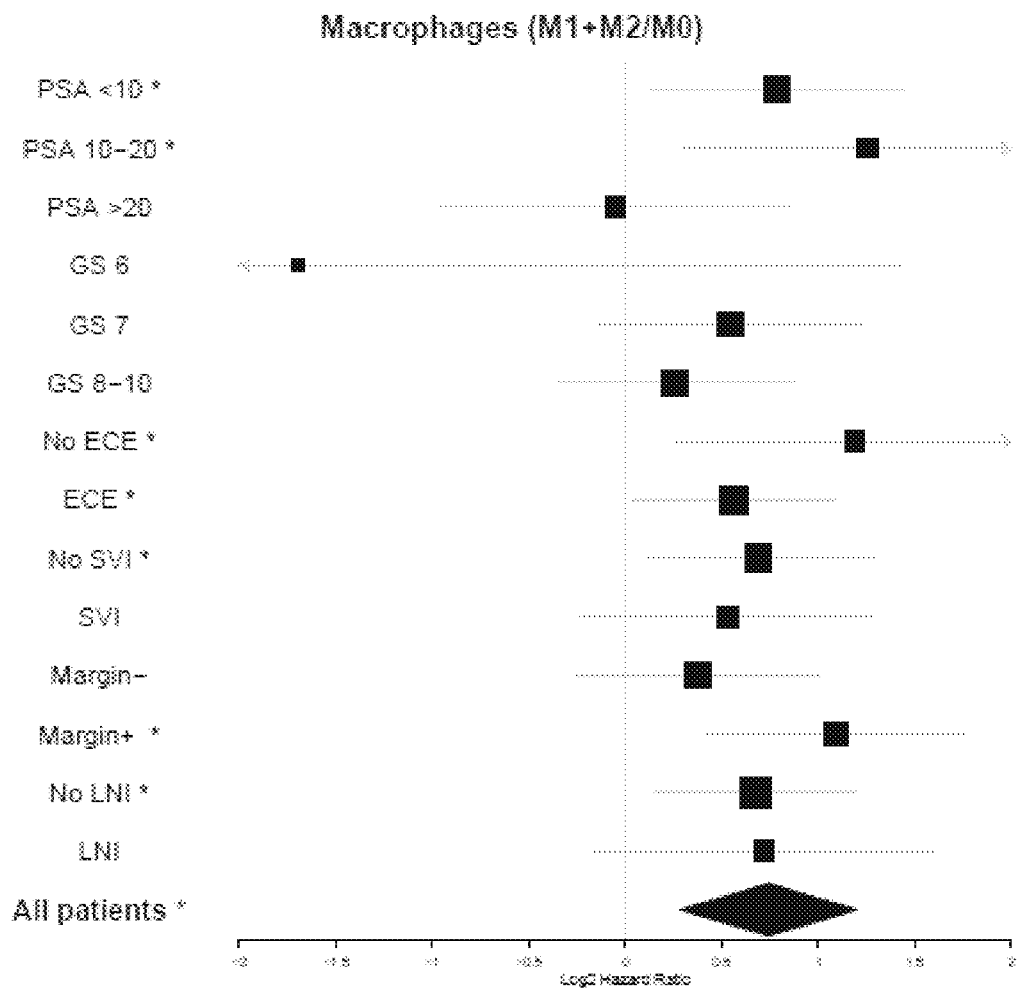
Figure 6F:
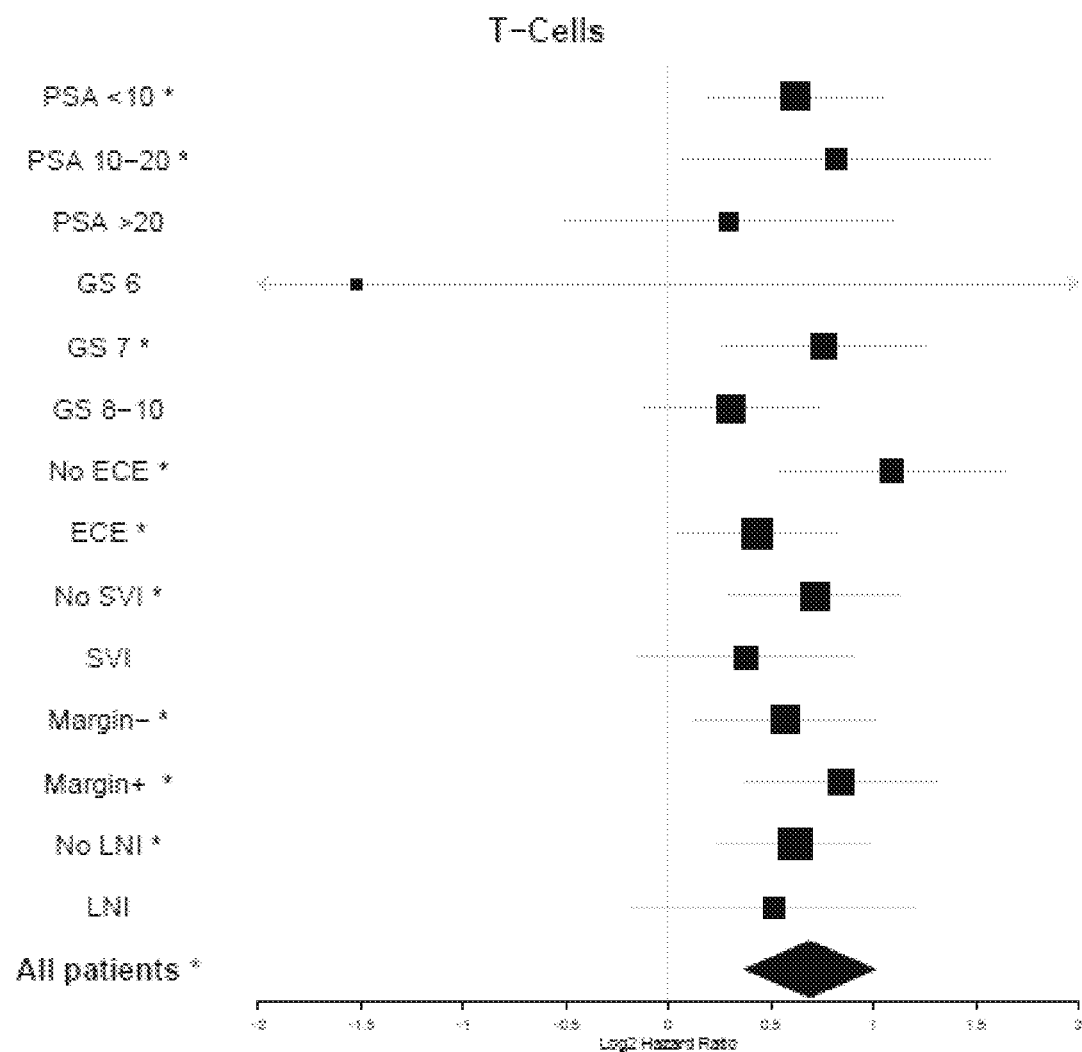

When de-convoluted into individual immune cell types, 678 (out of the original 1567) retrospective samples had Cibersort de-convolution p-values≤0.1. The median follow-up in this subcohort was 9.3 years. To understand the effect of the balance of activated versus resting cells, we calculated the ratio of activated to resting mast cells and NK cells, and found that they conferred improved DMFS (mast cells: p=0.0087, HR=0.67 [95% CI=0.49-0.9], NK cells: p=0.012, HR=0.72 [95% CI=0.56-0.93]; FIGS. 6B and 6C). Dendritic cells are a key component of Sipuleucel-T, which is made by extracting antigen presenting cells (APCs), primarily dendritic cells, then activating them ex-vivo. We found that higher ratios of activated to resting dendritic cells conferred improved DMFS (p=0.0018, HR=0.66 [95% CI=0.51-0.86], FIG. 6D), consistent with the biological rationale for Sipuleucel-T.

Figure 7A:
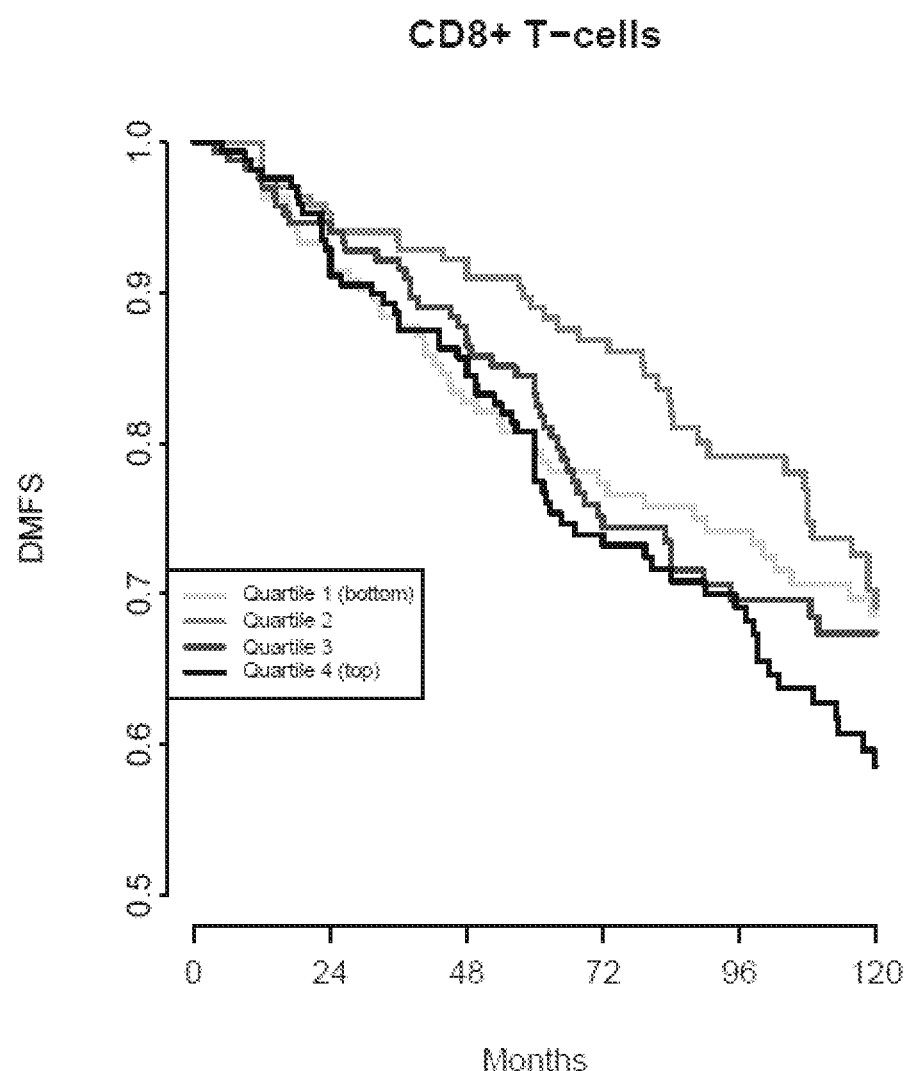
FIGS. 7A-7C show Kaplan-Meier curves showing the association of individual immune cell types predicted by Cibersort and clinical outcomes.
Figure 7B:
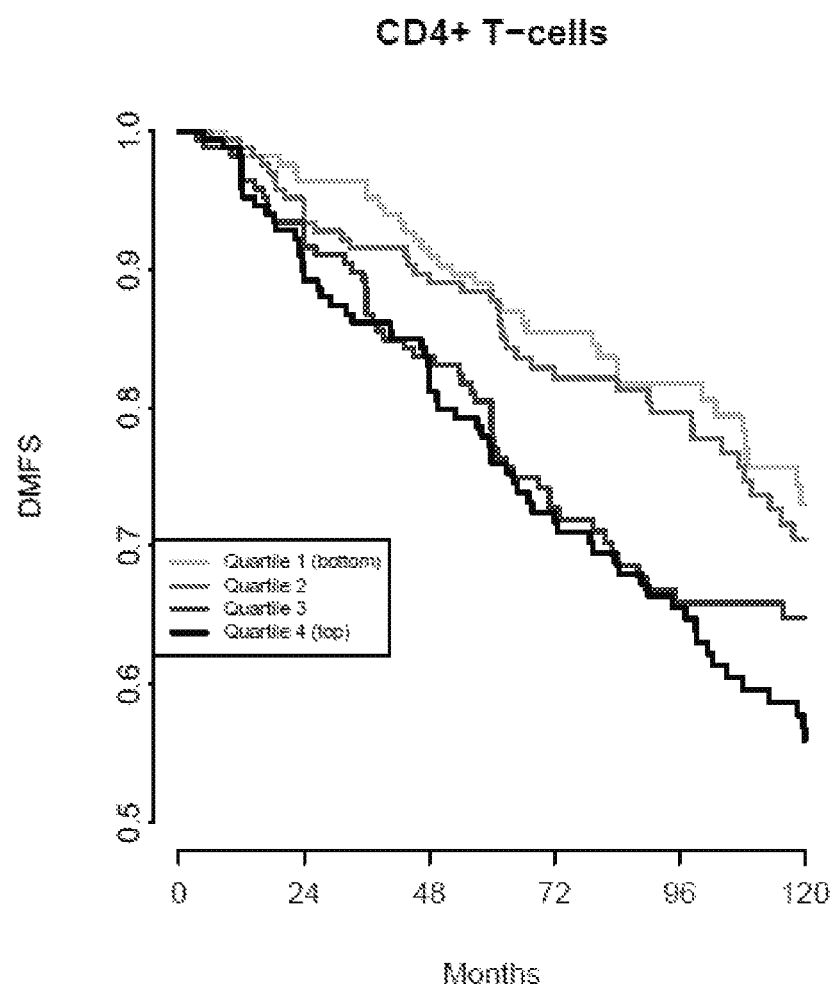
Figure 7C:
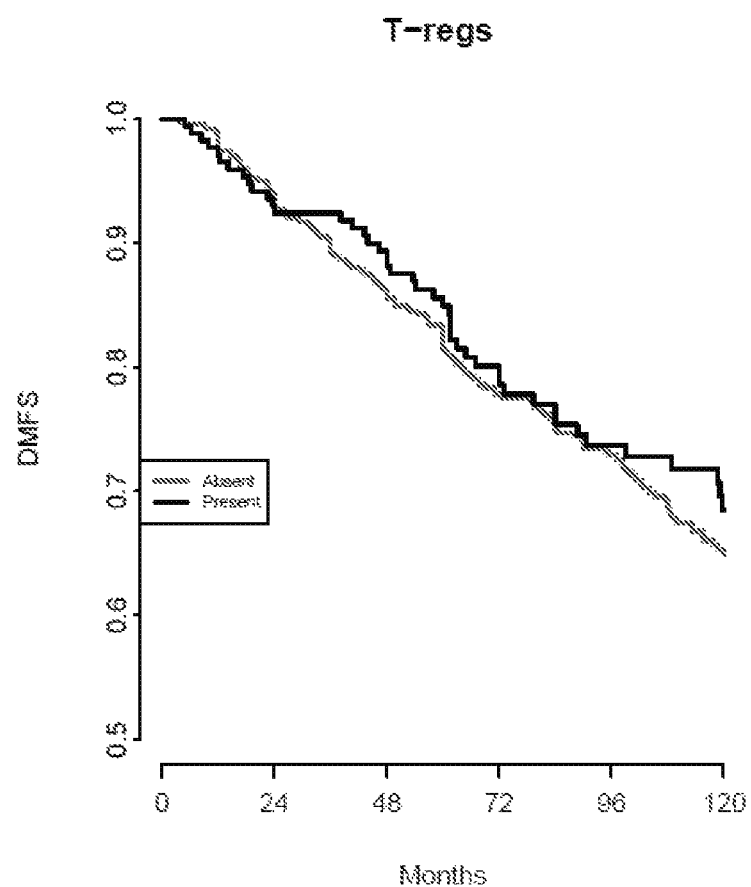

Several immune cell types conferred worse prognosis. The M1+M2 versus M0 ratio conferred statistically significantly worse DMFS (p=0.0015, HR=1.67 [95% CI=1.22-2.3], FIG. 6E). T-cells as a group were also associated with worse DMFS (p<0.0001, HR=1.61 [95% CI=1.30-2.01], FIG. 6F). Interestingly different T-cell subsets appear to have somewhat different trends with regards to DMFS. Higher levels of primarily CD4+ T-cells (p<0.0001, HR=1.57 [95% CI=1.25-1.97] and to a lesser extent CD8+ T-cells (p=0.044, HR=1.3 [95% CI=1.01-1.68]), appear to be associated with worse DMFS consistent with the findings by McArdle et al. (2004) Br J Cancer 91(3):541-3 (See FIGS. 7A-7C). T-regs (stratified into absent versus present as they were completely absent in >50% of samples) did not appear to be associated with prognosis. B-cells and neutrophils were not found to be associated with clinical outcomes.

Immune Checkpoint Targets are Prognostic

Figure 6G:
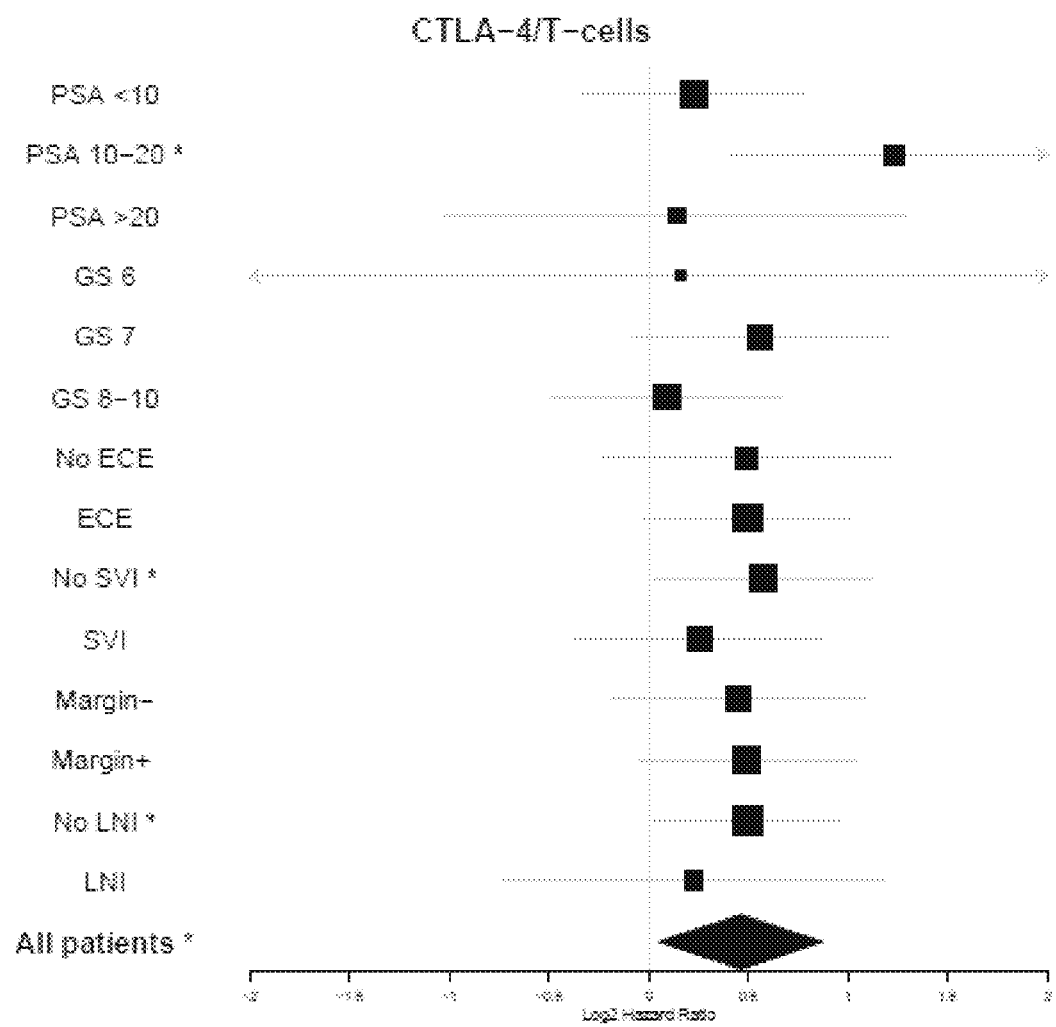
Figure 6H:
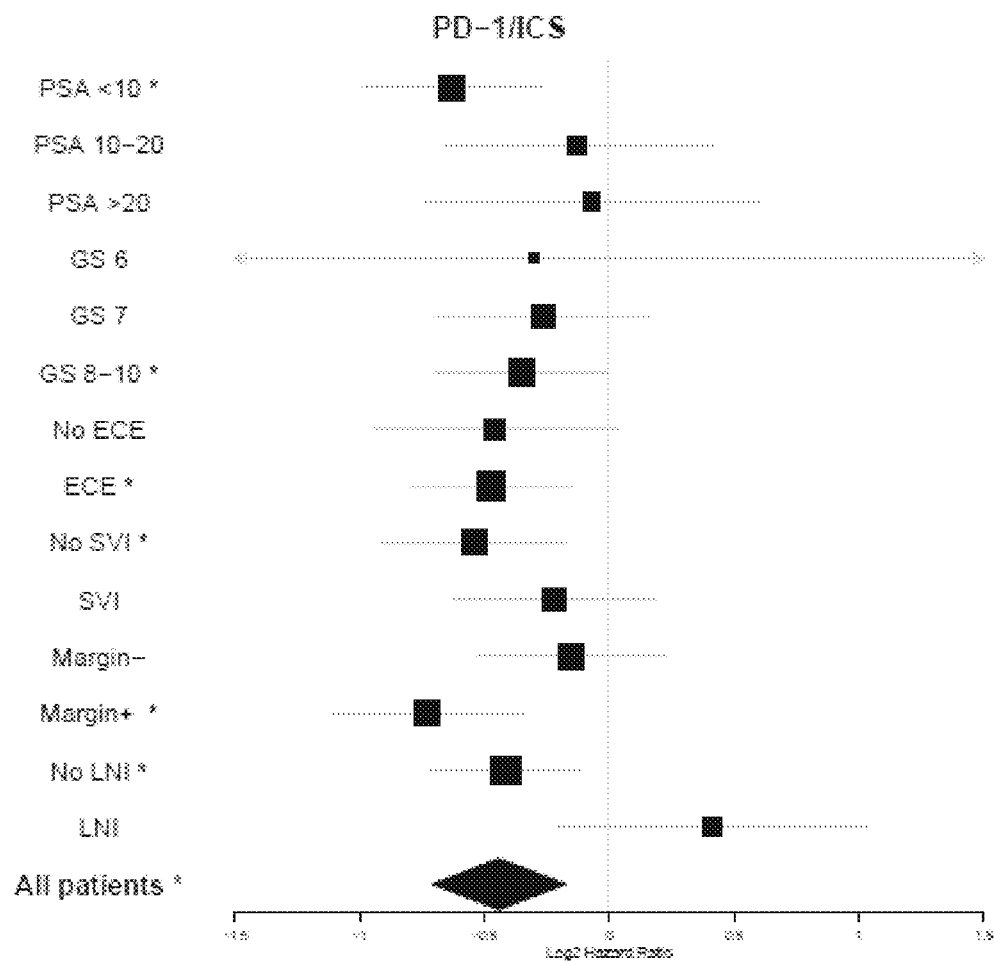
Figure 6I:
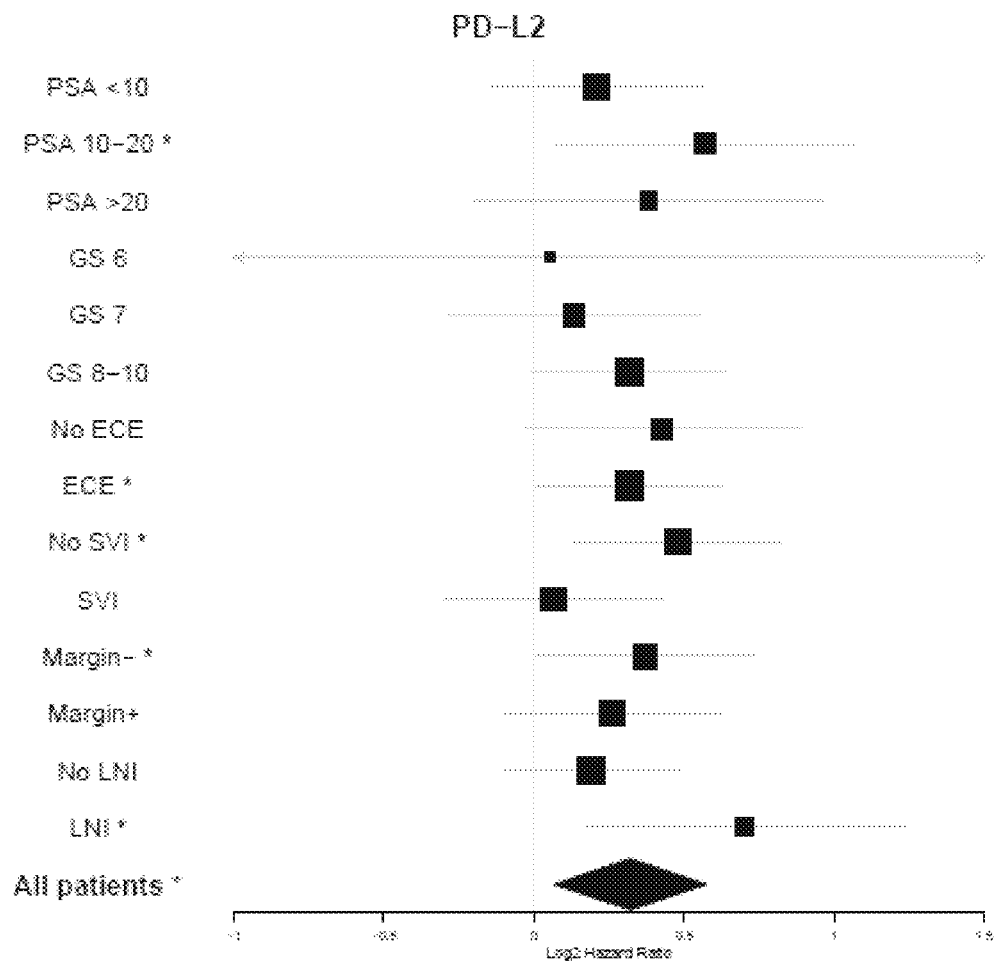

Immune checkpoint inhibitors target CTLA-4 and PD-1 on T-cells to stimulate an anti-tumor immune response. When examining CTLA-4 expression normalized to the estimated T-cell content (as CTLA-4 is T-cell specific), we found that higher CTLA-4 conferred worse bRFS (p=0.0089, HR=1.3 [95% CI=1.07-1.58]), DMFS (p=0.023, HR=1.38 [95% CI=1.04-1.83]), and PCSS (p=0.021, HR=1.65 [95% CI=1.08-2.54]) (FIG. 6G). Surprisingly, we observed the opposite trend for PD-1 normalized to estimated immune content (as PD-1 is expressed primarily on immune cells), with improved bRFS (p=0.036, HR=0.87 [95% CI=0.76-0.99]), DMFS (p=0.0013, HR=0.74 [95% CI=0.61-0.89]), and PCSS (p=0.0041, HR=0.67 [95% CI=0.51-0.88]), though it appears that the second lowest quartile had worse outcomes than the lowest quartile (FIG. 6H), suggesting that this association may not be strong. The PD-1 receptor interacts with tumoral ligands PD-L1 and PD-L2. PD-L1 was not associated with outcomes, consistent with its low expression in prostate cancer. However, PD-L2 was associated with worse bRFS (p=0.013, HR=1.17 [95% CI=1.03-1.33]), DMFS (p=0.014, HR=1.25 [95% CI=1.05-1.49]), and PCSS (p=0.0033, HR=1.45 [95% CI=1.13-1.86]) (FIG. 6I) and was also expressed at higher levels than PD-L1 across all 9393 samples (p<0.0001), suggesting that it may be the more prominent checkpoint antigen in prostate cancer. PD-L2 was associated with Gleason score, SVI, and LNI in the prospective cohort, with significant trends for Gleason and LNI in the retrospective cohort (see Table 5).

TABLE 5

Clinicopathologic variables and PD-L2

| | Retrospective | | | | | Prospective | | | | |
|---|---|---|---|---|---|---|---|---|---|---|
| | N | Mean | SD | Missing (%) | P-value | N | Mean | SD | Missing (%) | P-value |
| Age ≤65 | 990 | 0.0498 | 0.127 | 3 (0.002) | 0.12320151 | 2945 | 0.112 | 0.129 | 1362 (0.174) | 0.349115581 |
| Age >65 | 574 | 0.0599 | 0.124 | | | 3519 | 0.115 | 0.13 | | |
| PSA <10 | 907 | 0.0485 | 0.124 | 28 (0.018) | 0.152069759 | 3730 | 0.114 | 0.129 | 2945 (0.376) | 0.455483938 |
| PSA 10-20 | 389 | 0.0632 | 0.128 | | | 842 | 0.119 | 0.128 | | |

TABLE 5-continued

Clinicopathologic variables and PD-L2

| | Retrospective | | | | | Prospective | | | | |
|---|---|---|---|---|---|---|---|---|---|---|
| | N | Mean | SD | Missing (%) | P-value | N | Mean | SD | Missing (%) | P-value |
| PSA >20 | 243 | 0.0556 | 0.125 | | | 309 | 0.122 | 0.13 | | |
| Gleason 6 | 144 | 0.0545 | 0.107 | 4 (0.003) | 0.084735642 | 481 | 0.109 | 0.126 | 1362 (0.174) | 5.30E−07 |
| Gleason 7 | 881 | 0.0475 | 0.126 | | | 4612 | 0.109 | 0.127 | | |
| Gleason 8-10 | 538 | 0.0631 | 0.129 | | | 1371 | 0.131 | 0.137 | | |
| Margins− | 772 | 0.0559 | 0.125 | 3 (0.002) | 0.449286239 | 3134 | 0.114 | 0.13 | 1482 (0.189) | 0.84780985 |
| Margins+ | 792 | 0.0511 | 0.126 | | | 3210 | 0.113 | 0.129 | | |
| No SVI | 1115 | 0.0508 | 0.124 | 5 (0.004) | 0.186181577 | 5072 | 0.11 | 0.127 | 1641 (0.21) | 9.74E−05 |
| SVI | 446 | 0.0603 | 0.131 | | | 1113 | 0.128 | 0.138 | | |
| No LNI | 1393 | 0.0514 | 0.125 | 4 (0.003) | 0.070947827 | 5328 | 0.113 | 0.13 | 2223 (0.284) | 0.001787941 |
| LNI | 170 | 0.0708 | 0.132 | | | 275 | 0.14 | 0.137 | | |
| No ECE | 678 | 0.0546 | 0.128 | 7 (0.004) | 0.738611617 | 3011 | 0.114 | 0.128 | 1620 (0.207) | 0.967812159 |
| ECE | 882 | 0.0525 | 0.124 | | | 3195 | 0.114 | 0.132 | | |
| No RT | 1054 | 0.0565 | 0.126 | 3 (0.002) | 0.172726249 | | | | | |
| RT | 510 | 0.0472 | 0.126 | | | | | | | |
| No ADT | 870 | 0.0534 | 0.121 | 186 (0.119) | 0.257353237 | | | | | |
| ADT | 511 | 0.0615 | 0.133 | | | | | | | |

Exploratory Analysis of Radiation Response and PD-L2

GSEA was performed to examine which pathways are correlated with PD-L2 expression across the 9393 samples. Despite immune-related pathways only being a small minority of the nearly 5815 pathways examined, 18 of the top 25 gene sets were immune-related, and 6 were related to cellular adhesion, all consistent with the biological mechanism of PD-L2. All top 25 gene sets had FDRs<0.0001. Five of these gene sets contain PD-L2 and thus correlation of these pathways with PD-L2 expression is not surprising. However, the other 20 gene sets do not contain PD-L2, and thus the correlation of PD-L2 expression with these other immune-related and cellular adhesion pathways suggests that PD-L2 is playing a prominent role in immune modulation in prostate cancer.

Radiotherapy is thought to induce an immune response which could potentially lead to systemic abscopal effects by priming the immune system via local treatment which confers anti-tumor activity elsewhere in the body. There were only five total radiation-related gene sets in the pathways used for GSEA analysis. All radiation-related gene sets were positively enriched for genes highly correlated with PD-L2 expression, with FDRs<0.01. Upon examining clinical outcomes, PD-L2 was only prognostic in patients who did not receive PORT (p=0.0007, HR=1.66 [95% CI=1.24-2.22]) and not in patients who did. Patients with tumors with higher PD-L2 expression had worse outcomes compared to patients with tumors with lower PD-L2 expression. However, in patients who received PORT, this difference in outcomes by PD-L2 expression was diminished, suggesting that PORT was preferentially beneficial in patients with higher PD-L2 expression, supporting the correlation with radiation response in our GSEA analysis. The survival curves for the treated and untreated patients were not adjusted for baseline risk, and thus the patients who received RT had worse outcomes due to treatment selection bias. When we modeled the interaction between the continuous PD-L2 expression and PORT after adjusting for baseline risk by including CAPRA-S and accounting for treatment effects from ADT (n=1,002 as patients with unavailable treatment or CAPRA-S data were omitted), we observed a statistically significant interaction term (p=0.029, see Table 6) suggesting that PD-L2 predicts response to PORT.

TABLE 6

MVA interaction with PDL2 and PORT

| | Hazard Ratio | 2.50% | 97.50% | P-value |
|---|---|---|---|---|
| PORT | 1.25 | 0.95 | 1.64 | 0.114 |
| PDL2 | 5.46 | 1.75 | 17.02 | 0.003 |
| CAPRA-S | 1.14 | 1.09 | 1.2 | <0.0001 |
| Post-op ADT | 2.03 | 1.54 | 2.68 | <0.0001 |
| PORT:PDL2 | 0.13 | 0.02 | 0.82 | 0.029 |

These results showed that immune cell types and immune-cell gene expression are prognostic for prostate cancer in humans. These results further showed that the methods of the present disclosure are useful for prognosing and treating prostate cancer in humans. The results also showed that methods of the present disclosure are useful for identifying individuals in need of treatment for prostate cancer who will be responsive to radiation therapy.

While some embodiments of the disclosure have been illustrated and described, it will be appreciated that various changes can be made therein without departing from the spirit and scope of the disclosure.

What is claimed is:

1. A method for treating a subject for prostate cancer, the method comprising:
   a) obtaining a prognosis of the subject for distant metastasis-free survival (DMFS) based at least on levels of a plurality of immune cell types in a biological sample comprising prostate cancer cells from the subject, wherein the levels of the plurality of immune cell types comprise the ratio of the levels of M1 and M2 macrophages to M0 macrophages, wherein a higher ratio of the level of M1 and M2 macrophages to M0 macrophages compared to a reference value indicates that the subject will have a shorter DMFS; and
   b) administering a treatment to the subject based on the prognosis, wherein the prognosis of the subject indicates that the subject will have a shorter DMFS, and wherein the treatment comprises a treatment selected from the group consisting of surgery, chemotherapy, radiation therapy, immunotherapy/biological therapy, hormonal therapy, and photodynamic therapy.
2. The method of claim 1, wherein the method further comprises measuring or having measured levels of immune cell-specific gene expression of PD-L2, and wherein the administering the treatment to the subject in b) is based on the prognosis that is further based on immune cell-specific gene expression of PD-L2 in the sample, wherein the higher ratio of the level of M1 and M2 macrophages to M0 macrophages compared to the reference value and higher levels of immune cell-specific gene expression of PD-L2 in the sample compared to a reference value indicates that the subject will have shorter DMFS.

3. The method of claim 2, wherein the treatment comprises radiation therapy.

4. The method of claim 1, wherein the plurality of immune cells comprises activated and resting mast cells, and wherein administering the treatment to the subject in b) is based on the prognosis that is further based on the ratio of the level of activated and resting mast cells in the sample, wherein the higher ratio of the level of M1 and M2 macrophages to M0 macrophages compared to the reference value and a lower ratio of activated mast cells to resting mast cells compared to a reference value indicates that the subject will have shorter DMFS.

5. The method of claim 4, wherein the treatment comprises radiation therapy.

6. The method of claim 1, wherein the plurality of immune cells comprises activated and resting NK cells, and wherein administering the treatment to the subject in b) is based on the prognosis that is further based on the ratio of the level of activated and resting NK cells in the sample wherein the higher ratio of the level of M1 and M2 macrophages to M0 macrophages compared to the reference value and a lower ratio of activated NK cells to resting NK cells compared to a reference value indicates that the subject will have shorter DMFS.

7. The method of claim 6, wherein the treatment comprises radiation therapy.

8. The method of claim 1, wherein the plurality of immune cells comprises activated and resting dendritic cells, and wherein administering the treatment to the subject in b) is based on the prognosis that is further based on the ratio of the level of activated and resting dendritic cells in the sample, wherein the higher ratio of the level of M1 and M2 macrophages to M0 macrophages compared to the reference value and a lower ratio of activated dendritic cells to resting dendritic cells compared to a reference value indicates that the subject will have longer shorter DMFS.

9. The method of claim 8, wherein the treatment comprises radiation therapy.

10. The method of claim 1, wherein the levels of the plurality of immune cell types in the biological sample were calculated based on levels of immune cell-specific gene expression in the biological sample.

11. The method of claim 10, wherein the levels of immune cell-specific gene expression are determined by using a method selected from the group consisting of in situ hybridization, a PCR-based method, an array-based method, an immunohistochemical method, an RNA assay method and an immunoassay method.

12. The method of claim 10, wherein the levels of immune cell-specific gene expression are determined using one or more reagents selected from the group consisting of nucleic acid probes, nucleic acid primers, and antibodies.

13. The method of claim 10, wherein the levels of the plurality of immune cell types calculated based on levels of immune cell-specific gene expression in the biological sample further comprises the levels of at least one of the following pairs of immune cell types:
  i) activated mast cells and resting mast cells,
  ii) activated natural killer (NK) cells and resting NK cells, or
  iii) activated dendritic cells and resting dendritic cells.

14. The method of claim 10, wherein the levels of the plurality of immune cell types calculated based on levels of immune cell-specific gene expression in the biological sample further comprises the levels of at least activated mast cells and resting mast cells.

15. The method of claim 10, wherein the levels of the plurality of immune cell types calculated based on levels of immune cell-specific gene expression in the biological sample further comprises the levels of at least activated natural killer (NK) cells and resting NK cells.

16. The method of claim 10, wherein the levels of the plurality of immune cell types calculated based on levels of immune cell-specific gene expression in the biological sample further comprises the levels of at least activated dendritic cells and resting dendritic cells.

17. The method of claim 1, wherein the method is performed after the subject undergoes radical prostatectomy.

18. The method of claim 1, wherein the biological sample is a biopsy or a tumor sample.

19. The method of claim 1, wherein the treatment comprises radiation therapy.

* * * * *